US012745303B2

(12) United States Patent
Cirik et al.

(10) Patent No.: US 12,745,303 B2

(45) Date of Patent: Sep. 22, 2026

(54) DETERMINATION OF POWER CONTROL PARAMETERS

(71) Applicant: Comcast Cable Communications, LLC, Philadelphia, PA (US)

(72) Inventors: Ali Cagatay Cirik, Chantilly, VA (US); Hua Zhou, Vienna, VA (US); Esmael Hejazi Dinan, McLean, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 429 days.

(21) Appl. No.: 18/446,237

(22) Filed: Aug. 8, 2023

(65) Prior Publication Data

US 2024/0049330 A1 Feb. 8, 2024

Related U.S. Application Data

(60) Provisional application No. 63/395,946, filed on Aug. 8, 2022.

(51) Int. Cl.

| | |
|---|---|
| ***H04W 72/232*** | (2023.01) |
| ***H04W 52/14*** | (2009.01) |
| ***H04W 72/1268*** | (2023.01) |
| ***H04W 76/19*** | (2018.01) |

(52) U.S. Cl.

CPC ......... *H04W 76/19* (2018.02); *H04W 52/146* (2013.01); *H04W 72/1268* (2013.01); *H04W 72/232* (2023.01)

(58) Field of Classification Search

CPC ............. H04W 74/0833; H04W 16/28; H04W 74/0836; H04W 76/27; H04W 72/542; H04W 52/08; H04W 52/10; H04W 52/242; H04W 52/04; H04W 56/001; H04W 72/232; H04W 72/21; H04W 52/146; H04W 52/325; H04W 36/305;

(Continued)

(56) References Cited

U.S. PATENT DOCUMENTS

| | | | |
|---|---|---|---|
| 10,772,119 | B2 | 9/2020 | Zhou et al. |
| 10,805,148 | B2 | 10/2020 | Zhou et al. |
| 11,303,345 | B2 | 4/2022 | Cirik et al. |

(Continued)

FOREIGN PATENT DOCUMENTS

| | | | |
|---|---|---|---|
| WO | 2022083774 | A1 | 4/2022 |
| WO | 2022133172 | A1 | 6/2022 |
| WO | 2022151005 | A1 | 7/2022 |

OTHER PUBLICATIONS

Dec. 19, 2023—European Search Report—EP App. No. 23190349.3.

(Continued)

*Primary Examiner* — Tu X Nguyen

(74) *Attorney, Agent, or Firm* — Banner & Witcoff, Ltd.

(57) ABSTRACT

A wireless device may determine a transmission power for uplink signal transmission following completion of a beam failure recovery procedure. Transmission power determination may be based on a power control parameter set as selected by the wireless device. Selection of the power control parameter set may be based on a beam failure detection (BFD) set, of a plurality of configured BFD sets, associated with the beam failure recovery procedure and/or based on a transmission and reception point (TRP) associated with the uplink signal transmission.

20 Claims, 28 Drawing Sheets

(58) Field of Classification Search
CPC ... H04W 52/36; H04W 52/38; H04W 52/346; H04W 40/246; H04W 52/248
See application file for complete search history.

(56) References Cited

U.S. PATENT DOCUMENTS

| | | | | |
|---|---|---|---|---|
| 11,337,163 | B2 | 5/2022 | Cirik et al. | |
| 11,337,164 | B2 | 5/2022 | Xu et al. | |
| 2020/0260300 | A1 | 8/2020 | Cirik et al. | |
| 2020/0267663 | A1 | 8/2020 | Xu et al. | |
| 2020/0351794 | A1 | 11/2020 | Xu et al. | |
| 2021/0029649 | A1 | 1/2021 | Cirik et al. | |
| 2021/0029650 | A1 | 1/2021 | Cirik et al. | |
| 2021/0105727 | A1 | 4/2021 | Xu et al. | |
| 2021/0105765 | A1 | 4/2021 | Cirik et al. | |
| 2021/0219275 | A1 | 7/2021 | Xu et al. | |
| 2021/0258894 | A1* | 8/2021 | Yao | H04W 72/23 |
| 2021/0321379 | A1 | 10/2021 | Cirik et al. | |
| 2021/0336685 | A1 | 10/2021 | Cirik et al. | |
| 2021/0360701 | A1 | 11/2021 | Xu et al. | |
| 2022/0022141 | A1 | 1/2022 | Cirik et al. | |
| 2022/0030521 | A1 | 1/2022 | Cirik et al. | |
| 2022/0167278 | A1 | 5/2022 | Cirik et al. | |
| 2022/0167279 | A1 | 5/2022 | Zhou et al. | |
| 2022/0210679 | A1 | 6/2022 | Cirik et al. | |
| 2022/0210862 | A1 | 6/2022 | Cirik et al. | |
| 2022/0225135 | A1 | 7/2022 | Cirik et al. | |
| 2022/0240193 | A1 | 7/2022 | Xu et al. | |

OTHER PUBLICATIONS

3GPP TS 38.213 V17.2.0 (Jun. 2022) 3rd Generation Partnership Project; Technical Specification Group Radio Access Network; NR; Physical layer procedures for control (Release 17).
3GPP TS 38.214 V17.2.0 (Jun. 2022) 3rd Generation Partnership Project; Technical Specification Group Radio Access Network; NR; Physical layer procedures for data (Release 17).
3GPP TS 38.300 V17.1.0 (Jun. 2022), 3rd Generation Partnership Project; Technical Specification Group Radio Access Network; NR; NR and NG-RAN Overall Description; Stage 2 (Release 17).
3GPP TS 38.321 V17.1.0 (Jun. 2022), 3rd Generation Partnership Project; Technical Specification Group Radio Access Network; NR; Medium Access Control (MAC) protocol specification (Release 17).
3GPP TS 38.331 V17.1.0 (Jun. 2022), 3rd Generation Partnership Project; Technical Specification Group Radio Access Network; NR; Radio Resource Control (RRC) protocol specification (Release 17).
R1-2203257 3GPP TSG RAN WG1 Meeting #109-e, e-Meeting, May 9-20, 2022, Source: ZTE, Title: Remaining issues on multi-beam enhancements.
R1-2203258 3GPP TSG RAN WG1 Meeting #109-e, e-Meeting, May 9-May 20, 2022, Source: Moderator (ZTE), Title: Moderator Summary for Rel. 17 NR FeMIMO maintenance: Item 1: multi-beam.
R1-2203505 3GPP TSG RAN WG1 Meeting #109-e, e-Meeting, May 9-May 20, 2022, Source: vivo, Title: Maintenance on multi-beam enhancement.
R1-2203948 3GPP TSG RAN WG1 Meeting #109-e, e-Meeting, May 9-20, 2022, Source: OPPO, Title: Remaining Issues of Enhancements on Multi-Beam Operation.
R1-2204169 3GPP TSG RAN WG1 Meeting #109-e, e-Meeting, May 9-20, 2022, Source: Lenovo, Title: Remaining issues on multi-beam operation.
R1-2204682 3GPP TSG RAN WG1 Meeting #109-e, e-Meeting, May 9-20, 2022, Source: MediaTek Inc., Title: Maintenance of Rel-17 multi-beam operation.
R1-2204976 3GPP TSG RAN WG1 Meeting #109-e, e-Meeting, May 9-20, 2022, Source: Qualcomm Incorporated, Title: Enhancements on Multi-beam Operation.
R1-2205130 3GPP TSG RAN WG1 Meeting #109-e, e-Meeting, May 9-20, 2022, Source: Moderator (ZTE), Title: Moderator Summary for Rel. 17 NR FeMIMO maintenance: Item 1: multi-beam.
R1-2205315 3GPP TSG RAN WG1 Meeting #109-e, e-Meeting, May 9-20, 2022, Source: Moderator (ZTE), Title: Moderator Summary #0 for Maintenance on Rel-17 Multi-Beam.
R1-2205422 3GPP TSG RAN WG1 Meeting #109-e, e-Meeting, May 9-20, 2022, Source: Moderator (ZTE), Title: Moderator Summary #1 for Maintenance on Rel-17 Multi-Beam.
R1-2205631 3GPP TSG RAN WG1 Meeting #109-e, e-Meeting, May 9-20, 2022, Source: Moderator (ZTE), Title: Moderator Summary #2 for Maintenance on Rel-17 Multi-Beam.

* cited by examiner

Logical Channels
PCCH BCCH CCCH DCCH DTCH

Transport Channels
PCH BCH DL-SCH

DCI

Physical Channels
PBCH PDSCH PDCCH

Physical Signals
PSS/SSS CSI-RS DM-RS PT-RS

Downlink

CCCH DCCH DTCH
UL-SCH RACH
UCI
PUSCH PUCCH PRACH
DM-RS PT-RS SRS

Uplink

1 Frame (10 ms)

0 1 2 3 4 5 6 7 8 9

1 Subframe (1 ms)

Subcarrier spacing = 15 kHz
1 slot per subframe

1 Slot (1 ms, 14 OFDM Symbols)

Subcarrier spacing = 30 kHz
2 slots per subframe

1 Slot (0.5 ms, 14 OFDM Symbols)

Subcarrier spacing = 60 kHz
4 slots per subframe

1 Slot (0.25 ms, 14 OFDM Symbols)

Subcarrier spacing = 120 kHz
8 slots per subframe

1 Slot (0.0125 ms, 14 OFDM Symbols)

```
ServingCellConfig ::=            SEQUENCE {
...
MIMOParam ::= SEQUENCE {
   additionalPCI-ToAddModList          SEQUENCE (SIZE(1..maxNrofAdditionalPCI)) OF SSB-MTC-AdditionalPCI
   additionalPCI-ToReleaseList         SEQUENCE (SIZE(1..maxNrofAdditionalPCI)) OF AdditionalPCIIndex
   unifiedTCI-StateType                ENUMERATED {separate, joint}
   uplink-PowerControlToAddModList     SEQUENCE (SIZE (1..maxUL-TCI)) OF Uplink-powerControl
   uplink-PowerControlToReleaseList    SEQUENCE (SIZE (1..maxUL-TCI)) OF Uplink-powerControlId
   }


   SSB-MTC-AdditionalPCI ::=      SEQUENCE {
      additionalPCIIndex           AdditionalPCIIndex,
      additionalPCI                PhysCellId,
      ...
   }
   Uplink-powerControl  ::= SEQUENCE {
      ul-powercontrolId            Uplink-powerControlId,
      p0AlphaSetforPUSCH           P0AlphaSet
      p0AlphaSetforPUCCH           P0AlphaSet
      p0AlphaSetforSRS             P0AlphaSet}

      P0AlphaSet::=         SEQUENCE {
         p0                        INTEGER (-16..15)
         alpha                     Alpha
         closedLoopIndex           ENUMERATED { i0, i1}
   }
```

FIG. 17

UL Power Control 0
UL Power Control 1
...
UL Power Control M

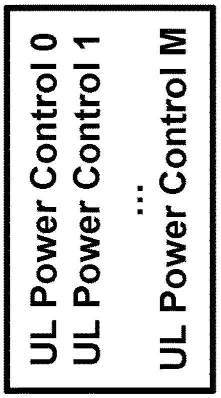

FIG. 21A

UL Power Control 0
UL Power Control 1
...
UL Power Control N

UL Power Control N+1
UL Power Control N+2
...
UL Power Control M

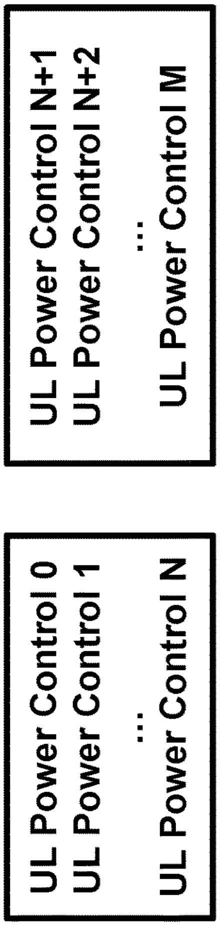

FIG. 21B

UL Power Control 0 (PCI 1)
UL Power Control 1 (PCI 2)
UL Power Control 2 (PCI 1)
UL Power Control 3 (PCI 1)
...
UL Power Control M-1 (PCI 2)
UL Power Control M (PCI 2)

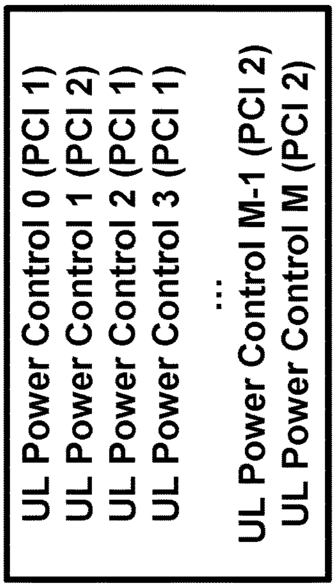

FIG. 21C

PCI 1

UL Power Control 0
UL Power Control 1
...
UL Power Control N

PCI 2

UL Power Control N+1
UL Power Control N+2
...
UL Power Control M

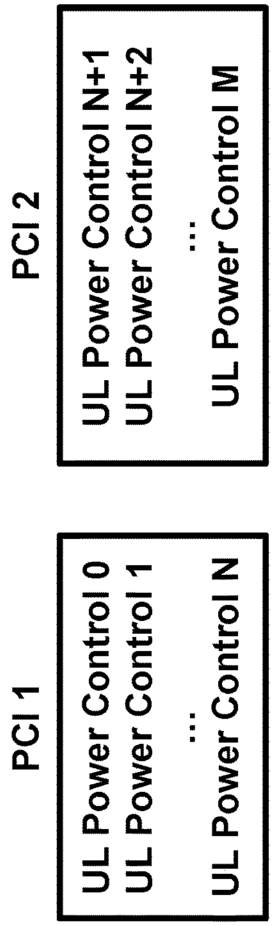

FIG. 21D

DETERMINATION OF POWER CONTROL PARAMETERS

CROSS-REFERENCE TO RELATED APPLICATIONS

This application claims the benefit of U.S. Provisional Application No. 63/395,946, filed on Aug. 8, 2022. The above-referenced application is hereby incorporated by reference in its entirety.

BACKGROUND

A wireless device communicates with a base station (e.g., via a transmission and reception point (TRP)). The wireless device determines a transmission power for communicating with the base station and/or the TRP.

SUMMARY

The following summary presents a simplified summary of certain features. The summary is not an extensive overview and is not intended to identify key or critical elements.

A communication device (e.g., a wireless device) may determine a transmission power to be used for a transmission (e.g., an uplink transmission). Transmission power determination, for uplink signal transmission, may follow completion of a beam failure recovery procedure. For example, a beam failure recovery procedure may be triggered by detection of a reduced radio link quality (e.g., received signal strength, signal to noise ratio (SNR), etc.) of a set of reference signals associated with a beam failure detection (BFD) set, and determination of a transmission power may follow completion of the triggered beam failure recovery procedure. To enable determination of the transmission power, multiple uplink power control sets (e.g., each comprising power control parameters) may be configured. Determination of the transmission power may be based on a default uplink power control set, among the multiple uplink power control sets. For transmissions to different receiving devices (e.g., transmission and reception points (TRPs)), different default uplink power control sets may be selected for transmissions to the different receiving devices. Selection of a default uplink power control set may be based on indexes associated with the default uplink power control sets and/or based on a use of multiple lists of uplink power control sets. For example, a first uplink power control set may be selected (e.g., from a first list of uplink power control set) for transmission to a first TRP and a second uplink power control set may be selected (e.g., from a second list of uplink power control set) for transmission to a second TRP. Use of different default uplink power control sets may reduce power consumption and/or reduce interference between communications involving the two TRPs.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 17 shows example MIMO configuration parameters.

FIG. 21A, FIG. 21B, FIG. 21C, and FIG. 21D show examples of uplink power control configurations.

DETAILED DESCRIPTION

Figure 1A:
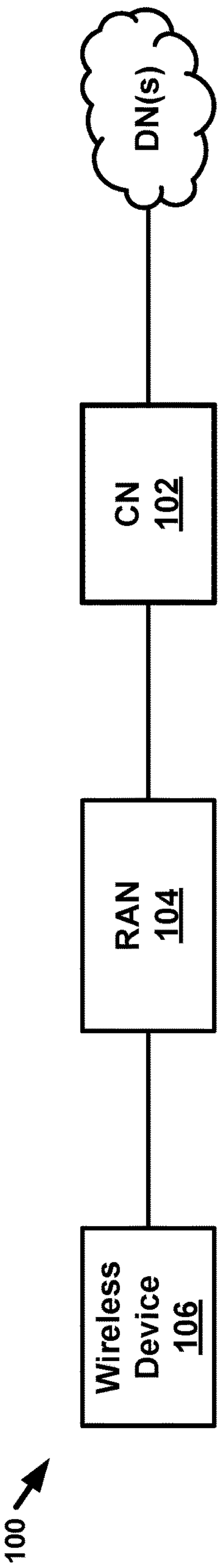
FIG. 1A and FIG. 1B show example communication networks.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems. More particularly, the technology disclosed herein may relate to determination of a transmission power.

FIG. 1A shows an example communication network 100. The communication network 100 may comprise a mobile communication network). The communication network 100 may comprise, for example, a public land mobile network (PLMN) operated/managed/run by a network operator. The communication network 100 may comprise one or more of a core network (CN) 102, a radio access network (RAN) 104, and/or a wireless device 106. The communication network 100 may comprise, and/or a device within the communication network 100 may communicate with (e.g., via CN 102), one or more data networks (DN(s)) 108. The wireless device 106 may communicate with one or more DNs 108, such as public DNs (e.g., the Internet), private DNs, and/or intra-operator DNs. The wireless device 106 may communicate with the one or more DNs 108 via the RAN 104 and/or via the CN 102. The CN 102 may provide/configure the wireless device 106 with one or more interfaces to the one or more DNs 108. As part of the interface functionality, the CN 102 may set up end-to-end connections between the wireless device 106 and the one or more DNs 108, authenticate the wireless device 106, provide/configure charging functionality, etc.

The wireless device 106 may communicate with the RAN 104 via radio communications over an air interface. The RAN 104 may communicate with the CN 102 via various communications (e.g., wired communications and/or wireless communications). The wireless device 106 may establish a connection with the CN 102 via the RAN 104. The RAN 104 may provide/configure scheduling, radio resource management, and/or retransmission protocols, for example, as part of the radio communications. The communication direction from the RAN 104 to the wireless device 106 over/via the air interface may be referred to as the downlink and/or downlink communication direction. The communication direction from the wireless device 106 to the RAN 104 over/via the air interface may be referred to as the uplink and/or uplink communication direction. Downlink transmissions may be separated and/or distinguished from uplink transmissions, for example, based on at least one of: frequency division duplexing (FDD), time-division duplexing (TDD), any other duplexing schemes, and/or one or more combinations thereof.

As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The RAN 104 may comprise one or more base stations (not shown). As used throughout, the term "base station" may comprise one or more of: a base station, a node, a Node B (NB), an evolved NodeB (eNB), a gNB, an ng-eNB, a relay node (e.g., an integrated access and backhaul (IAB) node), a donor node (e.g., a donor eNB, a donor gNB, etc.), an access point (e.g., a Wi-Fi access point), a transmission and reception point (TRP), a computing device, a device capable of wirelessly communicating, or any other device capable of sending and/or receiving signals. A base station may comprise one or more of each element listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an Evolved Node B (eNB) (e.g., associated with Evolved-Universal Terrestrial Radio Access (E-UTRA) and/or fourth-generation (4G) standards), a remote radio head (RRH), a baseband processing unit coupled to one or more remote radio heads (RRHs), a repeater node or relay node used to extend the coverage area of a donor node, a Next Generation Evolved Node B (ng-eNB), a Generation Node B (gNB) (e.g., associated with NR and/or fifth-generation (5G) standards), an access point (AP) (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

A base station (e.g., in the RAN 104) may comprise one or more sets of antennas for communicating with the wireless device 106 wirelessly (e.g., via an over the air interface). One or more base stations may comprise sets (e.g., three sets or any other quantity of sets) of antennas to respectively control multiple cells or sectors (e.g., three cells, three sectors, any other quantity of cells, or any other quantity of sectors). The size of a cell may be determined by a range at which a receiver (e.g., a base station receiver) may successfully receive transmissions from a transmitter (e.g., a wireless device transmitter) operating in the cell. One or more cells of base stations (e.g., by alone or in combination with other cells) may provide/configure a radio coverage to the wireless device 106 over a wide geographic area to support wireless device mobility. A base station comprising three sectors (e.g., or n-sector, where n refers to any quantity n) may be referred to as a three-sector site (e.g., or an n-sector site) or a three-sector base station (e.g., an n-sector base station).

One or more base stations (e.g., in the RAN 104) may be implemented as a sectored site with more or less than three sectors. One or more base stations of the RAN 104 may be implemented as an access point, as a baseband processing device/unit coupled to several RRHs, and/or as a repeater or relay node used to extend the coverage area of a node (e.g., a donor node). A baseband processing device/unit coupled to RRHs may be part of a centralized or cloud RAN architecture, for example, where the baseband processing device/unit may be centralized in a pool of baseband processing devices/units or virtualized. A repeater node may amplify and send (e.g., transmit, retransmit, rebroadcast, etc.) a radio signal received from a donor node. A relay node may perform the substantially the same/similar functions as a repeater node. The relay node may decode the radio signal received from the donor node, for example, to remove noise before amplifying and sending the radio signal.

The RAN 104 may be deployed as a homogenous network of base stations (e.g., macrocell base stations) that have similar antenna patterns and/or similar high-level transmit powers. The RAN 104 may be deployed as a heterogeneous network of base stations (e.g., different base stations that have different antenna patterns). In heterogeneous networks, small cell base stations may be used to provide/configure small coverage areas, for example, coverage areas that overlap with comparatively larger coverage areas provided/configured by other base stations (e.g., macrocell base stations). The small coverage areas may be provided/configured in areas with high data traffic (or so-called "hotspots") or in areas with a weak macrocell coverage. Examples of small cell base stations may comprise, in order of decreasing coverage area, microcell base stations, picocell base stations, and femtocell base stations or home base stations.

Examples described herein may be used in a variety of types of communications. For example, communications may be in accordance with the Third-Generation Partnership Project (3GPP) (e.g., one or more network elements similar to those of the communication network 100), communications in accordance with Institute of Electrical and Electronics Engineers (IEEE), communications in accordance with International Telecommunication Union (ITU), communications in accordance with International Organization for Standardization (ISO), etc. The 3GPP has produced specifications for multiple generations of mobile networks: a 3G network known as UMTS, a 4G network known as Long-Term Evolution (LTE) and LTE Advanced (LTE-A), and a 5G network known as 5G System (5GS) and NR system. 3GPP may produce specifications for additional generations of communication networks (e.g., 6G and/or any other generation of communication network). Examples may be described with reference to one or more elements (e.g., the RAN) of a 3GPP 5G network, referred to as a next-generation RAN (NG-RAN), or any other communication network, such as a 3GPP network and/or a non-3GPP network. Examples described herein may be applicable to other communication networks, such as 3G and/or 4G networks, and communication networks that may not yet be finalized/specified (e.g., a 3GPP 6G network), satellite communication networks, and/or any other communication network. NG-RAN implements and updates 5G radio access technology referred to as NR and may be provisioned to implement 4G radio access technology and/or other radio access technologies, such as other 3GPP and/or non-3GPP radio access technologies.

Figure 1B:
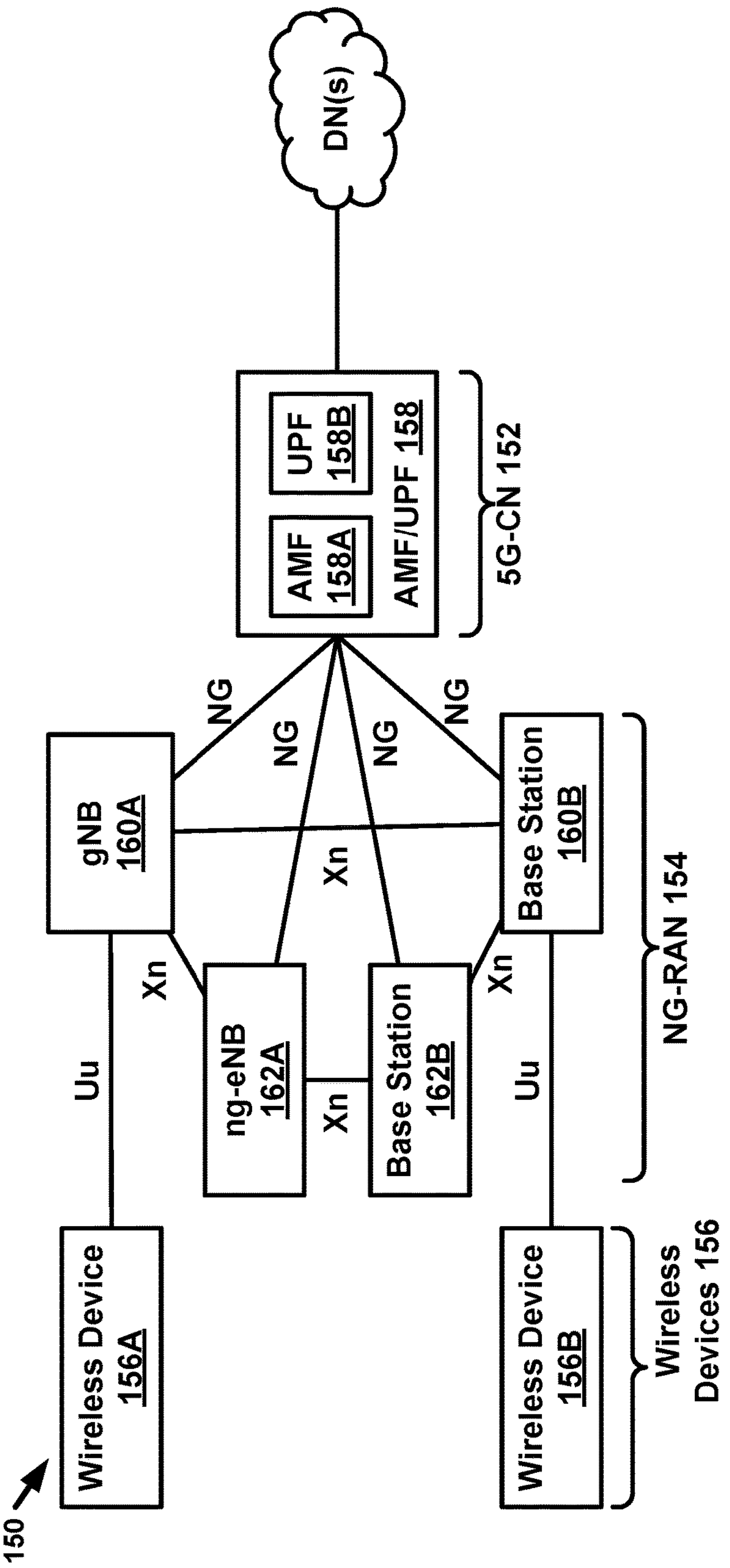

FIG. 1B shows an example communication network 150. The communication network may comprise a mobile communication network. The communication network 150 may comprise, for example, a PLMN operated/managed/run by a network operator. The communication network 150 may comprise one or more of: a CN 152 (e.g., a 5G core network (5G-CN)), a RAN 154 (e.g., an NG-RAN), and/or wireless devices 156A and 156B (collectively wireless device(s) 156). The communication network 150 may comprise, and/or a device within the communication network 150 may communicate with (e.g., via CN 152), one or more data networks (DN(s)) 170. These components may be implemented and operate in substantially the same or similar manner as corresponding components described with respect to FIG. 1A.

The CN 152 (e.g., 5G-CN) may provide/configure the wireless device(s) 156 with one or more interfaces to one or more DNs 170, such as public DNs (e.g., the Internet), private DNs, and/or intra-operator DNs. As part of the interface functionality, the CN 152 (e.g., 5G-CN) may set up end-to-end connections between the wireless device(s) 156 and the one or more DNs, authenticate the wireless device(s) 156, and/or provide/configure charging functionality. The CN 152 (e.g., the 5G-CN) may be a service-based architecture, which may differ from other CNs (e.g., such as a 3GPP 4G CN). The architecture of nodes of the CN 152 (e.g., 5G-CN) may be defined as network functions that offer services via interfaces to other network functions. The network functions of the CN 152 (e.g., 5G CN) may be implemented in several ways, for example, as network elements on dedicated or shared hardware, as software instances running on dedicated or shared hardware, and/or as virtualized functions instantiated on a platform (e.g., a cloud-based platform).

The CN 152 (e.g., 5G-CN) may comprise an Access and Mobility Management Function (AMF) device 158A and/or a User Plane Function (UPF) device 158B, which may be separate components or one component AMF/UPF device 158. The UPF device 158B may serve as a gateway between a RAN 154 (e.g., NG-RAN) and the one or more DNs 170. The UPF device 158B may perform functions, such as: packet routing and forwarding, packet inspection and user plane policy rule enforcement, traffic usage reporting, uplink classification to support routing of traffic flows to the one or more DNs 170, quality of service (QoS) handling for the user plane (e.g., packet filtering, gating, uplink/downlink rate enforcement, and uplink traffic verification), downlink packet buffering, and/or downlink data notification triggering. The UPF device 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The wireless device(s) 156 may be configured to receive services via a PDU session, which may be a logical connection between a wireless device and a DN.

The AMF device 158A may perform functions, such as: Non-Access Stratum (NAS) signaling termination, NAS signaling security, Access Stratum (AS) security control, inter-CN node signaling for mobility between access networks (e.g., 3GPP access networks and/or non-3GPP networks), idle mode wireless device reachability (e.g., idle mode UE reachability for control and execution of paging retransmission), registration area management, intra-system and inter-system mobility support, access authentication, access authorization including checking of roaming rights, mobility management control (e.g., subscription and policies), network slicing support, and/or session management function (SMF) selection. NAS may refer to the functionality operating between a CN and a wireless device, and AS may refer to the functionality operating between a wireless device and a RAN.

The CN 152 (e.g., 5G-CN) may comprise one or more additional network functions that may not be shown in FIG. 1B. The CN 152 (e.g., 5G-CN) may comprise one or more devices implementing at least one of: a Session Management Function (SMF), an NR Repository Function (NRF), a Policy Control Function (PCF), a Network Exposure Function (NEF), a Unified Data Management (UDM), an Application Function (AF), an Authentication Server Function (AUSF), and/or any other function.

The RAN 154 (e.g., NG-RAN) may communicate with the wireless device(s) 156 via radio communications (e.g., an over the air interface). The wireless device(s) 156 may communicate with the CN 152 via the RAN 154. The RAN 154 (e.g., NG-RAN) may comprise one or more first-type base stations (e.g., gNBs comprising a gNB 160A and a gNB 160B (collectively gNBs 160)) and/or one or more second-type base stations (e.g., ng eNBs comprising an ng-eNB 162A and an ng-eNB 162B (collectively ng eNBs 162)). The RAN 154 may comprise one or more of any quantity of types of base station. The gNBs 160 and ng eNBs 162 may be referred to as base stations. The base stations (e.g., the gNBs 160 and ng eNBs 162) may comprise one or more sets of antennas for communicating with the wireless device(s) 156 wirelessly (e.g., an over an air interface). One or more base stations (e.g., the gNBs 160 and/or the ng eNBs 162) may comprise multiple sets of antennas to respectively control multiple cells (or sectors). The cells of the base stations (e.g., the gNBs 160 and the ng-eNBs 162) may provide a radio coverage to the wireless device(s) 156 over a wide geographic area to support wireless device mobility.

The base stations (e.g., the gNBs 160 and/or the ng-eNBs 162) may be connected to the CN 152 (e.g., 5G CN) via a first interface (e.g., an NG interface) and to other base stations via a second interface (e.g., an Xn interface). The NG and Xn interfaces may be established using direct physical connections and/or indirect connections over an underlying transport network, such as an internet protocol (IP) transport network. The base stations (e.g., the gNBs 160 and/or the ng-eNBs 162) may communicate with the wireless device(s) 156 via a third interface (e.g., a Uu interface). A base station (e.g., the gNB 160A) may communicate with the wireless device 156A via a Uu interface. The NG, Xn, and Uu interfaces may be associated with a protocol stack. The protocol stacks associated with the interfaces may be used by the network elements shown in FIG. 1B to exchange data and signaling messages. The protocol stacks may comprise two planes: a user plane and a control plane. Any other quantity of planes may be used (e.g., in a protocol stack). The user plane may handle data of interest to a user. The control plane may handle signaling messages of interest to the network elements.

One or more base stations (e.g., the gNBs 160 and/or the ng-eNBs 162) may communicate with one or more AMF/UPF devices, such as the AMF/UPF 158, via one or more interfaces (e.g., NG interfaces). A base station (e.g., the gNB 160A) may be in communication with, and/or connected to, the UPF 158B of the AMF/UPF 158 via an NG-User plane (NG-U) interface. The NG-U interface may provide/perform delivery (e.g., non-guaranteed delivery) of user plane PDUs between a base station (e.g., the gNB 160A) and a UPF device (e.g., the UPF 158B). The base station (e.g., the gNB 160A) may be in communication with, and/or connected to, an AMF device (e.g., the AMF 158A) via an NG-Control plane (NG-C) interface. The NG-C interface may provide/perform, for example, NG interface management, wireless device context management (e.g., UE context management), wireless device mobility management (e.g., UE mobility management), transport of NAS messages, paging, PDU session management, configuration transfer, and/or warning message transmission.

A wireless device may access the base station, via an interface (e.g., Uu interface), for the user plane configuration and the control plane configuration. The base stations (e.g., gNBs 160) may provide user plane and control plane protocol terminations towards the wireless device(s) 156 via the Uu interface. A base station (e.g., the gNB 160A) may provide user plane and control plane protocol terminations toward the wireless device 156A over a Uu interface associated with a first protocol stack. A base station (e.g., the ng-eNBs 162) may provide Evolved UMTS Terrestrial Radio Access (E UTRA) user plane and control plane protocol terminations towards the wireless device(s) 156 via a Uu interface (e.g., where E UTRA may refer to the 3GPP 4G radio-access technology). A base station (e.g., the ng-eNB 162B) may provide E UTRA user plane and control plane protocol terminations towards the wireless device 156B via a Uu interface associated with a second protocol stack. The user plane and control plane protocol terminations may comprise, for example, NR user plane and control plane protocol terminations, 4G user plane and control plane protocol terminations, etc.

The CN 152 (e.g., 5G-CN) may be configured to handle one or more radio accesses (e.g., NR, 4G, and/or any other radio accesses). It may also be possible for an NR network/device (or any first network/device) to connect to a 4G core network/device (or any second network/device) in a non-standalone mode (e.g., non-standalone operation). In a non-standalone mode/operation, a 4G core network may be used to provide (or at least support) control-plane functionality (e.g., initial access, mobility, and/or paging). Although only one AMF/UPF 158 is shown in FIG. 1B, one or more base stations (e.g., one or more gNBs and/or one or more ng-eNBs) may be connected to multiple AMF/UPF nodes, for example, to provide redundancy and/or to load share across the multiple AMF/UPF nodes.

An interface (e.g., Uu, Xn, and/or NG interfaces) between network elements (e.g., the network elements shown in FIG. 1B) may be associated with a protocol stack that the network elements may use to exchange data and signaling messages. A protocol stack may comprise two planes: a user plane and a control plane. Any other quantity of planes may be used (e.g., in a protocol stack). The user plane may handle data associated with a user (e.g., data of interest to a user). The control plane may handle data associated with one or more network elements (e.g., signaling messages of interest to the network elements).

The communication network 100 in FIG. 1A and/or the communication network 150 in FIG. 1B may comprise any quantity/number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, a satellite network, and/or any other network for wireless communications (e.g., any 3GPP network and/or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network.

Figure 2A:
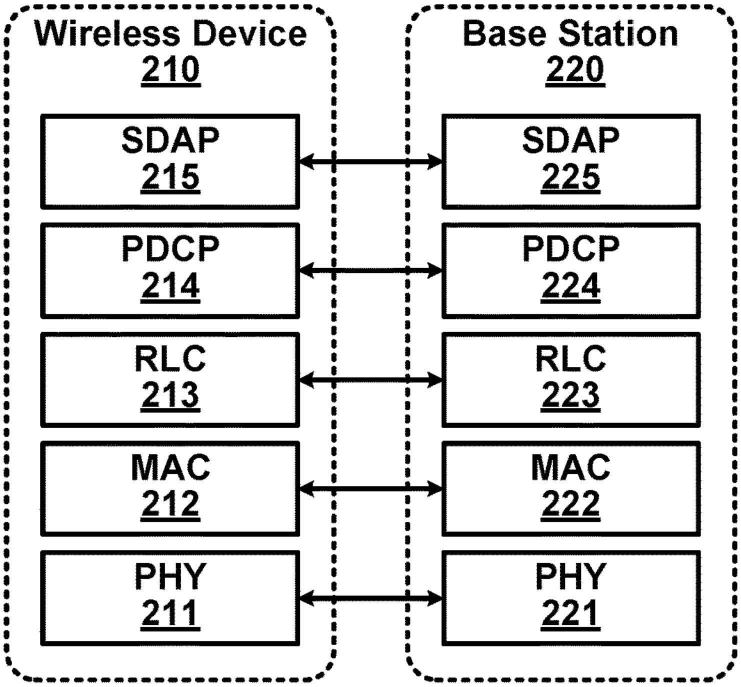
FIG. 2A shows an example user plane.
Figure 2B:
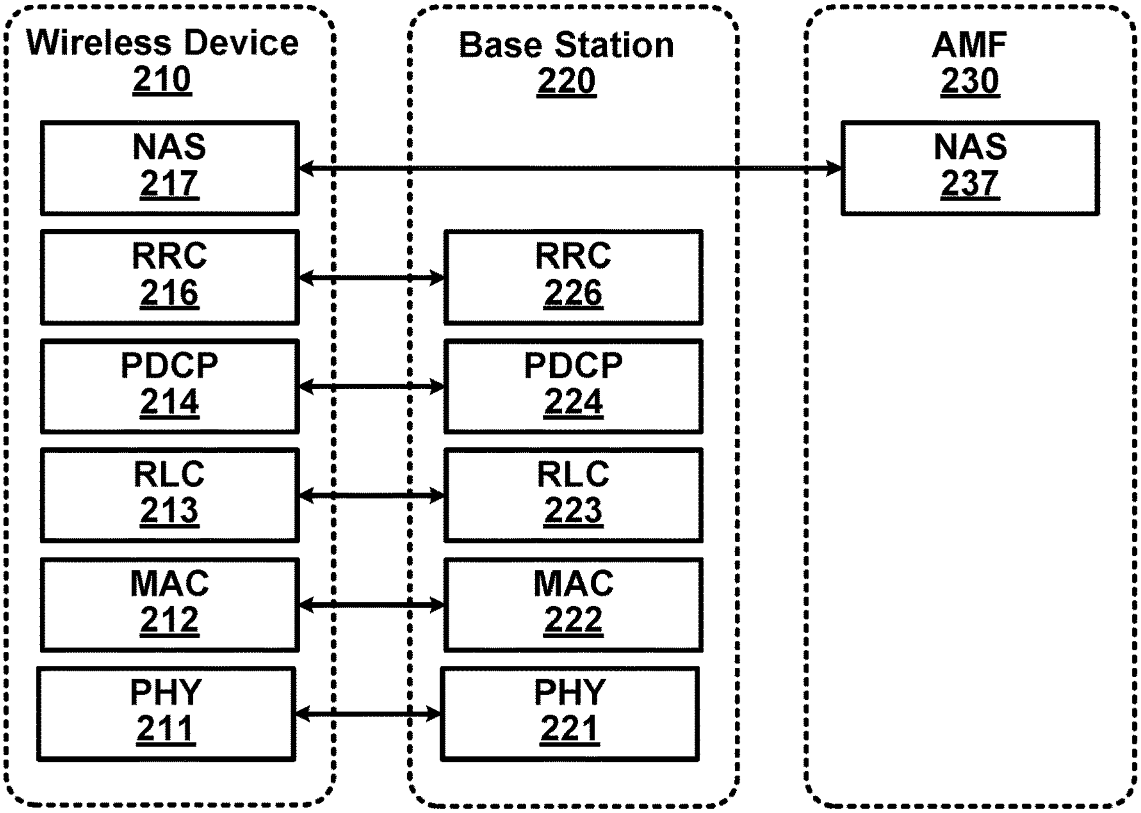
FIG. 2B shows an example control plane configuration.

FIG. 2A shows an example user plane configuration. The user plane configuration may comprise, for example, an NR user plane protocol stack. FIG. 2B shows an example control plane configuration. The control plane configuration may comprise, for example, an NR control plane protocol stack. One or more of the user plane configuration and/or the control plane configuration may use a Uu interface that may be between a wireless device 210 and a base station 220. The protocol stacks shown in FIG. 2A and FIG. 2B may be substantially the same or similar to those used for the Uu interface between, for example, the wireless device 156A and the base station 160A shown in FIG. 1B.

A user plane configuration (e.g., an NR user plane protocol stack) may comprise multiple layers (e.g., five layers or any other quantity of layers) implemented in the wireless device 210 and the base station 220 (e.g., as shown in FIG.

2A). At the bottom of the protocol stack, physical layers (PHYs) 211 and 221 may provide transport services to the higher layers of the protocol stack and may correspond to layer 1 of the Open Systems Interconnection (OSI) model. The protocol layers above PHY 211 may comprise a medium access control layer (MAC) 212, a radio link control layer (RLC) 213, a packet data convergence protocol layer (PDCP) 214, and/or a service data application protocol layer (SDAP) 215. The protocol layers above PHY 221 may comprise a medium access control layer (MAC) 222, a radio link control layer (RLC) 223, a packet data convergence protocol layer (PDCP) 224, and/or a service data application protocol layer (SDAP) 225. One or more of the four protocol layers above PHY 211 may correspond to layer 2, or the data link layer, of the OSI model. One or more of the four protocol layers above PHY 221 may correspond to layer 2, or the data link layer, of the OSI model.

Figure 3:
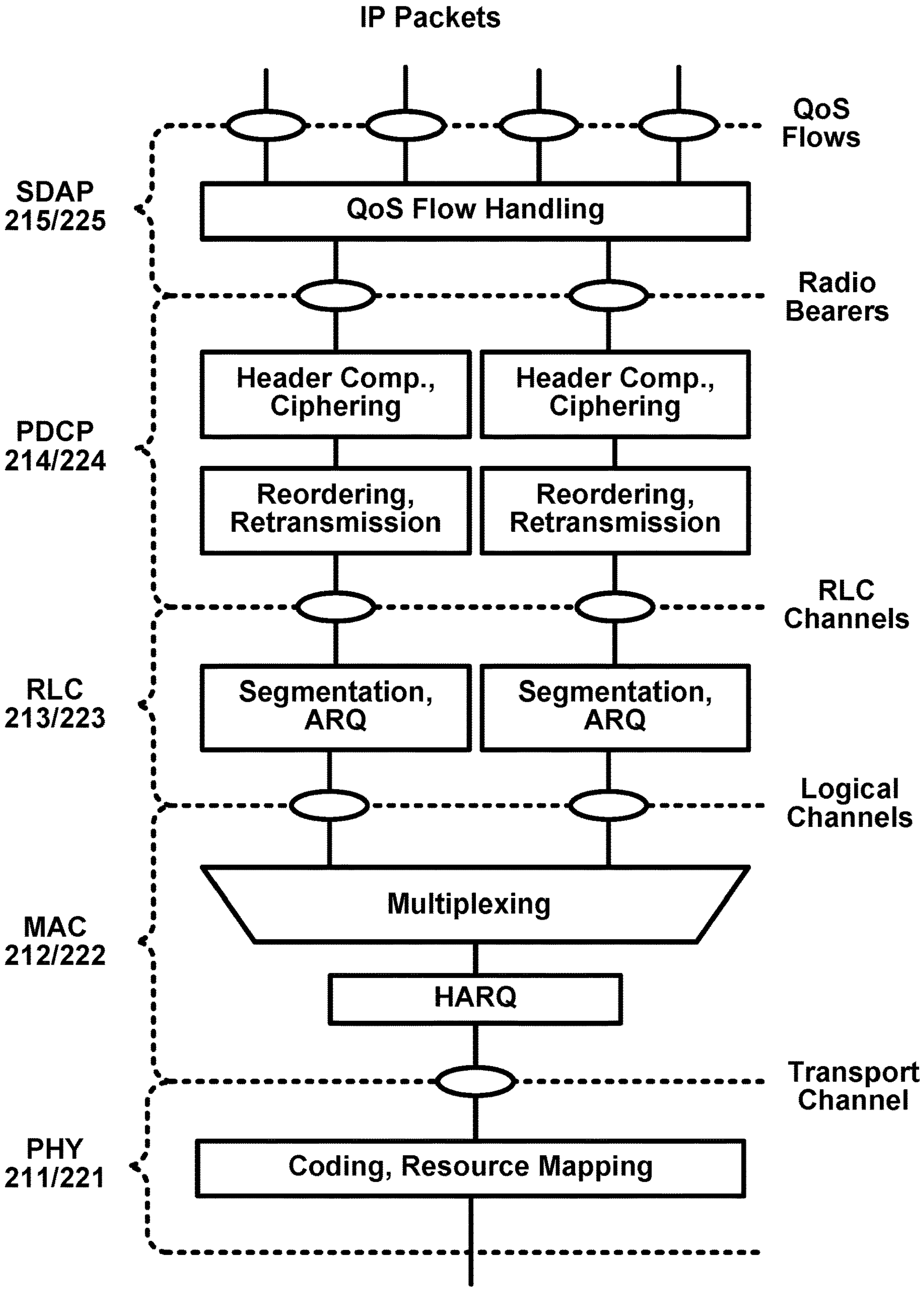
FIG. 3 shows example of protocol layers.

FIG. 3 shows an example of protocol layers. The protocol layers may comprise, for example, protocol layers of the NR user plane protocol stack. One or more services may be provided between protocol layers. SDAPs (e.g., SDAPS 215 and 225 shown in FIG. 2A and FIG. 3) may perform Quality of Service (QoS) flow handling. A wireless device (e.g., the wireless devices 106, 156A, 156B, and 210) may receive services through/via a PDU session, which may be a logical connection between the wireless device and a DN. The PDU session may have one or more QoS flows 310. A UPF (e.g., the UPF 158B) of a CN may map IP packets to the one or more QoS flows of the PDU session, for example, based on one or more QoS requirements (e.g., in terms of delay, data rate, error rate, and/or any other quality/service requirement). The SDAPs 215 and 225 may perform mapping/de-mapping between the one or more QoS flows 310 and one or more radio bearers 320 (e.g., data radio bearers). The mapping/de-mapping between the one or more QoS flows 310 and the radio bearers 320 may be determined by the SDAP 225 of the base station 220. The SDAP 215 of the wireless device 210 may be informed of the mapping between the QoS flows 310 and the radio bearers 320 via reflective mapping and/or control signaling received from the base station 220. For reflective mapping, the SDAP 225 of the base station 220 may mark the downlink packets with a QoS flow indicator (QFI), which may be monitored/detected/identified/indicated/observed by the SDAP 215 of the wireless device 210 to determine the mapping/de-mapping between the one or more QoS flows 310 and the radio bearers 320.

PDCPs (e.g., the PDCPs 214 and 224 shown in FIG. 2A and FIG. 3) may perform header compression/decompression, for example, to reduce the amount of data that may need to be transmitted (e.g., sent) over the air interface, ciphering/deciphering to prevent unauthorized decoding of data transmitted (e.g., sent) over the air interface, and/or integrity protection (e.g., to ensure control messages originate from intended sources). The PDCPs 214 and 224 may perform retransmissions of undelivered packets, in-sequence delivery and reordering of packets, and/or removal of packets received in duplicate due to, for example, a handover (e.g., an intra-gNB handover). The PDCPs 214 and 224 may perform packet duplication, for example, to improve the likelihood of the packet being received. A receiver may receive the packet in duplicate and may remove any duplicate packets. Packet duplication may be useful for certain services, such as services that require high reliability.

The PDCP layers (e.g., PDCPs 214 and 224) may perform mapping/de-mapping between a split radio bearer and RLC channels (e.g., RLC channels 330) (e.g., in a dual connectivity scenario/configuration). Dual connectivity may refer to a technique that allows a wireless device to communicate with multiple cells (e.g., two cells) or, more generally, multiple cell groups comprising: a master cell group (MCG) and a secondary cell group (SCG). A split bearer may be configured and/or used, for example, if a single radio bearer (e.g., such as one of the radio bearers provided/configured by the PDCPs 214 and 224 as a service to the SDAPs 215 and 225) is handled by cell groups in dual connectivity. The PDCPs 214 and 224 may map/de-map between the split radio bearer and RLC channels 330 belonging to the cell groups.

RLC layers (e.g., RLCs 213 and 223) may perform segmentation, retransmission via Automatic Repeat Request (ARQ), and/or removal of duplicate data units received from MAC layers (e.g., MACs 212 and 222, respectively). The RLC layers (e.g., RLCs 213 and 223) may support multiple transmission modes (e.g., three transmission modes: transparent mode (TM); unacknowledged mode (UM); and acknowledged mode (AM)). The RLC layers may perform one or more of the noted functions, for example, based on the transmission mode an RLC layer is operating. The RLC configuration may be per logical channel. The RLC configuration may not depend on numerologies and/or Transmission Time Interval (TTI) durations (or other durations). The RLC layers (e.g., RLCs 213 and 223) may provide/configure RLC channels as a service to the PDCP layers (e.g., PDCPs 214 and 224, respectively), such as shown in FIG. 3.

The MAC layers (e.g., MACs 212 and 222) may perform multiplexing/demultiplexing of logical channels and/or mapping between logical channels and transport channels. The multiplexing/demultiplexing may comprise multiplexing/demultiplexing of data units/data portions, belonging to the one or more logical channels, into/from Transport Blocks (TB s) delivered to/from the PHY layers (e.g., PHYs 211 and 221, respectively). The MAC layer of a base station (e.g., MAC 222) may be configured to perform scheduling, scheduling information reporting, and/or priority handling between wireless devices via dynamic scheduling. Scheduling may be performed by a base station (e.g., the base station 220 at the MAC 222) for downlink/or and uplink. The MAC layers (e.g., MACs 212 and 222) may be configured to perform error correction(s) via Hybrid Automatic Repeat Request (HARQ) (e.g., one HARQ entity per carrier in case of Carrier Aggregation (CA)), priority handling between logical channels of the wireless device 210 via logical channel prioritization and/or padding. The MAC layers (e.g., MACs 212 and 222) may support one or more numerologies and/or transmission timings. Mapping restrictions in a logical channel prioritization may control which numerology and/or transmission timing a logical channel may use. The MAC layers (e.g., the MACs 212 and 222) may provide/configure logical channels 340 as a service to the RLC layers (e.g., the RLCs 213 and 223).

The PHY layers (e.g., PHYs 211 and 221) may perform mapping of transport channels to physical channels and/or digital and analog signal processing functions, for example, for sending and/or receiving information (e.g., via an over the air interface). The digital and/or analog signal processing functions may comprise, for example, coding/decoding and/or modulation/demodulation. The PHY layers (e.g., PHYs 211 and 221) may perform multi-antenna mapping. The PHY layers (e.g., the PHYs 211 and 221) may provide/configure one or more transport channels (e.g., transport channels 350) as a service to the MAC layers (e.g., the MACs 212 and 222, respectively).

Figure 4A:
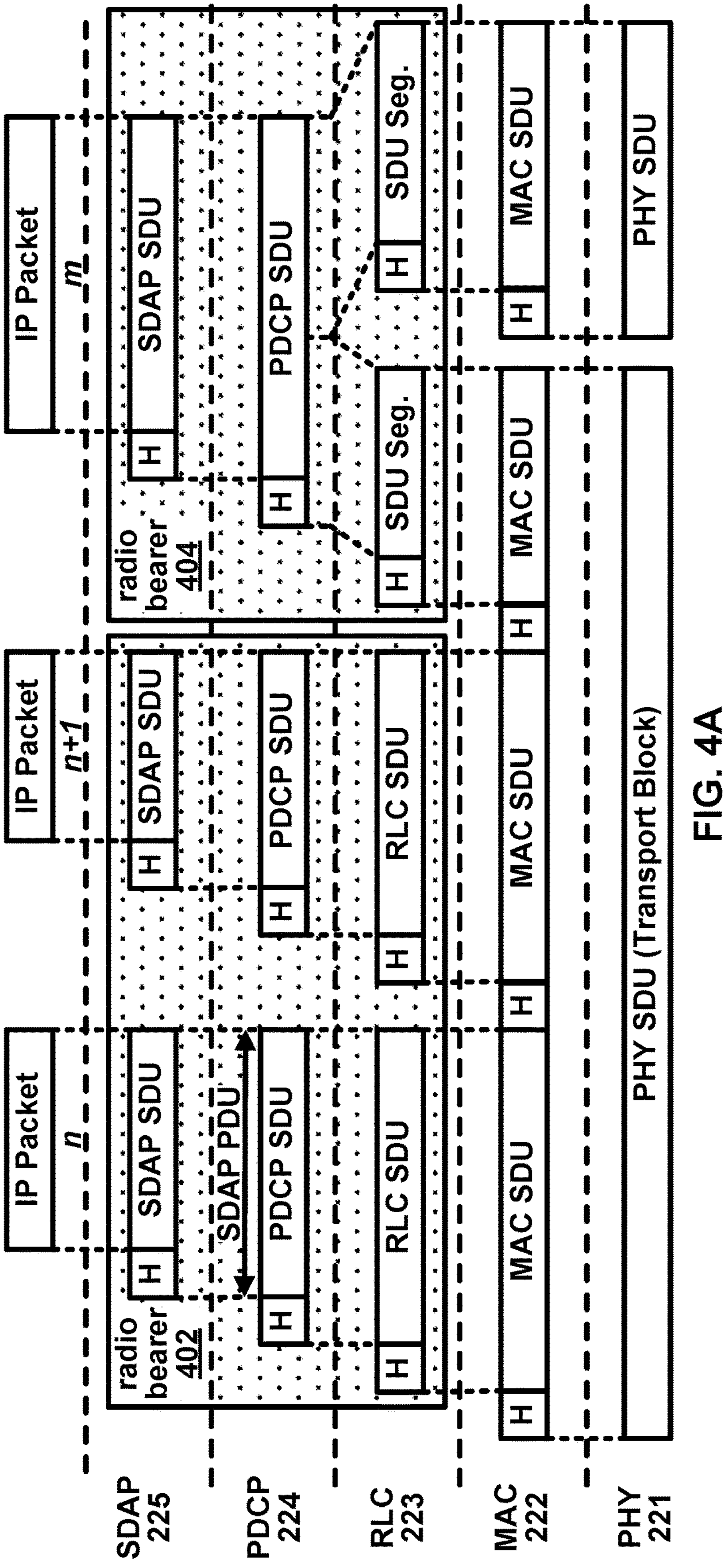
FIG. 4A shows an example downlink data flow for a user plane configuration.

FIG. 4A shows an example downlink data flow for a user plane configuration. The user plane configuration may comprise, for example, the NR user plane protocol stack shown in FIG. 2A. One or more TBs may be generated, for example, based on a data flow via a user plane protocol stack. As shown in FIG. 4A, a downlink data flow of three IP packets (n, n+1, and m) via the NR user plane protocol stack may generate two TBs (e.g., at the base station 220). An uplink data flow via the NR user plane protocol stack may be similar to the downlink data flow shown in FIG. 4A. The three IP packets (n, n+1, and m) may be determined from the two TBs, for example, based on the uplink data flow via an NR user plane protocol stack. A first quantity of packets (e.g., three or any other quantity) may be determined from a second quantity of TBs (e.g., two or another quantity).

The downlink data flow may begin, for example, if the SDAP 225 receives the three IP packets (or other quantity of IP packets) from one or more QoS flows and maps the three packets (or other quantity of packets) to radio bearers (e.g., radio bearers 402 and 404). The SDAP 225 may map the IP packets n and n+1 to a first radio bearer 402 and map the IP packet m to a second radio bearer 404. An SDAP header (labeled with "H" preceding each SDAP SDU shown in FIG. 4A) may be added to an IP packet to generate an SDAP PDU, which may be referred to as a PDCP SDU. The data unit transferred from/to a higher protocol layer may be referred to as a service data unit (SDU) of the lower protocol layer, and the data unit transferred to/from a lower protocol layer may be referred to as a protocol data unit (PDU) of the higher protocol layer. As shown in FIG. 4A, the data unit from the SDAP 225 may be an SDU of lower protocol layer PDCP 224 (e.g., PDCP SDU) and may be a PDU of the SDAP 225 (e.g., SDAP PDU).

Each protocol layer (e.g., protocol layers shown in FIG. 4A) or at least some protocol layers may: perform its own function(s) (e.g., one or more functions of each protocol layer described with respect to FIG. 3), add a corresponding header, and/or forward a respective output to the next lower layer (e.g., its respective lower layer). The PDCP 224 may perform an IP-header compression and/or ciphering. The PDCP 224 may forward its output (e.g., a PDCP PDU, which is an RLC SDU) to the RLC 223. The RLC 223 may optionally perform segmentation (e.g., as shown for IP packet m in FIG. 4A). The RLC 223 may forward its outputs (e.g., two RLC PDUs, which are two MAC SDUs, generated by adding respective subheaders to two SDU segments (SDU Segs)) to the MAC 222. The MAC 222 may multiplex a number of RLC PDUs (MAC SDUs). The MAC 222 may attach a MAC subheader to an RLC PDU (MAC SDU) to form a TB. The MAC subheaders may be distributed across the MAC PDU (e.g., in an NR configuration as shown in FIG. 4A). The MAC subheaders may be entirely located at the beginning of a MAC PDU (e.g., in an LTE configuration). The NR MAC PDU structure may reduce a processing time and/or associated latency, for example, if the MAC PDU subheaders are computed before assembling the full MAC PDU.

Figure 4B:
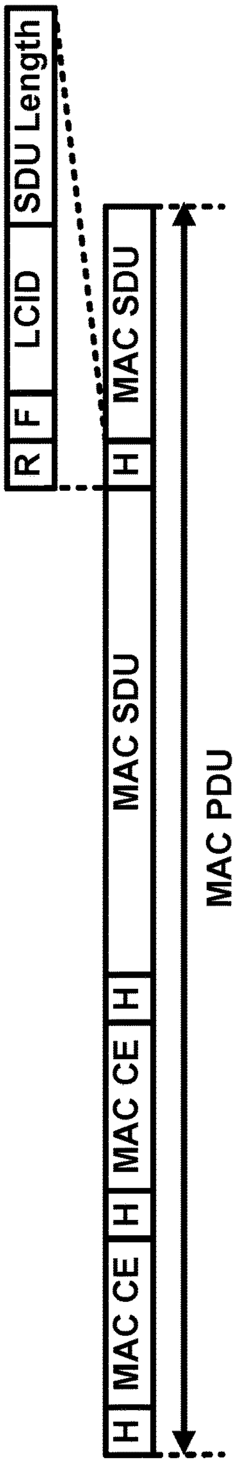
FIG. 4B shows an example format of a Medium Access Control (MAC) subheader in a MAC Protocol Data Unit (PDU).

FIG. 4B shows an example format of a MAC subheader in a MAC PDU. A MAC PDU may comprise a MAC subheader (H) and a MAC SDU. Each of one or more MAC subheaders may comprise an SDU length field for indicating the length (e.g., in bytes) of the MAC SDU to which the MAC subheader corresponds; a logical channel identifier (LCID) field for identifying/indicating the logical channel from which the MAC SDU originated to aid in the demultiplexing process; a flag (F) for indicating the size of the SDU length field; and a reserved bit (R) field for future use.

One or more MAC control elements (CEs) may be added to, or inserted into, the MAC PDU by a MAC layer, such as MAC 223 or MAC 222. As shown in FIG. 4B, two MAC CEs may be inserted/added before two MAC PDUs. The MAC CEs may be inserted/added at the beginning of a MAC PDU for downlink transmissions (as shown in FIG. 4B). One or more MAC CEs may be inserted/added at the end of a MAC PDU for uplink transmissions. MAC CEs may be used for in band control signaling. Example MAC CEs may comprise scheduling-related MAC CEs, such as buffer status reports and power headroom reports; activation/deactivation MAC CEs (e.g., MAC CEs for activation/deactivation of PDCP duplication detection, channel state information (CSI) reporting, sounding reference signal (SRS) transmission, and prior configured components); discontinuous reception (DRX)-related MAC CEs; timing advance MAC CEs; and random access-related MAC CEs. A MAC CE may be preceded by a MAC subheader with a similar format as described for the MAC subheader for MAC SDUs and may be identified with a reserved value in the LCID field that indicates the type of control information included in the corresponding MAC CE.

Figures 5A, 5B:
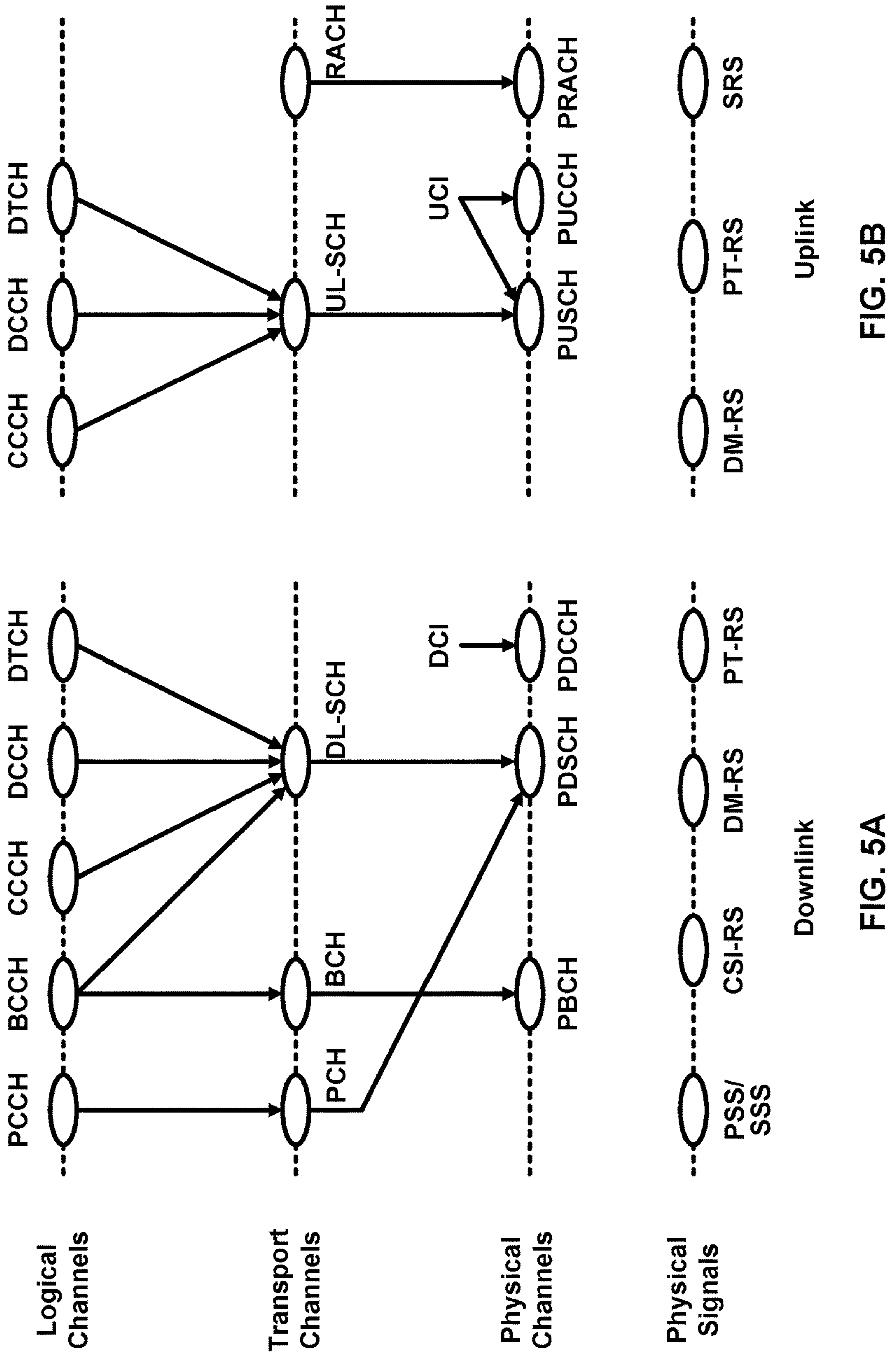
FIG. 5A shows an example mapping for downlink channels.
FIG. 5B shows an example mapping for uplink channels.

FIG. 5A shows an example mapping for downlink channels. The mapping for uplink channels may comprise mapping between channels (e.g., logical channels, transport channels, and physical channels) for downlink. FIG. 5B shows an example mapping for uplink channels. The mapping for uplink channels may comprise mapping between channels (e.g., logical channels, transport channels, and physical channels) for uplink. Information may be passed through/via channels between the RLC, the MAC, and the PHY layers of a protocol stack (e.g., the NR protocol stack). A logical channel may be used between the RLC and the MAC layers. The logical channel may be classified/indicated as a control channel that may carry control and/or configuration information (e.g., in the NR control plane), or as a traffic channel that may carry data (e.g., in the NR user plane). A logical channel may be classified/indicated as a dedicated logical channel that may be dedicated to a specific wireless device, and/or as a common logical channel that may be used by more than one wireless device (e.g., a group of wireless device).

A logical channel may be defined by the type of information it carries. The set of logical channels (e.g., in an NR configuration) may comprise one or more channels described below. A paging control channel (PCCH) may comprise/carry one or more paging messages used to page a wireless device whose location is not known to the network on a cell level. A broadcast control channel (BCCH) may comprise/carry system information messages in the form of a master information block (MIB) and several system information blocks (SIB s). The system information messages may be used by wireless devices to obtain information about how a cell is configured and how to operate within the cell. A common control channel (CCCH) may comprise/carry control messages together with random access. A dedicated control channel (DCCH) may comprise/carry control messages to/from a specific wireless device to configure the wireless device with configuration information. A dedicated traffic channel (DTCH) may comprise/carry user data to/from a specific wireless device.

Transport channels may be used between the MAC and PHY layers. Transport channels may be defined by how the information they carry is sent/transmitted (e.g., via an over the air interface). The set of transport channels (e.g., that may be defined by an NR configuration or any other configuration) may comprise one or more of the following channels. A paging channel (PCH) may comprise/carry paging messages that originated from the PCCH. A broadcast channel (BCH) may comprise/carry the MIB from the BCCH. A downlink shared channel (DL-SCH) may comprise/carry downlink data and signaling messages, including the SIB s from the BCCH. An uplink shared channel (UL-SCH) may comprise/carry uplink data and signaling messages. A random access channel (RACH) may provide a wireless device with an access to the network without any prior scheduling.

The PHY layer may use physical channels to pass/transfer information between processing levels of the PHY layer. A physical channel may have an associated set of time-frequency resources for carrying the information of one or more transport channels. The PHY layer may generate control information to support the low-level operation of the PHY layer. The PHY layer may provide/transfer the control information to the lower levels of the PHY layer via physical control channels (e.g., referred to as L1/L2 control channels). The set of physical channels and physical control channels (e.g., that may be defined by an NR configuration or any other configuration) may comprise one or more of the following channels. A physical broadcast channel (PBCH) may comprise/carry the MIB from the BCH. A physical downlink shared channel (PDSCH) may comprise/carry downlink data and signaling messages from the DL-SCH, as well as paging messages from the PCH. A physical downlink control channel (PDCCH) may comprise/carry downlink control information (DCI), which may comprise downlink scheduling commands, uplink scheduling grants, and uplink power control commands. A physical uplink shared channel (PUSCH) may comprise/carry uplink data and signaling messages from the UL-SCH and in some instances uplink control information (UCI) as described below. A physical uplink control channel (PUCCH) may comprise/carry UCI, which may comprise HARQ acknowledgments, channel quality indicators (CQI), pre-coding matrix indicators (PMI), rank indicators (RI), and scheduling requests (SR). A physical random access channel (PRACH) may be used for random access.

The physical layer may generate physical signals to support the low-level operation of the physical layer, which may be similar to the physical control channels. As shown in FIG. 5A and FIG. 5B, the physical layer signals (e.g., that may be defined by an NR configuration or any other configuration) may comprise primary synchronization signals (PSS), secondary synchronization signals (SSS), channel state information reference signals (CSI-RS), demodulation reference signals (DM-RS), sounding reference signals (SRS), phase-tracking reference signals (PT RS), and/or any other signals.

One or more of the channels (e.g., logical channels, transport channels, physical channels, etc.) may be used to carry out functions associated with the control plan protocol stack (e.g., NR control plane protocol stack). FIG. 2B shows an example control plane configuration (e.g., an NR control plane protocol stack). As shown in FIG. 2B, the control plane configuration (e.g., the NR control plane protocol stack) may use substantially the same/similar one or more protocol layers (e.g., PHY 211 and 221, MAC 212 and 222, RLC 213 and 223, and PDCP 214 and 224) as the example user plane configuration (e.g., the NR user plane protocol stack). Similar four protocol layers may comprise the PHYs 211 and 221, the MACs 212 and 222, the RLCs 213 and 223, and the PDCPs 214 and 224. The control plane configuration (e.g., the NR control plane stack) may have radio resource controls (RRCs) 216 and 226 and NAS protocols 217 and 237 at the top of the control plane configuration (e.g., the NR control plane protocol stack), for example, instead of having the SDAPs 215 and 225. The control plane configuration may comprise an AMF 230 comprising the NAS protocol 237.

The NAS protocols 217 and 237 may provide control plane functionality between the wireless device 210 and the AMF 230 (e.g., the AMF 158A or any other AMF) and/or, more generally, between the wireless device 210 and a CN (e.g., the CN 152 or any other CN). The NAS protocols 217 and 237 may provide control plane functionality between the wireless device 210 and the AMF 230 via signaling messages, referred to as NAS messages. There may be no direct path between the wireless device 210 and the AMF 230 via which the NAS messages may be transported. The NAS messages may be transported using the AS of the Uu and NG interfaces. The NAS protocols 217 and 237 may provide control plane functionality, such as authentication, security, a connection setup, mobility management, session management, and/or any other functionality.

The RRCs 216 and 226 may provide/configure control plane functionality between the wireless device 210 and the base station 220 and/or, more generally, between the wireless device 210 and the RAN (e.g., the base station 220). The RRC layers 216 and 226 may provide/configure control plane functionality between the wireless device 210 and the base station 220 via signaling messages, which may be referred to as RRC messages. The RRC messages may be sent/transmitted between the wireless device 210 and the RAN (e.g., the base station 220) using signaling radio bearers and the same/similar PDCP, RLC, MAC, and PHY protocol layers. The MAC layer may multiplex control-plane and user-plane data into the same TB. The RRC layers 216 and 226 may provide/configure control plane functionality, such as one or more of the following functionalities: broadcast of system information related to AS and NAS; paging initiated by the CN or the RAN; establishment, maintenance and release of an RRC connection between the wireless device 210 and the RAN (e.g., the base station 220); security functions including key management; establishment, configuration, maintenance and release of signaling radio bearers and data radio bearers; mobility functions; QoS management functions; wireless device measurement reporting (e.g., the wireless device measurement reporting) and control of the reporting; detection of and recovery from radio link failure (RLF); and/or NAS message transfer. As part of establishing an RRC connection, RRC layers 216 and 226 may establish an RRC context, which may involve configuring parameters for communication between the wireless device 210 and the RAN (e.g., the base station 220).

Figure 6:
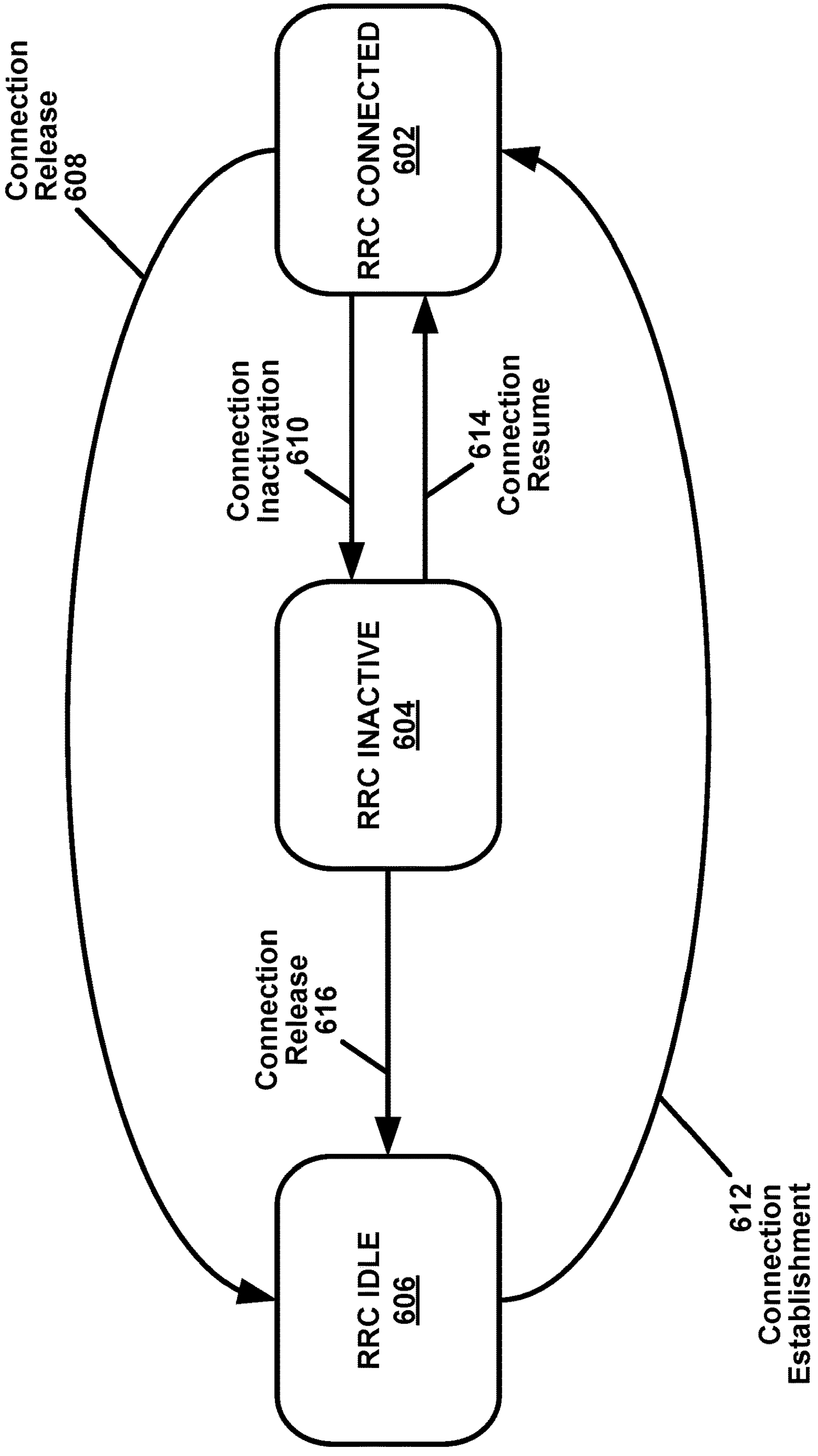
FIG. 6 shows example radio resource control (RRC) states and RRC state transitions.

FIG. 6 shows example RRC states and RRC state transitions. An RRC state of a wireless device may be changed to another RRC state (e.g., RRC state transitions of a wireless device). The wireless device may be substantially the same or similar to the wireless device 106, 210, or any other wireless device. A wireless device may be in at least one of a plurality of states, such as three RRC states comprising RRC connected 602 (e.g., RRC_CONNECTED), RRC idle 606 (e.g., RRC_IDLE), and RRC inactive 604 (e.g., RRC_INACTIVE). The RRC inactive 604 may be RRC connected but inactive.

An RRC connection may be established for the wireless device. For example, this may be during an RRC connected state. During the RRC connected state (e.g., during the RRC connected 602), the wireless device may have an established RRC context and may have at least one RRC connection with a base station. The base station may be similar to one of the one or more base stations (e.g., one or more base stations of the RAN 104 shown in FIG. 1A, one of the gNBs 160 or ng-eNB s 162 shown in FIG. 1B, the base station 220 shown in FIG. 2A and FIG. 2B, or any other base stations). The base station with which the wireless device is connected (e.g., has established an RRC connection) may have the RRC context for the wireless device. The RRC context, which may be referred to as a wireless device context (e.g., the UE context), may comprise parameters for communication between the wireless device and the base station. These parameters may comprise, for example, one or more of: AS contexts; radio link configuration parameters; bearer configuration information (e.g., relating to a data radio bearer, a signaling radio bearer, a logical channel, a QoS flow, and/or a PDU session); security information; and/or layer configuration information (e.g., PHY, MAC, RLC, PDCP, and/or SDAP layer configuration information). During the RRC connected state (e.g., the RRC connected 602), mobility of the wireless device may be managed/controlled by an RAN (e.g., the RAN 104 or the NG RAN 154). The wireless device may measure received signal levels (e.g., reference signal levels, reference signal received power, reference signal received quality, received signal strength indicator, etc.) based on one or more signals sent from a serving cell and neighboring cells. The wireless device may report these measurements to a serving base station (e.g., the base station currently serving the wireless device). The serving base station of the wireless device may request a handover to a cell of one of the neighboring base stations, for example, based on the reported measurements. The RRC state may transition from the RRC connected state (e.g., RRC connected 602) to an RRC idle state (e.g., the RRC idle 606) via a connection release procedure 608. The RRC state may transition from the RRC connected state (e.g., RRC connected 602) to the RRC inactive state (e.g., RRC inactive 604) via a connection inactivation procedure 610.

An RRC context may not be established for the wireless device. For example, this may be during the RRC idle state. During the RRC idle state (e.g., the RRC idle 606), an RRC context may not be established for the wireless device. During the RRC idle state (e.g., the RRC idle 606), the wireless device may not have an RRC connection with the base station. During the RRC idle state (e.g., the RRC idle 606), the wireless device may be in a sleep state for the majority of the time (e.g., to conserve battery power). The wireless device may wake up periodically (e.g., once in every discontinuous reception (DRX) cycle) to monitor for paging messages (e.g., paging messages set from the RAN). Mobility of the wireless device may be managed by the wireless device via a procedure of a cell reselection. The RRC state may transition from the RRC idle state (e.g., the RRC idle 606) to the RRC connected state (e.g., the RRC connected 602) via a connection establishment procedure 612, which may involve a random access procedure.

A previously established RRC context may be maintained for the wireless device. For example, this may be during the RRC inactive state. During the RRC inactive state (e.g., the RRC inactive 604), the RRC context previously established may be maintained in the wireless device and the base station. The maintenance of the RRC context may enable/allow a fast transition to the RRC connected state (e.g., the RRC connected 602) with reduced signaling overhead as compared to the transition from the RRC idle state (e.g., the RRC idle 606) to the RRC connected state (e.g., the RRC connected 602). During the RRC inactive state (e.g., the RRC inactive 604), the wireless device may be in a sleep state and mobility of the wireless device may be managed/controlled by the wireless device via a cell reselection. The RRC state may transition from the RRC inactive state (e.g., the RRC inactive 604) to the RRC connected state (e.g., the RRC connected 602) via a connection resume procedure 614. The RRC state may transition from the RRC inactive state (e.g., the RRC inactive 604) to the RRC idle state (e.g., the RRC idle 606) via a connection release procedure 616 that may be the same as or similar to connection release procedure 608.

An RRC state may be associated with a mobility management mechanism. During the RRC idle state (e.g., RRC idle 606) and the RRC inactive state (e.g., the RRC inactive 604), mobility may be managed/controlled by the wireless device via a cell reselection. The purpose of mobility management during the RRC idle state (e.g., the RRC idle 606) or during the RRC inactive state (e.g., the RRC inactive 604) may be to enable/allow the network to be able to notify the wireless device of an event via a paging message without having to broadcast the paging message over the entire mobile communications network. The mobility management mechanism used during the RRC idle state (e.g., the RRC idle 606) or during the RRC idle state (e.g., the RRC inactive 604) may enable/allow the network to track the wireless device on a cell-group level, for example, so that the paging message may be broadcast over the cells of the cell group that the wireless device currently resides within (e.g. instead of sending the paging message over the entire mobile communication network). The mobility management mechanisms for the RRC idle state (e.g., the RRC idle 606) and the RRC inactive state (e.g., the RRC inactive 604) may track the wireless device on a cell-group level. The mobility management mechanisms may do the tracking, for example, using different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN (e.g., the CN 102, the 5G CN 152, or any other CN) may send to the wireless device a list of TAIs associated with a wireless device registration area (e.g., a UE registration area). A wireless device may perform a registration update with the CN to allow the CN to update the location of the wireless device and provide the wireless device with a new the UE registration area, for example, if the wireless device moves (e.g., via a cell reselection) to a cell associated with a TAI that may not be included in the list of TAIs associated with the UE registration area.

RAN areas may be used to track the wireless device (e.g., the location of the wireless device at the RAN level). For a wireless device in an RRC inactive state (e.g., the RRC inactive 604), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., RRC inactive 604).

A base station (e.g., gNB s 160 in FIG. 1B or any other base station) may be split in two parts: a central unit (e.g., a base station central unit, such as a gNB CU) and one or more distributed units (e.g., a base station distributed unit, such as a gNB DU). A base station central unit (CU) may be coupled to one or more base station distributed units (DUs) using an F1 interface (e.g., an F1 interface defined in an NR configuration). The base station CU may comprise the RRC, the PDCP, and the SDAP layers. A base station distributed unit (DU) may comprise the RLC, the MAC, and the PHY layers.

The physical signals and physical channels (e.g., described with respect to FIG. 5A and FIG. 5B) may be mapped onto one or more symbols (e.g., orthogonal frequency divisional multiplexing (OFDM) symbols in an NR configuration or any other symbols). OFDM is a multicarrier communication scheme that sends/transmits data over F orthogonal subcarriers (or tones). The data may be mapped to a series of complex symbols (e.g., M-quadrature amplitude modulation (M-QAM) symbols or M-phase shift keying (M PSK) symbols or any other modulated symbols), referred to as source symbols, and divided into F parallel symbol streams, for example, before transmission of the data. The F parallel symbol streams may be treated as if they are in the frequency domain. The F parallel symbols may be used as inputs to an Inverse Fast Fourier Transform (IFFT) block that transforms them into the time domain. The IFFT block may take in F source symbols at a time, one from each of the F parallel symbol streams. The IFFT block may use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. An OFDM symbol provided/output by the IFFT block may be sent/transmitted over the air interface on a carrier frequency, for example, after one or more processes (e.g., addition of a cyclic prefix) and up-conversion. The F parallel symbol streams may be mixed, for example, using a Fast Fourier Transform (FFT) block before being processed by the IFFT block. This operation may produce Discrete Fourier Transform (DFT)-precoded OFDM symbols and may be used by one or more wireless devices in the uplink to reduce the peak to average power ratio (PAPR). Inverse processing may be performed on the OFDM symbol at a receiver using an FFT block to recover the data mapped to the source symbols.

Figure 7:
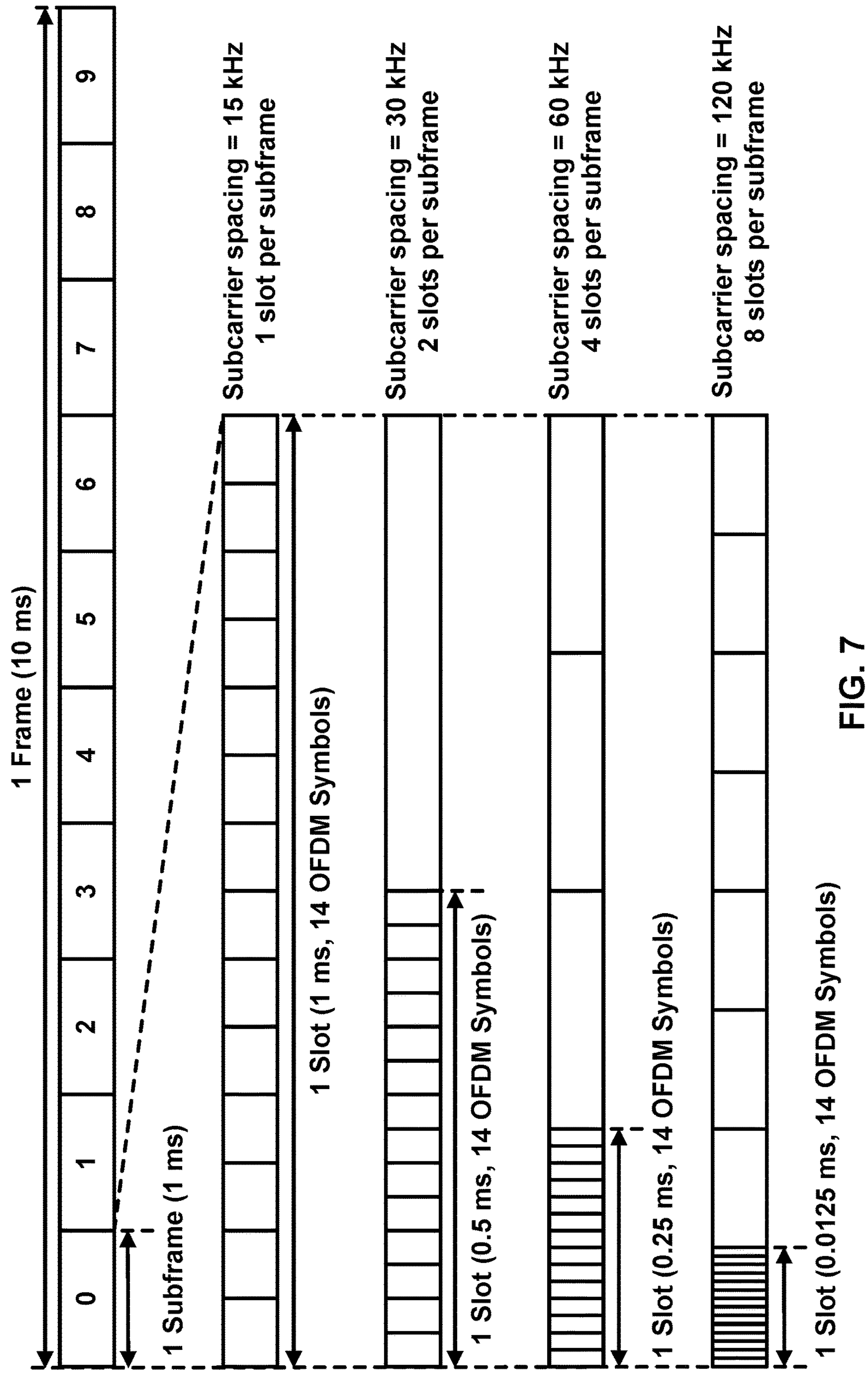
FIG. 7 shows an example configuration of a frame.

FIG. 7 shows an example configuration of a frame. The frame may comprise, for example, an NR radio frame into which OFDM symbols may be grouped. A frame (e.g., an NR radio frame) may be identified/indicated by a system frame number (SFN) or any other value. The SFN may repeat with a period of 1024 frames. One NR frame may be 10 milliseconds (ms) in duration and may comprise 10 subframes that are 1 ms in duration. A subframe may be divided into one or more slots (e.g., depending on numerologies and/or different subcarrier spacings). Each of the one or more slots may comprise, for example, 14 OFDM symbols per slot. Any quantity of symbols, slots, or duration may be used for any time interval.

The duration of a slot may depend on the numerology used for the OFDM symbols of the slot. A flexible numerology may be supported, for example, to accommodate different deployments (e.g., cells with carrier frequencies below 1 GHz up to cells with carrier frequencies in the mm-wave range). A flexible numerology may be supported, for example, in an NR configuration or any other radio configurations. A numerology may be defined in terms of subcarrier spacing and/or cyclic prefix duration. Subcarrier spacings may be scaled up by powers of two from a baseline subcarrier spacing of 15 kHz. Cyclic prefix durations may be scaled down by powers of two from a baseline cyclic prefix duration of 4.7 μs, for example, for a numerology in an NR configuration or any other radio configurations. Numerologies may be defined with the following subcarrier spacing/cyclic prefix duration combinations: 15 kHz/4.7 μs; 30 kHz/2.3 μs; 60 kHz/1.2 μs; 120 kHz/0.59 μs; 240 kHz/0.29 μs, and/or any other subcarrier spacing/cyclic prefix duration combinations.

A slot may have a fixed number/quantity of OFDM symbols (e.g., 14 OFDM symbols). A numerology with a higher subcarrier spacing may have a shorter slot duration and more slots per subframe. Examples of numerology-dependent slot duration and slots-per-subframe transmission structure are shown in FIG. 7 (the numerology with a subcarrier spacing of 240 kHz is not shown in FIG. 7). A subframe (e.g., in an NR configuration) may be used as a numerology-independent time reference. A slot may be used as the unit upon which uplink and downlink transmissions are scheduled. Scheduling (e.g., in an NR configuration) may be decoupled from the slot duration. Scheduling may start at any OFDM symbol. Scheduling may last for as many symbols as needed for a transmission, for example, to support low latency. These partial slot transmissions may be referred to as mini-slot or sub-slot transmissions.

Figure 8:
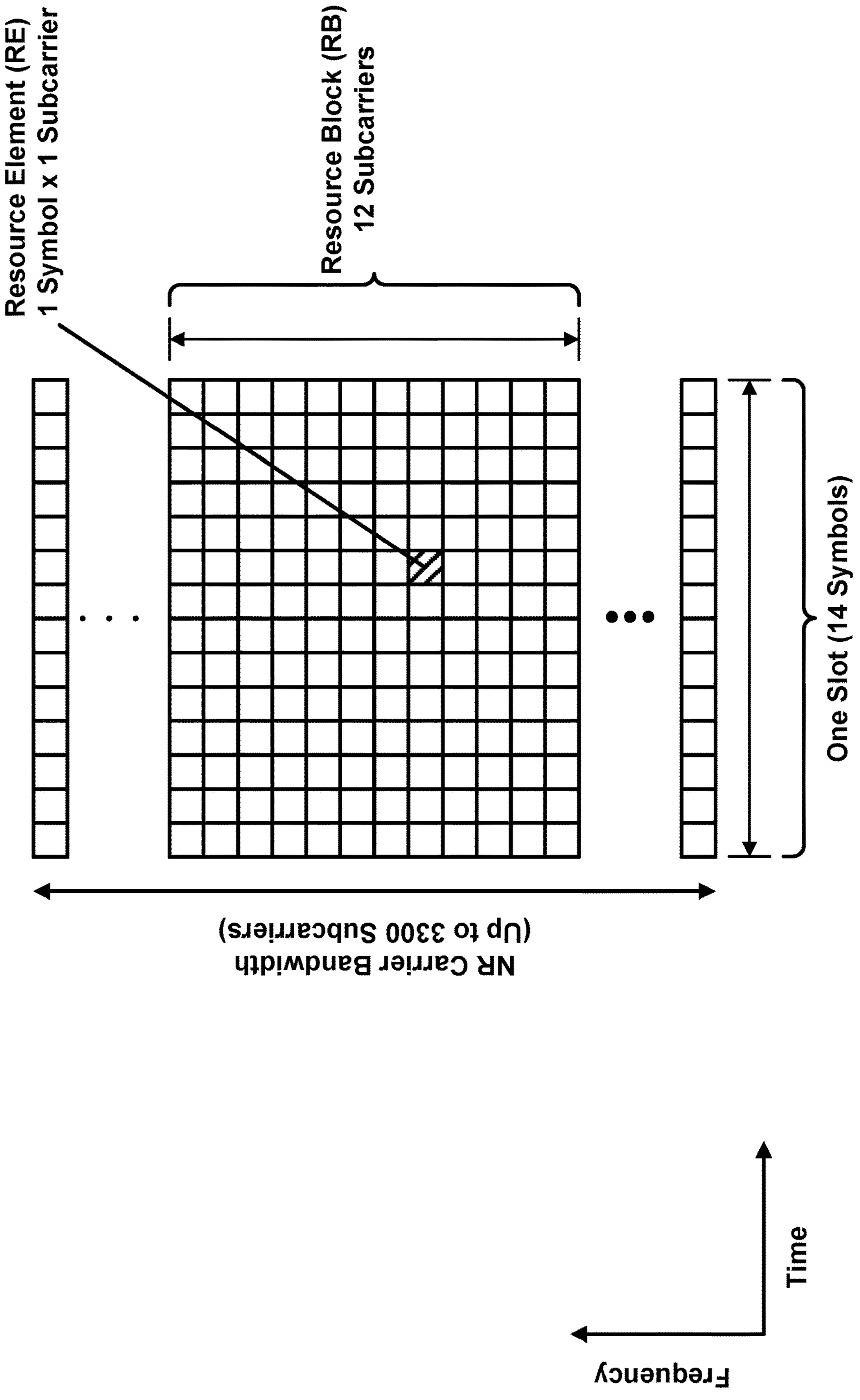
FIG. 8 shows an example resource configuration of one or more carriers.

FIG. 8 shows an example resource configuration of one or more carriers. The resource configuration of may comprise a slot in the time and frequency domain for an NR carrier or any other carrier. The slot may comprise resource elements (REs) and resource blocks (RBs). A resource element (RE) may be the smallest physical resource (e.g., in an NR configuration). An RE may span one OFDM symbol in the time domain by one subcarrier in the frequency domain, such as shown in FIG. 8. An RB may span twelve consecutive REs in the frequency domain, such as shown in FIG. 8. A carrier (e.g., an NR carrier) may be limited to a width of a certain quantity of RBs and/or subcarriers (e.g., 275 RBs or 275×12=3300 subcarriers). Such limitation(s), if used, may limit the carrier (e.g., NR carrier) frequency based on subcarrier spacing (e.g., carrier frequency of 50, 100, 200, and 400 MHz for subcarrier spacings of 15, 30, 60, and 120 kHz, respectively). A 400 MHz bandwidth may be set based on a 400 MHz per carrier bandwidth limit. Any other bandwidth may be set based on a per carrier bandwidth limit.

A single numerology may be used across the entire bandwidth of a carrier (e.g., an NR such as shown in FIG. 8). In other example configurations, multiple numerologies may be supported on the same carrier. NR and/or other access technologies may support wide carrier bandwidths (e.g., up to 400 MHz for a subcarrier spacing of 120 kHz). Not all wireless devices may be able to receive the full carrier bandwidth (e.g., due to hardware limitations and/or different wireless device capabilities). Receiving and/or utilizing the full carrier bandwidth may be prohibitive, for example, in terms of wireless device power consumption. A wireless device may adapt the size of the receive bandwidth of the wireless device, for example, based on the amount of traffic the wireless device is scheduled to receive (e.g., to reduce power consumption and/or for other purposes). Such an adaptation may be referred to as bandwidth adaptation.

Configuration of one or more bandwidth parts (BWPs) may support one or more wireless devices not capable of receiving the full carrier bandwidth. BWPs may support bandwidth adaptation, for example, for such wireless devices not capable of receiving the full carrier bandwidth. A BWP (e.g., a BWP of an NR configuration) may be defined by a subset of contiguous RBs on a carrier. A wireless device may be configured (e.g., via an RRC layer) with one or more downlink BWPs per serving cell and one or more uplink BWPs per serving cell (e.g., up to four downlink BWPs per serving cell and up to four uplink BWPs per serving cell). One or more of the configured BWPs for a serving cell may be active, for example, at a given time. The one or more BWPs may be referred to as active BWPs of the serving cell. A serving cell may have one or more first active BWPs in the uplink carrier and one or more second active BWPs in the secondary uplink carrier, for example, if the serving cell is configured with a secondary uplink carrier.

A downlink BWP from a set of configured downlink BWPs may be linked with an uplink BWP from a set of configured uplink BWPs (e.g., for unpaired spectra). A downlink BWP and an uplink BWP may be linked, for example, if a downlink BWP index of the downlink BWP and an uplink BWP index of the uplink BWP are the same. A wireless device may expect that the center frequency for a downlink BWP is the same as the center frequency for an uplink BWP (e.g., for unpaired spectra).

A base station may configure a wireless device with one or more control resource sets (CORESETs) for at least one search space. The base station may configure the wireless device with one or more CORESETS, for example, for a downlink BWP in a set of configured downlink BWPs on a primary cell (PCell) or on a secondary cell (SCell). A search space may comprise a set of locations in the time and frequency domains where the wireless device may monitor/find/detect/identify control information. The search space may be a wireless device-specific search space (e.g., a UE-specific search space) or a common search space (e.g., potentially usable by a plurality of wireless devices or a group of wireless user devices). A base station may configure a group of wireless devices with a common search space, on a PCell or on a primary secondary cell (PSCell), in an active downlink BWP.

A base station may configure a wireless device with one or more resource sets for one or more PUCCH transmissions, for example, for an uplink BWP in a set of configured uplink BWPs. A wireless device may receive downlink receptions (e.g., PDCCH or PDSCH) in a downlink BWP, for example, according to a configured numerology (e.g., a configured subcarrier spacing and/or a configured cyclic prefix duration) for the downlink BWP. The wireless device may send/transmit uplink transmissions (e.g., PUCCH or PUSCH) in an uplink BWP, for example, according to a configured numerology (e.g., a configured subcarrier spacing and/or a configured cyclic prefix length for the uplink BWP).

One or more BWP indicator fields may be provided/comprised in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a wireless device with a default downlink BWP within a set of configured downlink BWPs associated with a PCell. A default downlink BWP may be an initial active downlink BWP, for example, if the base station does not provide/configure a default downlink BWP to/for the wireless device. The wireless device may determine which BWP is the initial active downlink BWP, for example, based on a CORESET configuration obtained using the PBCH.

A base station may configure a wireless device with a BWP inactivity timer value for a PCell. The wireless device may start or restart a BWP inactivity timer at any appropriate time. The wireless device may start or restart the BWP inactivity timer, for example, if one or more conditions are satisfied. The one or more conditions may comprise at least one of: the wireless device detects DCI indicating an active downlink BWP other than a default downlink BWP for a paired spectra operation; the wireless device detects DCI indicating an active downlink BWP other than a default downlink BWP for an unpaired spectra operation; and/or the wireless device detects DCI indicating an active uplink BWP other than a default uplink BWP for an unpaired spectra operation. The wireless device may start/run the BWP inactivity timer toward expiration (e.g., increment from zero to the BWP inactivity timer value, or decrement from the BWP inactivity timer value to zero), for example, if the wireless device does not detect DCI during a time interval (e.g., 1 ms or 0.5 ms). The wireless device may switch from the active downlink BWP to the default downlink BWP, for example, if the BWP inactivity timer expires.

A base station may semi-statically configure a wireless device with one or more BWPs. A wireless device may switch an active BWP from a first BWP to a second BWP, for example, based on (e.g., after or in response to) receiving DCI indicating the second BWP as an active BWP. A wireless device may switch an active BWP from a first BWP to a second BWP, for example, based on (e.g., after or in response to) an expiry of the BWP inactivity timer (e.g., if the second BWP is the default BWP).

A downlink BWP switching may refer to switching an active downlink BWP from a first downlink BWP to a second downlink BWP (e.g., the second downlink BWP is activated and the first downlink BWP is deactivated). An uplink BWP switching may refer to switching an active uplink BWP from a first uplink BWP to a second uplink BWP (e.g., the second uplink BWP is activated and the first uplink BWP is deactivated). Downlink and uplink BWP switching may be performed independently (e.g., in paired spectrum/spectra). Downlink and uplink BWP switching may be performed simultaneously (e.g., in unpaired spectrum/spectra). Switching between configured BWPs may occur, for example, based on RRC signaling, DCI signaling, expiration of a BWP inactivity timer, and/or an initiation of random access.

Figure 9:
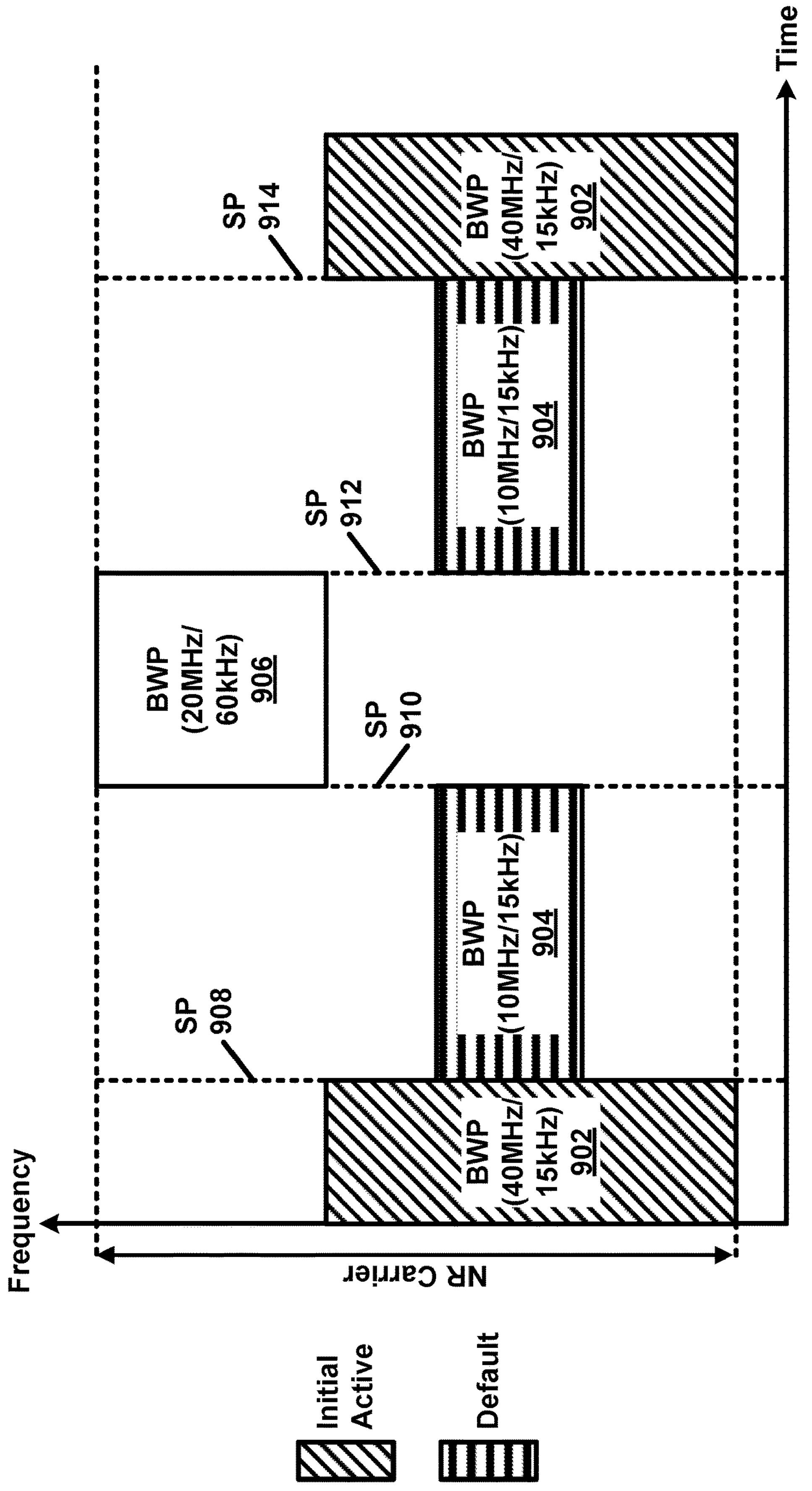
FIG. 9 shows an example configuration of bandwidth parts (BWPs).

FIG. 9 shows an example of configured BWPs. Bandwidth adaptation using multiple BWPs (e.g., three configured BWPs for an NR carrier) may be available. A wireless device configured with multiple BWPs (e.g., the three BWPs) may switch from one BWP to another BWP at a switching point. The BWPs may comprise: a BWP 902 having a bandwidth of 40 MHz and a subcarrier spacing of 15 kHz; a BWP 904 having a bandwidth of 10 MHz and a subcarrier spacing of 15 kHz; and a BWP 906 having a bandwidth of 20 MHz and a subcarrier spacing of 60 kHz. The BWP 902 may be an initial active BWP, and the BWP

904 may be a default BWP. The wireless device may switch between BWPs at switching points. The wireless device may switch from the BWP 902 to the BWP 904 at a switching point 908. The switching at the switching point 908 may occur for any suitable reasons. The switching at a switching point 908 may occur, for example, based on (e.g., after or in response to) an expiry of a BWP inactivity timer (e.g., indicating switching to the default BWP). The switching at the switching point 908 may occur, for example, based on (e.g., after or in response to) receiving DCI indicating BWP 904 as the active BWP. The wireless device may switch at a switching point 910 from an active BWP 904 to the BWP 906, for example, after or in response receiving DCI indicating BWP 906 as a new active BWP. The wireless device may switch at a switching point 912 from an active BWP 906 to the BWP 904, for example, a based on (e.g., after or in response to) an expiry of a BWP inactivity timer. The wireless device may switch at the switching point 912 from an active BWP 906 to the BWP 904, for example, after or in response receiving DCI indicating BWP 904 as a new active BWP. The wireless device may switch at a switching point 914 from an active BWP 904 to the BWP 902, for example, after or in response receiving DCI indicating the BWP 902 as a new active BWP.

Wireless device procedures for switching BWPs on a secondary cell may be the same/similar as those on a primary cell, for example, if the wireless device is configured for a secondary cell with a default downlink BWP in a set of configured downlink BWPs and a timer value. The wireless device may use the timer value and the default downlink BWP for the secondary cell in the same/similar manner as the wireless device uses the timer value and/or default BWPs for a primary cell. The timer value (e.g., the BWP inactivity timer) may be configured per cell (e.g., for one or more BWPs), for example, via RRC signaling or any other signaling. One or more active BWPs may switch to another BWP, for example, based on an expiration of the BWP inactivity timer.

Two or more carriers may be aggregated and data may be simultaneously sent/transmitted to/from the same wireless device using carrier aggregation (CA) (e.g., to increase data rates). The aggregated carriers in CA may be referred to as component carriers (CCs). There may be a number/quantity of serving cells for the wireless device (e.g., one serving cell for a CC), for example, if CA is configured/used. The CCs may have multiple configurations in the frequency domain.

Figure 10A:
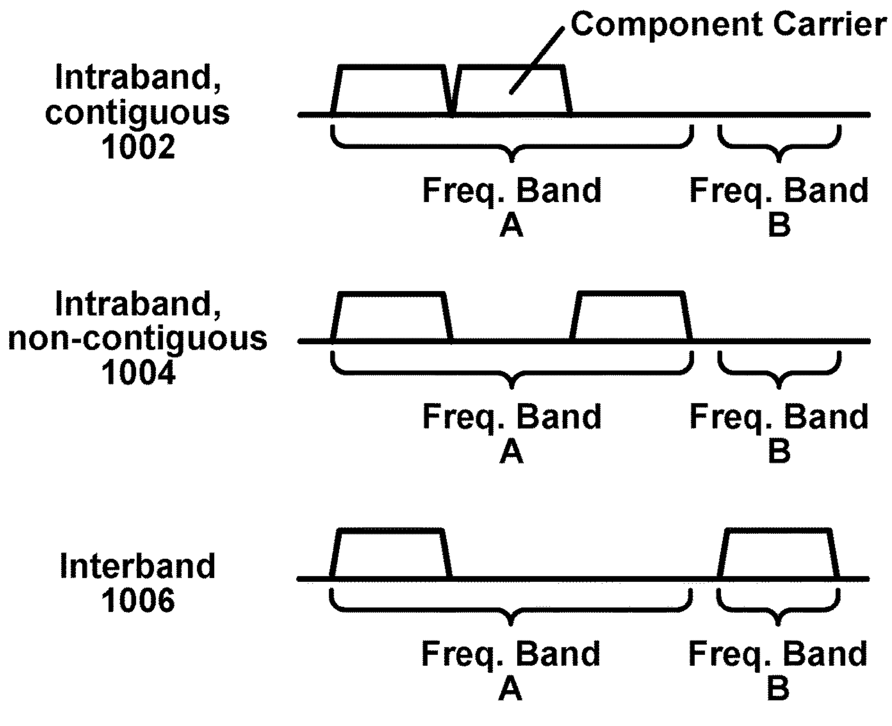
FIG. 10A shows example carrier aggregation configurations based on component carriers.

FIG. 10A shows example CA configurations based on CCs. As shown in FIG. 10A, three types of CA configurations may comprise an intraband (contiguous) configuration 1002, an intraband (non-contiguous) configuration 1004, and/or an interband configuration 1006. In the intraband (contiguous) configuration 1002, two CCs may be aggregated in the same frequency band (frequency band A) and may be located directly adjacent to each other within the frequency band. In the intraband (non-contiguous) configuration 1004, two CCs may be aggregated in the same frequency band (frequency band A) but may be separated from each other in the frequency band by a gap. In the interband configuration 1006, two CCs may be located in different frequency bands (e.g., frequency band A and frequency band B, respectively).

A network may set the maximum quantity of CCs that can be aggregated (e.g., up to 32 CCs may be aggregated in NR, or any other quantity may be aggregated in other systems). The aggregated CCs may have the same or different bandwidths, subcarrier spacing, and/or duplexing schemes (TDD, FDD, or any other duplexing schemes). A serving cell for a wireless device using CA may have a downlink CC. One or more uplink CCs may be optionally configured for a serving cell (e.g., for FDD). The ability to aggregate more downlink carriers than uplink carriers may be useful, for example, if the wireless device has more data traffic in the downlink than in the uplink.

One of the aggregated cells for a wireless device may be referred to as a primary cell (PCell), for example, if a CA is configured. The PCell may be the serving cell that the wireless initially connects to or access to, for example, during or at an RRC connection establishment, an RRC connection reestablishment, and/or a handover. The PCell may provide/configure the wireless device with NAS mobility information and the security input. Wireless device may have different PCells. For the downlink, the carrier corresponding to the PCell may be referred to as the downlink primary CC (DL PCC). For the uplink, the carrier corresponding to the PCell may be referred to as the uplink primary CC (UL PCC). The other aggregated cells (e.g., associated with CCs other than the DL PCC and UL PCC) for the wireless device may be referred to as secondary cells (SCells). The SCells may be configured, for example, after the PCell is configured for the wireless device. An SCell may be configured via an RRC connection reconfiguration procedure. For the downlink, the carrier corresponding to an SCell may be referred to as a downlink secondary CC (DL SCC). For the uplink, the carrier corresponding to the SCell may be referred to as the uplink secondary CC (UL SCC).

Configured SCells for a wireless device may be activated or deactivated, for example, based on traffic and channel conditions. Deactivation of an SCell may cause the wireless device to stop PDCCH and PDSCH reception on the SCell and PUSCH, SRS, and CQI transmissions on the SCell. Configured SCells may be activated or deactivated, for example, using a MAC CE (e.g., the MAC CE described with respect to FIG. 4B). A MAC CE may use a bitmap (e.g., one bit per SCell) to indicate which SCells (e.g., in a subset of configured SCells) for the wireless device are activated or deactivated. Configured SCells may be deactivated, for example, based on (e.g., after or in response to) an expiration of an SCell deactivation timer (e.g., one SCell deactivation timer per SCell may be configured).

DCI may comprise control information, such as scheduling assignments and scheduling grants, for a cell. DCI may be sent/transmitted via the cell corresponding to the scheduling assignments and/or scheduling grants, which may be referred to as a self-scheduling. DCI comprising control information for a cell may be sent/transmitted via another cell, which may be referred to as a cross-carrier scheduling. Uplink control information (UCI) may comprise control information, such as HARQ acknowledgments and channel state feedback (e.g., CQI, PMI, and/or RI) for aggregated cells. UCI may be sent/transmitted via an uplink control channel (e.g., a PUCCH) of the PCell or a certain SCell (e.g., an SCell configured with PUCCH). For a larger number of aggregated downlink CCs, the PUCCH of the PCell may become overloaded. Cells may be divided into multiple PUCCH groups.

Figure 10B:
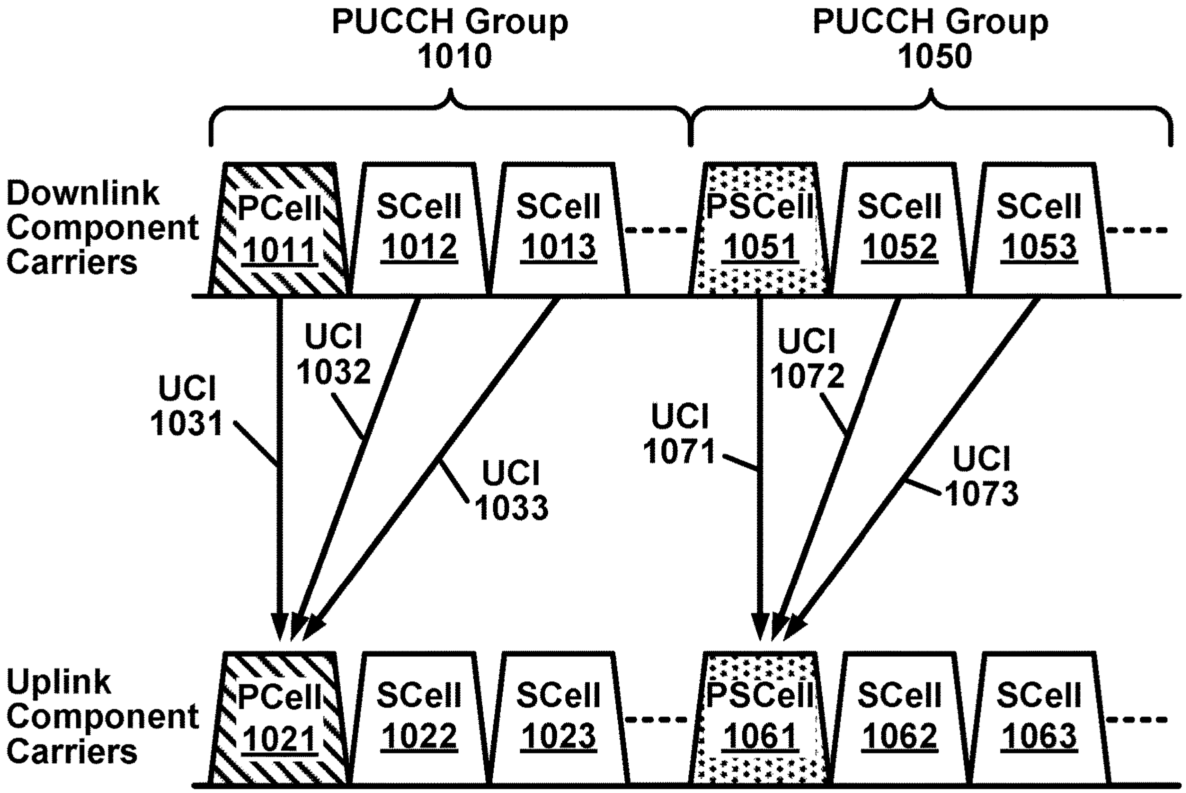
FIG. 10B shows example group of cells.

FIG. 10B shows example group of cells. Aggregated cells may be configured into one or more PUCCH groups (e.g., as shown in FIG. 10B). One or more cell groups or one or more uplink control channel groups (e.g., a PUCCH group 1010 and a PUCCH group 1050) may comprise one or more downlink CCs, respectively. The PUCCH group 1010 may comprise one or more downlink CCs, for example, three downlink CCs: a PCell 1011 (e.g., a DL PCC), an SCell 1012 (e.g., a DL SCC), and an SCell 1013 (e.g., a DL SCC). The PUCCH group 1050 may comprise one or more downlink CCs, for example, three downlink CCs: a PUCCH SCell (or PSCell) 1051 (e.g., a DL SCC), an SCell 1052 (e.g., a DL SCC), and an SCell 1053 (e.g., a DL SCC). One or more uplink CCs of the PUCCH group 1010 may be configured as a PCell 1021 (e.g., a UL PCC), an SCell 1022 (e.g., a UL SCC), and an SCell 1023 (e.g., a UL SCC). One or more uplink CCs of the PUCCH group 1050 may be configured as a PUCCH SCell (or PSCell) 1061 (e.g., a UL SCC), an SCell 1062 (e.g., a UL SCC), and an SCell 1063 (e.g., a UL SCC). UCI related to the downlink CCs of the PUCCH group 1010, shown as UCI 1031, UCI 1032, and UCI 1033, may be sent/transmitted via the uplink of the PCell 1021 (e.g., via the PUCCH of the PCell 1021). UCI related to the downlink CCs of the PUCCH group 1050, shown as UCI 1071, UCI 1072, and UCI 1073, may be sent/transmitted via the uplink of the PUCCH SCell (or PSCell) 1061 (e.g., via the PUCCH of the PUCCH SCell 1061). A single uplink PCell may be configured to send/transmit UCI relating to the six downlink CCs, for example, if the aggregated cells shown in FIG. 10B are not divided into the PUCCH group 1010 and the PUCCH group 1050. The PCell 1021 may become overloaded, for example, if the UCIs 1031, 1032, 1033, 1071, 1072, and 1073 are sent/transmitted via the PCell 1021. By dividing transmissions of UCI between the PCell 1021 and the PUCCH SCell (or PSCell) 1061, overloading may be prevented and/or reduced.

A PCell may comprise a downlink carrier (e.g., the PCell 1011) and an uplink carrier (e.g., the PCell 1021). An SCell may comprise only a downlink carrier. A cell, comprising a downlink carrier and optionally an uplink carrier, may be assigned with a physical cell ID and a cell index. The physical cell ID or the cell index may indicate/identify a downlink carrier and/or an uplink carrier of the cell, for example, depending on the context in which the physical cell ID is used. A physical cell ID may be determined, for example, using a synchronization signal (e.g., PSS and/or SSS) sent/transmitted via a downlink component carrier. A cell index may be determined, for example, using one or more RRC messages. A physical cell ID may be referred to as a carrier ID, and a cell index may be referred to as a carrier index. A first physical cell ID for a first downlink carrier may refer to the first physical cell ID for a cell comprising the first downlink carrier. Substantially the same/similar concept may apply to, for example, a carrier activation. Activation of a first carrier may refer to activation of a cell comprising the first carrier.

A multi-carrier nature of a PHY layer may be exposed/indicated to a MAC layer (e.g., in a CA configuration). A HARQ entity may operate on a serving cell. A transport block may be generated per assignment/grant per serving cell. A transport block and potential HARQ retransmissions of the transport block may be mapped to a serving cell.

For the downlink, a base station may send/transmit (e.g., unicast, multicast, and/or broadcast), to one or more wireless devices, one or more reference signals (RSs) (e.g., PSS, SSS, CSI-RS, DM-RS, and/or PT-RS). For the uplink, the one or more wireless devices may send/transmit one or more RSs to the base station (e.g., DM-RS, PT-RS, and/or SRS). The PSS and the SSS may be sent/transmitted by the base station and used by the one or more wireless devices to synchronize the one or more wireless devices with the base station. A synchronization signal (SS)/physical broadcast channel (PBCH) block may comprise the PSS, the SSS, and the PBCH. The base station may periodically send/transmit a burst of SS/PBCH blocks, which may be referred to as SSBs.

Figure 11A:
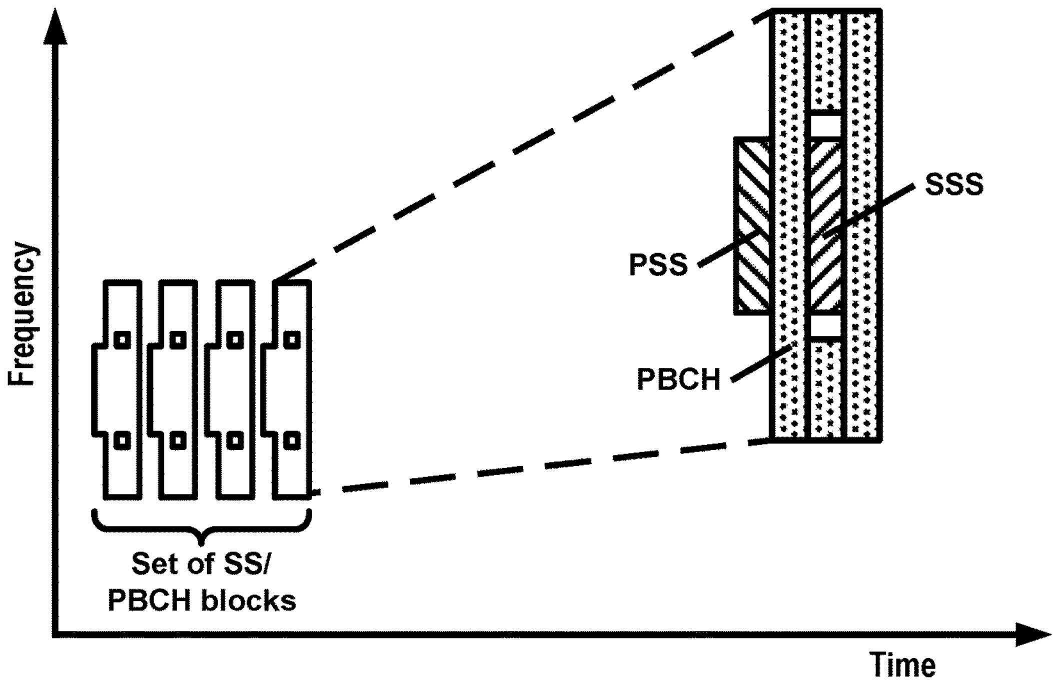
FIG. 11A shows an example mapping of one or more synchronization signal/physical broadcast channel (SS/PBCH) blocks.

FIG. 11A shows an example mapping of one or more SS/PBCH blocks. A burst of SS/PBCH blocks may comprise one or more SS/PBCH blocks (e.g., 4 SS/PBCH blocks, as shown in FIG. 11A). Bursts may be sent/transmitted periodically (e.g., every 2 frames, 20 ms, or any other durations). A burst may be restricted to a half-frame (e.g., a first half-frame having a duration of 5 ms). Such parameters (e.g., the number of SS/PBCH blocks per burst, periodicity of bursts, position of the burst within the frame) may be configured, for example, based on at least one of: a carrier frequency of a cell in which the SS/PBCH block is sent/transmitted; a numerology or subcarrier spacing of the cell; a configuration by the network (e.g., using RRC signaling); and/or any other suitable factor(s). A wireless device may assume a subcarrier spacing for the SS/PBCH block based on the carrier frequency being monitored, for example, unless the radio network configured the wireless device to assume a different subcarrier spacing.

The SS/PBCH block may span one or more OFDM symbols in the time domain (e.g., 4 OFDM symbols, as shown in FIG. 11A or any other quantity/number of symbols) and may span one or more subcarriers in the frequency domain (e.g., 240 contiguous subcarriers or any other quantity/number of subcarriers). The PSS, the SSS, and the PBCH may have a common center frequency. The PSS may be sent/transmitted first and may span, for example, 1 OFDM symbol and 127 subcarriers. The SSS may be sent/transmitted after the PSS (e.g., two symbols later) and may span 1 OFDM symbol and 127 subcarriers. The PBCH may be sent/transmitted after the PSS (e.g., across the next 3 OFDM symbols) and may span 240 subcarriers (e.g., in the second and fourth OFDM symbols as shown in FIG. 11A) and/or may span fewer than 240 subcarriers (e.g., in the third OFDM symbols as shown in FIG. 11A).

The location of the SS/PBCH block in the time and frequency domains may not be known to the wireless device (e.g., if the wireless device is searching for the cell). The wireless device may monitor a carrier for the PSS, for example, to find and select the cell. The wireless device may monitor a frequency location within the carrier. The wireless device may search for the PSS at a different frequency location within the carrier, for example, if the PSS is not found after a certain duration (e.g., 20 ms). The wireless device may search for the PSS at a different frequency location within the carrier, for example, as indicated by a synchronization raster. The wireless device may determine the locations of the SSS and the PBCH, respectively, for example, based on a known structure of the SS/PBCH block if the PSS is found at a location in the time and frequency domains. The SS/PBCH block may be a cell-defining SS block (CD-SSB). A primary cell may be associated with a CD-SSB. The CD-SSB may be located on a synchronization raster. A cell selection/search and/or reselection may be based on the CD-SSB.

The SS/PBCH block may be used by the wireless device to determine one or more parameters of the cell. The wireless device may determine a physical cell identifier (PCI) of the cell, for example, based on the sequences of the PSS and the SSS, respectively. The wireless device may determine a location of a frame boundary of the cell, for example, based on the location of the SS/PBCH block. The SS/PBCH block may indicate that it has been sent/transmitted in accordance with a transmission pattern. An SS/PBCH block in the transmission pattern may be a known distance from the frame boundary (e.g., a predefined distance for a RAN configuration among one or more networks, one or more base stations, and one or more wireless devices).

The PBCH may use a QPSK modulation and/or forward error correction (FEC). The FEC may use polar coding. One or more symbols spanned by the PBCH may comprise/carry one or more DM-RS s for demodulation of the PBCH. The PBCH may comprise an indication of a current system frame number (SFN) of the cell and/or a SS/PBCH block timing index. These parameters may facilitate time synchronization of the wireless device to the base station. The PBCH may comprise a MIB used to send/transmit to the wireless device one or more parameters. The MIB may be used by the wireless device to locate remaining minimum system information (RMSI) associated with the cell. The RMSI may comprise a System Information Block Type 1 (SIB1). The SIB1 may comprise information for the wireless device to access the cell. The wireless device may use one or more parameters of the MIB to monitor a PDCCH, which may be used to schedule a PDSCH. The PDSCH may comprise the SIB1. The SIB1 may be decoded using parameters provided/comprised in the MIB. The PBCH may indicate an absence of SIB1. The wireless device may be pointed to a frequency, for example, based on the PBCH indicating the absence of SIB1. The wireless device may search for an SS/PBCH block at the frequency to which the wireless device is pointed.

The wireless device may assume that one or more SS/PBCH blocks sent/transmitted with a same SS/PBCH block index are quasi co-located (QCLed) (e.g., having substantially the same/similar Doppler spread, Doppler shift, average gain, average delay, and/or spatial Rx parameters). The wireless device may not assume QCL for SS/PBCH block transmissions having different SS/PBCH block indices. SS/PBCH blocks (e.g., those within a half-frame) may be sent/transmitted in spatial directions (e.g., using different beams that span a coverage area of the cell). A first SS/PBCH block may be sent/transmitted in a first spatial direction using a first beam, a second SS/PBCH block may be sent/transmitted in a second spatial direction using a second beam, a third SS/PBCH block may be sent/transmitted in a third spatial direction using a third beam, a fourth SS/PBCH block may be sent/transmitted in a fourth spatial direction using a fourth beam, etc.

A base station may send/transmit a plurality of SS/PBCH blocks, for example, within a frequency span of a carrier. A first PCI of a first SS/PBCH block of the plurality of SS/PBCH blocks may be different from a second PCI of a second SS/PBCH block of the plurality of SS/PBCH blocks. The PCIs of SS/PBCH blocks sent/transmitted in different frequency locations may be different or substantially the same.

The CSI-RS may be sent/transmitted by the base station and used by the wireless device to acquire/obtain/determine channel state information (CSI). The base station may configure the wireless device with one or more CSI-RS s for channel estimation or any other suitable purpose. The base station may configure a wireless device with one or more of the same/similar CSI-RSs. The wireless device may measure the one or more CSI-RSs. The wireless device may estimate a downlink channel state and/or generate a CSI report, for example, based on the measuring of the one or more downlink CSI-RSs. The wireless device may send/transmit the CSI report to the base station (e.g., based on periodic CSI reporting, semi-persistent CSI reporting, and/or aperiodic CSI reporting). The base station may use feedback provided by the wireless device (e.g., the estimated downlink channel state) to perform a link adaptation.

The base station may semi-statically configure the wireless device with one or more CSI-RS resource sets. A CSI-RS resource may be associated with a location in the time and frequency domains and a periodicity. The base station may selectively activate and/or deactivate a CSI-RS resource. The base station may indicate to the wireless device that a CSI-RS resource in the CSI-RS resource set is activated and/or deactivated.

The base station may configure the wireless device to report CSI measurements. The base station may configure the wireless device to provide CSI reports periodically, aperiodically, or semi-persistently. For periodic CSI reporting, the wireless device may be configured with a timing and/or periodicity of a plurality of CSI reports. For aperiodic CSI reporting, the base station may request a CSI report. The base station may command the wireless device to measure a configured CSI-RS resource and provide a CSI report relating to the measurement(s). For semi-persistent CSI reporting, the base station may configure the wireless device to send/transmit periodically, and selectively activate or deactivate the periodic reporting (e.g., via one or more activation/deactivation MAC CEs and/or one or more DCIs). The base station may configure the wireless device with a CSI-RS resource set and CSI reports, for example, using RRC signaling.

The CSI-RS configuration may comprise one or more parameters indicating, for example, up to 32 antenna ports (or any other quantity of antenna ports). The wireless device may be configured to use/employ the same OFDM symbols for a downlink CSI-RS and a CORESET, for example, if the downlink CSI-RS and CORESET are spatially QCLed and resource elements associated with the downlink CSI-RS are outside of the physical resource blocks (PRBs) configured for the CORESET. The wireless device may be configured to use/employ the same OFDM symbols for a downlink CSI-RS and SS/PBCH blocks, for example, if the downlink CSI-RS and SS/PBCH blocks are spatially QCLed and resource elements associated with the downlink CSI-RS are outside of PRBs configured for the SS/PBCH blocks.

Downlink DM-RS s may be sent/transmitted by a base station and received/used by a wireless device for a channel estimation. The downlink DM-RS s may be used for coherent demodulation of one or more downlink physical channels (e.g., PDSCH). A network (e.g., an NR network) may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., one or two adjacent OFDM symbols). A base station may semi-statically configure the wireless device with a number/quantity (e.g. a maximum number/quantity) of front-loaded DM-RS symbols for a PDSCH. A DM-RS configuration may support one or more DM-RS ports. A DM-RS configuration may support up to eight orthogonal downlink DM-RS ports per wireless device (e.g., for single user-MIMO). A DM-RS configuration may support up to 4 orthogonal downlink DM-RS ports per wireless device (e.g., for multiuser-MIMO). A radio network may support (e.g., at least for CP-OFDM) a common DM-RS structure for downlink and uplink. A DM-RS location, a DM-RS pattern, and/or a scrambling sequence may be the same or different. The base station may send/transmit a downlink DM-RS and a corresponding PDSCH, for example, using the same precoding matrix. The wireless device may use the one or more downlink DM-RSs for coherent demodulation/channel estimation of the PDSCH.

A transmitter (e.g., a transmitter of a base station) may use a precoder matrices for a part of a transmission bandwidth. The transmitter may use a first precoder matrix for a first bandwidth and a second precoder matrix for a second bandwidth. The first precoder matrix and the second precoder matrix may be different, for example, based on the first bandwidth being different from the second bandwidth. The wireless device may assume that a same precoding matrix is used across a set of PRBs. The set of PRBs may be determined/indicated/identified/denoted as a precoding resource block group (PRG).

A PDSCH may comprise one or more layers. The wireless device may assume that at least one symbol with DM-RS is present on a layer of the one or more layers of the PDSCH. A higher layer may configure one or more DM-RS s for a PDSCH (e.g., up to 3 DMRSs for the PDSCH). Downlink PT-RS may be sent/transmitted by a base station and used by a wireless device, for example, for a phase-noise compensation. Whether a downlink PT-RS is present or not may depend on an RRC configuration. The presence and/or the pattern of the downlink PT-RS may be configured on a wireless device-specific basis, for example, using a combination of RRC signaling and/or an association with one or more parameters used/employed for other purposes (e.g., modulation and coding scheme (MCS)), which may be indicated by DCI. A dynamic presence of a downlink PT-RS, if configured, may be associated with one or more DCI parameters comprising at least MCS. A network (e.g., an NR network) may support a plurality of PT-RS densities defined in the time and/or frequency domains. A frequency domain density (if configured/present) may be associated with at least one configuration of a scheduled bandwidth. The wireless device may assume a same precoding for a DM-RS port and a PT-RS port. The quantity/number of PT-RS ports may be fewer than the quantity/number of DM-RS ports in a scheduled resource. Downlink PT-RS may be configured/allocated/confined in the scheduled time/frequency duration for the wireless device. Downlink PT-RS may be sent/transmitted via symbols, for example, to facilitate a phase tracking at the receiver.

The wireless device may send/transmit an uplink DM-RS to a base station, for example, for a channel estimation. The base station may use the uplink DM-RS for coherent demodulation of one or more uplink physical channels. The wireless device may send/transmit an uplink DM-RS with a PUSCH and/or a PUCCH. The uplink DM-RS may span a range of frequencies that is similar to a range of frequencies associated with the corresponding physical channel. The base station may configure the wireless device with one or more uplink DM-RS configurations. At least one DM-RS configuration may support a front-loaded DM-RS pattern. The front-loaded DM-RS may be mapped over one or more OFDM symbols (e.g., one or two adjacent OFDM symbols). One or more uplink DM-RS s may be configured to send/transmit at one or more symbols of a PUSCH and/or a PUCCH. The base station may semi-statically configure the wireless device with a number/quantity (e.g., the maximum number/quantity) of front-loaded DM-RS symbols for the PUSCH and/or the PUCCH, which the wireless device may use to schedule a single-symbol DM-RS and/or a double-symbol DM-RS. A network (e.g., an NR network) may support (e.g., for cyclic prefix orthogonal frequency division multiplexing (CP-OFDM)) a common DM-RS structure for downlink and uplink. A DM-RS location, a DM-RS pattern, and/or a scrambling sequence for the DM-RS may be substantially the same or different.

A PUSCH may comprise one or more layers. A wireless device may send/transmit at least one symbol with DM-RS present on a layer of the one or more layers of the PUSCH. A higher layer may configure one or more DM-RS s (e.g., up to three DMRSs) for the PUSCH. Uplink PT-RS (which may be used by a base station for a phase tracking and/or a phase-noise compensation) may or may not be present, for example, depending on an RRC configuration of the wireless device. The presence and/or the pattern of an uplink PT-RS may be configured on a wireless device-specific basis (e.g., a UE-specific basis), for example, by a combination of RRC signaling and/or one or more parameters configured/employed for other purposes (e.g., MCS), which may be indicated by DCI. A dynamic presence of an uplink PT-RS, if configured, may be associated with one or more DCI parameters comprising at least MCS. A radio network may support a plurality of uplink PT-RS densities defined in time/frequency domain. A frequency domain density (if configured/present) may be associated with at least one configuration of a scheduled bandwidth. The wireless device may assume a same precoding for a DM-RS port and a PT-RS port. A quantity/number of PT-RS ports may be less than a quantity/number of DM-RS ports in a scheduled resource. An uplink PT-RS may be configured/allocated/confined in the scheduled time/frequency duration for the wireless device.

One or more SRSs may be sent/transmitted by a wireless device to a base station, for example, for a channel state estimation to support uplink channel dependent scheduling and/or a link adaptation. SRS sent/transmitted by the wireless device may enable/allow a base station to estimate an uplink channel state at one or more frequencies. A scheduler at the base station may use/employ the estimated uplink channel state to assign one or more resource blocks for an uplink PUSCH transmission for the wireless device. The base station may semi-statically configure the wireless device with one or more SRS resource sets. For an SRS resource set, the base station may configure the wireless device with one or more SRS resources. An SRS resource set applicability may be configured, for example, by a higher layer (e.g., RRC) parameter. An SRS resource in a SRS resource set of the one or more SRS resource sets (e.g., with the same/similar time domain behavior, periodic, aperiodic, and/or the like) may be sent/transmitted at a time instant (e.g., simultaneously), for example, if a higher layer parameter indicates beam management. The wireless device may send/transmit one or more SRS resources in SRS resource sets. A network (e.g., an NR network) may support aperiodic, periodic, and/or semi-persistent SRS transmissions. The wireless device may send/transmit SRS resources, for example, based on one or more trigger types. The one or more trigger types may comprise higher layer signaling (e.g., RRC) and/or one or more DCI formats. At least one DCI format may be used/employed for the wireless device to select at least one of one or more configured SRS resource sets. An SRS trigger type 0 may refer to an SRS triggered based on higher layer signaling. An SRS trigger type 1 may refer to an SRS triggered based on one or more DCI formats. The wireless device may be configured to send/transmit an SRS, for example, after a transmission of a PUSCH and a corresponding uplink DM-RS if a PUSCH and an SRS are sent/transmitted in a same slot. A base station may semi-statically configure a wireless device with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; an offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port may be determined/defined such that the channel over which a symbol on the antenna port is conveyed can be inferred from the channel over which another symbol on the same antenna port is conveyed. The receiver may infer/determine the channel (e.g., fading gain, multipath delay, and/or the like) for conveying a second symbol on an antenna port, from the channel for conveying a first symbol on the antenna port, for example, if the first symbol and the second symbol are sent/transmitted on the same antenna port. A first antenna port and a second antenna port may be referred to as quasi co-located (QCLed), for example, if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming may require beam management. Beam management may comprise a beam measurement, a beam selection, and/or a beam indication. A beam may be associated with one or more reference signals. A beam may be identified by one or more beamformed reference signals. The wireless device may perform a downlink beam measurement, for example, based on one or more downlink reference signals (e.g., a CSI-RS) and generate a beam measurement report. The wireless device may perform the downlink beam measurement procedure, for example, after an RRC connection is set up with a base station.

Figure 11B:
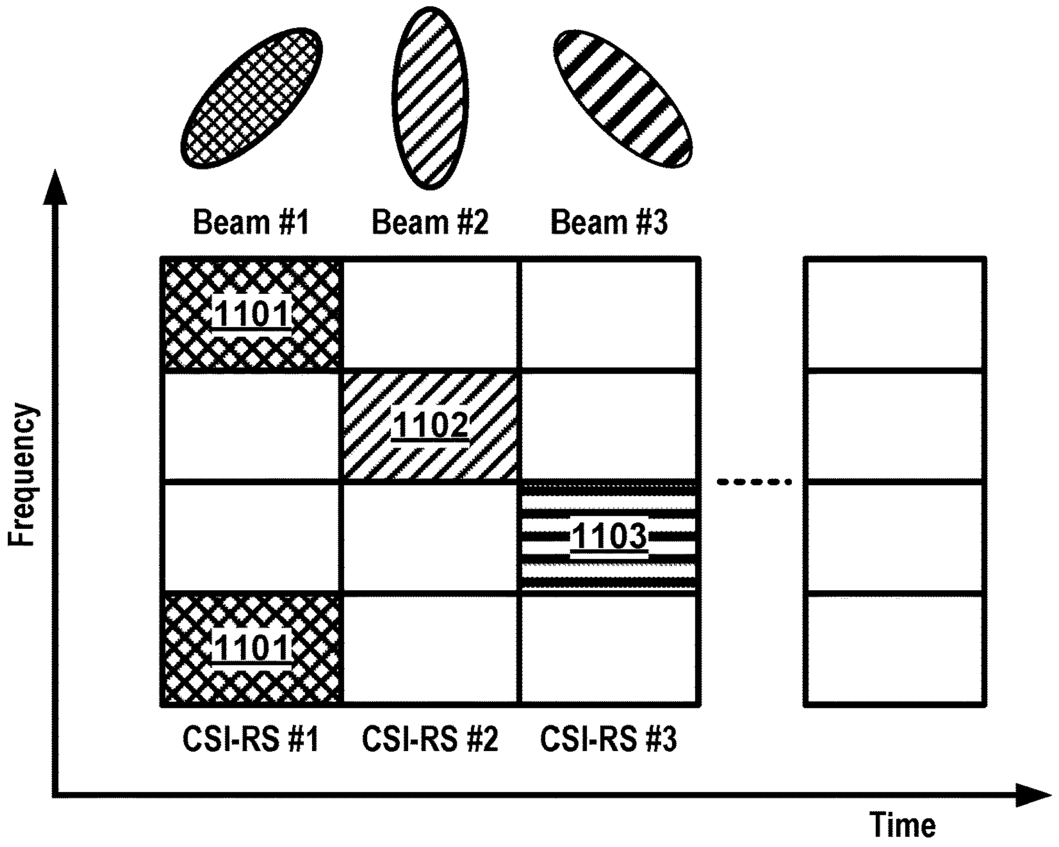
FIG. 11B shows an example mapping of one or more channel state information reference signals (CSI-RSs).

FIG. 11B shows an example mapping of one or more CSI-RSs. The CSI-RS s may be mapped in the time and frequency domains. Each rectangular block shown in FIG. 11B may correspond to a resource block (RB) within a bandwidth of a cell. A base station may send/transmit one or more RRC messages comprising CSI-RS resource configuration parameters indicating one or more CSI-RS s. One or more of parameters may be configured by higher layer signaling (e.g., RRC and/or MAC signaling) for a CSI-RS resource configuration. The one or more of the parameters may comprise at least one of: a CSI-RS resource configuration identity, a number of CSI-RS ports, a CSI-RS configuration (e.g., symbol and resource element (RE) locations in a subframe), a CSI-RS subframe configuration (e.g., a subframe location, an offset, and periodicity in a radio frame), a CSI-RS power parameter, a CSI-RS sequence parameter, a code division multiplexing (CDM) type parameter, a frequency density, a transmission comb, quasi colocation (QCL) parameters (e.g., QCL-scramblingidentity, crs-portscount, mbsfn-subframeconfiglist, csi-rs-configZPid, qcl-csi-rs-configNZPid), and/or other radio resource parameters.

One or more beams may be configured for a wireless device in a wireless device-specific configuration. Three beams are shown in FIG. 11B (beam #1, beam #2, and beam #3), but more or fewer beams may be configured. Beam #1 may be allocated with CSI-RS 1101 that may be sent/transmitted in one or more subcarriers in an RB of a first symbol. Beam #2 may be allocated with CSI-RS 1102 that may be sent/transmitted in one or more subcarriers in an RB of a second symbol. Beam #3 may be allocated with CSI-RS 1103 that may be sent/transmitted in one or more subcarriers in an RB of a third symbol. A base station may use other subcarriers in the same RB (e.g., those that are not used to send/transmit CSI-RS 1101) to transmit another CSI-RS associated with a beam for another wireless device, for example, by using frequency division multiplexing (FDM). Beams used for a wireless device may be configured such that beams for the wireless device use symbols different from symbols used by beams of other wireless devices, for example, by using time domain multiplexing (TDM). A wireless device may be served with beams in orthogonal symbols (e.g., no overlapping symbols), for example, by using the TDM.

CSI-RSs (e.g., CSI-RS s 1101, 1102, 1103) may be sent/transmitted by the base station and used by the wireless device for one or more measurements. The wireless device may measure a reference signal received power (RSRP) of configured CSI-RS resources. The base station may configure the wireless device with a reporting configuration, and the wireless device may report the RSRP measurements to a network (e.g., via one or more base stations) based on the reporting configuration. The base station may determine, based on the reported measurement results, one or more transmission configuration indication (TCI) states comprising a number of reference signals. The base station may indicate one or more TCI states to the wireless device (e.g., via RRC signaling, a MAC CE, and/or DCI). The wireless device may receive a downlink transmission with an Rx beam determined based on the one or more TCI states. The wireless device may or may not have a capability of beam correspondence. The wireless device may determine a spatial domain filter of a transmit (Tx) beam, for example, based on a spatial domain filter of the corresponding Rx beam, if the wireless device has the capability of beam correspondence. The wireless device may perform an uplink beam selection procedure to determine the spatial domain filter of the Tx beam, for example, if the wireless device does not have the capability of beam correspondence. The wireless device may perform the uplink beam selection procedure, for example, based on one or more sounding reference signal (SRS) resources configured to the wireless device by the base station. The base station may select and indicate uplink beams for the wireless device, for example, based on measurements of the one or more SRS resources sent/transmitted by the wireless device.

A wireless device may determine/assess (e.g., measure) a channel quality of one or more beam pair links, for example, in a beam management procedure. A beam pair link may comprise a Tx beam of a base station and an Rx beam of the wireless device. The Tx beam of the base station may send/transmit a downlink signal, and the Rx beam of the wireless device may receive the downlink signal. The wireless device may send/transmit a beam measurement report, for example, based on the assessment/determination. The beam measurement report may indicate one or more beam pair quality parameters comprising at least one of: one or more beam identifications (e.g., a beam index, a reference signal index, or the like), an RSRP, a precoding matrix indicator (PMI), a channel quality indicator (CQI), and/or a rank indicator (RI).

Figure 12A:
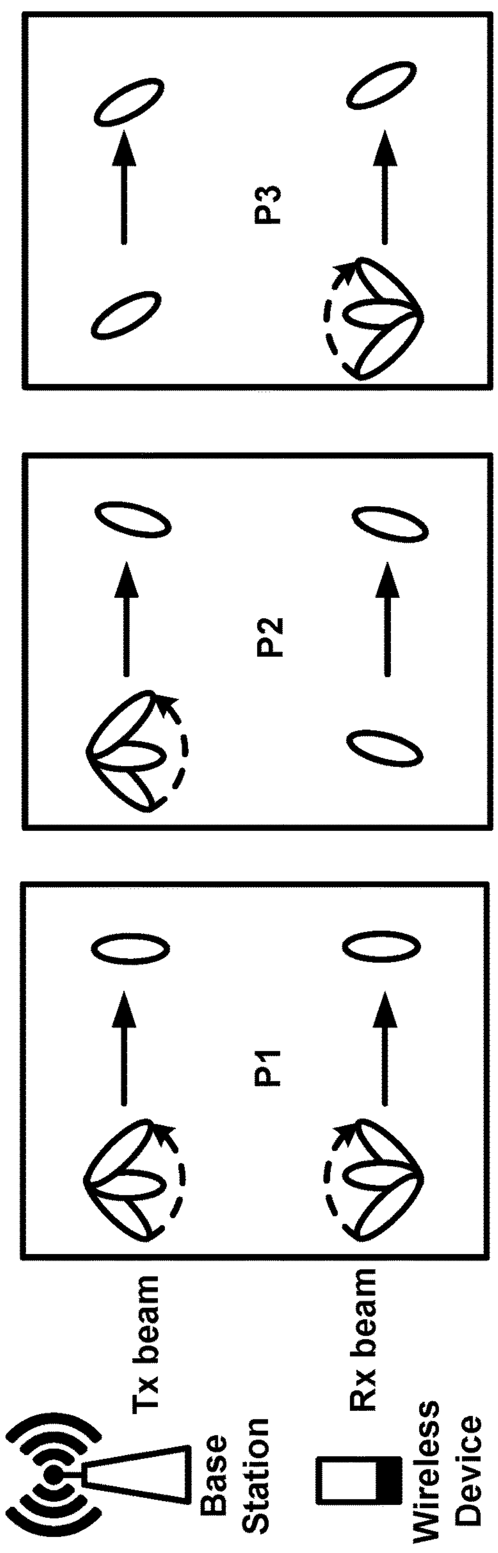
FIG. 12A shows examples of downlink beam management procedures.

FIG. 12A shows examples of downlink beam management procedures. One or more downlink beam management procedures (e.g., downlink beam management procedures P1, P2, and P3) may be performed. Procedure P1 may enable a measurement (e.g., a wireless device measurement) on Tx beams of a TRP (or multiple TRPs) (e.g., to support a selection of one or more base station Tx beams and/or wireless device Rx beams). The Tx beams of a base station and the Rx beams of a wireless device are shown as ovals in the top row of P1 and bottom row of P1, respectively. Beamforming (e.g., at a TRP) may comprise a Tx beam sweep for a set of beams (e.g., the beam sweeps shown, in the top rows of P1 and P2, as ovals rotated in a counter-clockwise direction indicated by the dashed arrows). Beamforming (e.g., at a wireless device) may comprise an Rx beam sweep for a set of beams (e.g., the beam sweeps shown, in the bottom rows of P1 and P3, as ovals rotated in a clockwise direction indicated by the dashed arrows). Procedure P2 may be used to enable a measurement (e.g., a wireless device measurement) on Tx beams of a TRP (shown, in the top row of P2, as ovals rotated in a counter-clockwise direction indicated by the dashed arrow). The wireless device and/or the base station may perform procedure P2, for example, using a smaller set of beams than the set of beams used in procedure P1, or using narrower beams than the beams used in procedure P1. Procedure P2 may be referred to as a beam refinement. The wireless device may perform procedure P3 for an Rx beam determination, for example, by using the same Tx beam(s) of the base station and sweeping Rx beam(s) of the wireless device.

Figure 12B:
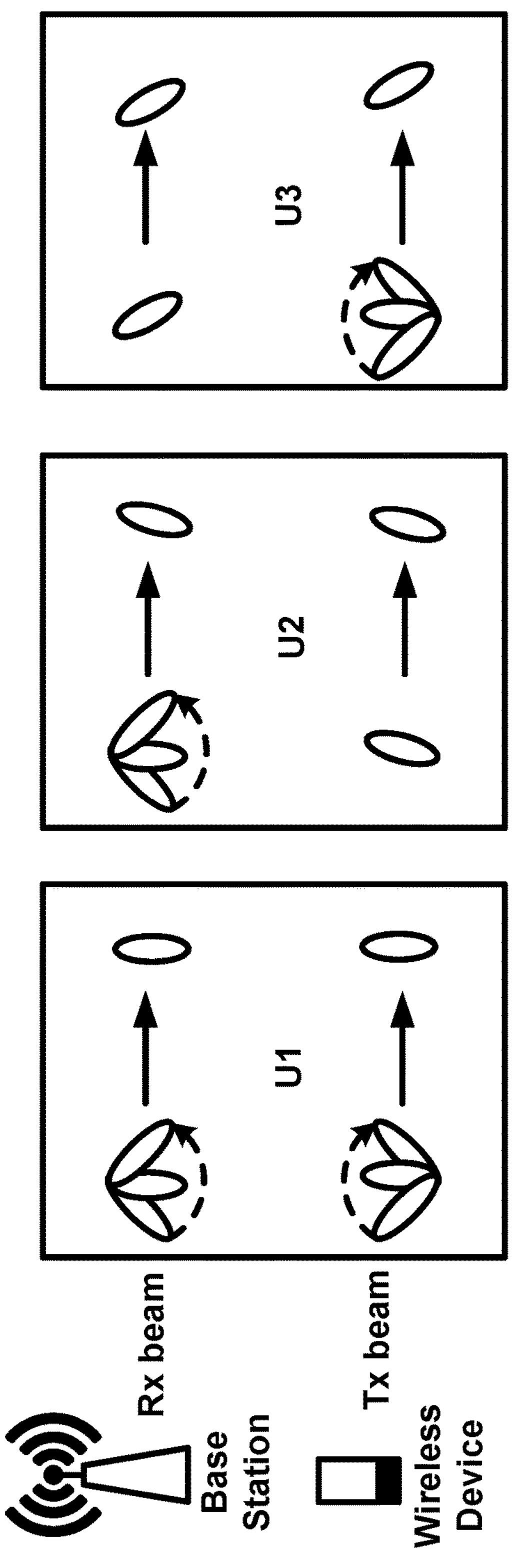
FIG. 12B shows examples of uplink beam management procedures.

FIG. 12B shows examples of uplink beam management procedures. One or more uplink beam management procedures (e.g., uplink beam management procedures U1, U2, and U3) may be performed. Procedure U1 may be used to enable a base station to perform a measurement on Tx beams of a wireless device (e.g., to support a selection of one or more Tx beams of the wireless device and/or Rx beams of the base station). The Tx beams of the wireless device and the Rx beams of the base station are shown as ovals in the top row of U1 and bottom row of U1, respectively). Beamforming (e.g., at the wireless device) may comprise one or more beam sweeps, for example, a Tx beam sweep from a set of beams (shown, in the bottom rows of U1 and U3, as ovals rotated in a clockwise direction indicated by the dashed arrows). Beamforming (e.g., at the base station) may comprise one or more beam sweeps, for example, an Rx beam sweep from a set of beams (shown, in the top rows of U1 and U2, as ovals rotated in a counter-clockwise direction indicated by the dashed arrows). Procedure U2 may be used to enable the base station to adjust its Rx beam, for example, if the wireless device (e.g., UE) uses a fixed Tx beam. The wireless device and/or the base station may perform procedure U2, for example, using a smaller set of beams than the set of beams used in procedure P1, or using narrower beams than the beams used in procedure P1. Procedure U2 may be referred to as a beam refinement. The wireless device may perform procedure U3 to adjust its Tx beam, for example, if the base station uses a fixed Rx beam.

A wireless device may initiate/start/perform a beam failure recovery (BFR) procedure, for example, based on detecting a beam failure. The wireless device may send/transmit a BFR request (e.g., a preamble, UCI, an SR, a MAC CE, and/or the like), for example, based on the initiating the BFR procedure. The wireless device may detect the beam failure, for example, based on a determination that a quality of beam pair link(s) of an associated control channel is unsatisfactory (e.g., having an error rate higher than an error rate threshold, a received signal power lower than a received signal power threshold, an expiration of a timer, and/or the like).

The wireless device may measure a quality of a beam pair link, for example, using one or more reference signals (RS s) comprising one or more SS/PBCH blocks, one or more CSI-RS resources, and/or one or more DM-RSs. A quality of the beam pair link may be based on one or more of a block error rate (BLER), an RSRP value, a signal to interference plus noise ratio (SINR) value, an RSRQ value, and/or a CSI value measured on RS resources. The base station may indicate that an RS resource is QCLed with one or more DM-RS s of a channel (e.g., a control channel, a shared data channel, and/or the like). The RS resource and the one or more DM-RSs of the channel may be QCLed, for example, if the channel characteristics (e.g., Doppler shift, Doppler spread, an average delay, delay spread, a spatial Rx parameter, fading, and/or the like) from a transmission via the RS resource to the wireless device are similar or the same as the channel characteristics from a transmission via the channel to the wireless device.

A network (e.g., an NR network comprising a gNB and/or an ng-eNB) and/or the wireless device may initiate/start/perform a random access procedure. A wireless device in an RRC idle (e.g., an RRC_IDLE) state and/or an RRC inactive (e.g., an RRC_INACTIVE) state may initiate/perform the random access procedure to request a connection setup to a network. The wireless device may initiate/start/perform the random access procedure from an RRC connected (e.g., an RRC_CONNECTED) state. The wireless device may initiate/start/perform the random access procedure to request uplink resources (e.g., for uplink transmission of an SR if there is no PUCCH resource available) and/or acquire/obtain/determine an uplink timing (e.g., if an uplink synchronization status is non-synchronized). The wireless device may initiate/start/perform the random access procedure to request one or more system information blocks (SIBs) (e.g., other system information blocks, such as SIB2, SIB3, and/or the like). The wireless device may initiate/start/perform the random access procedure for a beam failure recovery request. A network may initiate/start/perform a random access procedure, for example, for a handover and/or for establishing time alignment for an SCell addition.

Figure 13C:
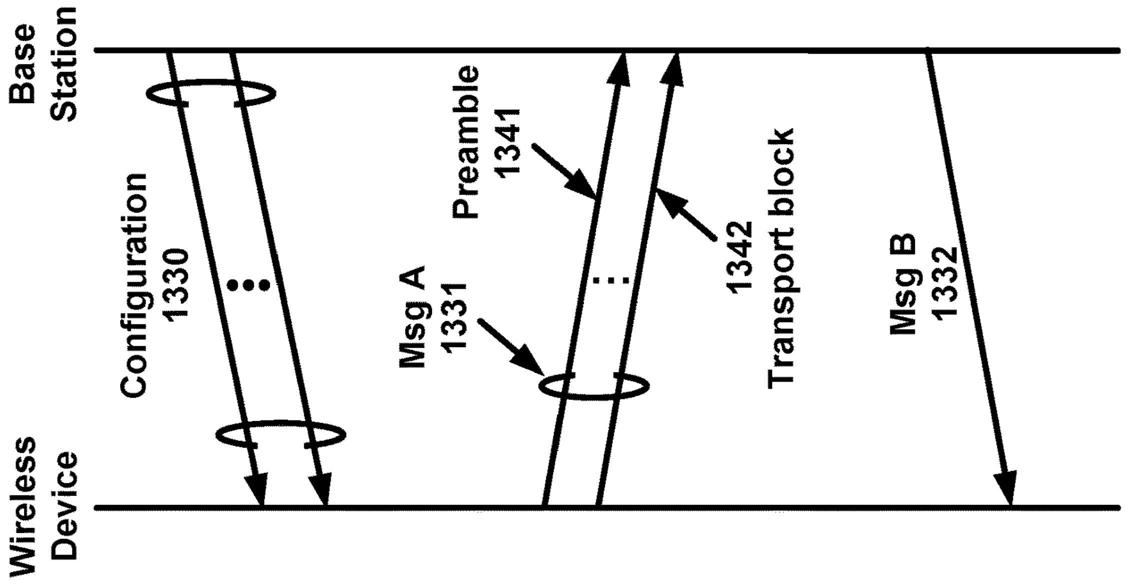
FIG. 13C shows an example two-step random access procedure.
Figure 13B:
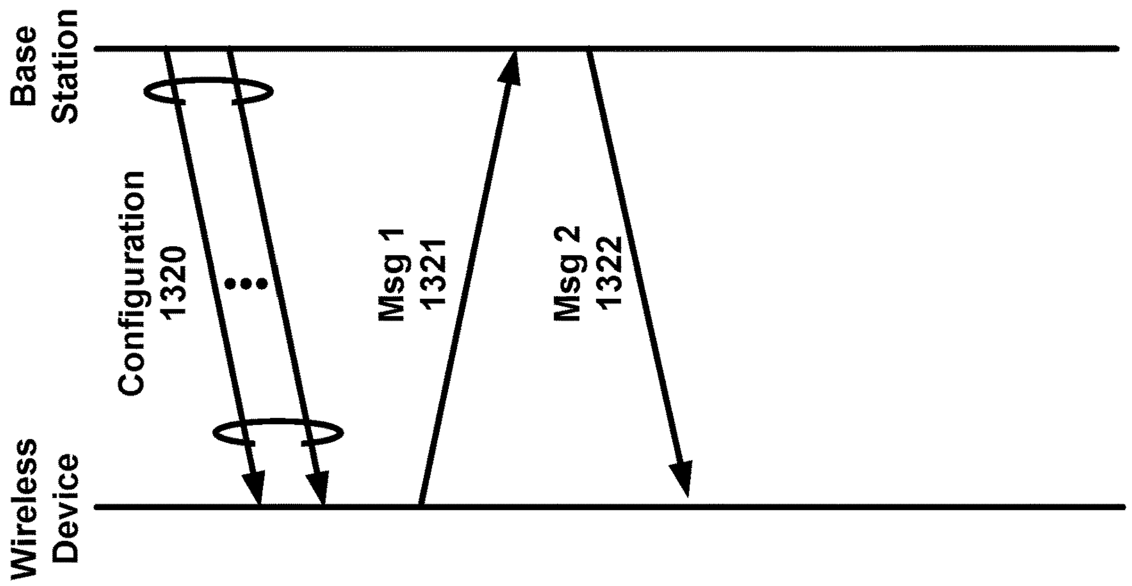
FIG. 13B shows an example two-step random access procedure.
Figure 13A:
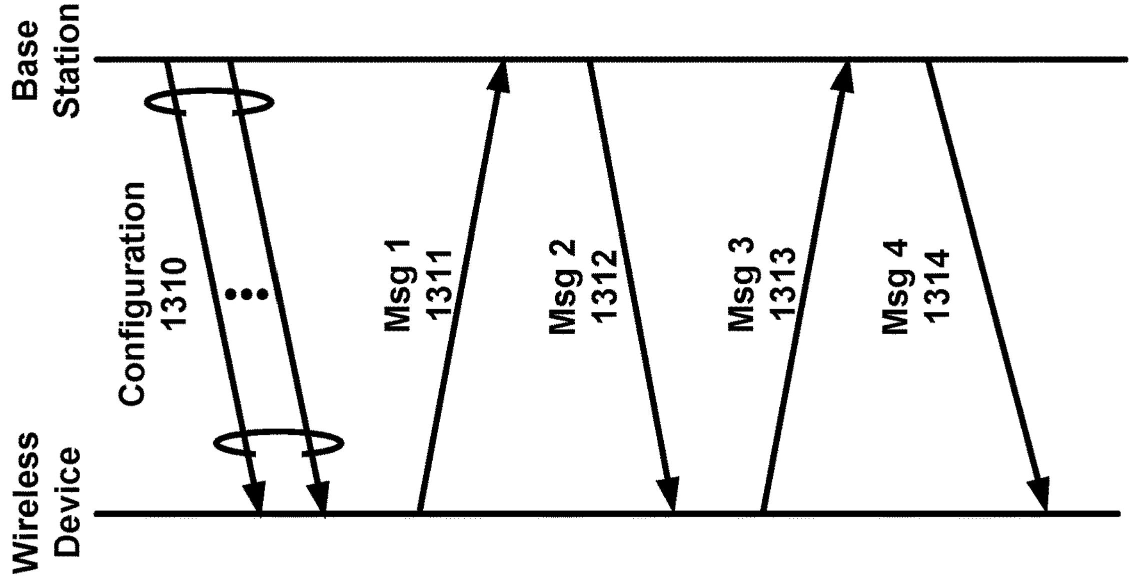
FIG. 13A shows an example four-step random access procedure.

FIG. 13A shows an example four-step random access procedure. The four-step random access procedure may comprise a four-step contention-based random access procedure. A base station may send/transmit a configuration message 1310 to a wireless device, for example, before initiating the random access procedure. The four-step random access procedure may comprise transmissions of four messages comprising: a first message (e.g., Msg 1 1311), a second message (e.g., Msg 2 1312), a third message (e.g., Msg 3 1313), and a fourth message (e.g., Msg 4 1314). The first message (e.g., Msg 1 1311) may comprise a preamble (or a random access preamble). The first message (e.g., Msg 1 1311) may be referred to as a preamble. The second message (e.g., Msg 2 1312) may comprise as a random access response (RAR). The second message (e.g., Msg 2 1312) may be referred to as an RAR.

The configuration message 1310 may be sent/transmitted, for example, using one or more RRC messages. The one or more RRC messages may indicate one or more random access channel (RACH) parameters to the wireless device. The one or more RACH parameters may comprise at least one of: general parameters for one or more random access procedures (e.g., RACH-configGeneral); cell-specific parameters (e.g., RACH-ConfigCommon); and/or dedicated parameters (e.g., RACH-configDedicated). The base station may send/transmit (e.g., broadcast or multicast) the one or more RRC messages to one or more wireless devices. The one or more RRC messages may be wireless device-specific. The one or more RRC messages that are wireless device-specific may be, for example, dedicated RRC messages sent/transmitted to a wireless device in an RRC connected (e.g., an RRC_CONNECTED) state and/or in an RRC inactive (e.g., an RRC_INACTIVE) state. The wireless devices may determine, based on the one or more RACH parameters, a time-frequency resource and/or an uplink transmit power for transmission of the first message (e.g., Msg 1 1311) and/or the third message (e.g., Msg 3 1313). The wireless device may determine a reception timing and a downlink channel for receiving the second message (e.g., Msg 2 1312) and the fourth message (e.g., Msg 4 1314), for example, based on the one or more RACH parameters.

The one or more RACH parameters provided/configured/comprised in the configuration message 1310 may indicate one or more Physical RACH (PRACH) occasions available for transmission of the first message (e.g., Msg 1 1311). The one or more PRACH occasions may be predefined (e.g., by a network comprising one or more base stations). The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. The one or more RACH parameters may indicate a quantity/number of SS/PBCH blocks mapped to a PRACH occasion and/or a quantity/number of preambles mapped to a SS/PBCH blocks.

The one or more RACH parameters provided/configured/comprised in the configuration message 1310 may be used to determine an uplink transmit power of first message (e.g., Msg 1 1311) and/or third message (e.g., Msg 3 1313). The one or more RACH parameters may indicate a reference power for a preamble transmission (e.g., a received target power and/or an initial power of the preamble transmission). There may be one or more power offsets indicated by the one or more RACH parameters. The one or more RACH parameters may indicate: a power ramping step; a power offset between SSB and CSI-RS; a power offset between transmissions of the first message (e.g., Msg 1 1311) and the third message (e.g., Msg 3 1313); and/or a power offset value between preamble groups. The one or more RACH parameters may indicate one or more thresholds, for example, based on which the wireless device may determine at least one reference signal (e.g., an SSB and/or CSI-RS) and/or an uplink carrier (e.g., a normal uplink (NUL) carrier and/or a supplemental uplink (SUL) carrier).

The first message (e.g., Msg 1 1311) may comprise one or more preamble transmissions (e.g., a preamble transmission and one or more preamble retransmissions). An RRC message may be used to configure one or more preamble groups (e.g., group A and/or group B). A preamble group may comprise one or more preambles. The wireless device may determine the preamble group, for example, based on a pathloss measurement and/or a size of the third message (e.g., Msg 3 1313). The wireless device may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The wireless device may select at least one preamble associated with the one or more reference signals and/or a selected preamble group, for example, if the association between the one or more preambles and the at least one reference signal is configured by an RRC message.

The wireless device may determine the preamble, for example, based on the one or more RACH parameters provided/configured/comprised in the configuration message 1310. The wireless device may determine the preamble, for example, based on a pathloss measurement, an RSRP measurement, and/or a size of the third message (e.g., Msg 3 1313). The one or more RACH parameters may indicate: a preamble format; a maximum quantity/number of preamble transmissions; and/or one or more thresholds for determining one or more preamble groups (e.g., group A and group B). A base station may use the one or more RACH parameters to configure the wireless device with an association between one or more preambles and one or more reference signals (e.g., SSBs and/or CSI-RSs). The wireless device may determine the preamble to be comprised in first message (e.g., Msg 1 1311), for example, based on the association if the association is configured. The first message (e.g., Msg 1 1311) may be sent/transmitted to the base station via one or more PRACH occasions. The wireless device may use one or more reference signals (e.g., SSBs and/or CSI-RS s) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The wireless device may perform a preamble retransmission, for example, if no response is received based on (e.g., after or in response to) a preamble transmission (e.g., for a period of time, such as a monitoring window for monitoring an RAR). The wireless device may increase an uplink transmit power for the preamble retransmission. The wireless device may select an initial preamble transmit power, for example, based on a pathloss measurement and/or a target received preamble power configured by the network. The wireless device may determine to resend/retransmit a preamble and may ramp up the uplink transmit power. The wireless device may receive one or more RACH parameters (e.g., PREAMBLE_POWER_RAMPING_STEP) indicating a ramping step for the preamble retransmission. The ramping step may be an amount of incremental increase in uplink transmit power for a retransmission. The wireless device may ramp up the uplink transmit power, for example, if the wireless device determines a reference signal (e.g., SSB and/or CSI-RS) that is the same as a previous preamble transmission. The wireless device may count the quantity/number of preamble transmissions and/or retransmissions, for example, using a counter parameter (e.g., PREAMBLE_TRANSMISSION_COUNTER). The wireless device may determine that a random access procedure has been completed unsuccessfully, for example, if the quantity/number of preamble transmissions exceeds a threshold configured by the one or more RACH parameters (e.g., preambleTransMax) without receiving a successful response (e.g., an RAR).

The second message (e.g., Msg 2 1312) (e.g., received by the wireless device) may comprise an RAR. The second message (e.g., Msg 2 1312) may comprise multiple RARs corresponding to multiple wireless devices. The second message (e.g., Msg 2 1312) may be received, for example, based on (e.g., after or in response to) the sending/transmitting of the first message (e.g., Msg 1 1311). The second message (e.g., Msg 2 1312) may be scheduled on the DL-SCH and may be indicated by a PDCCH, for example, using a random access radio network temporary identifier (RA RNTI). The second message (e.g., Msg 2 1312) may indicate that the first message (e.g., Msg 1 1311) was received by the base station. The second message (e.g., Msg 2 1312) may comprise a time-alignment command that may be used by the wireless device to adjust the transmission timing of the wireless device, a scheduling grant for transmission of the third message (e.g., Msg 3 1313), and/or a Temporary Cell RNTI (TC-RNTI). The wireless device may determine/start a time window (e.g., ra-ResponseWindow) to monitor a PDCCH for the second message (e.g., Msg 2

1312), for example, after sending/transmitting the first message (e.g., Msg 1 1311) (e.g., a preamble). The wireless device may determine the start time of the time window, for example, based on a PRACH occasion that the wireless device uses to send/transmit the first message (e.g., Msg 1 1311) (e.g., the preamble). The wireless device may start the time window one or more symbols after the last symbol of the first message (e.g., Msg 1 1311) comprising the preamble (e.g., the symbol in which the first message (e.g., Msg 1 1311) comprising the preamble transmission was completed or at a first PDCCH occasion from an end of a preamble transmission). The one or more symbols may be determined based on a numerology. The PDCCH may be mapped in a common search space (e.g., a Type1-PDCCH common search space) configured by an RRC message. The wireless device may identify/determine the RAR, for example, based on an RNTI. Radio network temporary identifiers (RNTIs) may be used depending on one or more events initiating/starting the random access procedure. The wireless device may use a RA-RNTI, for example, for one or more communications associated with random access or any other purpose. The RA-RNTI may be associated with PRACH occasions in which the wireless device sends/transmits a preamble. The wireless device may determine the RA-RNTI, for example, based on at least one of: an OFDM symbol index; a slot index; a frequency domain index; and/or a UL carrier indicator of the PRACH occasions. An example RA-RNTI may be determined as follows:

$$\text{RA-RNTI}=1+s\_id+14\times t\_id+14\times 80\times f\_id+14\times 80\times 8\times ul\_carrier\_id$$

where s_id may be an index of a first OFDM symbol of the PRACH occasion (e.g., 0≤s_id<14), t_id may be an index of a first slot of the PRACH occasion in a system frame (e.g., 0≤t_id<80), fid may be an index of the PRACH occasion in the frequency domain (e.g., 0≤f_id<8), and ul carrier id may be a UL carrier used for a preamble transmission (e.g., 0 for an NUL carrier, and 1 for an SUL carrier).

The wireless device may send/transmit the third message (e.g., Msg 3 1313), for example, based on (e.g., after or in response to) a successful reception of the second message (e.g., Msg 2 1312) (e.g., using resources identified in the Msg 2 1312). The third message (e.g., Msg 3 1313) may be used, for example, for contention resolution in the contention-based random access procedure. A plurality of wireless devices may send/transmit the same preamble to a base station, and the base station may send/transmit an RAR that corresponds to a wireless device. Collisions may occur, for example, if the plurality of wireless device interpret the RAR as corresponding to themselves. Contention resolution (e.g., using the third message (e.g., Msg 3 1313) and the fourth message (e.g., Msg 4 1314)) may be used to increase the likelihood that the wireless device does not incorrectly use an identity of another the wireless device. The wireless device may comprise a device identifier in the third message (e.g., Msg 3 1313) (e.g., a C-RNTI if assigned, a TC RNTI comprised in the second message (e.g., Msg 2 1312), and/or any other suitable identifier), for example, to perform contention resolution.

The fourth message (e.g., Msg 4 1314) may be received, for example, based on (e.g., after or in response to) the sending/transmitting of the third message (e.g., Msg 3 1313). The base station may address the wireless on the PDCCH (e.g., the base station may send the PDCCH to the wireless device) using a C-RNTI, for example, If the C-RNTI was included in the third message (e.g., Msg 3 1313). The random access procedure may be determined to be successfully completed, for example, if the unique C RNTI of the wireless device is detected on the PDCCH (e.g., the PDCCH is scrambled by the C-RNTI). fourth message (e.g., Msg 4 1314) may be received using a DL-SCH associated with a TC RNTI, for example, if the TC RNTI is comprised in the third message (e.g., Msg 3 1313) (e.g., if the wireless device is in an RRC idle (e.g., an RRC_IDLE) state or not otherwise connected to the base station). The wireless device may determine that the contention resolution is successful and/or the wireless device may determine that the random access procedure is successfully completed, for example, if a MAC PDU is successfully decoded and a MAC PDU comprises the wireless device contention resolution identity MAC CE that matches or otherwise corresponds with the CCCH SDU sent/transmitted in third message (e.g., Msg 3 1313).

The wireless device may be configured with an SUL carrier and/or an NUL carrier. An initial access (e.g., random access) may be supported via an uplink carrier. A base station may configure the wireless device with multiple RACH configurations (e.g., two separate RACH configurations comprising: one for an SUL carrier and the other for an NUL carrier). For random access in a cell configured with an SUL carrier, the network may indicate which carrier to use (NUL or SUL). The wireless device may determine to use the SUL carrier, for example, if a measured quality of one or more reference signals (e.g., one or more reference signals associated with the NUL carrier) is lower than a broadcast threshold. Uplink transmissions of the random access procedure (e.g., the first message (e.g., Msg 1 1311) and/or the third message (e.g., Msg 3 1313)) may remain on, or may be performed via, the selected carrier. The wireless device may switch an uplink carrier during the random access procedure (e.g., between the Msg 1 1311 and the Msg 3 1313). The wireless device may determine and/or switch an uplink carrier for the first message (e.g., Msg 1 1311) and/or the third message (e.g., Msg 3 1313), for example, based on a channel clear assessment (e.g., a listen-before-talk).

FIG. 13B shows a two-step random access procedure. The two-step random access procedure may comprise a two-step contention-free random access procedure. Similar to the four-step contention-based random access procedure, a base station may, prior to initiation of the procedure, send/transmit a configuration message 1320 to the wireless device. The configuration message 1320 may be analogous in some respects to the configuration message 1310. The procedure shown in FIG. 13B may comprise transmissions of two messages: a first message (e.g., Msg 1 1321) and a second message (e.g., Msg 2 1322). The first message (e.g., Msg 1 1321) and the second message (e.g., Msg 2 1322) may be analogous in some respects to the first message (e.g., Msg 1 1311) and a second message (e.g., Msg 2 1312), respectively. The two-step contention-free random access procedure may not comprise messages analogous to the third message (e.g., Msg 3 1313) and/or the fourth message (e.g., Msg 4 1314).

The two-step (e.g., contention-free) random access procedure may be configured/initiated for a beam failure recovery, other SI request, an SCell addition, and/or a handover. A base station may indicate, or assign to, the wireless device a preamble to be used for the first message (e.g., Msg 1 1321). The wireless device may receive, from the base station via a PDCCH and/or an RRC, an indication of the preamble (e.g., ra-PreambleIndex).

The wireless device may start a time window (e.g., ra-ResponseWindow) to monitor a PDCCH for the RAR, for example, based on (e.g., after or in response to) sending/ transmitting the preamble. The base station may configure the wireless device with one or more beam failure recovery parameters, such as a separate time window and/or a separate PDCCH in a search space indicated by an RRC message (e.g., recoverySearchSpaceId). The base station may configure the one or more beam failure recovery parameters, for example, in association with a beam failure recovery request. The separate time window for monitoring the PDCCH and/or an RAR may be configured to start after sending/transmitting a beam failure recovery request (e.g., the window may start any quantity of symbols and/or slots after sending/transmitting the beam failure recovery request). The wireless device may monitor for a PDCCH transmission addressed to a Cell RNTI (C-RNTI) on the search space. During the two-step (e.g., contention-free) random access procedure, the wireless device may determine that a random access procedure is successful, for example, based on (e.g., after or in response to) sending/transmitting first message (e.g., Msg 1 1321) and receiving a corresponding second message (e.g., Msg 2 1322). The wireless device may determine that a random access procedure has successfully been completed, for example, if a PDCCH transmission is addressed to a corresponding C-RNTI. The wireless device may determine that a random access procedure has successfully been completed, for example, if the wireless device receives an RAR comprising a preamble identifier corresponding to a preamble sent/transmitted by the wireless device and/or the RAR comprises a MAC sub-PDU with the preamble identifier. The wireless device may determine the response as an indication of an acknowledgement for an SI request.

FIG. 13C shows an example two-step random access procedure. Similar to the random access procedures shown in FIGS. 13A and 13B, a base station may, prior to initiation of the procedure, send/transmit a configuration message 1330 to the wireless device. The configuration message 1330 may be analogous in some respects to the configuration message 1310 and/or the configuration message 1320. The procedure shown in FIG. 13C may comprise transmissions of multiple messages (e.g., two messages comprising: a first message (e.g., Msg A 1331) and a second message (e.g., Msg B 1332)).

Msg A 1320 may be sent/transmitted in an uplink transmission by the wireless device. Msg A 1320 may comprise one or more transmissions of a preamble 1341 and/or one or more transmissions of a transport block 1342. The transport block 1342 may comprise contents that are similar and/or equivalent to the contents of the third message (e.g., Msg 3 1313) (e.g., shown in FIG. 13A). The transport block 1342 may comprise UCI (e.g., an SR, a HARQ ACK/NACK, and/or the like). The wireless device may receive the second message (e.g., Msg B 1332), for example, based on (e.g., after or in response to) sending/transmitting the first message (e.g., Msg A 1331). The second message (e.g., Msg B 1332) may comprise contents that are similar and/or equivalent to the contents of the second message (e.g., Msg 2 1312) (e.g., an RAR shown in FIGS. 13A), the contents of the second message (e.g., Msg 2 1322) (e.g., an RAR shown in FIG. 13B) and/or the fourth message (e.g., Msg 4 1314) (e.g., shown in FIG. 13A).

The wireless device may start/initiate the two-step random access procedure (e.g., the two-step random access procedure shown in FIG. 13C) for a licensed spectrum and/or an unlicensed spectrum. The wireless device may determine, based on one or more factors, whether to start/initiate the two-step random access procedure. The one or more factors may comprise at least one of: a radio access technology in use (e.g., LTE, NR, and/or the like); whether the wireless device has a valid TA or not; a cell size; the RRC state of the wireless device; a type of spectrum (e.g., licensed vs. unlicensed); and/or any other suitable factors.

The wireless device may determine, based on two-step RACH parameters comprised in the configuration message 1330, a radio resource and/or an uplink transmit power for the preamble 1341 and/or the transport block 1342 (e.g., comprised in the first message (e.g., Msg A 1331)). The RACH parameters may indicate an MCS, a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the wireless device to determine a reception timing and a downlink channel for monitoring for and/or receiving second message (e.g., Msg B 1332).

The transport block 1342 may comprise data (e.g., delay-sensitive data), an identifier of the wireless device, security information, and/or device information (e.g., an International Mobile Subscriber Identity (IMSI)). The base station may send/transmit the second message (e.g., Msg B 1332) as a response to the first message (e.g., Msg A 1331). The second message (e.g., Msg B 1332) may comprise at least one of: a preamble identifier; a timing advance command; a power control command; an uplink grant (e.g., a radio resource assignment and/or an MCS); a wireless device identifier (e.g., a UE identifier for contention resolution); and/or an RNTI (e.g., a C-RNTI or a TC-RNTI). The wireless device may determine that the two-step random access procedure is successfully completed, for example, if a preamble identifier in the second message (e.g., Msg B 1332) corresponds to, or is matched to, a preamble sent/transmitted by the wireless device and/or the identifier of the wireless device in second message (e.g., Msg B 1332) corresponds to, or is matched to, the identifier of the wireless device in the first message (e.g., Msg A 1331) (e.g., the transport block 1342).

A wireless device and a base station may exchange control signaling (e.g., control information). The control signaling may be referred to as L1/L2 control signaling and may originate from the PHY layer (e.g., layer 1) and/or the MAC layer (e.g., layer 2) of the wireless device or the base station. The control signaling may comprise downlink control signaling sent/transmitted from the base station to the wireless device and/or uplink control signaling sent/transmitted from the wireless device to the base station.

The downlink control signaling may comprise at least one of: a downlink scheduling assignment; an uplink scheduling grant indicating uplink radio resources and/or a transport format; slot format information; a preemption indication; a power control command; and/or any other suitable signaling. The wireless device may receive the downlink control signaling in a payload sent/transmitted by the base station via a PDCCH. The payload sent/transmitted via the PDCCH may be referred to as downlink control information (DCI). The PDCCH may be a group common PDCCH (GC-PDCCH) that is common to a group of wireless devices. The GC-PDCCH may be scrambled by a group common RNTI.

A base station may attach one or more cyclic redundancy check (CRC) parity bits to DCI, for example, in order to facilitate detection of transmission errors. The base station may scramble the CRC parity bits with an identifier of a wireless device (or an identifier of a group of wireless devices), for example, if the DCI is intended for the wireless device (or the group of the wireless devices). Scrambling the CRC parity bits with the identifier may comprise Modulo-2 addition (or an exclusive-OR operation) of the identifier value and the CRC parity bits. The identifier may comprise a 16-bit value of an RNTI.

DCIs may be used for different purposes. A purpose may be indicated by the type of an RNTI used to scramble the CRC parity bits. DCI having CRC parity bits scrambled with a paging RNTI (P-RNTI) may indicate paging information and/or a system information change notification. The P-RNTI may be predefined as "FFFE" in hexadecimal. DCI having CRC parity bits scrambled with a system information RNTI (SI-RNTI) may indicate a broadcast transmission of the system information. The SI-RNTI may be predefined as "FFFF" in hexadecimal. DCI having CRC parity bits scrambled with a random access RNTI (RA-RNTI) may indicate a random access response (RAR). DCI having CRC parity bits scrambled with a cell RNTI (C-RNTI) may indicate a dynamically scheduled unicast transmission and/or a triggering of PDCCH-ordered random access. DCI having CRC parity bits scrambled with a temporary cell RNTI (TC-RNTI) may indicate a contention resolution (e.g., a Msg 3 analogous to the Msg 3 1313 shown in FIG. 13A). Other RNTIs configured for a wireless device by a base station may comprise a Configured Scheduling RNTI (CS RNTI), a Transmit Power Control-PUCCH RNTI (TPC PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C RNTI), and/or the like.

A base station may send/transmit DCIs with one or more DCI formats, for example, depending on the purpose and/or content of the DCIs. DCI format 0_0 may be used for scheduling of a PUSCH in a cell. DCI format 0_0 may be a fallback DCI format (e.g., with compact DCI payloads). DCI format 0_1 may be used for scheduling of a PUSCH in a cell (e.g., with more DCI payloads than DCI format 0_0). DCI format 1_0 may be used for scheduling of a PDSCH in a cell. DCI format 1_0 may be a fallback DCI format (e.g., with compact DCI payloads). DCI format 1_1 may be used for scheduling of a PDSCH in a cell (e.g., with more DCI payloads than DCI format 1_0). DCI format 2_0 may be used for providing a slot format indication to a group of wireless devices. DCI format 2_1 may be used for informing/notifying a group of wireless devices of a physical resource block and/or an OFDM symbol where the group of wireless devices may assume no transmission is intended to the group of wireless devices. DCI format 2_2 may be used for transmission of a transmit power control (TPC) command for PUCCH or PUSCH. DCI format 2_3 may be used for transmission of a group of TPC commands for SRS transmissions by one or more wireless devices. DCI format(s) for new functions may be defined in future releases. DCI formats may have different DCI sizes, or may share the same DCI size.

The base station may process the DCI with channel coding (e.g., polar coding), rate matching, scrambling and/or QPSK modulation, for example, after scrambling the DCI with an RNTI. A base station may map the coded and modulated DCI on resource elements used and/or configured for a PDCCH. The base station may send/transmit the DCI via a PDCCH occupying a number of contiguous control channel elements (CCEs), for example, based on a payload size of the DCI and/or a coverage of the base station. The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
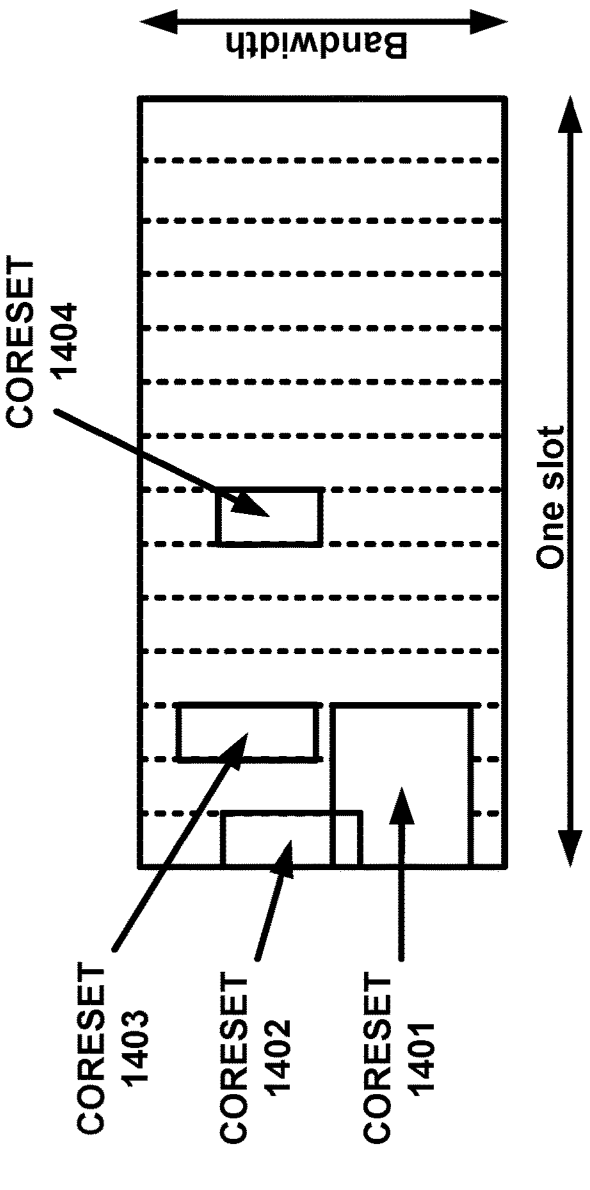
FIG. 14A shows an example of control resource set (CORESET) configurations.

FIG. 14A shows an example of CORESET configurations. The CORESET configurations may be for a bandwidth part or any other frequency bands. The base station may send/transmit DCI via a PDCCH on one or more control resource sets (CORESETs). A CORESET may comprise a time-frequency resource in which the wireless device attempts/tries to decode DCI using one or more search spaces. The base station may configure a size and a location of the CORESET in the time-frequency domain. A first CORESET 1401 and a second CORESET 1402 may occur or may be set/configured at the first symbol in a slot. The first CORESET 1401 may overlap with the second CORESET 1402 in the frequency domain. A third CORESET 1403 may occur or may be set/configured at a third symbol in the slot. A fourth CORESET 1404 may occur or may be set/configured at the seventh symbol in the slot. CORESETs may have a different number of resource blocks in frequency domain.

Figure 14B:
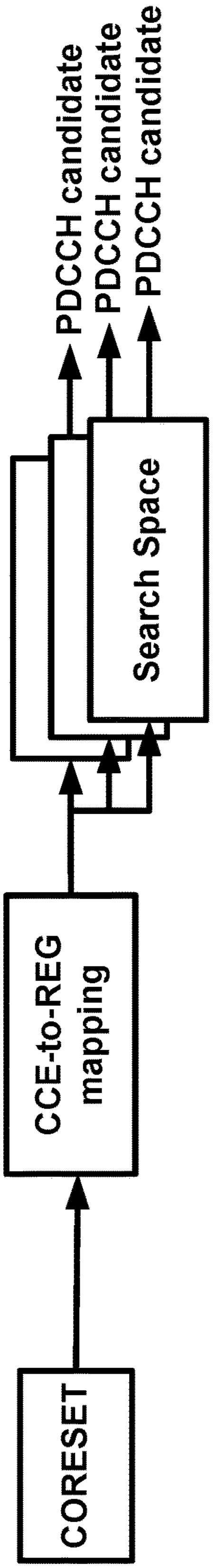
FIG. 14B shows an example of a control channel element to resource element group (CCE-to-REG) mapping.

FIG. 14B shows an example of a CCE-to-REG mapping. The CCE-to-REG mapping may be performed for DCI transmission via a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping (e.g., by an RRC configuration). A CORESET may be configured with an antenna port QCL parameter. The antenna port QCL parameter may indicate QCL information of a DM-RS for a PDCCH reception via the CORESET.

The base station may send/transmit, to the wireless device, one or more RRC messages comprising configuration parameters of one or more CORESETs and one or more search space sets. The configuration parameters may indicate an association between a search space set and a CORESET. A search space set may comprise a set of PDCCH candidates formed by CCEs (e.g., at a given aggregation level). The configuration parameters may indicate at least one of: a number of PDCCH candidates to be monitored per aggregation level; a PDCCH monitoring periodicity and a PDCCH monitoring pattern; one or more DCI formats to be monitored by the wireless device; and/or whether a search space set is a common search space set or a wireless device-specific search space set (e.g., a UE-specific search space set). A set of CCEs in the common search space set may be predefined and known to the wireless device. A set of CCEs in the wireless device-specific search space set (e.g., the UE-specific search space set) may be configured, for example, based on the identity of the wireless device (e.g., C-RNTI).

As shown in FIG. 14B, the wireless device may determine a time-frequency resource for a CORESET based on one or more RRC messages. The wireless device may determine a CCE-to-REG mapping (e.g., interleaved or non-interleaved, and/or mapping parameters) for the CORESET, for example, based on configuration parameters of the CORESET. The wireless device may determine a number (e.g., at most 10) of search space sets configured on/for the CORESET, for example, based on the one or more RRC messages. The wireless device may monitor a set of PDCCH candidates according to configuration parameters of a search space set. The wireless device may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding DCI content of one or more PDCCH candidates with possible (or configured) PDCCH locations, possible (or configured) PDCCH formats (e.g., the number of CCEs, the number of PDCCH candidates in common search spaces, and/or the number of PDCCH candidates in the wireless device-specific search spaces) and possible (or configured) DCI formats. The decoding may be referred to as blind decoding. The wireless device may determine DCI as valid for the wireless device, for example, based on (e.g., after or in response to) CRC checking (e.g., scrambled bits for CRC parity bits of the DCI matching an RNTI value). The wireless device may process information comprised in the DCI (e.g., a scheduling assignment, an uplink grant, power control, a slot format indication, a downlink preemption, and/or the like).

The may send/transmit uplink control signaling (e.g., UCI) to a base station. The uplink control signaling may comprise HARQ acknowledgements for received DL-SCH transport blocks. The wireless device may send/transmit the HARQ acknowledgements, for example, based on (e.g., after or in response to) receiving a DL-SCH transport block. Uplink control signaling may comprise CSI indicating a channel quality of a physical downlink channel. The wireless device may send/transmit the CSI to the base station. The base station, based on the received CSI, may determine transmission format parameters (e.g., comprising multi-antenna and beamforming schemes) for downlink transmission(s). Uplink control signaling may comprise scheduling requests (SR). The wireless device may send/transmit an SR indicating that uplink data is available for transmission to the base station. The wireless device may send/transmit UCI (e.g., HARQ acknowledgements (HARQ-ACK), CSI report, SR, and the like) via a PUCCH or a PUSCH. The wireless device may send/transmit the uplink control signaling via a PUCCH using one of several PUCCH formats.

There may be multiple PUCCH formats (e.g., five PUCCH formats). A wireless device may determine a PUCCH format, for example, based on a size of UCI (e.g., a quantity/number of uplink symbols of UCI transmission and a number of UCI bits). PUCCH format 0 may have a length of one or two OFDM symbols and may comprise two or fewer bits. The wireless device may send/transmit UCI via a PUCCH resource, for example, using PUCCH format 0 if the transmission is over/via one or two symbols and the quantity/number of HARQ-ACK information bits with positive or negative SR (HARQ-ACK/SR bits) is one or two. PUCCH format 1 may occupy a number of OFDM symbols (e.g., between four and fourteen OFDM symbols) and may comprise two or fewer bits. The wireless device may use PUCCH format 1, for example, if the transmission is over/via four or more symbols and the number of HARQ-ACK/SR bits is one or two. PUCCH format 2 may occupy one or two OFDM symbols and may comprise more than two bits. The wireless device may use PUCCH format 2, for example, if the transmission is over/via one or two symbols and the quantity/number of UCI bits is two or more. PUCCH format 3 may occupy a number of OFDM symbols (e.g., between four and fourteen OFDM symbols) and may comprise more than two bits. The wireless device may use PUCCH format 3, for example, if the transmission is four or more symbols, the quantity/number of UCI bits is two or more, and the PUCCH resource does not comprise an orthogonal cover code (OCC). PUCCH format 4 may occupy a number of OFDM symbols (e.g., between four and fourteen OFDM symbols) and may comprise more than two bits. The wireless device may use PUCCH format 4, for example, if the transmission is four or more symbols, the quantity/number of UCI bits is two or more, and the PUCCH resource comprises an OCC.

The base station may send/transmit configuration parameters to the wireless device for a plurality of PUCCH resource sets, for example, using an RRC message. The plurality of PUCCH resource sets (e.g., up to four sets in NR, or up to any other quantity of sets in other systems) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the wireless device may send/transmit using one of the plurality of PUCCH resources in the PUCCH resource set. The wireless device may select one of the plurality of PUCCH resource sets, for example, based on a total bit length of the UCI information bits (e.g., HARQ-ACK, SR, and/or CSI) if configured with a plurality of PUCCH resource sets. The wireless device may select a first PUCCH resource set having a PUCCH resource set index equal to "0," for example, if the total bit length of UCI information bits is two or fewer. The wireless device may select a second PUCCH resource set having a PUCCH resource set index equal to "1," for example, if the total bit length of UCI information bits is greater than two and less than or equal to a first configured value. The wireless device may select a third PUCCH resource set having a PUCCH resource set index equal to "2," for example, if the total bit length of UCI information bits is greater than the first configured value and less than or equal to a second configured value. The wireless device may select a fourth PUCCH resource set having a PUCCH resource set index equal to "3," for example, if the total bit length of UCI information bits is greater than the second configured value and less than or equal to a third value (e.g., 1406, 1706, or any other quantity of bits).

The wireless device may determine a PUCCH resource from the PUCCH resource set for UCI (HARQ-ACK, CSI, and/or SR) transmission, for example, after determining a PUCCH resource set from a plurality of PUCCH resource sets. The wireless device may determine the PUCCH resource, for example, based on a PUCCH resource indicator in DCI (e.g., with DCI format 1_0 or DCI for 1_1) received on/via a PDCCH. An n-bit (e.g., a three-bit) PUCCH resource indicator in the DCI may indicate one of multiple (e.g., eight) PUCCH resources in the PUCCH resource set. The wireless device may send/transmit the UCI (HARQ-ACK, CSI and/or SR) using a PUCCH resource indicated by the PUCCH resource indicator in the DCI, for example, based on the PUCCH resource indicator.

Figure 15A:
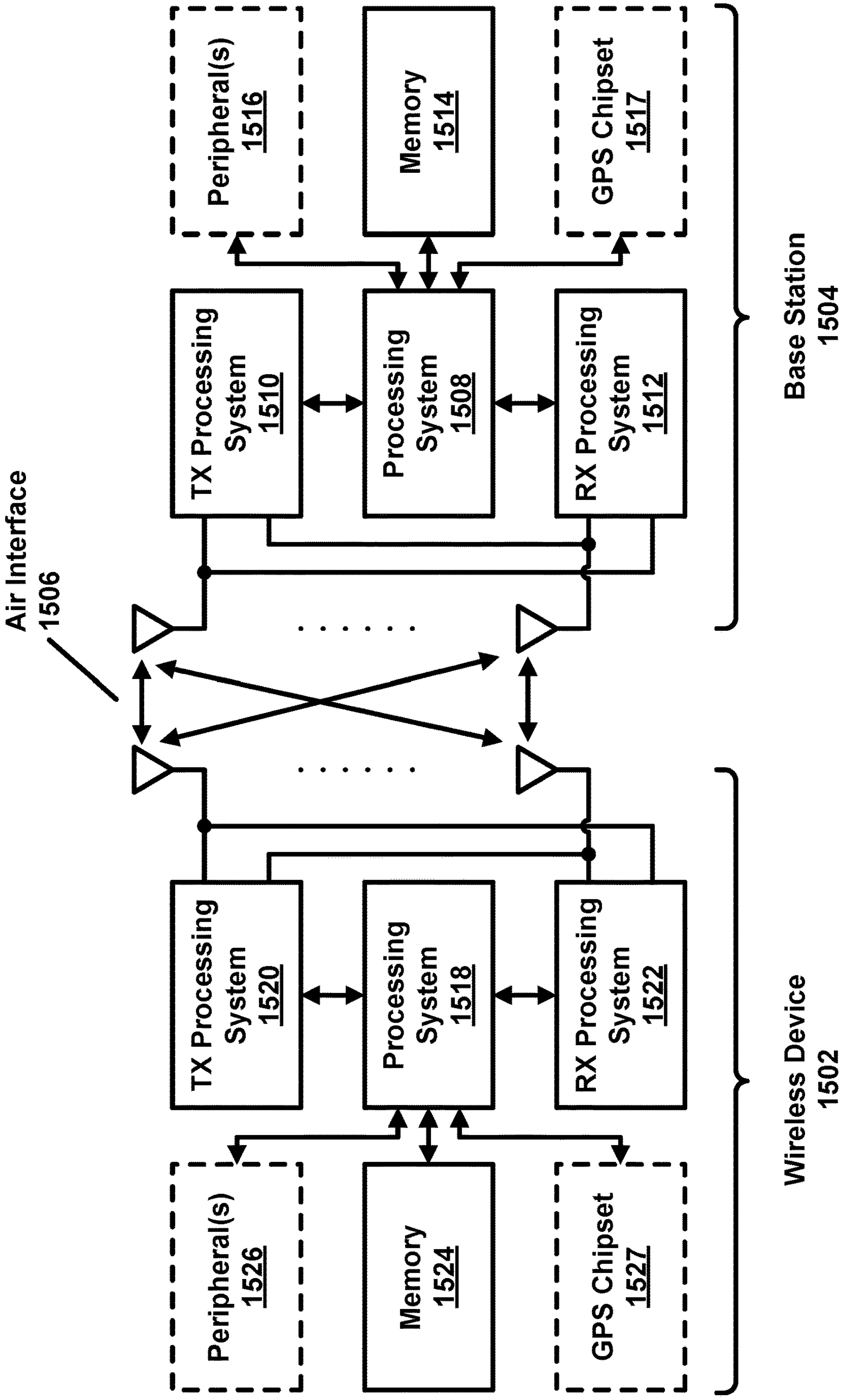
FIG. 15A shows an example of communications between a wireless device and a base station.

FIG. 15A shows an example communications between a wireless device and a base station. A wireless device 1502 and a base station 1504 may be part of a communication network, such as the communication network 100 shown in FIG. 1A, the communication network 150 shown in FIG. 1B, or any other communication network. A communication network may comprise more than one wireless device and/or more than one base station, with substantially the same or similar configurations as those shown in FIG. 15A.

The base station 1504 may connect the wireless device 1502 to a core network (not shown) via radio communications over the air interface (or radio interface) 1506. The communication direction from the base station 1504 to the wireless device 1502 over the air interface 1506 may be referred to as the downlink. The communication direction from the wireless device 1502 to the base station 1504 over the air interface may be referred to as the uplink. Downlink transmissions may be separated from uplink transmissions, for example, using various duplex schemes (e.g., FDD, TDD, and/or some combination of the duplexing techniques).

For the downlink, data to be sent to the wireless device 1502 from the base station 1504 may be provided/transferred/sent to the processing system 1508 of the base station 1504. The data may be provided/transferred/sent to the processing system 1508 by, for example, a core network. For the uplink, data to be sent to the base station 1504 from the wireless device 1502 may be provided/transferred/sent to the processing system 1518 of the wireless device 1502. The processing system 1508 and the processing system 1518 may implement layer 3 and layer 2 OSI functionality to process the data for transmission. Layer 2 may comprise an SDAP layer, a PDCP layer, an RLC layer, and a MAC layer, for example, described with respect to FIG. 2A, FIG. 2B, FIG. 3, and FIG. 4A. Layer 3 may comprise an RRC layer, for example, described with respect to FIG. 2B.

The data to be sent to the wireless device 1502 may be provided/transferred/sent to a transmission processing system 1510 of base station 1504, for example, after being processed by the processing system 1508. The data to be sent to base station 1504 may be provided/transferred/sent to a transmission processing system 1520 of the wireless device 1502, for example, after being processed by the processing system 1518. The transmission processing system 1510 and the transmission processing system 1520 may implement layer 1 OSI functionality. Layer 1 may comprise a PHY layer, for example, described with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

A reception processing system 1512 of the base station 1504 may receive the uplink transmission from the wireless device 1502. The reception processing system 1512 of the base station 1504 may comprise one or more TRPs. A reception processing system 1522 of the wireless device 1502 may receive the downlink transmission from the base station 1504. The reception processing system 1522 of the wireless device 1502 may comprise one or more antenna panels. The reception processing system 1512 and the reception processing system 1522 may implement layer 1 OSI functionality. Layer 1 may include a PHY layer, for example, described with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

The base station 1504 may comprise multiple antennas (e.g., multiple antenna panels, multiple TRPs, etc.). The wireless device 1502 may comprise multiple antennas (e.g., multiple antenna panels, etc.). The multiple antennas may be used to perform one or more MIMO or multi-antenna techniques, such as spatial multiplexing (e.g., single-user MIMO or multi-user MIMO), transmit/receive diversity, and/or beamforming. The wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518, respectively, to carry out one or more of the functionalities (e.g., one or more functionalities described herein and other functionalities of general computers, processors, memories, and/or other peripherals). The transmission processing system 1510 and/or the reception processing system 1512 may be coupled to the memory 1514 and/or another memory (e.g., one or more non-transitory computer readable mediums) storing computer program instructions or code that may be executed to carry out one or more of their respective functionalities. The transmission processing system 1520 and/or the reception processing system 1522 may be coupled to the memory 1524 and/or another memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and/or the base station 1504 to operate in a wireless environment.

The processing system 1508 may be connected to one or more peripherals 1516. The processing system 1518 may be connected to one or more peripherals 1526. The one or more peripherals 1516 and the one or more peripherals 1526 may comprise software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive input data (e.g., user input data) from, and/or provide output data (e.g., user output data) to, the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 may be connected to a Global Positioning System (GPS) chipset 1517. The processing system 1518 may be connected to a Global Positioning System (GPS) chipset 1527. The GPS chipset 1517 and the GPS chipset 1527 may be configured to determine and provide geographic location information of the wireless device 1502 and the base station 1504, respectively.

Figure 15B:
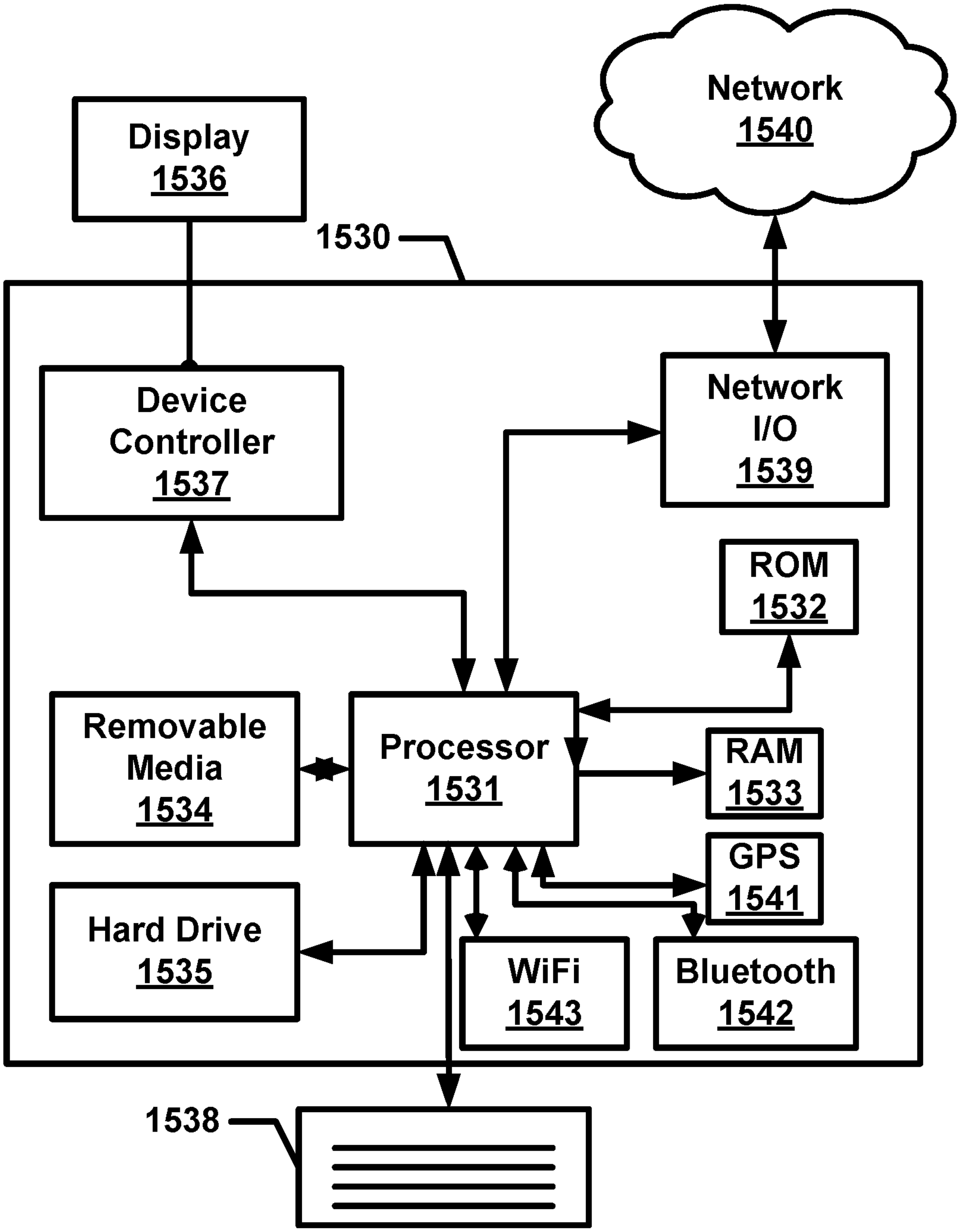
FIG. 15B shows example elements of a computing device that may be used to implement any of the various devices described herein

FIG. 15B shows example elements of a computing device that may be used to implement any of the various devices described herein, including, for example, the base station 160A, 160B, 162A, 162B, 220, and/or 1504, the wireless device 106, 156A, 156B, 210, and/or 1502, or any other base station, wireless device, AMF, UPF, network device, or computing device described herein. The computing device 1530 may include one or more processors 1531, which may execute instructions stored in the random-access memory (RAM) 1533, the removable media 1534 (such as a Universal Serial Bus (USB) drive, compact disk (CD) or digital versatile disk (DVD), or floppy disk drive), or any other desired storage medium. Instructions may also be stored in an attached (or internal) hard drive 1535. The computing device 1530 may also include a security processor (not shown), which may execute instructions of one or more computer programs to monitor the processes executing on the processor 1531 and any process that requests access to any hardware and/or software components of the computing device 1530 (e.g., ROM 1532, RAM 1533, the removable media 1534, the hard drive 1535, the device controller 1537, a network interface 1539, a GPS 1541, a Bluetooth interface 1542, a WiFi interface 1543, etc.). The computing device 1530 may include one or more output devices, such as the display 1536 (e.g., a screen, a display device, a monitor, a television, etc.), and may include one or more output device controllers 1537, such as a video processor. There may also be one or more user input devices 1538, such as a remote control, keyboard, mouse, touch screen, microphone, etc. The computing device 1530 may also include one or more network interfaces, such as a network interface 1539, which may be a wired interface, a wireless interface, or a combination of the two. The network interface 1539 may provide an interface for the computing device 1530 to communicate with a network 1540 (e.g., a RAN, or any other network). The network interface 1539 may include a modem (e.g., a cable modem), and the external network 1540 may include communication links, an external network, an in-home network, a provider's wireless, coaxial, fiber, or hybrid fiber/coaxial distribution system (e.g., a DOCSIS network), or any other desired network. Additionally, the computing device 1530 may include a location-detecting device, such as a global positioning system (GPS) microprocessor 1541, which may be configured to receive and process global positioning signals and determine, with possible assistance from an external server and antenna, a geographic position of the computing device 1530.

The example in FIG. 15B may be a hardware configuration, although the components shown may be implemented as software as well. Modifications may be made to add, remove, combine, divide, etc. components of the computing device 1530 as desired. Additionally, the components may be implemented using basic computing devices and components, and the same components (e.g., processor 1531, ROM storage 1532, display 1536, etc.) may be used to implement any of the other computing devices and components described herein. For example, the various components described herein may be implemented using computing devices having components such as a processor executing computer-executable instructions stored on a computer-readable medium, as shown in FIG. 15B. Some or all of the entities described herein may be software based, and may co-exist in a common physical platform (e.g., a requesting entity may be a separate software process and program from a dependent entity, both of which may be executed as software on a common computing device).

Figure 16A:
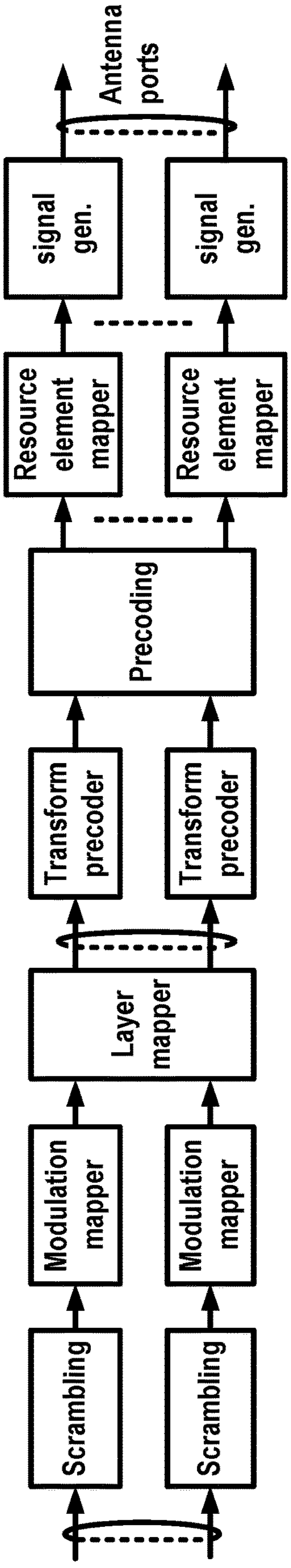
FIG. 16A, FIG. 16B, FIG. 16C, and FIG. 16D show examples of uplink and downlink signal transmission.

FIG. 16A shows an example structure for uplink transmission. Processing of a baseband signal representing a physical uplink shared channel may comprise/perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA), CP-OFDM signal for an antenna port, or any other signals; and/or the like. An SC-FDMA signal for uplink transmission may be generated, for example, if transform precoding is enabled. A CP-OFDM signal for uplink transmission may be generated, for example, if transform precoding is not enabled (e.g., as shown in FIG. 16A). These functions are examples and other mechanisms for uplink transmission may be implemented.

Figure 16B:
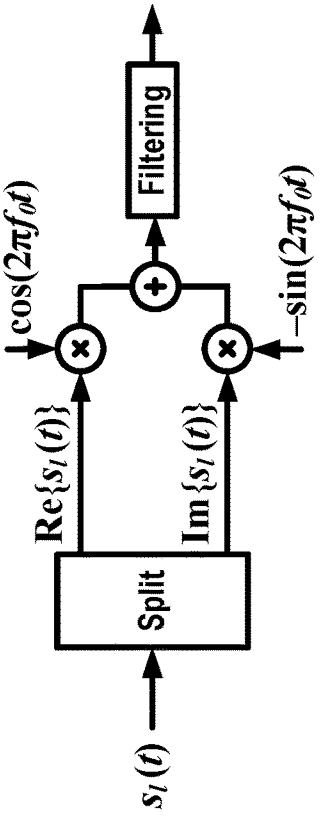

FIG. 16B shows an example structure for modulation and up-conversion of a baseband signal to a carrier frequency. The baseband signal may be a complex-valued SC-FDMA, CP-OFDM baseband signal (or any other baseband signals) for an antenna port and/or a complex-valued Physical Random Access Channel (PRACH) baseband signal. Filtering may be performed/employed, for example, prior to transmission.

Figure 16D:
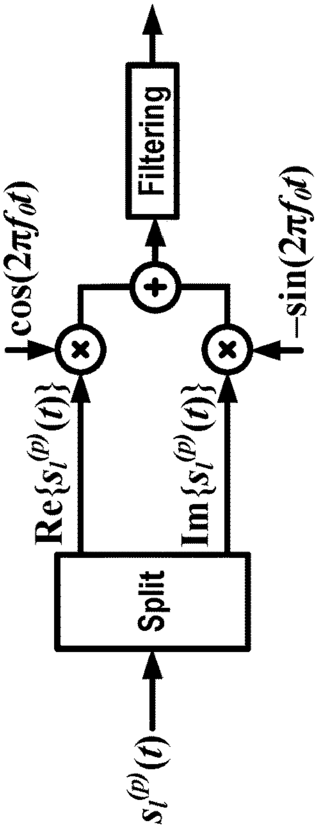
Figure 16C:
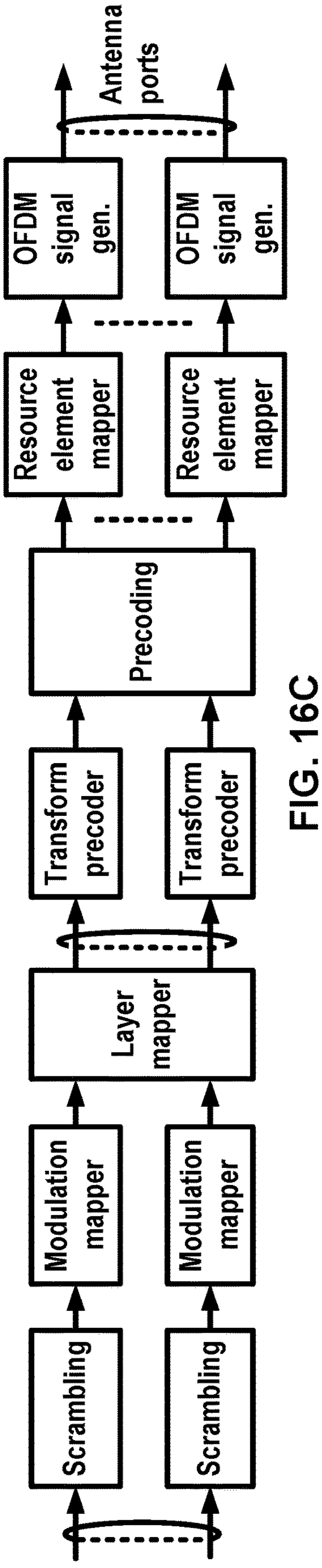

FIG. 16C shows an example structure for downlink transmissions. Processing of a baseband signal representing a physical downlink channel may comprise/perform one or more functions. The one or more functions may comprise: scrambling of coded bits in a codeword to be sent/transmitted on/via a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are examples and other mechanisms for downlink transmission may be implemented.

FIG. 16D shows an example structure for modulation and up-conversion of a baseband signal to a carrier frequency. The baseband signal may be a complex-valued OFDM baseband signal for an antenna port or any other signal. Filtering may be performed/employed, for example, prior to transmission.

A wireless device may receive, from a base station, one or more messages (e.g. RRC messages) comprising configuration parameters of a plurality of cells (e.g., a primary cell, one or more secondary cells). The wireless device may communicate with at least one base station (e.g., two or more base stations in dual-connectivity) via the plurality of cells. The one or more messages (e.g. as a part of the configuration parameters) may comprise parameters of PHY, MAC, RLC, PCDP, SDAP, RRC layers for configuring the wireless device. The configuration parameters may comprise parameters for configuring PHY and MAC layer channels, bearers, etc. The configuration parameters may comprise parameters indicating values of timers for PHY, MAC, RLC, PCDP, SDAP, RRC layers, and/or communication channels.

A timer may begin running, for example, once it is started and continue running until it is stopped or until it expires. A timer may be started, for example, if it is not running or restarted if it is running. A timer may be associated with a value (e.g., the timer may be started or restarted from a value or may be started from zero and expire once it reaches the value). The duration of a timer may not be updated, for example, until the timer is stopped or expires (e.g., due to BWP switching). A timer may be used to measure a time period/window for a process. With respect to an implementation and/or procedure related to one or more timers or other parameters, it will be understood that there may be multiple ways to implement the one or more timers or other parameters. One or more of the multiple ways to implement a timer may be used to measure a time period/window for the procedure. A random access response window timer may be used for measuring a window of time for receiving a random access response. The time difference between two time stamps may be used, for example, instead of starting a random access response window timer and determine the expiration of the timer. A process for measuring a time window may be restarted, for example, if a timer is restarted. Other example implementations may be configured/provided to restart a measurement of a time window.

A wireless device may be configured with multiple uplink power control parameter sets. The wireless device may be configured with multiple uplink power control parameter sets, for example, in a unified TCI state framework. Each uplink power control parameter set may comprise respective uplink transmission power parameters (e.g., target-received power, pathloss compensation factor, closed-loop index, and/or the like). The wireless device may start sending uplink transmissions with a transmission power determined based on a selected uplink power control parameter set among the multiple uplink power control parameter sets, for example, based on a wireless device successfully completing a beam failure recovery procedure. The selected uplink power control parameter set may be a power control parameter set with the lowest/smallest uplink power control set index. The uplink power control parameter set with the lowest uplink power control set index may be the default uplink power control parameter set used by the wireless device, for example, based on (e.g., after or in response to) successful completion of the beam failure recovery procedure.

For example, a wireless device may receive (e.g., from a base station) one or more messages comprising one or more configuration parameters for a cell. The one or more configuration parameters may indicate a plurality of uplink power control sets. The wireless device may complete beam failure recovery procedure of the cell. The wireless device may start sending/transmitting, via the cell and based on completion of the beam failure recovery procedure, uplink signals. The wireless device may send the uplink signals with transmission powers determined based on a determined uplink power control set among the plurality of uplink power control sets. The uplink power control set may have a lowest/smallest uplink power control set index among the plurality of uplink power control sets.

Multiple (e.g., two or more) unified TCI states may be used to support multiple TRPs. Each unified TCI state may be associated with a respective TRP of the multiple TRPs. The wireless device may complete a beam failure recovery procedure of one or more TRPs (e.g., a first TRP and/or a second TRP) of the multiple TRPs. The wireless device, based on completion of the beam failure recovery procedure, may start sending uplink transmissions (e.g., to the first TRP and/or the second TRP). The uplink transmissions may be sent, for example, with a transmission power determined based on the uplink power control parameter set with the lowest uplink power control set index. The wireless device may start sending all the uplink transmissions with the transmission power determined based on the uplink power control parameter set with the lowest uplink power control set index irrespective of whether the beam failure recovery procedure was completed for the first TRP or the second TRP and/or irrespective of whether an uplink transmission is for the first TRP or the second TRP. The first TRP and the second TRP may have different channel conditions. Using the same power control parameters (e.g., as indicated by the uplink power control parameter set with the lowest uplink power control set index) for uplink transmissions to both the first TRP and the second TRP may not be efficient.

For example, the wireless device may be served by multiple TRPs (e.g., comprising a first TRP and a second TRP). The wireless device may complete beam failure recovery of a second TRP. The uplink power control set with the lowest/smallest uplink power control set index may be associated with (or may belong) to the first TRP. The one or more configuration parameters may indicate, for the first TRP, the uplink power control set with the lowest/smallest uplink power control set index. The wireless device may start sending, to (e.g., towards) the second TRP (e.g., based on/after completion of a beam failure recovery procedure of the second TRP), uplink signals with transmission powers determined based on the uplink power control set, belonging to the first TRP, with the lowest/smallest uplink power control set index. Transmitting the uplink signals to the second TRP with the transmission powers determined based on the uplink power control set of the first TRP may not be efficient. For example, the wireless device may need to apply/use different transmission powers for the first TRP and the second TRP. The wireless device may need to apply/use different transmission powers for the first TRP and the second TRP, for example, if the first TRP and the second TRP are not co-located and/or are subject to different channel conditions (e.g., pathloss, obstacles, reflections, etc.). Using the same uplink power control set (e.g., the uplink power control set with the lowest/smallest uplink power control set) based on (e.g., after) completion of a beam failure recovery procedure of the first TRP and/or a beam failure recovery procedure of the second TRP may increase interference to other cells and/or the wireless devices.

Various examples herein describe enhanced uplink power control mechanisms for communication with multiple TRPs. The enhanced uplink power control mechanisms may be used following completion of a beam failure recovery procedure. The enhanced uplink power control mechanisms may be used, for example, if the wireless device is served by multiple TRPs (e.g., intra-cell multi-TRP operation and/or inter-cell multi-TRP operation).

A wireless device may complete a beam failure recovery procedure for a TRP (e.g., or for a beam failure detection (BFD) set). The wireless device may start sending uplink transmission(s), for example, based on completion of the beam failure recovery procedure. The wireless device may start sending the uplink transmissions with a transmission power determined based on an uplink power control parameter set. An uplink power control set used for transmission power determination may be based on a TRP for which the beam failure recovery procedure was completed. Different uplink power control sets may be used following completion of beam failure recovery procedures for different TRPs. Use of different uplink power control sets may reduce interference between TRPs and/or may improve signaling efficiency.

The uplink power control parameter set for transmission power determination may comprise an uplink power control set with the lowest/smallest uplink power control set index, for example, if the TRP is the first TRP (e.g., if the BFD set is the first BFD set). The uplink power control parameter set for transmission power determination may comprise an uplink power control set with the second lowest/smallest uplink power control set index, for example, if the TRP is the second TRP (e.g., if the BFD set is the second BFD set).

A base station may configure multiple lists of uplink power control parameter sets. Each list of uplink power control parameter sets may be associated with a corresponding TRP (e.g., or a corresponding BFD set). For example, the base station may configure a first list of power control parameter sets for the first TRP and a second list of uplink power control parameter sets for the second TRP. The uplink power control parameter set for transmission power determination (e.g., following beam failure recovery procedure for a TRP (or a BFD set)) may be an uplink power control set with the lowest/smallest uplink power control set index in a list of uplink power control parameter sets associated with the TRP (or the BFD set). Multiple lists of uplink power control parameter sets may be applicable for intra-cell multi-TRP operation.

The wireless device may start sending/transmitting, to/towards a first TRP, uplink signals, for example, based on (e.g., after) completion of a beam failure recovery procedure of the first TRP. The wireless device may start sending/transmitting, to/towards the first TRP, the uplink signals with transmission powers determined, for example, based on a first uplink power control set of the plurality of uplink power control sets. The wireless device may start sending/transmitting, to/towards a second TRP, uplink signals, for example, based on/after completion of a beam failure recovery procedure of the second TRP. The wireless device may start sending/transmitting, to/towards the second TRP, uplink signals with transmission powers determined based on a second uplink power control set of the plurality of uplink power control sets. The first uplink power control set and the second uplink power control set may be different. Selection/determination rules/criteria of the first uplink power control set and the second uplink power control set are further discussed herein (e.g., at least with reference to FIG. 21A, FIG. 21B, FIG. 21C, FIG. 21D, FIG. 22A, FIG. 22B, FIG. 23A, and/or FIG. 23B).

A wireless device may complete a beam failure recovery procedure for a TRP (e.g., or for a BFD set) of a cell identified by a PCI. The PCI may be associated with a BFD set. The uplink power control parameter set for transmission power determination may an uplink power control set with the lowest/smallest uplink power control set index among the uplink power control set indexes associated with the PCI of the BFD set. Determination of an uplink power control parameter set based on the PCI of the BFD set may be applicable for inter-cell multi-TRP operation.

Configuration parameters may indicate a respective PCI for each BFD set. The configuration parameters may indicate: a respective PCI for each uplink power control set; and/or different uplink power control sets for each PCI.

A wireless device may receive (e.g., from a base station) one or more messages comprising one or more configuration parameters for a cell. The one or more configuration parameters may indicate a plurality of BFD sets. The one or more configuration parameters may indicate a plurality of TCI states. Each TCI state of the plurality of TCI states may be associated with a respective PCI of a plurality of PCIs.

The one or more configuration parameters may indicate a maximum quantity of non-serving cells (e.g., 7, 10, or any other quantity). The base station may dynamically (e.g., using DCI, MAC CE) activate at least one of the non-serving cells. The base station may dynamically activate at least one of the non-serving cells, for example, based on a location/mobility of the wireless device. The non-serving cells may or may not be co-located and/or may or may not be subject to different channel conditions.

The wireless device may receive a first downlink control command/message (e.g., MAC CE, DCI). The first downlink control command/message may indicate a first TCI state associated with a first PCI. The first PCI may indicate/identify a first cell. The wireless device may start measuring, for beam failure detection of the first cell, one or more reference signals in a first BFD set, of the plurality of BFD sets, associated with the first PCI of the first TCI state.

The wireless device may receive a second downlink control command/message (e.g., MAC CE, DCI). The second downlink control command/message may indicate a second TCI state associated with a second PCI. The second PCI may indicate/identify a second cell. The second PCI may be different from the first PCI. The second PCI and the first PCI may indicate/identify different cells. The first cell and the second cell may be different.

The wireless device may keep measuring the one or more reference signals in the first BFD set, for example, for beam failure detection of the first cell. Measuring the one or more reference signals in the first beam failure detection set may not be efficient as the wireless device may not necessarily transmit/receive via the first cell. The wireless device may not transmit/receive via the first cell, for example, based on/after receiving the second downlink control command/message indicating the second TCI state associated with the second PCI that indicates/identifies the second cell. The first cell may be deactivated based on receiving the second downlink control command/message. Transmitting uplink signals and/or monitoring downlink control channels for beam failure detection of the first cell (e.g., following deactivation of the first cell) may increase power consumption at the wireless device.

Various examples described herein may enhance beam failure detection and/or beam failure recovery in an inter-cell multi-TRP operation. A wireless device may increment a beam failure instance counter, for example, based on detecting a beam failure instance (e.g., when radio link qualities of the one or more reference signals are worse (e.g., higher BLER) than a first threshold). The wireless device may receive the second downlink control command/message, for example, before (or prior to) the beam failure instance counter reaching a maximum quantity of beam failure instances (e.g., indicated by higher layer parameter beamFailureInstanceMaxCount). The wireless device may set the beam failure instance counter to zero, for example, based on receiving the second downlink control command/message indicating activation of the second TCI state associated with the second PCI that is different from the first PCI of the first TCI state.

The beam failure instance counter may reach the maximum quantity of beam failure instances (e.g., indicated by the higher layer parameter beamFailureInstanceMaxCount). The beam failure instance counter may be equal to or greater than the maximum quantity of beam failure instances. The wireless device may initiate/trigger a beam failure recovery procedure of the first cell, for example, based on the beam failure instance counter being equal to or greater the maximum quantity of beam failure instances. The wireless device may receive the second downlink control command/message, for example, during the beam failure recovery procedure. The wireless device may stop/abort/cancel the beam failure recovery procedure of the first cell, for example, based on receiving the second downlink control command/message indicating activation of the second TCI state associated with the second PCI that is different from the first PCI of the first TCI state. Stopping the beam failure recovery procedure of the first cell may reduce power consumption at the wireless device and/or the base station.

The wireless device may start measuring BFD reference signals (RSs) in a BFD set associated with a PCI. The wireless device may start measuring BFD reference signals (RSs) in a BFD set associated with the PCI, for example, if/when the wireless device receives a control command (e.g., DCI, MAC CE) indicating activation of a TCI state associated with the PCI.

The wireless device may stop an ongoing beam failure recovery procedure of a BFD set associated with a PCI, for example, if/when the wireless device receives a control command (e.g., DCI, MAC CE) indicating activation of a TCI state associated with a second PCI different from the PCI. The wireless device may reset a BFD counter and a BFD timer of a BFD set associated with a PCI, for example, if/when the wireless device receives a control command (e.g., DCI, MAC CE) indicating activation of a TCI state associated with a second PCI different from the PCI.

FIG. 17 shows an example of MIMO configuration parameters. The MIMO configuration parameters may be indicated (e.g., to a wireless device) via an RRC message. Additional details regarding the MIMO configuration parameters are further described herein at least with reference to FIGS. 18-20 and 21A-21D.

Figure 18:
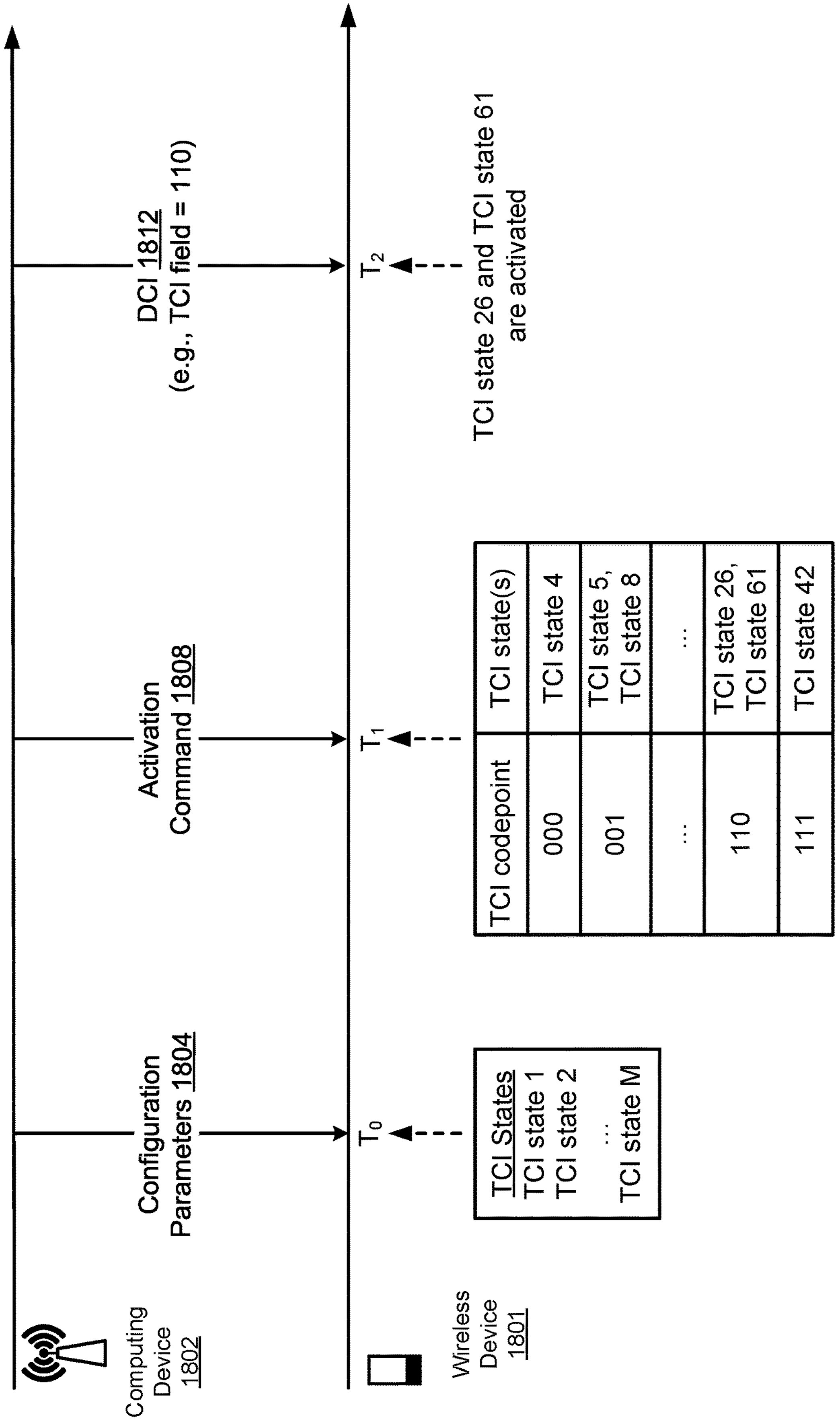
FIG. 18 shows an example TCI state activation.
Figure 19:
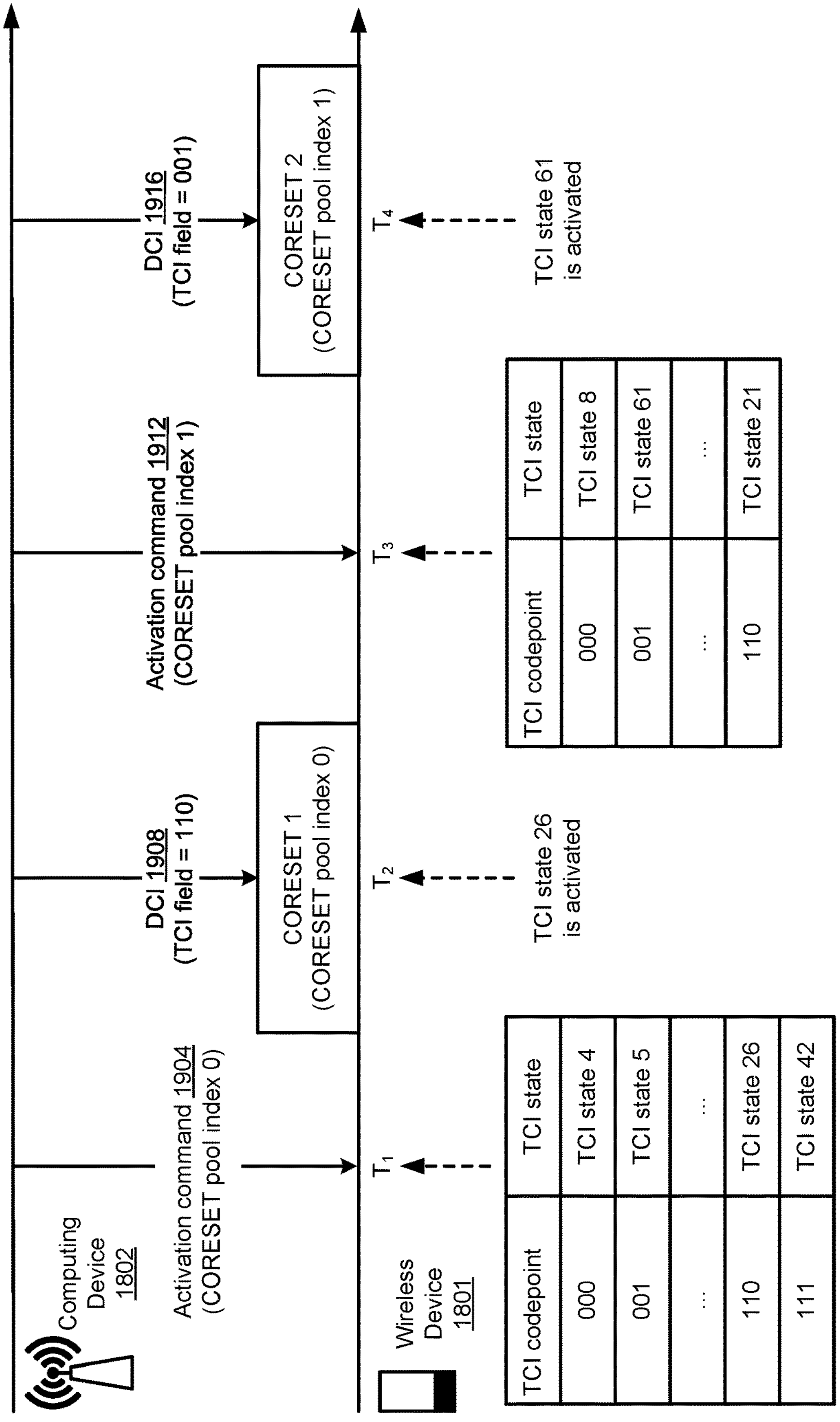
FIG. 19 shows an example TCI state activation.

FIG. 18 and FIG. 19 show examples of TCI state activation. A wireless device (e.g., a wireless device 1801) may receive one or more messages (e.g., at time $T_0$). The wireless device may receive the one or more messages from a computing device (e.g., a computing device 1802), which may comprise any computing device described herein (e.g., base station, relay node, wireless device, etc.). For example, the wireless device may receive the one or more messages from a base station. The wireless device may receive the one or more messages from a relay node. The wireless device may receive the one or more messages from another wireless device (e.g., TRP, vehicle, remote radio head, and the like). The one or more messages may comprise one or more configuration parameters (e.g., configuration parameters 1804 at time $T_0$ as shown in FIG. 18). The one or more configuration parameters may comprise RRC configuration parameter(s). The one or more configuration parameters may comprise RRC reconfiguration parameter(s). The one or more configuration parameters may comprise the MIMO configuration parameter(s) as shown in FIG. 17.

One or more configuration parameters may be for one or more cells. The one or more cells may comprise a cell. The cell may be, for example, a serving cell. At least one configuration parameter of the one or more configuration parameters may be for the cell. The cell may be a primary cell (PCell). The cell may be a primary secondary cell (PSCell). The cell may be a secondary cell (SCell). The cell may be a secondary cell configured for/with a PUCCH (e.g., PUCCH SCell). The cell may be an unlicensed cell, for example, operating in an unlicensed band. The cell may be a licensed cell, for example, operating in a licensed band. The cell may operate in a first frequency range (FR1). The FR1 may comprise, for example, frequency bands below 6 GHz (or any other frequency or range of frequencies). The cell may operate in a second frequency range (FR2). The FR2 may comprise, for example, frequency bands from 24 GHz to 52.6 GHz (or any other frequency or range of frequencies). The cell may operate in a third frequency range (FR3). The FR3 may comprise, for example, frequency bands from 52.6 GHz to 71 GHz (or any other frequency or range of frequencies). The FR3 may comprise, for example, frequency bands starting from (or above) 52.6 GHz (or any other frequency).

A wireless device may perform uplink transmissions (e.g., PUSCH, PUCCH, SRS) via/of the cell in a first time and in a first frequency. The wireless device may perform downlink receptions (e.g., PDCCH, PDSCH) via/of the cell in a second time and in a second frequency. The cell may operate in a time-division duplex (TDD) mode. The first frequency and the second frequency may be the same, for example, in the TDD mode. The first time and the second time may be different, for example, in the TDD mode. The cell may operate in a frequency-division duplex (FDD) mode. The first frequency and the second frequency may be different, for example, in the FDD mode. The first time and the second time may be the same, for example, in the FDD mode. The cell may operate in a code-division multiplex (CDM) mode, for example, in which the first frequency and the second frequency may be the same or different, and or in which the first time and the second time may be the same or different. The cell may operate in a spatial-domain multiplex (SDM) mode, for example, in which the first frequency and the second frequency may be the same or different, and or in which the first time and the second time may be the same or different. The cell may operation in one or more of a TDD mode, an FDD mode, a CDM mode, and/or an SDM mode.

A wireless device may be an RRC mode of a plurality of RRC modes. For example, the wireless device may be in an RRC connected mode. The wireless device may be in an RRC idle mode. The wireless device may be in an RRC inactive mode.

A cell may comprise a plurality of BWPs. The plurality of BWPs may comprise one or more uplink BWPs comprising an uplink BWP (UL BWP) of the cell. The plurality of BWPs may comprise one or more downlink BWPs comprising a downlink BWP of the cell.

A BWP of the plurality of BWPs may be in one of an active state and an inactive state. In the active state of a downlink BWP of the one or more downlink BWPs, the wireless device may monitor a downlink channel/signal (e.g., PDCCH, DCI, CSI-RS, PDSCH) on/for/via the downlink BWP. In the active state of a downlink BWP of the one or more downlink BWPs, the wireless device may receive a PDSCH on/via/for the downlink BWP. In the inactive state of a downlink BWP of the one or more downlink BWPs, the wireless device may not monitor a downlink channel/signal (e.g., PDCCH, DCI, CSI-RS, PDSCH) on/via/for the downlink BWP. In the inactive state of a downlink BWP of the one or more downlink BWPs, the wireless device may stop monitoring (or receiving) a downlink channel/signal (e.g., PDCCH, DCI, CSI-RS, PDSCH) on/via/for the downlink BWP. In the inactive state of a downlink BWP of the one or more downlink BWPs, the wireless device may not receive a PDSCH on/via/for the downlink BWP. In the inactive state of a downlink BWP of the one or more downlink BWPs, the wireless device may stop receiving a PDSCH on/via/for the downlink BWP.

In the active state of an uplink BWP of the one or more uplink BWPs, the wireless device may send (e.g., transmit)

an uplink signal/channel (e.g., PUCCH, preamble, PUSCH, PRACH, SRS, etc.) on/via the uplink BWP. In the inactive state of an uplink BWP of the one or more uplink BWPs, the wireless device may not send (e.g., transmit) an uplink signal/channel (e.g., PUCCH, preamble, PUSCH, PRACH, SRS, etc.) on/via the uplink BWP.

A wireless device may activate the downlink BWP of the one or more downlink BWPs of the cell. Activating the downlink BWP may comprise setting (or switching to) the downlink BWP as an active downlink BWP of the cell. Activating the downlink BWP may comprise setting the downlink BWP in the active state. Activating the downlink BWP may comprise switching the downlink BWP from the inactive state to the active state.

A wireless device may activate the uplink BWP of the one or more uplink BWPs of the cell. Activating the uplink BWP may comprise that the wireless device sets (or switches to) the uplink BWP as an active uplink BWP of the cell. Activating the uplink BWP may comprise setting the uplink BWP in the active state. Activating the uplink BWP may comprise switching the uplink BWP from the inactive state to the active state.

One or more configuration parameters may be for the (active) downlink BWP of the cell. At least one configuration parameter of the one or more configuration parameters may be for the downlink BWP of the cell.

One or more configuration parameters may be for the (active) uplink BWP of the cell. At least one configuration parameter of the one or more configuration parameters may be for the uplink BWP of the cell. The one or more configuration parameters may indicate a subcarrier spacing (or a numerology) for the downlink BWP. The one or more configuration parameters may indicate a subcarrier spacing (or a numerology) for the uplink BWP.

A value of the subcarrier spacing (of the downlink BWP and/or the uplink BWP) may be/indicate, for example, 15 kHz ($\mu$=0), or any other frequency or range of frequencies. A value of the subcarrier spacing may be/indicate, for example, 30 kHz ($\mu$=1). A value of the subcarrier spacing may be/indicate, for example, 60 kHz ($\mu$=2). A value of the subcarrier spacing may be/indicate, for example, 120 kHz ($\mu$=3). A value of the subcarrier spacing may be/indicate, for example, 240 kHz ($\mu$=4). A value of the subcarrier spacing may be/indicate, for example, 480 kHz ($\mu$=5). A value of the subcarrier spacing may be/indicate, for example, 960 kHz ($\mu$=6). For example, 480 kHz may be valid/applicable in FR3. For example, 960 kHz may be valid/applicable in FR3. For example, 240 kHz may be valid/applicable in FR3. For example, 120 kHz may be valid/applicable in FR3. Any frequency or range of frequencies may be valid/applicable to any FR(n) (e.g., $\mu$ may be equal to any value).

One or more configuration parameters may indicate a plurality of control resource sets (CORESETS). The one or more configuration parameters may indicate the plurality of CORESETS for the (active) downlink BWP of the cell. The (active) downlink BWP may comprise the plurality of CORESETS.

One or more configuration parameters may indicate a plurality of CORESET indexes/identifiers/indicators (e.g., provided by a higher layer parameter ControlResourceSetId) for the plurality of CORESETS. Each CORESET of the plurality of CORESETS may be identified/indicated by a respective CORESET index of the plurality of CORESET indexes. A first CORESET of the plurality of CORESETS may be identified by a first CORESET index of the plurality of CORESET indexes. A second CORESET of the plurality of CORESETS may be identified by a second CORESET index of the plurality of CORESET indexes.

The one or more configuration parameters may indicate one or more CORESET pool indicators/indexes (e.g., provided by a higher layer parameter CoresetPoolIndex) for the plurality of CORESETs. Each CORESET of the plurality of CORESETs may comprise (or be configured/indicated by the one or more configuration parameters) by a respective CORESET pool index of the one or more CORESET pool indexes (e.g., 0, 1). The one or more configuration parameters may indicate, for each CORESET of the plurality of CORESETs, a respective CORESET pool index of the one or more CORESET pool indexes. The one or more configuration parameters may indicate, for a first CORESET of the plurality of CORESETs, a first CORESET pool index (e.g., CoresetPoolIndex=0). The one or more configuration parameters may indicate, for a second CORESET of the plurality of CORESETs, a second CORESET pool index (e.g., CoresetPoolIndex=1). The one or more CORESET pool indexes may comprise the first CORESET pool index and the second CORESET pool index.

The one or more configuration parameters may not indicate, for a CORESET of the plurality of CORESETs, a CORESET pool index. For example, the higher layer parameter CoresetPoolIndex may be absent in configuration parameter(s) of the CORESET. The wireless device may determine a value (or a default value) of/for a CORESET pool index of the CORESET as the first CORESET pool index (e.g., CoresetPoolIndex=0). The wireless device may determine the value (or the default value) of/for the CORESET pool index of the CORESET as the first CORESET pool index, for example, based on the one or more configuration parameters not indicating, for the CORESET, a CORESET pool index. The first CORESET pool index (CoresetPoolIndex=0) may be the CORESET pool index of the CORESET, for example, based on the one or more configuration parameters not indicating, for the CORESET, a CORESET pool index.

A first CORESET pool (e.g., e.g., CORESET pool 0) may comprise one or more first CORESETs with a CORESET pool index that is equal to a first CORESET pool index (e.g., CoresetPoolIndex=0). The one or more configuration parameters may indicate the first CORESET pool index for each CORESET of the one or more first CORESETs in the first CORESET pool. The plurality of CORESETs may comprise the one or more first CORESETs.

A second CORESET pool (e.g., CORESET pool 1) may comprise one or more second CORESETs with a CORESET pool index that is equal to a second CORESET pool index (e.g., CoresetPoolIndex=1). The one or more configuration parameters may indicate the second CORESET pool index for each CORESET of the one or more second CORESETs in the second CORESET pool. The plurality of CORESETs may comprise the one or more second CORESETs.

The one or more configuration parameters may not indicate a CORESET pool index for a CORESET of the plurality of CORESETs. The wireless device may determine a default value for the CORESET pool index of the CORESET, for example, based on the one or more configuration parameters not indicating the CORESET pool index for the CORESET. The default value may be equal to zero (CoresetPoolIndex=0). The default value may be equal to the first CORESET pool index (e.g., zero). The default value may be equal to any other value. The first CORESET pool may comprise the CORESET based on the one or more configuration parameters not indicating, for the CORESET, the CORESET pool index. The first CORESET pool may comprise the CORESET based on the default value of/for the CORESET pool index of the CORESET being equal to the first CORESET pool index.

A first CORESET pool index of a first CORESET and a second CORESET pool index of a second CORESET may be the same. For example, the one or more configuration parameters may indicate the same CORESET pool index for the first CORESET and the second CORESET. The plurality of CORESETs may comprise the first CORESET and the second CORESET. The one or more CORESET pool indexes may comprise the first CORESET pool index and the second CORESET pool index. The wireless device may group the first CORESET and the second CORESET in a same CORESET pool (e.g., CoresetPoolIndex=0 or CoresetPoolIndex=1), for example, based on the first CORESET pool index of the first CORESET and the second CORESET pool index of the second CORESET being the same. A first CORESET pool comprising the first CORESET and a second CORESET pool comprising the second CORESET may be the same, for example, based on the first CORESET pool index of the first CORESET and the second CORESET pool index of the second CORESET being the same.

A first CORESET pool index of a first CORESET and a second CORESET pool index of a second CORESET may be different. The plurality of CORESETs may comprise the first CORESET and the second CORESET. The one or more CORESET pool indexes may comprise the first CORESET pool index and the second CORESET pool index. The wireless device may group the first CORESET and the second CORESET in different CORESET pools, for example, based on the first CORESET pool index of the first CORESET and the second CORESET pool index of the second CORESET being different. The wireless device may group the first CORESET in a first CORESET pool (e.g., CoresetPoolIndex=0). The wireless device may group the second CORESET in a second CORESET pool (e.g., CoresetPoolIndex=1) that is different from the first CORESET pool, for example, based on the first CORESET pool index and the second CORESET pool index being different. The first CORESET pool and the second CORESET pool may be different, for example, based on the first CORESET pool index of the first CORESET and the second CORESET pool index of the second CORESET being different.

The one or more configuration parameters may indicate at least two CORESET pool indexes (e.g., 0, 1, and/or any other value(s)) for a higher layer parameter CORESETPoolIndex. The one or more configuration parameters may comprise the higher layer parameter CORESETPoolIndex with (or set to) the at least two CORESET pool indexes. The at least two CORESET pool indexes may comprise a first CORESET pool index (e.g., 0) for/of one or more first CORESETs of the plurality of CORESETs. The at least two CORESET pool indexes may comprise a second CORESET pool index (e.g., 1), different from the first CORESET pool index, for/of one or more second CORESETs of the plurality of CORESETs. The one or more first CORESETs may comprise one or more third CORESETs, of the plurality of CORESETs, without a value for a higher layer parameter CORESETPoolIndex. The one or more configuration parameters may not comprise the higher layer parameter CORESETPoolIndex for the one or more third CORESETs.

The cell may comprise a plurality of TRPs. The plurality of TRPs may serve the cell (and/or may serve the wireless device in/via/of the cell). At least one TRP of the plurality of TRPs may serve the cell (and/or may serve the wireless device in/via/of the cell). The plurality of TRPs may comprise a first TRP and a second TRP.

The first TRP may send a downlink signal/transmission (e.g., PDSCH transmission, PDCCH transmission, DCI, etc.) via the first CORESET pool. Sending the downlink signal/transmission via the first CORESET pool may comprise that the first TRP transmits the downlink signal/transmission via a first CORESET with (e.g., configured with or associated with) the first CORESET pool index. The first TRP may not send a downlink signal/transmission (e.g., PDSCH transmission, PDCCH transmission, DCI transmission, etc.) via the second CORESET pool. Not sending the downlink signal/transmission via the second CORESET pool may comprise that the first TRP does not send the downlink signal/transmission via a second CORESET with (e.g., configured with or associated with) the second CORESET pool index.

The second TRP may send a downlink signal/transmission (e.g., PDSCH transmission, PDCCH transmission, DCI) via the second CORESET pool. Sending the downlink signal/transmission via the second CORESET pool may comprise that the second TRP sends the downlink signal/transmission via a second CORESET with (e.g., configured with or associated with) the second CORESET pool index. The second TRP may not send a downlink signal/transmission via the first CORESET pool. Not sending the downlink signal/transmission via the first CORESET pool may comprise that the second TRP does not send the downlink signal/transmission via a first CORESET with (e.g., configured with or associated with) the first CORESET pool index.

The one or more configuration parameters may indicate a plurality of uplink resources (e.g., PUCCH resources, SRS resources, and/or the like). The one or more configuration parameters may indicate the plurality of uplink resources for the (active) uplink BWP of the cell. The (active) uplink BWP may comprise the plurality of uplink resources. The (active) uplink BWP of an uplink carrier (e.g., NUL carrier, SUL carrier) of the cell may comprise the plurality of uplink resources.

The plurality of uplink resources may comprise/be, for example, a plurality of PUCCH resources. The plurality of uplink resources may comprise/be, for example, a plurality of SRS resources. The plurality of uplink resources may comprise/be, for example, a plurality of PUSCH resources.

The one or more configuration parameters may indicate one or more uplink resource groups/sets (e.g., PUCCH resource group(s), SRS resource set(s)). The one or more uplink resource groups/sets may comprise the plurality of uplink resources. Each uplink resource group/set of the one or more uplink resource groups/sets may comprise respective uplink resource(s) of the plurality of uplink resources. For example, a first uplink resource group/set of the one or more uplink resource groups/sets may comprise one or more first uplink resources of the plurality of uplink resources. A second uplink resource group/set of the one or more uplink resource groups/sets may comprise one or more second uplink resources of the plurality of uplink resources. The first uplink resource group/set and the second uplink resource group/set may or may not share/comprise a common/shared/same uplink resource of the plurality of uplink resources. A first uplink resource in (or belonging to) the first uplink resource group/set may or may not be in (or belong to) the second uplink resource group/set.

The one or more configuration parameters may indicate a plurality of uplink resource indexes/identifiers/indicators (e.g., provided by a higher layer parameter PUCCH-ResourceId, SRS-ResourceId) for the plurality of uplink resources. Each uplink resource of the plurality of uplink resources may be identified/indicated by a respective uplink resource index of the plurality of uplink resource indexes. A first uplink resource of the plurality of uplink resources may be identified by a first uplink resource index of the plurality of uplink resource indexes. A second uplink resource of the plurality of uplink resources may be identified by a second uplink resource index of the plurality of uplink resource indexes.

The one or more configuration parameters may indicate one or more uplink resource group/set indexes/identifiers/indicators (e.g., provided by a higher layer parameter PUCCH-ResourceGroupId, SRS-ResourceSetId) for the one or more uplink resource groups/sets. Each uplink resource group/set of the one or more uplink resource groups/sets may be identified/indicated by a respective uplink resource group/set index of the one or more uplink resource group/set indexes. A first uplink resource group/set of the one or more uplink resource groups/sets may be identified by a first uplink resource group/set index of the one or more uplink resource group/set indexes. A second uplink resource group/set of the one or more uplink resource groups/sets may be identified by a second uplink resource group/set index of the one or more uplink resource group/set indexes.

The one or more configuration parameters may indicate one or more CORESET pool indexes (e.g., provided by a higher layer parameter CoresetPoolIndex) for the plurality of uplink resources. Each uplink resource of the plurality of uplink resources may comprise (or be configured/indicated by the one or more configuration parameters) by a respective CORESET pool index of the one or more CORESET pool indexes (e.g., 0, 1, or any other value). The one or more configuration parameters may indicate, for each uplink resource of the plurality of uplink resources, a respective CORESET pool index of the one or more CORESET pool indexes. For example, the one or more configuration parameters may indicate, for a first uplink resource of the plurality of uplink resources, a first CORESET pool index (CoresetPoolIndex=0). The one or more configuration parameters may indicate, for a second uplink resource of the plurality of uplink resources, a second CORESET pool index (CoresetPoolIndex=1). The one or more CORESET pool indexes may comprise the first CORESET pool index and the second CORESET pool index.

The one or more configuration parameters may not indicate, for an uplink resource of the plurality of uplink resources, a CORESET pool index. For example, the higher layer parameter CoresetPoolIndex may be absent in configuration parameter(s) of the uplink resource. The wireless device may determine a value (or a default value) of/for a CORESET pool index of the uplink resource as the first CORESET pool index (CoresetPoolIndex=0). The wireless device may determine the value (or the default value) of/for the CORESET pool index of the uplink resource as the first CORESET pool index, for example, based on the one or more configuration parameters not indicating, for the uplink resource, a CORESET pool index. The first CORESET pool index (CoresetPoolIndex=0) may be the CORESET pool index of the uplink resource, for example, based on the one or more configuration parameters not indicating, for the uplink resource, a CORESET pool index.

The one or more configuration parameters may indicate at least two CORESET pool indexes (e.g., 0, 1, and/or the like) for a higher layer parameter CORESETPoolIndex. The one or more configuration parameters may comprise the higher layer parameter CORESETPoolIndex with (or set to) the at least two CORESET pool indexes. The at least two CORESET pool indexes may comprise a first CORESET pool index (e.g., 0) for/of one or more first uplink resources of the plurality of uplink resources. The at least two CORESET pool indexes may comprise a second CORESET pool index (e.g., 1), different from the first CORESET pool index, for/of one or more second uplink resources of the plurality of uplink resources. The one or more first uplink resources may comprise one or more third uplink resources, of the plurality of uplink resources, without a value for a higher layer parameter CORESETPoolIndex. The one or more configuration parameters may not comprise the higher layer parameter CORESETPoolIndex for the one or more third uplink resources.

The cell may comprise a plurality of TRPs. The plurality of TRPs may serve the cell (and/or may serve the wireless device in/via/of the cell). At least one TRP of the plurality of TRPs may serve the cell (and/or may serve the wireless device in/via/of the cell). The plurality of TRPs may comprise a first TRP and a second TRP.

The first TRP may receive an uplink signal/transmission (e.g., PUSCH transmission, PUCCH transmission, SRS, UCI, PRACH transmission) via a first uplink resource, of the plurality of uplink resources, with (e.g., configured with or associated with) the first CORESET pool index. The first TRP may or may not receive an uplink signal/transmission (e.g., PUSCH transmission, PUCCH transmission, SRS, UCI, PRACH transmission) via a second uplink resource, of the plurality of uplink resources, with (e.g., configured with or associated with) the second CORESET pool index.

The second TRP may receive an uplink signal/transmission (e.g., PUSCH transmission, PUCCH transmission, SRS, UCI, PRACH transmission) via a second uplink resource, of the plurality of uplink resources, with (e.g., configured with or associated with) the second CORESET pool index. The second TRP may or may not receive an uplink signal/transmission (e.g., PUSCH transmission, PUCCH transmission, SRS, UCI, PRACH transmission) via a first uplink resource, of the plurality of uplink resources, with (e.g., configured with or associated with) the first CORESET pool index.

The one or more configuration parameters may indicate one or more CORESET pool indexes (e.g., provided by a higher layer parameter CoresetPoolIndex) for the one or more uplink resource groups/sets. Each uplink resource group/set of one or more uplink resource groups/sets may comprise (or be configured/indicated by the one or more configuration parameters) by a respective CORESET pool index of the one or more CORESET pool indexes (e.g., 0, 1, and/or the like). The one or more configuration parameters may indicate, for each uplink resource group/set of the one or more uplink resource groups/sets, a respective CORESET pool index of the one or more CORESET pool indexes. For example, the one or more configuration parameters may indicate, for a first uplink resource group/set of the one or more uplink resource groups/sets, a first CORESET pool index (e.g., CoresetPoolIndex=0). The one or more configuration parameters may indicate, for a second uplink resource group/set of the one or more uplink resource groups/sets, a second CORESET pool index (e.g., CoresetPoolIndex=1). The one or more CORESET pool indexes may comprise the first CORESET pool index and the second CORESET pool index.

The one or more configuration parameters may not indicate, for an uplink resource group/set of the one or more uplink resource groups/sets, a CORESET pool index. The higher layer parameter CoresetPoolIndex may be absent in configuration parameter(s) of the uplink resource group/set. The wireless device may determine a value (or a default value) of/for a CORESET pool index of the uplink resource group/set as the first CORESET pool index (e.g., CoresetPoolIndex=0). The wireless device may determine the value (or the default value) of/for the CORESET pool index of the uplink resource group/set as the first CORESET pool index, for example, based on the one or more configuration parameters not indicating, for the uplink resource group/set, a CORESET pool index. The first CORESET pool index (e.g., CoresetPoolIndex=0) may be the CORESET pool index of the uplink resource group/set, for example, based on the one or more configuration parameters not indicating, for the uplink resource group/set, a CORESET pool index.

The one or more configuration parameters may indicate at least two CORESET pool indexes (e.g., 0, 1, and/or the like) for a higher layer parameter CORESETPoolIndex. The one or more configuration parameters may comprise the higher layer parameter CORESETPoolIndex with (or set to) the at least two CORESET pool indexes. The at least two CORESET pool indexes may comprise a first CORESET pool index (e.g., 0) for/of one or more first uplink resource groups/sets of the one or more uplink resource groups/sets. The at least two CORESET pool indexes may comprise a second CORESET pool index (e.g., 1), different from the first CORESET pool index, for/of one or more second uplink resource groups/sets of the one or more uplink resource groups/sets. The one or more first uplink resource groups/sets may comprise one or more third uplink resource groups/sets, of the one or more uplink resource groups/sets, without a value for a higher layer parameter CORESETPoolIndex. The one or more configuration parameters may not comprise the higher layer parameter CORESETPoolIndex for the one or more third uplink resource groups/sets.

The cell may comprise a plurality of TRPs. The plurality of TRPs may serve the cell (and/or may serve the wireless device in/via/of the cell). At least one TRP of the plurality of TRPs may serve the cell (and/or may serve the wireless device in/via/of the cell). The plurality of TRPs may comprise a first TRP and a second TRP.

The first TRP may receive an uplink signal/transmission (e.g., PUSCH transmission, PUCCH transmission, SRS, UCI, PRACH transmission) via an uplink resource of/in a first uplink resource group/set, of the one or more uplink resource groups/sets, with (e.g., configured with or associated with) the first CORESET pool index. The first TRP may or may not receive an uplink signal/transmission (e.g., PUSCH transmission, PUCCH transmission, SRS, UCI, PRACH transmission) via an uplink resource in/of a second uplink resource group/set, of the one or more uplink resource groups/sets, with (e.g., configured with or associated with) the second CORESET pool index.

The second TRP may receive an uplink signal/transmission (e.g., PUSCH transmission, PUCCH transmission, SRS, UCI, PRACH transmission) via an uplink resource in/of a second uplink resource group/set, of the one or more uplink resource groups/sets, with (e.g., configured with or associated with) the second CORESET pool index. The second TRP may or may not receive an uplink signal/transmission (e.g., PUSCH transmission, PUCCH transmission, SRS, UCI, PRACH transmission) via an uplink resource in/of a first uplink resource group/set, of the one or more uplink resource groups/sets, with (e.g., configured with or associated with) the first CORESET pool index.

The wireless device may send/transmit, via an uplink resource, an uplink signal/transmission (e.g., PUSCH/PUCCH/SRS transmission). The plurality of uplink resources may comprise the uplink resource. An uplink resource group/set of the one or more uplink resource groups/sets may comprise the uplink resource.

The wireless device may receive, via a CORESET of the plurality of CORESETs, DCI. The DCI may schedule/trigger/indicate transmission of the uplink signal/transmission. The DCI may schedule/trigger/indicate transmission of the uplink signal/transmission via the uplink resource. The DCI may indicate the uplink resource. The DCI may comprise a field indicating the uplink resource.

The uplink signal/transmission may be a PUSCH transmission (e.g., transport block). The uplink resource may be a PUSCH resource. The DCI may schedule transmission of the PUSCH transmission.

The uplink signal/transmission may be a PUCCH transmission (e.g., HARQ-ACK information feedback). The uplink resource may be a PUCCH resource. The DCI may schedule reception of a transport block (or a PDSCH reception). The uplink signal/transmission may be a HARQ-ACK information feedback of the transport block.

The uplink signal/transmission may be an SRS. The uplink resource may be an SRS resource. The DCI may schedule transmission of the SRS. The SRS may be, for example, an aperiodic SRS.

The CORESET that the wireless device receives the DCI may be associated with a CORESET pool index. The one or more CORESET pool indexes may comprise the CORESET pool index. The one or more configuration parameters may indicate, for the CORESET, the CORESET pool index. The one or more configuration parameters may not indicate, for the CORESET, the CORESET pool index (e.g., CoresetPoolIndex=0 or CoresetPoolIndex=1). A value (or a default value) of the CORESET pool index of the CORESET may be equal to the first CORESET pool index (e.g., CoresetPoolIndex=0), for example, based on the one or more configuration parameters not indicating, for the CORESET, a CORESET pool index.

The uplink resource may be associated with the CORESET pool index. The uplink resource may be associated with the CORESET pool index, for example, based on receiving, via the CORESET associated with the CORESET pool index, the DCI scheduling/triggering/indicating transmission of the uplink signal/transmission via the uplink resource.

The uplink resource group/set comprising the uplink resource may be associated with the CORESET pool index. The uplink resource group/set may be associated with the CORESET pool index, for example, based on receiving, via the CORESET associated with the CORESET pool index, the DCI scheduling/triggering/indicating transmission of the uplink signal/transmission via the uplink resource in (that belongs to) the uplink resource group/set. The uplink resource group/set may comprise one or more uplink resources that comprise the uplink resource. The one or more uplink resources may be associated with the CORESET pool index, for example, based on the uplink resource group/set, comprising the one or more uplink resources, being associated with the CORESET pool index. Each uplink resource of the one or more uplink resources may be associated with the CORESET pool index, for example, based on the uplink resource group/set being associated with the CORESET pool index.

The uplink signal/transmission may be associated with the CORESET pool index. The uplink signal/transmission may be associated with the CORESET pool index, for example, based on receiving, via the CORESET associated with the CORESET pool index, the DCI scheduling/triggering/indicating transmission of the uplink signal/transmission.

The one or more configuration parameters may indicate a plurality of TCI states (e.g., indicated by a higher layer parameter DL-orJoint-TCIState or dl-orJoint-TCI-ToAddModList). The one or more configuration parameters may comprise one or more PDSCH configuration parameters, for example, indicating the plurality of TCI states. For example, in FIG. 18, the plurality of TCI states may comprise TCI state 1, TCI state 2, . . . , and TCI state M. The one or more configuration parameters may indicate the plurality of TCI states that indicate a unified TCI state for the cell.

The one or more configuration parameters may comprise the one or more PDSCH configuration parameters, for example, for the downlink BWP of the cell. The one or more configuration parameters indicate the plurality of TCI states for the downlink BWP of the cell.

The one or more configuration parameters may comprise the one or more PDSCH configuration parameters, for example, for a second downlink BWP of a second cell. The one or more configuration parameters may indicate the plurality of TCI states for the second downlink BWP of the second cell. The one or more cells may comprise the second cell. The one or more configuration parameters may comprise, for the downlink BWP of the cell, a reference unified TCI state list parameter (e.g., higher layer parameter unifiedTCI-StateRef) indicating the second downlink BWP of the second cell. The reference unified TCI state list parameter may comprise a BWP indicator/index (e.g., higher layer parameter BWP-Id) identifying/indicating the second downlink BWP. The reference unified TCI state list parameter may comprise a cell index (e.g., higher layer parameter ServCellIndex) identifying/indicating the second cell.

The one or more configuration parameters may comprise a unified TCI state type parameter (e.g., higher layer parameter unifiedtci-StateType as shown in FIG. 17). The one or more configuration parameters may comprise one or more serving cell parameters (e.g., higher layer parameter ServingCellConfig) comprising the unified TCI state type parameter. The unified TCI state type parameter may indicate the unified TCI state type of the cell.

For example, the unified TCI state type parameter may be set to a first value/configuration (e.g., indicating "joint"). The wireless device may use/apply the plurality of TCI states (e.g., provided/indicated by parameter dl-orJoint-TCI-ToAddModList) for both uplink transmissions (e.g., PUSCH/PUCCH/SRS transmissions) of the cell and downlink receptions (e.g., PDCCH/PDSCH/CSI-RS receptions) of the cell, for example, based on the one or more configuration parameters comprising the unified TCI state type parameter being set to the first value/configuration (e.g., "joint").

For example, unified TCI state type parameter may be set to a second value/configuration (e.g., indicating "separate"). The wireless device may use/apply the plurality of TCI states (e.g., provided/indicated by a higher layer parameter dl-orJoint-TCI-ToAddModList) for downlink receptions (e.g., PDCCH/PDSCH/CSI-RS receptions) of the cell, for example, based on the one or more configuration parameters comprising the unified TCI state type parameter being set to the second value/configuration (e.g., "separate"). The wireless device may not use/apply the plurality of TCI states for uplink transmissions (e.g., PUSCH/PUCCH/SRS transmissions) of the cell, for example, based on the one or more configuration parameters comprising the unified TCI state type parameter being set to the second value/configuration (e.g., "separate").

The one or more configuration parameters may indicate a second plurality of TCI states (e.g., UL-TCIState, provided/indicated by a higher layer parameter ul-TCI-ToAddModList). The one or more configuration parameters may comprise one or more uplink BWP configuration parameters, for example, indicating the second plurality of TCI states. For example, with reference to FIG. 18, the second plurality of TCI states may be TCI state 1, TCI state 2, . . . , and TCI state M.

The one or more configuration parameters may comprise the one or more uplink BWP configuration parameters, for example, for the uplink BWP of the cell. The one or more configuration parameters may indicate the second plurality of TCI states for the uplink BWP of the cell.

The one or more configuration parameters may comprise the one or more uplink BWP configuration parameters, for example, for a second uplink BWP of a second cell. The one or more configuration parameters may indicate the second plurality of TCI states for the second uplink BWP of the second cell. The one or more cells may comprise the second cell. The one or more configuration parameters may comprise, for the uplink BWP of the cell, a reference unified TCI state list parameter (e.g., higher layer parameter unifiedtci-StateType) indicating the second uplink BWP of the second cell. The reference unified TCI state list parameter may comprise a BWP index (e.g., higher layer parameter BWP-Id) identifying/indicating the second uplink BWP. The reference unified TCI state list parameter may comprise a cell index (e.g., higher layer parameter ServCellIndex) identifying/indicating the second cell.

The wireless device may use/apply the second plurality of TCI states for uplink transmissions (e.g., PUSCH/PUCCH/SRS transmissions) of the cell, for example, based on the one or more configuration parameters comprising the unified TCI state type parameter set to the second value/configuration (e.g., "separate"). The wireless device may not use/apply the second plurality of TCI states for downlink receptions (e.g., PDCCH/PDSCH/CSI-RS receptions) of the cell, for example, based on the one or more configuration parameters comprising the unified TCI state type parameter being set to the second value/configuration (e.g., "separate").

The wireless device may use, for downlink receptions via the downlink BWP of the cell, the plurality of TCI states, for example based on the one or more configuration parameters indicating the plurality of TCI states for the downlink BWP of the cell. The wireless device may use, for uplink transmissions via the uplink BWP of the cell, the plurality of TCI states, for example based on the one or more configuration parameters indicating the plurality of TCI states for the downlink BWP of the cell.

The wireless device may use, for downlink receptions via the downlink BWP of the cell, the plurality of TCI states of the second downlink BWP of the second cell, for example, based on the reference unified TCI state list parameter indicating, for the downlink BWP of the cell, the second downlink BWP of the second cell. The wireless device may use, for uplink transmissions via the uplink BWP of the cell, the plurality of TCI states of the second downlink BWP of the second cell, for example, based on the reference unified TCI state list parameter indicating, for the downlink BWP of the cell, the second downlink BWP of the second cell.

The wireless device may use, for uplink transmissions via the uplink BWP of the cell, the second plurality of TCI states, for example, based on the one or more configuration parameters indicating the second plurality of TCI states for the uplink BWP of the cell. The wireless device may use, for uplink transmissions via the uplink BWP of the cell, the second plurality of TCI states of the second uplink BWP of the second cell, for example, based on the reference unified TCI state list parameter indicating, for the uplink BWP of the cell, the second uplink BWP of the second cell.

The one or more configuration parameters may indicate, for the cell, a PCI. The one or more configuration parameters may indicate, for the one or more cells, one or more PCIs. The one or more PCIs may comprise the PCI of the cell. The one or more configuration parameters may comprise a higher layer (or RRC) parameter physCellId indicating the one or more PCIs for the one or more cells. The one or more configuration parameters may indicate, for each cell of the one or more cells, a respective PCI of the one or more PCIs. The one or more configuration parameters may comprise the higher layer (or RRC) parameter physCellId indicating a respective PCI of the one or more PCIs for each cell of the one or more cells. For example, the one or more configuration parameters may indicate, for a first cell of the one or more cells, a first PCI of the one or more PCIs. The first PCI may indicate/identify a physical cell identity of the first cell. The one or more configuration parameters may indicate, for a second cell of the one or more cells, a second PCI of the one or more PCIs. The second PCI may indicate/identify a physical cell identity of the second cell.

The one or more configuration parameters may indicate a list of PCI sets (e.g., indicated by an RRC parameter additionalPCI-ToAddModList as shown in FIG. 17). The one or more configuration parameters may comprise one or more serving cell parameters (e.g., higher layer parameter ServingCellConfig as shown in FIG. 17) indicating the list of PCI sets. The one or more serving cell parameters may comprise MIMO parameters (e.g., higher layer parameter MIMOParam as shown in FIG. 17) comprising/indicating the list of PCI sets. The list of PCI sets may comprise at least one PCI set (e.g., provided/indicated by a higher layer parameter SSB-MTC-AdditionalPCI as shown in FIG. 17).

The list of PCI sets (or the at least one PCI set) may comprise/indicate at least one PCI (e.g., higher layer parameters additionalPCI and/or PhysCellId as shown in FIG. 17) of the one or more PCIs. Each PCI set (e.g., indicated by higher layer parameter SSB-MTC-AdditionalPCI) of the list of PCI sets may comprise/indicate a respective PCI of the at least one PCI. The one or more configuration parameters may indicate, for each PCI set of the list of PCI sets, a respective PCI of the at least one PCI. The at least one PCI may not comprise the PCI of the cell. Each PCI of the at least one PCI may be different from the PCI of the cell. The one or more PCIs may comprise the at least one PCI and the PCI of the cell. The at least one PCI may indicate/identify at least one cell of the one or more cells. Each PCI of the at least one PCI may indicate/identify a respective cell of the at least one cell. For example, a first PCI set of the list of PCI sets may comprise a first PCI of the at least one PCI. The first PCI may indicate/identify a first cell of the at least one cell. A second PCI set of the list of PCI sets may comprise a second PCI of the at least one PCI. The second PCI may indicate/identify a second cell of the at least one cell. The at least one cell may not comprise the cell. Each cell of the at least one cell may be different from the cell. The one or more cells may comprise the at least one cell and the cell.

The at least one cell may be/comprise at least one non-serving cell. The at least one cell may be/comprise at least one neighboring cell. The at least one cell may be/comprise at least one candidate/assisting cell.

A maximum size/length (e.g., indicated by higher layer parameter maxNrofAdditionalPCI) of the list of PCI sets may be equal to a value (e.g., 7, or any other value). A maximum quantity of PCI sets in the list of PCI sets may be equal to a value (e.g., 7, or any other value).

The list of PCI sets (or the at least one PCI set) may comprise/indicate at least one additional PCI index (e.g., indicated by higher layer parameter additionalPCIIndex as shown in FIG. 17). Each PCI set (e.g., indicated by higher layer parameter SSB-MTC-AdditionalPCI) of the list of PCI sets may comprise/indicate a respective additional PCI index of the at least one additional PCI index. The one or more configuration parameters may indicate the at least one additional PCI index for the list of PCI sets. The one or more configuration parameters may indicate, for each PCI set of the list of PCI sets, a respective additional PCI index of the at least one additional PCI index. Each PCI set of the list of PCI sets may be identified/indicated by a respective additional PCI index of the at least one additional PCI index. For example, a first PCI set of the list of PCI sets may be identified/indicated by a first additional PCI index of the at least one additional PCI index. A second PCI set of the list of PCI sets may be identified/indicated by a second additional PCI index of the at least one additional PCI index.

The one or more configuration parameters may indicate the list of PCI sets, for example, for inter-cell beam management. The one or more configuration parameters may indicate the list of PCI sets, for example, for inter-cell multi-TRP operation/mode.

For example, the list of PCI sets (e.g., as indicated by the higher layer parameter SSB—MTC-AdditionalPCI) may comprise [{1, PCI 5}, {2, PCI 2}, {3, PCI 4}, {4, PCI 10}, {5, PCI 21}]. The PCI of the cell may be different from PCI 5, PCI 2, PCI 4, PCI 10, and PCI 21. {1, PCI 5) may be a first PCI set of the list of PCI sets. 1 may be a first additional PCI index of the first PCI set. PCI 5 may be a first PCI indicating/identifying/of a first cell. {2, PCI 2) may be a second PCI set of the list of PCI sets. 2 may be a second additional PCI index of the second PCI set. PCI 2 may be a second PCI indicating/identifying/of a second cell. {3, PCI 4) may be a third PCI set of the list of PCI sets. 3 may be a third additional PCI index of the third PCI set. PCI 4 may be a third PCI indicating/identifying/of a third cell. {4, PCI 10) may be a fourth PCI set of the list of PCI sets. 4 may be a fourth additional PCI index of the fourth PCI set. PCI 10 may be a fourth PCI indicating/identifying/of a fourth cell. 15, PCI 21) may be a fifth PCI set of the list of PCI sets. 5 may be a fifth additional PCI index of the fifth PCI set. PCI 21 may be a fifth PCI indicating/identifying/of a fifth cell.

The at least one additional PCI index may comprise the first additional PCI index (e.g., 1), the second additional PCI index (e.g., 2), the third additional PCI index (e.g., 3), the fourth additional PCI index (e.g., 4), and the fifth additional PCI index (e.g., 5). The at least one PCI may comprise PCI 5, PCI 2, PCI 4, PCI 10, and PCI 21. The at least one cell may comprise the first cell, the second cell, the third cell, the fourth cell and the fifth cell. The one or more cells may comprise the at least one cell and the cell.

The one or more configuration parameters may indicate, for one or more TCI states of the plurality of TCI states (or, of the second plurality of TCI states), the at least one additional PCI index. The one or more configuration parameters may indicate, for each TCI state of the one or more TCI states, a respective additional PCI index (e.g., additionalPCI, AdditionalPCIIndex) of the at least one additional PCI index. For example, the one or more configuration parameters may indicate, for a first TCI state of the one or more TCI states, a first additional PCI index (e.g., 1) of the at least one additional PCI index. The first additional PCI index may indicate/identify a first PCI set of the list of PCI sets. The one or more configuration parameters may indicate, for a second TCI state of the one or more TCI states, a second additional PCI index (e.g., 2) of the at least one additional PCI index. The second additional PCI index may indicate/ identify a second PCI set of the list of PCI sets. The one or more configuration parameters may indicate, for a third TCI state of the one or more TCI states, a third additional PCI index (e.g., 3) of the at least one additional PCI index. The third additional PCI index may indicate/identify a third PCI set of the list of PCI sets. Similarly, the one or more configuration parameters may indicate, for other TCI states of the one or more TCI states, additional PCI indexes of the at least one additional PCI index.

A TCI state of the one or more TCI states may be associated with an additional PCI index of the at least one additional PCI index, for example, based on the one or more configuration parameters indicating, for the TCI state, the additional PCI index. The TCI state may comprise/have the additional PCI index. The additional PCI index may indicate/identify a PCI set of the list of PCI sets (or the at least one PCI set). The PCI set may comprise/indicate/have a second PCI of the at least one PCI. The second PCI may indicate/identify a second cell of the at least one cell. The TCI state may be associated with the second PCI (or the second cell), for example, based on the one or more configuration parameters indicating, for the TCI state, the additional PCI index indicating the second PCI (or the second cell). The second PCI of the second cell may be, for example, different from the PCI of the cell.

The one or more configuration parameters may not indicate, for one or more TCI states of the plurality of TCI states, an additional PCI index of the at least one additional PCI index. An additional PCI index may be absent (or may not be present) in configuration parameter(s) of the one or more TCI states. The one or more configuration parameters may comprise the configuration parameter(s) of the one or more TCI states. The one or more TCI states of the plurality of TCI states may not be associated with an additional PCI index. The one or more TCI states may not comprise/have an additional PCI index. Each TCI state of the one or more TCI states may not comprise/have an additional PCI index. The one or more TCI states may be associated with the cell (or the PCI of the cell), for example, based on the one or more configuration parameters not indicating, for the one or more TCI states of the plurality of TCI states, an additional PCI index. The one or more TCI states may be associated with the cell (or the PCI of the cell), for example, based on the one or more configuration parameters not indicating, for each TCI state of the one or more TCI states, an additional PCI index. The one or more TCI states may be associated with the cell (or the PCI of the cell), for example, based on the one or more configuration parameters not indicating, for each TCI state of the one or more TCI states, an additional PCI index of the at least one additional PCI index.

The wireless device may receive a control command (e.g., MAC CE, DCI, downlink control command/message, unified TCI states activation/deactivation MAC CE, activation command, and/or the like). For example, the wireless device may receive an activation command 1808 at time T1 as shown in FIG. 18.

The control command may indicate activation of a subset of TCI states of the plurality of TCI states (e.g., indicated by higher layer parameter DLorJoint-TCIState). For example, the control command may indicate activation of a subset of TCI states of the second plurality of TCI states (e.g., UL-TCIState).

The wireless device may map the subset of TCI states to one or more TCI codepoints. The wireless device may map respective TCI state(s) of the subset of TCI states to a respective TCI codepoint of the one or more TCI codepoints. The one or more TCI codepoints may indicate/comprise the subset of TCI states. Each TCI codepoint of the one or more TCI codepoints may indicate (or may be mapped to) respective TCI state(s) of the subset of TCI states. Each TCI codepoint of the one or more TCI codepoints may indicate/comprise (or be mapped to) one or more TCI states.

For example, as shown in FIG. 18, the subset of TCI states may comprise at least TCI state 4, TCI state 5, TCI state 8, TCI state 26, TCI state 61, and TCI state 42. The one or more TCI codepoints may/be comprise a first TCI codepoint (e.g., TCI codepoint 000), a second TCI codepoint (e.g., TCI codepoint 001), a third TCI codepoint (e.g., TCI codepoint 110), and a fourth TCI codepoint (e.g., TCI codepoint 111). The first TCI codepoint (e.g., TCI codepoint 000) may comprise/indicate the TCI state 4. The second TCI codepoint (e.g., TCI codepoint 001) may comprise/indicate the TCI state 5 and the TCI state 8. The third TCI codepoint (e.g., TCI codepoint 110) may comprise/indicate the TCI state 26 and TCI state 61. The fourth TCI codepoint (e.g., TCI codepoint 111) may comprise/indicate the TCI state 42. For example, the first TCI codepoint (e.g., TCI codepoint 000) and the fourth TCI codepoint (e.g., TCI codepoint 111) may each indicate a single TCI state. The second TCI codepoint (e.g., TCI codepoint 001) and the third TCI codepoint (e.g., TCI codepoint 110) may indicate two TCI states (e.g., two joint TCI states, two uplink TCI states, two downlink TCI states, and/or the like).

A quantity of the one or more TCI codepoints may be equal to one. The one or more TCI codepoints may be a (single) TCI codepoint. The (single) TCI codepoint may indicate/comprise (or may be mapped to) at least two TCI states of the plurality of TCI states. The subset of TCI states may be/comprise the at least two TCI states. The wireless device may not receive DCI indicating activation of one or more TCI states among the subset of TCI states, for example, based on the quantity of the one or more TCI codepoints being equal to one. The wireless device may not receive DCI indicating activation of one or more TCI states among the subset of TCI states, for example, based on the control command indicating activation of the at least two TCI states. The at least two TCI states may comprise a first TCI state (e.g., TCI state 26 as shown in FIG. 18) and a second TCI state (e.g., TCI state 61 as shown in FIG. 18).

A quantity of the one or more TCI codepoints may be greater than one. The wireless device may receive DCI (e.g., DCI 1812 at time T2 as shown in FIG. 18). The DCI may comprise a TCI field. The TCI field may indicate a TCI codepoint of the one or more TCI codepoints. A value of the TCI field (e.g., TCI field=110 as shown in FIG. 18) may indicate (or be equal to) the TCI codepoint.

The TCI codepoint may comprise/indicate (or may be mapped to) at least two TCI states (e.g., TCI state 26 and TCI state 61 in FIG. 18). The subset of TCI states may comprise the at least two TCI states of/in the TCI codepoint. The DCI may indicate activation of the at least two TCI states. The at least two TCI states may comprise a first TCI state (e.g., TCI state 26) and a second TCI state (e.g., TCI state 61).

The wireless device may receive a first control command (e.g., MAC CE, DCI, downlink control command/message, unified TCI states activation/deactivation MAC CE, activation command and/or the like). For example, the wireless device may receive an activation command 1904 at time T1 as shown in FIG. 19.

The first control command may activate/select/indicate/update (or indicate activation of) a first subset of TCI states of the plurality of TCI states (e.g., indicated by the higher layer parameter DLorJoint-TCIState). The first control command may activate/select/indicate/update (or indicate activation of) a first subset of TCI states of the second plurality of TCI states (e.g., indicated by the higher layer parameter UL-TCIState).

The first control command may comprise a field (e.g., CoresetPoolID) comprising a first CORESET pool index/indicator/identifier (e.g., CORESET pool index 0 as shown in FIG. 19). A value in/of the field may be equal to the first CORESET pool index. The first CORESET pool index may be equal to zero (or any other value). The first subset of TCI states may be associated with the first CORESET pool index. The first subset of TCI states may be associated with the first CORESET pool index, for example, based on the first control command, indicating activation of the first subset of TCI states, comprising the field with the first CORESET pool index. The wireless device may activate the first subset of TCI states for the first CORESET pool index.

The wireless device may map the first subset of TCI states to one or more first TCI codepoints. The wireless device may map respective TCI state(s) of the first subset of TCI states to a respective TCI codepoint of the one or more first TCI codepoints. The one or more first TCI codepoints may indicate/comprise the first subset of TCI states. Each TCI codepoint of the one or more first TCI codepoints may indicate (or may be mapped to) respective TCI state(s) of the first subset of TCI states. Each TCI codepoint of the one or more first TCI codepoints may indicate/comprise (or be mapped to) one or more TCI states. The one or more first TCI codepoints may be associated with the first CORESET pool index.

For example, as shown in FIG. 19, the first subset of TCI states may comprise TCI state 4, TCI state 5, TCI state 26, and TCI state 42. The one or more first TCI codepoints may/be comprise a first TCI codepoint (e.g., TCI codepoint 000), a second TCI codepoint (e.g., TCI codepoint 001), a third TCI codepoint (e.g., TCI codepoint 110), and a fourth TCI codepoint (e.g., TCI codepoint 111). The first TCI codepoint (e.g., TCI codepoint 000) may comprise/indicate the TCI state 4. The second TCI codepoint (e.g., TCI codepoint 001) may comprise/indicate the TCI state 5. The third TCI codepoint (e.g., TCI codepoint 110) may comprise/indicate the TCI state 26. The fourth TCI codepoint (e.g., TCI codepoint 111) may comprise/indicate the TCI state 42. For example, the first TCI codepoint (e.g., TCI codepoint 000), the second TCI codepoint (e.g., TCI codepoint 001), the third TCI codepoint (e.g., TCI codepoint 110), and the fourth TCI codepoint (e.g., TCI codepoint 111) may each indicate a respective single TCI state (e.g., a single joint TCI state, a single uplink TCI state, a single downlink TCI state, and/or the like).

A quantity of the one or more first TCI codepoints may be equal to one. The one or more first TCI codepoints may be a (single) TCI codepoint. The (single) TCI codepoint may indicate a first TCI state of the plurality of TCI states. The first subset of TCI states may comprise/be the first TCI state. The wireless device may not receive DCI indicating activation of one or more TCI states among the first subset of TCI states, for example, based on the quantity of the one or more first TCI codepoints being equal to one. The wireless device may not receive DCI indicating activation of one or more TCI states among the first subset of TCI states, for example, based on the first control command indicating activation of the first TCI state.

A quantity of the one or more first TCI codepoints may be greater than one. The wireless device may receive, via a first CORESET (e.g., CORESET 1 in FIG. 19) with the first CORESET pool index (e.g., CORESET pool index 0), first DCI (e.g., DCI 1908 at time T2 in FIG. 19). The plurality of CORESETs may comprise the first CORESET. The one or more configuration parameters may indicate, for the first CORESET, the first CORESET pool index. The one or more configuration parameters may not indicate, for the first CORESET, a CORESET pool index. The first CORESET may be associated with the first CORESET pool index (e.g., CORESET pool index 0), for example, based on the one or more configuration parameters not indicating, for the first CORESET, a CORESET pool index. A default value for CORESET pool index of the first CORESET may be equal to the first CORESET pool index (e.g., CORESET pool index 0), for example, based on the one or more configuration parameters not indicating, for the first CORESET, a CORESET pool index.

The first DCI may correspond to DCI format 1_1. The first DCI may correspond to DCI format 1_2. The first DCI may correspond to DCI format 1_x, where x=0, 1, 2 . . . The first DCI may correspond to DCI format 0_x, where x=0, 1, 2 . . . .

The first DCI may comprise a first TCI field. The first TCI field may indicate a first TCI codepoint in/of the one or more first TCI codepoints. The first TCI field may indicate the first TCI codepoint of the one or more first TCI codepoints associated with the first CORESET pool index, for example, based on the receiving the first DCI via the first CORESET with the first CORESET pool index. A value of the first TCI field (e.g., 110 as shown in FIG. 19) may be equal to the first TCI codepoint. The value of the first TCI field may indicate the first TCI codepoint. The first TCI codepoint (e.g., 110) may indicate/comprise (or may be mapped to) a first TCI state (e.g., TCI state 26 as shown in FIG. 19). The first subset of TCI states may comprise the first TCI state. The first DCI may indicate activation of (or may activate) the first TCI state. The first DCI may indicate activation of the first TCI state. The first TCI field in/of the first DCI may indicate the first TCI state in the first subset of TCI states, for example, based on the receiving the first DCI via the first CORESET with the first CORESET pool index. The first TCI field in/of the first DCI may indicate the first TCI state in the first subset of TCI states, for example, based on the first control command, that indicates activation of the first subset of TCI states, comprising the field indicating/comprising the first CORESET pool index (that is the same as that of the first CORESET).

The first TCI state may be associated with (or may be activated for) the first CORESET pool index. The first TCI state may be associated with downlink/uplink receptions/transmissions associated with the first CORESET pool index. The first TCI state may be associated with the downlink/uplink receptions/transmissions associated with the first CORESET pool index, for example, based on the receiving, via the first CORESET with the first CORESET pool index, the first DCI indicating activation of the first TCI state.

The wireless device may apply the first TCI state to downlink receptions (e.g., PDSCH receptions, transport block, PDCCH receptions, CSI-RS, DM-RS, and/or the like) associated with the first CORESET pool index. For example, the one or more configuration parameters may indicate, for a CORESET of the plurality of CORESETs, the first CORESET pool index. The wireless device may monitor downlink control channels in the CORESET based on the first TCI state, for example, based on/in response to the one or more configuration parameters indicating, for the CORESET, the first CORESET pool index. For example, the wireless device may receive, via a CORESET with the first CORESET pool index, DCI scheduling a downlink signal (e.g., PDSCH transmission, transport block, DM-RS, CSI-RS, aperiodic CSI-RS). The plurality of CORESETs may comprise the CORESET. The downlink signal may be associated with the first CORESET pool index, for example, based on the receiving the DCI via the CORESET with the first CORESET pool index. The wireless device may receive the downlink signal based on the first TCI state, for example, based on/in response to the downlink signal being associated with the first CORESET pool index. For example, the wireless device may receive a downlink signal (e.g., PDSCH transmission, transport block, DM-RS, CSI-RS, aperiodic CSI-RS) based on the first TCI state, for example, based on/in response to the one or more configuration parameters indicating, for the downlink signal (or a resource set comprising the downlink signal), the first CORESET pool index.

The wireless device may apply the first TCI state to uplink transmissions (e.g., PUSCH transmissions, transport block, PUCCH transmissions, SRS, and/or the like) associated with the first CORESET pool index. For example, the one or more configuration parameters may indicate, for an uplink resource (or an uplink resource group/set comprising an uplink resource, the first CORESET pool index. The wireless device may send/transmit, via the uplink resource, an uplink signal (e.g., UCI, HARQ-ACK, SR, CSI report, SRS) based on the first TCI state, for example, based on/in response to the one or more configuration parameters indicating, for the uplink resource (or the uplink resource group/set comprising the uplink resource), the first CORESET pool index. The (active) uplink BWP of the cell may comprise the uplink resource. The uplink resource may be a PUCCH resource. The uplink signal may be UCI (e.g., UCI, HARQ-ACK, SR, CSI report, and/or the like). The uplink resource may be an SRS resource. The uplink signal may be an SRS. The uplink resource may be a PUSCH resource. The uplink signal may be a PUSCH transmission (e.g., a transport block) of a configured uplink grant (e.g., type 1 configured uplink grant). Transmission of the uplink signal via the uplink resource may be associated with the first CORESET pool index, for example, based on the one or more configuration parameters indicating, for the uplink resource (or the uplink resource group/set comprising the uplink resource), the first CORESET pool index.

The wireless device may receive, via a CORESET with the first CORESET pool index, DCI triggering/scheduling transmission of an uplink signal (e.g., PUSCH transmission, transport block, SRS, HARQ-ACK). The plurality of CORESETs may comprise the CORESET. The uplink signal may be associated with the first CORESET pool index, for example, based on the receiving the DCI via the CORESET with the first CORESET pool index. The wireless device may send/transmit the uplink signal based on the first TCI state, for example, based on/in response to the uplink signal being associated with the first CORESET pool index.

The wireless device may receive a second control command (e.g., MAC CE, DCI, downlink control command/message, unified TCI states activation/deactivation MAC CE, activation command, and/or the like). For example, the wireless device may receive an activation command 1912 at time T3 in FIG. 19.

The second control command may activate/select/indicate/update (or indicate activation of) a second subset of TCI states of the plurality of TCI states (e.g., indicated by the higher layer parameter DLorJoint-TCIState). The second control command may activate/select/indicate/update (or indicate activation of) a second subset of TCI states of the second plurality of TCI states (e.g., indicated by the higher layer parameter UL-TCIState).

The second control command may comprise a field (e.g., CoresetPoolID) with/indicating a second CORESET pool index/indicator/identifier (e.g., Coreset pool index 1 in FIG. 19). A value in/of the field may be equal to the second CORESET pool index. The second CORESET pool index may be equal to one (or any other second value). The second subset of TCI states may be associated with the second CORESET pool index. The second subset of TCI states may be associated with the second CORESET pool index, for example, based on the second control command, indicating activation of the second subset of TCI states, comprising the field with/indicating the second CORESET pool index. The wireless device may activate the second subset of TCI states for the second CORESET pool index.

The wireless device may map the second subset of TCI states to one or more second TCI codepoints. The wireless device may map respective TCI state(s) of the second subset of TCI states to a respective TCI codepoint of the one or more second TCI codepoints. The one or more second TCI codepoints may indicate/comprise (or may be mapped to) the second subset of TCI states. Each TCI codepoint of the one or more second TCI codepoints may indicate (or may be mapped to) respective TCI state(s) of the second subset of TCI states. Each TCI codepoint of the one or more second TCI codepoints may indicate/comprise (or be mapped to) one or more TCI states. The one or more second TCI codepoints may be associated with the second CORESET pool index.

For example, as shown in FIG. 19, the second subset of TCI states may comprise TCI state 8, TCI state 61, and TCI state 21. The one or more second TCI codepoints may/be comprise a first TCI codepoint (e.g., TCI codepoint 000), a second TCI codepoint (e.g., TCI codepoint 001), and/or a third TCI codepoint (e.g., TCI codepoint 110). The first TCI codepoint (e.g., TCI codepoint 000) may comprise/indicate the TCI state 8. The second TCI codepoint (e.g., TCI codepoint 001) may comprise/indicate the TCI state 61. The third TCI codepoint (e.g., TCI codepoint 110) may comprise/indicate the TCI state 21. For example, the first TCI codepoint (e.g., TCI codepoint 000), the second TCI codepoint (e.g., TCI codepoint 001), and/or the third TCI codepoint (e.g., TCI codepoint 110) may each indicate a respective single TCI state (e.g., a single joint TCI state, a single uplink TCI state, a single downlink TCI state, and/or the like).

A quantity of the one or more second TCI codepoints may be equal to one. The one or more second TCI codepoints may be/comprise a (single) TCI codepoint. The (single) TCI codepoint may indicate a second TCI state of the plurality of TCI states. The second subset of TCI states may be/comprise the second TCI state. The wireless device may not receive DCI indicating activation of one or more TCI states among the second subset of TCI states, for example, based on the quantity of the one or more second TCI codepoints being equal to one. The wireless device may not receive DCI indicating activation of one or more TCI states among the second subset of TCI states, for example, based on the second control command indicating activation of the second TCI state.

A quantity of the one or more second TCI codepoints may be greater than one. The wireless device may receive, via a second CORESET (e.g., CORESET 2 as shown in FIG. 19) with the second CORESET pool index (e.g., CORESET pool index 1), second DCI (e.g., DCI 1916 at time T4 in FIG. 19). The one or more configuration parameters may indicate, for the second CORESET, the second CORESET pool index. The plurality of CORESETs may comprise the second CORESET.

The second DCI may correspond to a DCI format 1_1. The second DCI may correspond to a DCI format 1_2. The second DCI may correspond to a DCI format 1_x, where x=0, 1, 2 . . . The second DCI may correspond to a DCI format 0_x, where x=0, 1, 2 . . . .

The second DCI may comprise a second TCI field. The second TCI field may indicate a second TCI codepoint in/of the one or more second TCI codepoints. The second TCI field may indicate the second TCI codepoint of the one or more second TCI codepoints associated with the second CORESET pool index, for example, based on the receiving the second DCI via the second CORESET with the second CORESET pool index. A value of the second TCI field (e.g., 001 as shown in FIG. 19) may be equal to the second TCI codepoint. The value of the second TCI field may indicate the second TCI codepoint. The second TCI codepoint (e.g., 001) may indicate/comprise (or may be mapped to) a second TCI state (e.g., TCI state 61 as shown in FIG. 19). The second subset of TCI states may comprise the second TCI state. The second DCI may indicate activation of (or may activate) the second TCI state. The second TCI field in/of the second DCI may indicate the second TCI state in the second subset of TCI states, for example, based on the receiving the second DCI via the second CORESET with the second CORESET pool index. The second TCI field in/of the second DCI may indicate the second TCI state in the second subset of TCI states, for example, based on the second control command, that indicates activation of the second subset of TCI states, comprising the field with the second CORESET pool index (that is the same as that of the second CORESET). The second TCI state may be associated with (or may be activated for) the second CORESET pool index.

The second TCI state may be associated with downlink receptions and/or uplink transmissions associated with the second CORESET pool index. The second TCI state may be associated with the downlink receptions and/or uplink transmissions associated with the second CORESET pool index, for example, based on the receiving, via the second CORESET with the second CORESET pool index, the second DCI indicating activation of the second TCI state.

The wireless device may apply the second TCI state to downlink receptions (e.g., PDSCH receptions, transport block, PDCCH receptions, CSI-RS, DM-RS, and/or the like) associated with the second CORESET pool index. For example, the one or more configuration parameters may indicate, for a CORESET of the plurality of CORESETs, the second CORESET pool index. The wireless device may monitor downlink control channels in the CORESET based on the second TCI state, for example, based on/in response to the one or more configuration parameters indicating, for the CORESET, the second CORESET pool index. For example, the wireless device may receive, via a CORESET with the second CORESET pool index, DCI scheduling a downlink signal (e.g., PDSCH transmission, transport block, DM-RS, CSI-RS, aperiodic CSI-RS). The plurality of CORESETs may comprise the CORESET. The downlink signal may be associated with the second CORESET pool index, for example, based on the receiving the DCI via the CORESET with the second CORESET pool index. The wireless device may receive the downlink signal based on the second TCI state, for example, based on/in response to the downlink signal being associated with the second CORESET pool index. For example, the wireless device may receive a downlink signal (e.g., PDSCH transmission, transport block, DM-RS, CSI-RS, aperiodic CSI-RS) based on the second TCI state, for example, based on/in response to the one or more configuration parameters indicating, for the downlink signal (or a resource set comprising the downlink signal), the second CORESET pool index.

The wireless device may apply the second TCI state to uplink transmissions (e.g., PUSCH transmissions, transport block, PUCCH transmissions, SRS, and/or the like) associated with the second CORESET pool index. For example, the one or more configuration parameters may indicate, for an uplink resource (or an uplink resource group/set comprising an uplink resource), the second CORESET pool index. The wireless device may send/transmit, via the uplink resource, an uplink signal (e.g., UCI, HARQ-ACK, SR, CSI report, SRS, and/or the like) based on the second TCI state, for example, based on/in response to the one or more configuration parameters indicating, for the uplink resource (or the uplink resource group/set comprising the uplink resource), the second CORESET pool index. The (active) uplink BWP of the cell may comprise the uplink resource. The uplink resource may be a PUCCH resource. The uplink signal may comprise UCI (e.g., UCI, HARQ-ACK, SR, CSI report). The uplink resource may be an SRS resource. The uplink signal may be an SRS. The uplink resource may be a PUSCH resource. The uplink signal may be a PUSCH transmission (e.g., transport block) of a configured uplink grant (e.g., type 1 configured uplink grant). Transmission of the uplink signal via the uplink resource may be associated with the second CORESET pool index, for example, based on the one or more configuration parameters indicating, for the uplink resource (or the uplink resource group/set comprising the uplink resource), the second CORESET pool index.

The wireless device may receive, via a CORESET with the second CORESET pool index, DCI triggering/scheduling transmission of an uplink signal (e.g., PUSCH transmission, transport block, SRS, HARQ-ACK, and/or the like). The plurality of CORESETs may comprise the CORESET. The uplink signal may be associated with the second CORESET pool index, for example, based on the receiving the DCI via the CORESET with the second CORESET pool index. The wireless device may send/transmit the uplink signal based on the second TCI state, for example, based on/in response to the uplink signal being associated with the second CORESET pool index.

The first TCI state may comprise/indicate a first reference signal (e.g., CSI-RS, SSB/PBCH block, DM-RS, SRS, and/or the like). The first TCI state may comprise/indicate a first quasi co-location type (e.g., QCL TypeA, QCL TypeB, QCL TypeC, QCL TypeD).

The first TCI state may be associated with the PCI of the cell. The first TCI state may or may not comprise/have/be associated with an additional PCI index of the at least one additional PCI index. An additional PCI index may be absent in configuration parameter(s) of the first TCI state. The one or more configuration parameters may comprise the configuration parameter(s) of the first TCI state. The first TCI state may be associated with the PCI of the cell, for example, based on the first TCI state not comprising/having an additional PCI index of the at least one additional PCI index. The first reference signal may be quasi co-located with a first SS/PBCH block. The first reference signal may be a first SS/PBCH block. The first reference signal may be quasi co-located with a first CSI-RS that is quasi co-located with a first SS/PBCH block. The first SS/PBCH block may be associated with the cell. The first SS/PB CH block may be associated with the PCI of the cell. The one or more configuration parameters may indicate, for the cell, the first SS/PBCH block.

The first TCI state may be associated with a second PCI of a second cell. The at least one cell of the one or more cells may comprise the second cell. The at least one PCI in (or indicated by) the list of PCI sets may comprise the second PCI. The second PCI may indicate/identify the second cell. The first TCI state may comprise/have/be associated with an additional PCI index of the at least one additional PCI index. The one or more configuration parameters may indicate, for the first TCI state, the additional PCI index. The additional PCI index may indicate a PCI set of the list of PCI sets. The PCI set may comprise/indicate the second PCI of the second cell. The first TCI state may be associated with the second PCI of the second cell, for example, based on the first TCI state comprising/having/being associated with the additional PCI index indicating the second PCI of the second cell. The first TCI state may be associated with the second PCI of the second cell, for example, based on the one or more configuration parameters indicating, for the first TCI state, the additional PCI index that indicates the second PCI of the second cell. The first reference signal may be quasi co-located with a first SS/PBCH block. The first reference signal may be a first SS/PBCH block. The first reference signal may be quasi co-located with a first CSI-RS that is quasi co-located with a first SS/PBCH block. The first SS/PBCH block may be associated with the second cell. The first SS/PBCH block may be associated with the second PCI of the second cell. The one or more configuration parameters may indicate, for the second cell, the first SS/PBCH block.

The second TCI state may comprise/indicate a second reference signal (e.g., CSI-RS, SSB/PBCH block, DM-RS, SRS, and/or the like). The second TCI state may comprise/indicate a second quasi co-location type (e.g., QCL TypeA, QCL TypeB, QCL TypeC, QCL TypeD).

The second TCI state may be associated with the PCI of the cell. The second TCI state may or may not comprise/have an additional PCI index of the at least one additional PCI index. An additional PCI index may be absent in configuration parameter(s) of the second TCI state. The one or more configuration parameters may comprise the configuration parameter(s) of the second TCI state. The second TCI state may be associated with the PCI of the cell, for example, based on the second TCI state not comprising/having/indicating an additional PCI index of the at least one additional PCI index. The second reference signal may be quasi co-located with a second SS/PBCH block. The second reference signal may be a second SS/PBCH block. The second reference signal may be quasi co-located with a second CSI-RS that is quasi co-located with a second SS/PBCH block. The second SS/PBCH block may be associated with the cell. The second SS/PBCH block may be associated with the PCI of the cell. The one or more configuration parameters may indicate, for the cell, the second SS/PBCH block.

The second TCI state may be associated with a second PCI of a second cell. The at least one cell of the one or more cells may comprise the second cell. The at least one PCI in (or indicated by) the list of PCI sets may comprise the second PCI. The second PCI may indicate/identify the second cell. The second TCI state may comprise/have/indicate an additional PCI index of the at least one additional PCI index. The one or more configuration parameters may indicate, for the second TCI state, the additional PCI index. The additional PCI index may indicate a PCI set of the list of PCI sets. The PCI set may comprise/indicate the second PCI of the second cell. The second TCI state may be associated with the second PCI of the second cell, for example, based on the second TCI state comprising/having/indicating the additional PCI index indicating the second PCI of the second cell. The second TCI state may be associated with the second PCI of the second cell, for example, based on the one or more configuration parameters indicating, for the second TCI state, the additional PCI index that indicates the second PCI of the second cell. The second reference signal may be quasi co-located with a second SS/PBCH block. The second reference signal may be a second SS/PBCH block. The second reference signal may be quasi co-located with a second CSI-RS that is quasi co-located with a second SS/PBCH block. The second SS/PBCH block may be associated with the second cell. The second SS/PBCH block may be associated with the second PCI of the second cell. The one or more configuration parameters may indicate, for the second cell, the second SS/PBCH block.

The second cell with (or identified/indicated by) the second PCI may be a non-serving cell. The second cell with (or identified/indicated by) the second PCI may be a neighboring cell. The second cell with (or identified/indicated by) the second PCI may be a candidate/assisting cell.

The one or more configuration parameters may indicate, for the first TCI state, a first TCI state index (e.g., indicated by a higher layer parameter tci-StateId). The one or more configuration parameters may indicate, for the second TCI state, a second TCI state index. The first TCI state index may be lower/less than the second TCI state index.

The control command (e.g., the activation command 1808) indicating activation of the subset of TCI states may comprise a plurality of fields. A first field of the plurality of fields may indicate the first TCI state. For example, the first field may comprise the first TCI state index indicating/identifying the first TCI state. The first field may occur/be (or be located) in a first octet of the control command (or any other position within the control command). A second field of the plurality of fields may indicate the second TCI state. For example, the second field may comprise the second TCI state index indicating/identifying the second TCI state. The second field may occur/be (or be located) in a second octet of the control command (or any other second position within the control command). The first octet may be lower/less (e.g., may be located before) than the second octet. For example, the first octet may be octet 5 of the control command, and the second octet may be octet 6 of the control command. The first octet may be octet 1 of the control command, and the second octet may be octet 2 of the control command. The first octet may be octet 9 of the control command, and the second octet may be octet 10 of the control command. The base station may order the first TCI state index and the second TCI state index according to (or based on) an ordinal position in the control command. For example, octet n of the control command may comprise the first TCI state index identifying/indicating the first TCI state, and octet m of the control command may comprise the second TCI state index identifying/indicating the second TCI state, where $n<m$.

The control command may indicate/map/activate a list/set/vector of the at least two TCI states in/to/for the TCI codepoint. The control command may indicate mapping/association/activation of the list/set/vector of the at least two TCI states to/for the TCI codepoint. The at least two TCI states may comprise the first TCI state and the second TCI state. The first TCI state may occur first in the list/set/vector of the at least two TCI states. The first TCI state may be a first (e.g., starting/earliest/initial) TCI state in the list/set/vector of the at least two TCI states. The second TCI state may occur second in the list/set/vector of the at least two TCI states. The second TCI state may be a last (e.g., latest/ending) TCI state in the list/set/vector of the at least two TCI states. The first TCI state may be TCI state 5 and the second TCI state may be TCI state 8, for example, if the list/set/vector of the at least two TCI states comprises TCI state 5 and TCI state 8. The first TCI state may be TCI state 26 and the second TCI state may be TCI state 61, for example, if the list/set/vector of the at least two TCI states comprises TCI state 26, TCI state 61.

The wireless device may apply the first TCI state to one or more first uplink channels/resources of the cell. The wireless device may send/transmit, via the one or more first uplink channels/resources, uplink signals based on the first TCI state. The wireless device may send/transmit, via each uplink channel/resource of the one or more first uplink channels/resources, a respective uplink signal of the uplink signals based on the first TCI state.

The wireless device may send/transmit, via the one or more first uplink channels/resources, the uplink signals with transmission power(s) determined based on the first TCI state. The wireless device may send/transmit, via each uplink channel/resource of the one or more first uplink channels/resources, an uplink signal with a respective transmission power determined based on the first TCI state. The wireless device may send/transmit, via a first uplink channel/resource of the one or more first uplink channels/resources, a first uplink signal with/using a first transmission power determined based on the first TCI state. The wireless device may determine the first transmission power based on one or more first power control parameters (e.g., target received power, pathloss compensation factor, closed-loop index, pathloss reference signal, and/or the like) associated with (e.g., mapped to, indicated by, or included in) the first TCI state. The wireless device may send/transmit, via a second uplink channel/resource of the one or more first uplink channels/resources, a second uplink signal with/using a second transmission power determined based on the first TCI state. The wireless device may determine the second transmission power based on one or more first power control parameters (e.g., target received power, pathloss compensation factor, closed-loop index, pathloss reference signal, and/or the like) associated with (e.g., mapped to, indicated by, or included in) the first TCI state.

The wireless device may send/transmit, via the one or more first uplink channels/resources, the uplink signals with/using a first spatial domain transmission filter/beam determined based on the first TCI state. The wireless device may send/transmit, via each uplink channel/resource of the one or more first uplink channels/resources, a respective uplink signal with/using the first spatial domain transmission filter/beam determined based on the first TCI state. For example, the wireless device may transmit, via a first uplink channel/resource of the one or more first uplink channels/resources, a first uplink signal with/using the first spatial domain transmission filter/beam determined based on the first TCI state. At least one DMRS antenna port of the first uplink signal may be quasi co-located with the first reference signal indicated by the first TCI state. The wireless device may transmit, via a second uplink channel/resource of the one or more first uplink channels/resources, a second uplink signal with/using the first spatial domain transmission filter/beam determined based on the first TCI state. At least one DMRS antenna port of the second uplink signal may be quasi co-located with the first reference signal indicated by the first TCI state The one or more first uplink channels/resources may be/comprise a PUSCH resource. The one or more first uplink channels/resources may be/comprise one or more first PUSCH resources. The one or more first uplink channels/resources may be/comprise (e.g., may be used for) one or more first PUSCH transmissions.

The wireless device may receive, via a first CORESET, first DCI scheduling a first PUSCH transmission. The plurality of CORESETs may comprise the first CORESET. The first DCI may comprise a field (e.g., an SRS resource set indicator field, a TRP field, a CORESET pool index field, an additional PCI index, a BFD set index, a unified TCI state indicator field, a joint TCI state indicator field, an uplink TCI state indicator field, panel index, capability set index, and/or the like). The field may comprise/indicate a first value (e.g., 0, 00, 10, 11). The first value may indicate the first TCI state. The wireless device may transmit/perform, based on the first TCI state, the first PUSCH transmission, for example, based on/in response to the first DCI comprising the field with the first value indicating the first TCI state. The one or more first uplink channels/resources may comprise PUSCH transmissions scheduled by DCIs comprising the field with the first value. Each DCI of the DCIs may schedule one or more PUSCH transmissions of the PUSCH transmissions.

The first CORESET may be associated with the first CORESET pool index (e.g., CoresetPoolIndex=0). For example, the one or more configuration parameters may indicate, for the first CORESET, the first CORESET pool index. For example, the one or more configuration parameters may not indicate, for the first CORESET, a CORESET pool index. The wireless device may transmit/perform, based on the first TCI state, the first PUSCH transmission, for example, in response to receiving the first DCI scheduling the first PUSCH transmission via the first CORESET with the first CORESET pool index. The one or more first uplink channels/resources may be/comprise the first PUSCH transmission. The one or more first uplink channels/resources may be/comprise PUSCH transmissions scheduled by DCIs received via one or more first CORESETs with the first CORESET pool index. The plurality of CORESETs may comprise the one or more first CORESETs.

The one or more configuration parameters may comprise/indicate, for a configured uplink grant, a field (e.g., SRS resource set indicator field, TRP field, CORESET pool index field, additional PCI index, BFD set index, unified TCI state indicator field, joint TCI state indicator field, uplink TCI state indicator field, panel index, capability set index, and/or the like). The field may comprise a first value (e.g., 0, 00, 10, 11) indicating the first TCI state. The wireless device may transmit/perform, based on the first TCI state, PUSCH transmissions of/for the configured uplink grant. The wireless device may transmit/perform, based on the first TCI state, the PUSCH transmissions of/for the configured uplink grant, for example, based on/in response to the one or more configuration parameters indicating, for the configured uplink grant, the field with the first value that indicates the first TCI state. The configured uplink grant may be, for example, a type 1 configured uplink grant. The one or more first uplink channels/resources may comprise the PUSCH transmissions of/for the configured uplink grant.

The one or more first uplink channels/resources may be/comprise PUCCH resource(s). The one or more first uplink channels/resources may be/comprise one or more first PUCCH resources. The one or more first uplink channels/ resources may be/comprise one or more first PUCCH resource sets/groups. The one or more first uplink channels/resources may be/comprise one or more first PUCCH transmissions.

The one or more configuration parameters may indicate, for a first PUCCH resource, a field (e.g., SRS resource set indicator field, TRP field, CORESET pool index field, additional PCI index, BFD set index, unified TCI state indicator field, joint TCI state indicator field, uplink TCI state indicator field, panel index, capability set index, and the like). The field may indicate/comprise a first value (e.g., 0, 00, 10, 11) indicating the first TCI state. The wireless device may send/transmit, based on the first TCI state, an uplink signal (e.g., SR, HARQ-ACK, CSI report, uplink control information) via the first PUCCH resource. The wireless device may send/transmit, based on the first TCI state, the uplink signal via the first PUCCH resource, for example, based on/in response to the one or more configuration parameters indicating, for the first PUCCH resource, the field with the first value that indicates the first TCI state. The one or more first uplink channels/resources may comprise PUCCH transmissions via the first PUCCH resource.

The one or more configuration parameters may indicate, for a first PUCCH resource set/group, a field (e.g., SRS resource set indicator field, TRP field, CORESET pool index field, additional PCI index, BFD set index, unified TCI state indicator field, joint TCI state indicator field, uplink TCI state indicator field, panel index, capability set index, and/or the like). The field may comprise/indicate a first value (e.g., 0, 00, 10, 11) indicating the first TCI state. The wireless device may send/transmit, based on the first TCI state, an uplink signal (e.g., SR, HARQ-ACK, CSI report, uplink control information) via a PUCCH resource in the first PUCCH resource set/group. The wireless device may send/transmit, based on the first TCI state, the uplink signal via the PUCCH resource in the first PUCCH resource set/group, for example, based on/in response to the one or more configuration parameters indicating/comprising, for the first PUCCH resource set/group, the field with the first value indicating the first TCI state. The wireless device may send/transmit, based on the first TCI state, a respective uplink signal (e.g., SR, HARQ-ACK, CSI report, uplink control information) via each PUCCH resource in the first PUCCH resource set/group, for example, based on/in response to the one or more configuration parameters indicating, for the first PUCCH resource set/group, the field with the first value indicating the first TCI state. The one or more first uplink channels/resources may comprise PUCCH transmissions via each PUCCH resource in the first PUCCH resource set/group.

The wireless device may receive, via a first CORESET, first DCI. The first DCI may trigger/schedule transmission of a first PUCCH transmission (e.g., HARQ-ACK feedback transmission). The first DCI may schedule a PDSCH reception. The first DCI may indicate SCell dormancy. The first DCI may indicate SPS PDSCH release. The first DCI may indicate activation of a unified TCI state. The plurality of CORESETs may comprise the first CORESET. The first DCI may comprise a field (e.g., SRS resource set indicator field, TRP field, CORESET pool index field, additional PCI index, BFD set index, unified TCI state indicator field, joint TCI state indicator field, uplink TCI state indicator field, panel index, capability set index, and/or the like). The field may comprise a first value (e.g., 0, 00, 10, 11) indicating the first TCI state. The wireless device may transmit/perform, based on the first TCI state, the first PUCCH transmission. The wireless device may transmit/perform, based on the first TCI state, the first PUCCH transmission, for example, based on/in response to the first DCI comprising the field with the first value indicating the first TCI state. The one or more first uplink channels/resources may comprise PUCCH transmissions triggered/scheduled by DCIs comprising the field with the first value.

The first CORESET may be associated with the first CORESET pool index (e.g., CoresetPoolIndex=0). For example, the one or more configuration parameters may indicate, for the first CORESET, the first CORESET pool index. The one or more configuration parameters may not indicate, for the first CORESET, a CORESET pool index. The wireless device may transmit/perform, based on the first TCI state, the first PUCCH transmission. The wireless device may transmit/perform, based on the first TCI state, the first PUCCH transmission, for example, based on/in response to receiving the first DCI triggering/scheduling the first PUCCH transmission via the first CORESET with the first CORESET pool index. The one or more first uplink channels/resources may comprise PUCCH transmissions triggered/scheduled by DCIs received via one or more first CORESETs with the first CORESET pool index. The plurality of CORESETs may comprise the one or more first CORESETs.

The one or more first uplink channels/resources may be/comprise SRS resources. The one or more first uplink channels/resources may be/comprise one or more first SRS resources. The one or more first uplink channels/resources may be/comprise one or more first SRS resource sets/groups. The one or more first uplink channels/resources may comprise one or more first SRS transmissions.

The one or more configuration parameters may indicate, for a first SRS resource, a field (e.g., SRS resource set indicator field, TRP field, CORESET pool index field, additional PCI index, BFD set index, unified TCI state indicator field, joint TCI state indicator field, uplink TCI state indicator field, panel index, capability set index, and/or the like). The field may comprise/indicate a first value (e.g., 0) indicating the first TCI state. The wireless device may send/transmit, based on the first TCI state, an SRS via the first SRS resource. The wireless device may send/transmit, based on the first TCI state, the SRS via the first SRS resource, for example, based on/in response to the one or more configuration parameters indicating, for the first SRS resource, the field with the first value that indicates the first TCI state. The one or more first uplink channels/resources may comprise SRS transmissions via the first SRS resource.

The one or more configuration parameters may indicate, for a first SRS resource set/group, a field (e.g., SRS resource set indicator field, TRP field, CORESET pool index field, additional PCI index, BFD set index, unified TCI state indicator field, joint TCI state indicator field, uplink TCI state indicator field, panel index, capability set index, and/or the like). The field may comprise/indicate a first value (e.g., 0, 00, 10, 11) indicating the first TCI state. The wireless device may send/transmit, based on the first TCI state, an SRS via an SRS resource in the first SRS resource set/group. The wireless device may send/transmit, based on the first TCI state, the SRS via the SRS resource in the first SRS resource set/group, for example, based on/in response to the one or more configuration parameters indicating, for the first SRS resource set/group, the field with the first value that indicates the first TCI state. The wireless device may send/transmit, based on the first TCI state, a respective SRS via each SRS resource in the first SRS resource set/group. The wireless device may send/transmit, based on the first TCI state, the respective SRS via each SRS resource in the first SRS resource set/group, for example, based on/in response to the one or more configuration parameters indicating, for the first SRS resource set/group, the field with the first value that indicates the first TCI state. The one or more first uplink channels/resources may comprise SRS transmissions via each SRS resource in the first SRS resource set/group.

The wireless device may receive, via a first CORESET, a first DCI triggering/scheduling transmission of an SRS. The SRS may be an aperiodic SRS. The SRS may be a semi-persistent SRS. The plurality of CORESETs may comprise the first CORESET. The first DCI may comprise a field (e.g., SRS resource set indicator field, TRP field, CORESET pool index field, additional PCI index, BFD set index, unified TCI state indicator field, joint TCI state indicator field, uplink TCI state indicator field, panel index, capability set index, and/or the like). The field may comprise/indicate a first value (e.g., 0, 00, 10, 11) indicating the first TCI state. The wireless device may send/transmit, based on the first TCI state, the SRS. The wireless device may send/transmit, based on the first TCI state, the SRS, for example, based on/in response to the first DCI comprising the field with the first value indicating the first TCI state. The one or more first uplink channels/resources may comprise SRS transmissions triggered/scheduled by DCIs comprising the field with the first value.

The first CORESET may be associated with the first CORESET pool index (e.g., CoresetPoolIndex=0). For example, the one or more configuration parameters may indicate, for the first CORESET, the first CORESET pool index. The one or more configuration parameters may not indicate, for the first CORESET, a CORESET pool index. The wireless device may send/transmit, based on the first TCI state, the SRS. The wireless device may send/transmit, based on the first TCI state, the SRS, for example, based on/in response to receiving the first DCI triggering/scheduling the transmission of the SRS via the first CORESET with the first CORESET pool index. The one or more first uplink channels/resources may comprise SRS transmissions triggered/scheduled by DCIs received via one or more first CORESETs with the first CORESET pool index. The plurality of CORESETs may comprise the one or more first CORESETs.

The wireless device may apply the second TCI state to one or more second uplink channels/resources of the cell. The wireless device may send/transmit, via the one or more second uplink channels/resources, uplink signals based on the second TCI state. The wireless device may send/transmit, via each uplink channel/resource of the one or more second uplink channels/resources and based on the second TCI state, a respective uplink signal of the uplink signals.

The wireless device may send/transmit, via the one or more second uplink channels/resources, the uplink signals using determined transmission power(s). The transmission power(s) may be determined based on the second TCI state. The wireless device may send/transmit, via each uplink channel/resource of the one or more second uplink channels/resources, an uplink signal with a respective transmission power determined based on the second TCI state. For example, the wireless device may transmit, via a first uplink channel/resource of the one or more second uplink channels/resources, a first uplink signal using a first transmission power determined based on the second TCI state. The wireless device may determine the first transmission power based on one or more second power control parameters (e.g., target received power, pathloss compensation factor, closed-loop index, pathloss reference signal) associated with (e.g., mapped to, indicated by, and/or included in) the second TCI state. The wireless device may transmit, via a second uplink channel/resource of the one or more second uplink channels/resources, a second uplink signal u sing a second transmission power determined based on the second TCI state. The wireless device may determine the second transmission power based on one or more second power control parameters (e.g., target received power, pathloss compensation factor, closed-loop index, pathloss reference signal) associated with (e.g., mapped to, indicated by, and/or included in) the second TCI state.

The wireless device may send/transmit, via the one or more second uplink channels/resources, the uplink signals using a second spatial domain transmission filter/beam. The second spatial domain transmission filter/beam may be determined based on the second TCI state. The wireless device may transmit, via each uplink channel/resource of the one or more second uplink channels/resources, a respective uplink signal using the second spatial domain transmission filter/beam determined based on the second TCI state. For example, the wireless device may transmit, via a first uplink channel/resource of the one or more second uplink channels/resources, a first uplink signal using the second spatial domain transmission filter/beam determined based on the second TCI state. At least one DMRS antenna port of the first uplink signal may be quasi co-located with the second reference signal indicated by the second TCI state. The wireless device may transmit, via a second uplink channel/resource of the one or more second uplink channels/resources, a second uplink signal using the second spatial domain transmission filter/beam determined based on the second TCI state. At least one DMRS antenna port of the second uplink signal may be quasi co-located with the second reference signal indicated by the second TCI state.

The one or more second uplink channels/resources may comprise PUSCH resources. The one or more second uplink channels/resources may be/comprise one or more second PUSCH resources. The one or more second uplink channels/resources may comprise one or more second PUSCH transmissions.

The wireless device may receive, via a second CORESET, second DCI. The second DCI may schedule a second PUSCH transmission. The plurality of CORESETs may comprise the second CORESET. The second DCI may comprise a field (e.g., SRS resource set indicator field, TRP field, CORESET pool index field, additional PCI index, BFD set index, unified TCI state indicator field, joint TCI state indicator field, uplink TCI state indicator field, panel index, capability set index, and/or the like). The field may indicate/comprise a second value (e.g., 1, 01, 10, 11) indicating the second TCI state. The wireless device may send/perform, based on the second TCI state, the second PUSCH transmission. The wireless device may send/perform, based on the second TCI state, the second PUSCH transmission, for example, based on/in response to the second DCI comprising the field with the second value indicating the second TCI state. The one or more second uplink channels/resources may comprise PUSCH transmissions scheduled by DCIs comprising the field with the second value. Each DCI of the DCIs may schedule one or more PUSCH transmissions of the PUSCH transmissions.

The second CORESET may be associated with the second CORESET pool index (e.g., CoresetPoolIndex=1). For example, the one or more configuration parameters may indicate, for the second CORESET, the second CORESET pool index. The wireless device may send/perform, based on the second TCI state, the second PUSCH transmission, for example, based on/in response to receiving the second DCI scheduling the second PUSCH transmission via the second CORESET with the second CORESET pool index. The one or more second uplink channels/resources may comprise PUSCH transmissions scheduled by DCIs received via one or more second CORESETs with the second CORESET pool index. The plurality of CORESETs may comprise the one or more second CORESETs.

The one or more configuration parameters may indicate, for a configured uplink grant, a field (e.g., SRS resource set indicator field, TRP field, CORESET pool index field, additional PCI index, BFD set index, unified TCI state indicator field, joint TCI state indicator field, uplink TCI state indicator field, panel index, capability set index, and/or the like). with the field may indicate/comprise a second value (e.g., 1, 01, 10, 11) indicating the second TCI state. The wireless device may send/perform, based on the second TCI state, PUSCH transmissions of/for the configured uplink grant. The wireless device may send/perform, based on the second TCI state, PUSCH transmissions of/for the configured uplink grant, for example, based on/in response to the one or more configuration parameters indicating, for the configured uplink grant, the field with the second value that indicates the second TCI state. The configured uplink grant may be, for example, a type 1 configured uplink grant. The one or more second uplink channels/resources may comprise the PUSCH transmissions of/for the configured uplink grant.

The one or more second uplink channels/resources may be/comprise PUCCH resource(s). The one or more second uplink channels/resources may be/comprise one or more second PUCCH resources. The one or more second uplink channels/resources may be/comprise one or more second PUCCH resource sets/groups. The one or more second uplink channels/resources may comprise one or more second PUCCH transmissions.

The one or more configuration parameters may indicate, for a second PUCCH resource, a field (e.g., SRS resource set indicator field, TRP field, CORESET pool index field, additional PCI index, BFD set index, unified TCI state indicator field, joint TCI state indicator field, uplink TCI state indicator field, panel index, capability set index, and/or the like). The field may indicate/comprise a second value (e.g., 1, 01, 10, 11) indicating the second TCI state. The wireless device may send/transmit, based on the second TCI state, an uplink signal (e.g., SR, HARQ-ACK, CSI report, uplink control information) via the second PUCCH resource. The wireless device may send/transmit, based on the second TCI state, the uplink signal via the second PUCCH resource, for example, based on/in response to the one or more configuration parameters indicating, for the second PUCCH resource, the field with the second value that indicates the second TCI state. The one or more second uplink channels/resources may comprise PUCCH transmissions via the second PUCCH resource.

The one or more configuration parameters may indicate, for a second PUCCH resource set/group, a field (e.g., SRS resource set indicator field, TRP field, CORESET pool index field, additional PCI index, BFD set index, unified TCI state indicator field, joint TCI state indicator field, uplink TCI state indicator field, panel index, capability set index, and/or the like). The field may comprise/indicate a second value (e.g., 1, 01, 10, 11) indicating the second TCI state. The wireless device may send/transmit, based on the second TCI state, an uplink signal (e.g., SR, HARQ-ACK, CSI report, uplink control information) via a PUCCH resource in the second PUCCH resource set/group. The wireless device may send/transmit, based on the second TCI state, the uplink signal via the PUCCH resource in the second PUCCH resource set/group, for example, based on/in response to the one or more configuration parameters indicating, for the second PUCCH resource set/group, the field with the second value that indicates the second TCI state. The wireless device may send/transmit, based on the second TCI state, a respective uplink signal (e.g., SR, HARQ-ACK, CSI report, uplink control information) via each PUCCH resource in the second PUCCH resource set/group, for example, based on/in response to the one or more configuration parameters indicating, for the second PUCCH resource set/group, the field with the second value that indicates the second TCI state. The one or more second uplink channels/resources may comprise PUCCH transmissions via each PUCCH resource in the second PUCCH resource set/group.

The wireless device may receive, via a second CORESET, second DCI. The second DCI may trigger/schedule transmission of a second PUCCH transmission (e.g., HARQ-ACK feedback transmission). The second DCI may schedule a PDSCH reception. The second DCI may indicate SCell dormancy. The second DCI may indicate SPS PDSCH release. The second DCI may indicate activation of a unified TCI state. The plurality of CORESETs may comprise the second CORESET. The second DCI may comprise a field (e.g., SRS resource set indicator field, TRP field, CORESET pool index field, additional PCI index, BFD set index, unified TCI state indicator field, joint TCI state indicator field, uplink TCI state indicator field, panel index, capability set index, and/or the like). The field may indicate/comprise a second value (e.g., 1, 01, 10, 11) indicating the second TCI state. The wireless device may send/perform, based on the second TCI state, the second PUCCH transmission. The wireless device may send/perform, based on the second TCI state, the second PUCCH transmission, for example, based on/in response to the second DCI comprising the field with the second value that indicates the second TCI state. The one or more second uplink channels/resources may comprise PUCCH transmissions triggered/scheduled by DCIs comprising the field with the second value.

The second CORESET may be associated with the second CORESET pool index (e.g., CoresetPoolIndex=1). The one or more configuration parameters may indicate, for the second CORESET, the second CORESET pool index. The wireless device may send/perform, based on the second TCI state, the second PUCCH transmission. The wireless device may send/perform, based on the second TCI state, the second PUCCH transmission, for example, based on/in response to receiving the second DCI triggering/scheduling the second PUCCH transmission via the second CORESET with the second CORESET pool index. The one or more second uplink channels/resources may comprise PUCCH transmissions triggered/scheduled by DCIs received via one or more second CORESETs with the second CORESET pool index. The plurality of CORESETs may comprise the one or more second CORESETs.

The one or more second uplink channels/resources may be/comprise SRS resource(s). The one or more second uplink channels/resources may be/comprise one or more second SRS resources. The one or more second uplink channels/resources may be/comprise one or more second SRS resource sets/groups. The one or more second uplink channels/resources may be/comprise one or more second SRS transmissions.

The one or more configuration parameters may indicate, for a second SRS resource, a field (e.g., SRS resource set indicator field, TRP field, CORESET pool index field, additional PCI index, BFD set index, unified TCI state indicator field, joint TCI state indicator field, uplink TCI state indicator field, panel index, capability set index, and/or the like). The field may comprise/indicate a second value (e.g., 1) indicating the second TCI state. The wireless device may send/transmit, based on the second TCI state, an SRS via the second SRS resource. The wireless device may send/transmit, based on the second TCI state, the SRS via the second SRS resource, for example, based on/in response to the one or more configuration parameters indicating, for the second SRS resource, the field with the second value that indicates the second TCI state. The one or more second uplink channels/resources may comprise SRS transmissions via the second SRS resource.

The one or more configuration parameters may indicate, for a second SRS resource set/group, a field (e.g., SRS resource set indicator field, TRP field, CORESET pool index field, additional PCI index, BFD set index, unified TCI state indicator field, joint TCI state indicator field, uplink TCI state indicator field, panel index, capability set index, and/or the like). with the field may indicate/comprise a second value (e.g., 1) indicating the second TCI state. The wireless device may send/transmit, based on the second TCI state, an SRS via an SRS resource in the second SRS resource set/group. The wireless device may send/transmit, based on the second TCI state, the SRS via the SRS resource in the second SRS resource set/group, for example, based on/in response to the one or more configuration parameters indicating, for the second SRS resource set/group, the field with the second value that indicates the second TCI state. The wireless device may send/transmit, based on the second TCI state, a respective SRS via each SRS resource in the second SRS resource set/group, for example, based on/in response to the one or more configuration parameters indicating, for the second SRS resource set/group, the field with the second value that indicates the second TCI state. The one or more second uplink channels/resources may comprise SRS transmissions via each SRS resource in the second SRS resource set/group.

The wireless device may receive, via a second CORESET, second DCI. The second DCI may trigger/schedule transmission of an SRS. The SRS may be an aperiodic SRS. The SRS may be a semi-persistent SRS. The plurality of CORESETs may comprise the second CORESET. The second DCI may comprise a field (e.g., SRS resource set indicator field, TRP field, CORESET pool index field, additional PCI index, BFD set index, unified TCI state indicator field, joint TCI state indicator field, uplink TCI state indicator field, panel index, capability set index, and/or the like). The field may comprise/indicate a second value (e.g., 1, 01, 10, 11) indicating the second TCI state. The wireless device may send/transmit, based on the second TCI state, the SRS. The wireless device may send/transmit, based on the second TCI state, the SRS, for example, based on/in response to the second DCI comprising the field with the second value indicating the second TCI state. The one or more second uplink channels/resources may comprise SRS transmissions triggered/scheduled by DCIs comprising the field with the second value.

The second CORESET may be associated with the second CORESET pool index (e.g., CoresetPoolIndex=1). The one or more configuration parameters may indicate, for the second CORESET, the second CORESET pool index. The wireless device may send/transmit, based on the second TCI state, the SRS. The wireless device may send/transmit, based on the second TCI state, the SRS, for example, based on/in response to receiving the second DCI triggering/scheduling the transmission of the SRS via the second CORESET with the second CORESET pool index. The one or more second uplink channels/resources may comprise SRS transmissions triggered/scheduled by DCIs received via one or more second CORESETs with the second CORESET pool index. The plurality of CORESETs may comprise the one or more second CORESETs.

Figure 20:
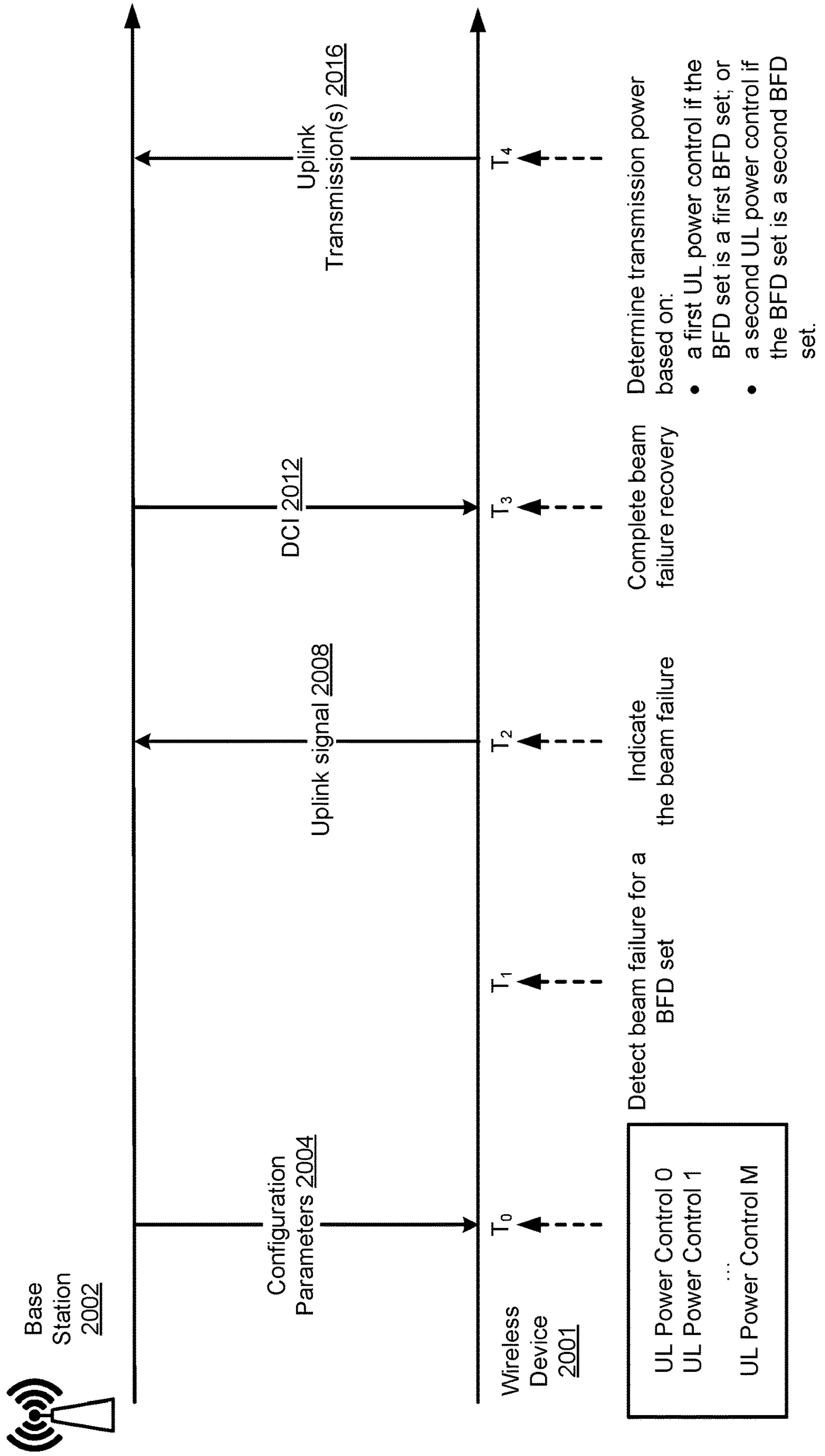
FIG. 20 shows an example beam failure recovery procedure.

FIG. 20 shows an example beam failure recovery procedure. A wireless device (e.g., a wireless device 2001) may receive one or more messages comprising one or more configuration parameters (e.g., at time TO as in FIG. 20). The reception of the one or more configuration parameters at time TO of FIG. 20 may be similar or substantially similar to the reception of the one or more configuration parameters at time TO in FIG. 18. The one or more configuration parameters received at time TO of FIG. 20 may be similar to or substantially similar to the one or more configuration parameters received at time TO in FIG. 18.

The wireless device may detect a beam failure of a BFD set (e.g., at time T1 in FIG. 20). At least two BFD sets may comprise the BFD set. At least two BFD sets may comprise a first BFD set (e.g., $\overline{q}_{0,0}$) and a second BFD set (e.g., $\overline{q}_{0,1}$). The BFD set may be the first BFD set (e.g., $\overline{q}_{0,0}$) of the at least two BFD sets. The BFD set may be the second BFD set (e.g., $\overline{q}_{0,1}$) of the at least two BFD sets.

The wireless device may detect the beam failure based on measuring/assessing one or more reference signals in the BFD set. The wireless device may measure/assess radio link qualities (e.g., BLER, SINR, signal to noise ratio (SNR), RSRP, and/or the like) of/for the one or more reference signals. The wireless device may measure/assess a respective radio link quality of the radio link qualities of/for each reference signal of the one or more reference signals. The radio link qualities may be worse (e.g., higher BLER, lower RSRP, lower SNR, lower SINR, and the like) than a first threshold (e.g., indicated by a higher layer parameter such as rlmInSyncOutOfSyncThreshold). Each radio link quality of a respective reference signal of the one or more reference signals may be worse than the first threshold. A respective radio link quality of each reference signal of the one or more reference signals may be worse than the first threshold. The wireless device may detect the beam failure based on the radio link qualities of the one or more reference signals being worse than the first threshold. The one or more configuration parameters may indicate the first threshold.

The one or more configuration parameters may indicate the at least two BFD sets. The one or more configuration parameters may indicate the BFD set. The one or more configuration parameters may indicate the one or more reference signals for/in the BFD set. The BFD set may comprise the one or more reference signals. The one or more configuration parameters may comprise/indicate a first BFD set parameter (e.g., failureDetectionSet1) indicating the first BFD set (e.g., $\overline{q}_{0,0}$), for example, if the BFD set is the first BFD set (e.g., $\overline{q}_{0,0}$). The first BFD set parameter may indicate the one or more reference signals for beam failure detection of the first BFD set. The first BFD set may comprise the one or more reference signals. The one or more configuration parameters may comprise a second BFD set parameter (e.g., failureDetectionSet2) indicating the second BFD set (e.g., $\overline{q}_{0,1}$), for example, if the BFD set is the second BFD set (e.g., $\overline{q}_{0,1}$). The second BFD set parameter may indicate the one or more reference signals for beam failure detection of the second BFD set. The second BFD set may comprise the one or more reference signals.

The wireless device may receive a MAC CE (e.g., BFD-RS indication MAC CE). The MAC CE may activate/update the one or more reference signals among a plurality of reference signals in/of the BFD set. The one or more configuration parameters may indicate the plurality of reference signals for/in the BFD set. A quantity of the plurality of reference signals in the BFD set may be greater than a maximum quantity of failure detection reference signals (e.g., $N_{BFD}$, $N_{BFD}$=2, 3, 4, etc.). The base station may send/transmit the MAC CE, for example, based on the quantity of the plurality of reference signals being greater than the maximum quantity of failure detection reference signals. The wireless device may start measuring the one or more reference signals for beam failure detection of the BFD set, for example, based on the receiving the MAC CE activating/updating the one or more reference signals for the BFD set.

The one or more configuration parameters may not indicate the at least two BFD sets. The one or more configuration parameters may not indicate the BFD set. The one or more configuration parameters may not indicate the one or more reference signals for/in the BFD set. The one or more configuration parameters may not comprise a first BFD set parameter (e.g., failureDetectionSet1) indicating the first BFD set (e.g., $\overline{q}_{0,0}$), for example, if the BFD set is the first BFD set (e.g., $\overline{q}_{0,0}$). The one or more configuration parameters may not comprise a second BFD set parameter (e.g., failureDetectionSet2) indicating the second BFD set (e.g., $\overline{q}_{0,1}$), for example, if the BFD set is the second BFD set (e.g., $\overline{q}_{0,1}$).

The wireless device may determine the one or more reference signals for BFD of the BFD set. The wireless device may determine the one or more reference signals for BFD of the BFD set, for example, based on the one or more configuration parameters not indicating the BFD set (or not indicating one or more reference signals for/in the BFD set). The wireless device may determine the one or more reference signals based on one or more TCI states of one or more CORESETs. The wireless device may monitor downlink control channels in each CORESET of the one or more CORESETs based on a respective TCI state of the one or more TCI states. Each CORESET of the one or more CORESETs may be associated with (or activated with, by a MAC CE and/or DCI) a respective TCI state of the one or more TCI states. The one or more TCI states may indicate/comprise/have the one or more reference signals. Each TCI state of the one or more TCI states may indicate/comprise/have a respective reference signal of the one or more reference signals. The plurality of CORESETs may comprise the one or more CORESETs. The wireless device may add the one or more reference signals indicated by the one or more TCI states for the beam failure detection of the BFD set.

The one or more configuration parameters may indicate, for the one or more CORESETs, a first value (e.g., 0, 00, or any other first value) for/of an index (e.g., CORESET pool index, TRP index, additional PCI index, BFD set index, unified TCI state indicator, joint TCI state indicator, downlink TCI state indicator, TCI state indicator, and/or the like), for example, if the BFD set is the first BFD set (e.g., $\overline{q}_{0,0}$). The one or more configuration parameters may indicate, for each CORESET of the one or more CORESETs, the first value for/of the index. For example, the one or more CORESETs may be the one or more first CORESETs with the first CORESET pool index (e.g., CoresetPoolIndex=0).

The one or more configuration parameters may indicate, for the one or more CORESETs, a second value (e.g., 1, 01, 10, or any other second value) for/of an index (e.g., CORESET pool index, TRP index, additional PCI index, BFD set index, unified TCI state indicator, joint TCI state indicator, downlink TCI state indicator, TCI state indicator, and/or the like), for example, if the BFD set is the second BFD set (e.g., $\overline{q}_{0,0}$). The one or more configuration parameters may indicate, for each CORESET of the one or more CORESETs, the second value for/of the index. For example, the one or more CORESETs may be the one or more second CORESETs with the second CORESET pool index (e.g., CoresetPoolIndex=1).

A quantity of the one or more reference signals may be equal to or less than a maximum quantity of failure detection reference signals (e.g., $N_{BFD}$). The wireless device may send/transmit a wireless device capability message (e.g., a UE capability message) comprising a capability parameter indicating the maximum quantity of BFD reference signals.

The BFD set may be associated with (e.g., may be mapped to or may correspond to) the first TCI state. The BFD set may be associated with (e.g., may be mapped to or may correspond to) the first TCI state, for example, based on (e.g., when) the BFD set being (or is) the first BFD set (e.g., when the BFD set is the first BFD set). The first BFD set may be associated with (or mapped to or may correspond to) the first TCI state. The BFD set may be associated with (e.g., may be mapped to or may correspond to) the first TCI state, for example, based on the BFD set being associated with the PCI of the cell. The one or more configuration parameters may not indicate, for the BFD set, an additional PCI index. The BFD set may be associated with (e.g., may be mapped to or may correspond to) the first TCI state, for example, based on the BFD set being associated with a second PCI different from the PCI of the cell. The one or more configuration parameters may indicate, for the BFD set, an additional PCI index indicating a PCI set of the list of PCI sets. The PCI set may comprise/indicate the second PCI. The BFD set may be associated with (e.g., may be mapped to or may correspond to) the first TCI state, for example, based on the BFD set and the first TCI state being associated with the same PCI. For example, the BFD set and the first TCI state may be both associated with the PCI of the cell. For example, the BFD set and the first TCI state may be both associated with the second PCI different from the PCI of the cell.

The BFD set may be associated with (e.g., may be mapped to or may correspond to) the second TCI state. The BFD set may be associated with (e.g., may be mapped to or may correspond to) the second TCI state, for example, based on the BFD set being the second BFD set (e.g., when the BFD set is the second BFD set). The second BFD set may be associated with (e.g., may be mapped to or may correspond to) the second TCI state. The BFD set may be associated with (e.g., may be mapped to or may correspond to) the second TCI state, for example, based on the BFD set being associated with the PCI of the cell. The one or more configuration parameters may not indicate, for the BFD set, an additional PCI index. The BFD set may be associated with (e.g., may be mapped to or may correspond to) the second TCI state, for example, based on the BFD set being associated with a second PCI different from the PCI of the cell. The one or more configuration parameters may indicate, for the BFD set, an additional PCI index indicating a PCI set of the list of PCI sets. The PCI set may comprise/indicate the second PCI. The BFD set may be associated with (e.g., may be mapped to or may correspond to) the second TCI state, for example, based on the BFD set and the second TCI state being associated with the same PCI. For example, the BFD set and the second TCI state may be both associated with the PCI of the cell. For example, the BFD set and the second TCI state may be both associated with the second PCI different from the PCI of the cell.

The wireless device may trigger/initiate a beam failure recovery procedure for/of the BFD set. The wireless device may trigger/initiate a beam failure recovery procedure for/of the BFD set, for example, based on detecting the beam failure of the BFD set. The wireless device may send/transmit, for the beam failure recovery procedure, an uplink signal indicating the beam failure of the BFD set (e.g., uplink signal 2008 at time T2 as shown in FIG. 20). The wireless device may transmit, via an uplink resource, the uplink signal.

The uplink signal may be a PUSCH transmission. The PUSCH transmission may comprise/carry a beam failure recovery MAC CE (BFR MAC CE). The uplink resource may be a PUSCH resource.

The uplink signal may be a PUSCH transmission of a random access procedure (e.g., Msg3 transmission or MsgA transmission). The random access procedure may be a contention-based random access procedure. The PUSCH transmission may comprise/carry a BFR MAC CE. The uplink resource may be a PUSCH resource. In an example, the uplink signal may be a BFR MAC CE.

The uplink signal may be a random access preamble. The uplink resource may be a PRACH resource.

The uplink signal may be a PUCCH transmission. The uplink signal may be an SR. The uplink resource may be a PUCCH resource. The wireless device may transmit the uplink signal with (e.g., based on) a HARQ process number.

The uplink signal may indicate the beam failure of the BFD set. For example, the uplink signal may comprise a field (e.g., indicator/identifier) indicating the BFD set. The BFD set may be the first BFD set, for example, when the field is set/equal to zero (or any other first value). The BFD set may be the second BFD set, for example, when the field is set/equal to one (or any other second value).

The uplink resource via which the wireless device sends/transmits the uplink signal may indicate the BFD set. The one or more configuration parameters may indicate an association/mapping between the uplink resource and the BFD set. The BFD set may be the first BFD set, for example, if the uplink resource is a first uplink resource. The wireless device may transmit, via the first uplink resource, the uplink signal when the BFD set is the first BFD set. The BFD set may be the second BFD set, for example, if the uplink resource is a second uplink resource. The wireless device may transmit, via the second uplink resource, the uplink signal when the BFD set is the second BFD set.

The wireless device may measure/assess one or more candidate reference signals in a candidate beam detection set. The wireless device may measure/assess radio link qualities (e.g., RSRP, BLER, SINR, SNR, and/or the like) of the one or more candidate reference signals in the candidate beam detection set. The wireless device may measure/assess a respective radio link quality of the radio link qualities of each candidate reference signal of the one or more candidate reference signals. The wireless device may select/determine/identify a candidate reference signal among the one or more candidate reference signals. A radio link quality of the candidate reference signal may be better (e.g., may have equal to or higher/greater RSRP, may have equal to or higher/greater SINR, may have equal to or higher/greater SNR, may have lower/smaller BLER, etc.) than a threshold (e.g., indicated by a higher layer parameter, such as rsrp-ThresholdSSB or rsrp-ThresholdBFR).

At least two candidate beam detection sets may comprise the candidate beam detection set. At least two candidate beam detection sets may comprise a first candidate beam detection set (e.g., $\overline{q}_{1,0}$) and a second candidate beam detection set (e.g., $\overline{q}_{1,1}$). The candidate beam detection set may be the first candidate beam detection set (e.g., $\overline{q}_{1,0}$) of the at least two candidate beam detection sets. The candidate beam detection set may be the second candidate beam detection set (e.g., $\overline{q}_{1,1}$) of the at least two candidate beam detection sets.

The first BFD set (e.g., $\overline{q}_{0,0}$) may be associated with the first candidate beam detection set (e.g., $\overline{q}_{1,0}$). The wireless device may measure/assess radio link qualities of one or more candidate reference signals in the first candidate beam detection set for a beam failure recovery of the first BFD set. The wireless device may or may not measure/assess radio link qualities of one or more candidate reference signals in the second candidate beam detection set for a beam failure recovery of the first BFD set.

The second BFD set (e.g., $\overline{q}_{0,1}$) may be associated with the second candidate beam detection set (e.g., $\overline{q}_{1,1}$). The wireless device may measure/assess radio link qualities of one or more candidate reference signals in the second candidate beam detection set for a beam failure recovery of the second BFD set. The wireless device may or may not measure/assess radio link qualities of one or more candidate reference signals in the first candidate beam detection set for a beam failure recovery of the second BFD set.

The wireless device may measure/assess the one or more candidate reference signals in the candidate beam detection set associated with the BFD set. The wireless device may measure/assess radio link qualities of the one or more candidate reference signals in the candidate beam detection set for (e.g., based on) the beam failure of the BFD set.

The one or more configuration parameters may indicate the at least two candidate beam detection sets. The one or more configuration parameters may indicate the candidate beam detection set. The one or more configuration parameters may indicate the one or more candidate reference signals for/in the candidate beam detection set. The candidate beam detection set may comprise the one or more candidate reference signals. The one or more configuration parameters may comprise a first candidate beam detection set parameter (e.g., candidateBeamRSList1) indicating the first candidate beam detection set (e.g., $\overline{q}_{1,0}$) for example, if/when the candidate beam detection set is the first candidate beam detection set (e.g., $\overline{q}_{1,0}$). The first candidate beam detection set parameter may indicate the one or more candidate reference signals for candidate beam detection of the first candidate beam detection set. The first candidate beam detection set may comprise the one or more candidate reference signals. The one or more configuration parameters may comprise a second candidate beam detection set parameter (e.g., candidateBeamRSList2) indicating the second candidate beam detection set (e.g., $\overline{q}_{1,1}$), for example, if/when the candidate beam detection set is the second candidate beam detection set (e.g., $\overline{q}_{1,1}$). The second candidate beam detection set parameter may indicate the one or more candidate reference signals for candidate beam detection of the second candidate beam detection set. The second candidate beam detection set may comprise the one or more candidate reference signals.

The uplink signal may indicate the candidate reference signal. For example, the uplink signal may comprise a field (e.g., Candidate RS ID) indicating the candidate reference signal.

The uplink resource via which the wireless device sends/transmits the uplink signal may indicate the candidate reference signal. The one or more configuration parameters may indicate an association/mapping between the uplink resource and the candidate reference signal. The candidate reference signal may be a first candidate reference signal of the one or more candidate reference signals, for example, if/when the uplink resource is a first uplink resource. The candidate reference signal may be a second candidate reference signal of the one or more candidate reference signals, for example, if/when the uplink resource is a second uplink resource.

The wireless device may receive DCI (e.g., DCI 2012 at time T3 as shown in FIG. 20). The wireless device may receive a PDCCH transmission comprising/carrying the DCI. The wireless device may receive the DCI in a PDCCH monitoring occasion. The wireless device may receive, via a CORESET, the DCI. A CRC of the DCI may be scrambled by C-RNTI or MCS-C-RNTI. The wireless device may complete the beam failure recovery procedure of the BFD set based on receiving the DCI.

The BFD set may be associated with a corresponding TRP. For example, the first BFD set may be associated with a first TRP, and a second BFD set may be associated with a second TRP. Completion of the beam failure recovery procedure of the BFD set may comprise completion of the beam failure recovery procedure of the corresponding TRP.

The one or more configuration parameters may indicate, for the CORESET via which the wireless device receives the DCI, a recovery search space set indicator/index (e.g., higher layer parameter recoverySearchSpaceId). The recovery search space set index may indicate/identify a search space set. The wireless device may complete the beam failure recovery, for example, based on the receiving the DCI via the CORESET associated with (or mapped to) the recovery search space set index. The wireless device may complete the beam failure recovery, for example, based on the receiving the DCI via the CORESET associated with (or mapped to) the search space set identified/indicated by the recovery search space set index. The cell may be a PCell. The cell may be a PSCell.

The DCI may schedule a PUSCH transmission. The DCI may indicate, for the PUSCH transmission, a HARQ process number that is the same as (or equal to) the HARQ process number used for (or associated with) transmission of the uplink signal. The DCI may schedule the PUSCH transmission with a same HARQ process number as for the transmission of the uplink signal. The DCI may comprise a toggled new data indicator (NDI) field value. The wireless device may complete the beam failure recovery procedure based on the DCI scheduling the PUSCH transmission with the HARQ process number that is the same as the HARQ process number of a transmission of the uplink signal. The wireless device may complete the beam failure recovery based on the DCI scheduling the PUSCH transmission with the same HARQ process number as for the transmission of the uplink signal. The wireless device may complete the beam failure recovery procedure based on the DCI comprising the toggled NDI field value.

The wireless device may send/transmit one or more uplink signals (e.g., uplink transmission(s) 2016 at time T4 as shown in FIG. 20). The wireless device may send/transmit one or more uplink signals with/using transmission powers determined based on one or more power control parameters indicated by an uplink power control set.

The wireless device may transmit each uplink signal of the uplink signals with a respective transmission power, of the transmission powers, determined based on the one or more power control parameters indicated by the uplink power control set. The wireless device may transmit a first uplink signal with a first transmission power determined based on the one or more power control parameters indicated by the uplink power control set. The wireless device may transmit a second uplink signal with a second transmission power determined based on the one or more power control parameters indicated by the uplink power control set. The transmission powers may comprise the first transmission power and the second transmission power. The uplink signals may comprise the first uplink signal and the second uplink signal.

The first transmission power and the second transmission may be the same. The first transmission power and the second transmission may be the same, for example, based on transmitting the first uplink signal and the second uplink signal via the same channel. The first transmission power and the second transmission may be the same, for example, if the first uplink signal and the second uplink signal are both PUSCH transmissions, both PUCCH transmissions, or both SRS transmissions. The first transmission power and the second transmission may be different, for example, based on transmitting the first uplink signal and the second uplink signal via different channels. The first transmission power and the second transmission may be different, for example, if one of the first uplink signal and the second uplink signal is a PUSCH transmission and the other one is a PUCCH transmission, one of the first uplink signal and the second uplink signal is a PUSCH transmission and the other one is an SRS transmission, or one of the first uplink signal and the second uplink signal is a PUCCH transmission and the other one is an SRS transmission.

The uplink signals may be/comprise PUSCH transmissions. The uplink signals may be/comprise PUCCH transmissions. The uplink signals may be/comprise SRS transmissions. The uplink signals may be/comprise any other type of uplink transmissions.

The wireless device may transmit the uplink signals with/using the transmission powers determined based on the uplink power control set, for example, after a quantity of symbols from a last symbol of the DCI that completes the beam failure recovery procedure. The wireless device may transmit the uplink signals with the transmission powers determined based on the uplink power control set, for example, starting from the quantity of symbols from the last symbol of the DCI that completes the beam failure recovery procedure. The wireless device may start transmitting the uplink signals with the transmission powers determined based on the uplink power control set, for example, after the quantity of symbols from the last symbol of the DCI that completes the beam failure recovery. Transmitting the uplink signals, with the transmission powers determined based on the uplink power control set, may start after the quantity of symbols from the last symbol of the DCI that completes the beam failure recovery procedure.

The last symbol of the DCI that completes the beam failure recovery procedure may comprise/be the last/ending symbol of the PDCCH transmission comprising/carrying the DCI. The last symbol of the DCI that completes the beam failure recovery procedure may comprise/be the last/ending symbol of reception of the DCI. The last symbol of the DCI that completes the beam failure recovery procedure may comprise/be the last/ending symbol the PDCCH monitoring occasion that the wireless device receives the DCI.

The quantity of symbols may be fixed/predefined/preset. The quantity of symbols may be, for example, equal to 28 symbols (or any other quantity of symbols).

The one or more configuration parameters may indicate a plurality of uplink (UL) power control sets (e.g., via higher layer parameter Uplink-powerControl, as shown in FIG. 17). The one or more configuration parameters may comprise one or more serving cell parameters (e.g., higher layer parameter ServingCellConfig as shown in FIG. 17) indicating, for example, the plurality of uplink power control sets. For example, in FIG. 20, the plurality of uplink power control sets may comprise UL Power Control 0, UL Power Control 1, . . . , and UL Power Control M. The plurality of uplink power control sets may be used to configure power control parameters for uplink transmissions (e.g., PUSCH transmissions, PUCCH transmissions, SRS transmissions, and/or any other uplink transmission).

The one or more configuration parameters may indicate, for the plurality of uplink power control sets, a plurality of uplink power control set indexes/identifiers/identities (e.g., higher layer parameter Uplink-powerControlId as shown in FIG. 17). The one or more configuration parameters may indicate, for each uplink power control set of the plurality of uplink power control sets, a respective uplink power control set index of the plurality of uplink power control set indexes/identifiers/identities. The plurality of uplink power control sets may comprise a first uplink power control set and a second uplink power control set. The first uplink power control set may be indicated/identified by a first uplink power control set index of the plurality of uplink power control set indexes/identifiers/identities. The second uplink power control set may be indicated/identified by a second uplink power control set index of the plurality of uplink power control set indexes/identifiers/identities.

Each uplink power control set of the plurality of uplink power control sets may comprise/indicate respective power control parameters (e.g., target received power (p0) as shown in FIG. 17), closed-loop index (higher layer parameter ClosedLoopIndex as shown in FIG. 17), pathloss compensation factor (higher layer parameter alpha as shown in FIG. 17), pathloss reference signal, and/or the like). Each uplink power control set of the plurality of uplink power control sets may comprise/indicate respective power control parameters for an uplink channel/signal (e.g., PUSCH, PUCCH, SRS, and/or any other channel/signal).

The first uplink power control set may comprise/indicate one or more first power control parameters (e.g., target received power, closed-loop index, pathloss compensation factor, alpha, pathloss reference signal, and/or the like) for PUSCH transmissions (e.g., higher layer parameter p0AlphaSetforPUSCH, P0AlphaSet as shown in FIG. 17). The first uplink power control set may comprise/indicate one or more second power control parameters (e.g., target received power, closed-loop index, pathloss compensation factor, alpha, pathloss reference signal, and/or the like) for PUCCH transmissions (e.g., higher layer parameter p0AlphaSetforPUCCH, P0AlphaSet as shown in FIG. 17). The first uplink power control set may comprise/indicate one or more third power control parameters (e.g., target received power, closed-loop index, pathloss compensation factor, alpha, pathloss reference signal, and/or the like) for SRS transmissions (e.g., higher layer parameter p0AlphaSetforSRS, P0AlphaSet as shown in FIG. 17).

The second uplink power control set may comprise/indicate one or more first power control parameters (e.g., target received power, closed-loop index, pathloss compensation factor, alpha, pathloss reference signal, and/or the like) for PUSCH transmissions (e.g., higher layer parameter p0AlphaSetforPUSCH, P0AlphaSet as shown in FIG. 17). The second uplink power control set may comprise/indicate one or more second power control parameters (e.g., target received power, closed-loop index, pathloss compensation factor, alpha, pathloss reference signal, and/or the like) for PUCCH transmissions (e.g., higher layer parameter p0AlphaSetforPUCCH, P0AlphaSet as shown in FIG. 17). The second uplink power control set may comprise/indicate one or more third power control parameters (e.g., target received power, closed-loop index, pathloss compensation factor, alpha, pathloss reference signal, and/or the like) for SRS transmissions (e.g., higher layer parameter p0AlphaSetforSRS, P0AlphaSet as shown in FIG. 17).

The uplink power control set may be determined based on the BFD set for which beam failure was detected (e.g., at time T1). The uplink power control set may be a first uplink power control set of the plurality of uplink power control sets. The uplink power control set may be the first uplink power control set of the plurality of uplink power control sets, for example, based on the BFD set being the first BFD set. The uplink power control set may be the first uplink power control set of the plurality of uplink power control sets, for example, based on the BFD set being associated with the first TCI state. The uplink power control set may be the first uplink power control set of the plurality of uplink power control sets, for example, based on the BFD set and the first TCI state being associated with the same PCI. The uplink power control set may be the first uplink power control set of the plurality of uplink power control sets, for example, based on the BFD set and the first uplink power control set being associated with the same PCI. The uplink power control set may be the first uplink power control set of the plurality of uplink power control sets, for example, based on the first TCI state and the first uplink power control set being associated with the same PCI.

The one or more configuration parameters may indicate, for the first uplink power control set, a first uplink power control set index of the plurality of uplink power control set indexes/identifiers/identities. The first uplink power control set may be indicated/identified by the first uplink power control set index. The uplink power control set may be the first uplink power control set with the first uplink power control set index, for example, based on the BFD set being the first BFD set. The uplink power control set may be the first uplink power control set with the first uplink power control set index, for example, based on the BFD set being associated with the first TCI state. The uplink power control set may be the first uplink power control set with the first uplink power control set index, for example, based on the BFD set and the first uplink power control set with the first uplink power control set index being associated with the same PCI.

The uplink power control set may be a second uplink power control set of plurality of uplink power control sets. The uplink power control set may be the second uplink power control set of the plurality of uplink power control sets, for example, based on the BFD set being the second BFD set. The uplink power control set may be the second uplink power control set of the plurality of uplink power control sets, for example, based on the BFD set being associated with the second TCI state. The uplink power control set may be the second uplink power control set of the plurality of uplink power control sets, for example, based on the BFD set and the second TCI state being associated with the same PCI. The uplink power control set may be the second uplink power control set of the plurality of uplink power control sets, for example, based on the BFD set and the second uplink power control set being associated with the same PCI. The uplink power control set may be the second uplink power control set of the plurality of uplink power control sets, for example, based on the second TCI state and the second uplink power control set being associated with the same PCI.

The one or more configuration parameters may indicate, for the second uplink power control set, a second uplink power control set index of the plurality of uplink power control set indexes/identifiers/identities. The second uplink power control set may be indicated/identified by the second uplink power control set index. The uplink power control set may be the second uplink power control set with the second uplink power control set index, for example, based on the BFD set being the second BFD set. The uplink power control set may be the second uplink power control set with the second uplink power control set index, for example, based on the BFD set being associated with the second TCI state. The uplink power control set may be the second uplink power control set with the second uplink power control set index, for example, based on the BFD set and the second uplink power control set with the second uplink power control set index being associated with the same PCI.

FIG. 21A, FIG. 21B, FIG. 21C, and FIG. 21D show examples of uplink power control configurations. Each of the example uplink power control configurations may comprise a plurality of uplink power control sets used for determination of transmission powers for an uplink transmission. The example uplink power control configurations may be used to determine a transmission power for an uplink transmission (e.g., as described herein at least with reference to FIG. 20).

The one or more configuration parameters may comprise an uplink power control parameter (e.g., higher layer parameter uplink-PowerControlToAddModList) indicating a list of uplink power control sets (e.g., as shown in FIG. 21A and FIG. 21C). The list of uplink power control sets may comprise the plurality of uplink power control sets (e.g., information element (IE) Uplink-PowerControl). The uplink power control parameter may configure/indicate uplink power control parameters for uplink transmissions (e.g., PUSCH transmission, PUCCH transmission, SRS transmission, and/or any other transmission). The uplink power control parameter may configure/indicate uplink power control parameters for uplink transmissions when the one or more configuration parameters comprise/indicate/configure a field/parameter (e.g., unifiedTCI-StateType field/parameter) for the cell. The list of uplink power control sets (or the plurality of uplink power control sets) may comprise the first uplink power control set.

The first uplink power control set index may be equal to zero. The uplink power control set may be the first uplink power control set with the first uplink power control set index, for example, based on the first uplink power control set index of the first uplink power control set being equal to zero. For example, in FIG. 21A, the uplink power control set may be UL power control 0 based on the uplink power control set index of UL power control 0 being equal to zero.

The second uplink power control set index may be equal to one. The uplink power control set may be the second uplink power control set with the second uplink power control set index, for example, based on the second uplink power control set index of the second uplink power control set being equal to one. For example, in FIG. 21A, the uplink power control set may be UL power control 1 based on uplink power control set index of UL power control 1 being equal to one.

The first uplink power control set index may be the lowest/smallest (e.g., may have the lowest/smallest value) among the plurality of uplink power control set indexes of the plurality of uplink power control sets. The uplink power control set may be the first uplink power control set with the first uplink power control set index, for example, based on the first uplink power control set index of the first uplink power control set being the lowest/smallest among the plurality of uplink power control set indexes of the plurality of uplink power control sets. For example, in FIG. 21A, the uplink power control set may be UL power control 0 based on uplink power control set index of UL power control 0 being lowest/smallest among uplink power control set indexes of UL power control 0, UL power control 1, . . . , and UL power control M.

The second uplink power control set index may be the second lowest/smallest (e.g., may have the second lowest/smallest value) among the plurality of uplink power control set indexes of the plurality of uplink power control sets. The uplink power control set may be the second uplink power control set with the second uplink power control set index, for example, based on the second uplink power control set index of the second uplink power control set being the second lowest/smallest among the plurality of uplink power control set indexes of the plurality of uplink power control sets. For example, in FIG. 21A, the uplink power control set may be UL power control 1 based on uplink power control set index of UL power control 1 being the second lowest/smallest among uplink power control set indexes of UL power control 0, UL power control 1, . . . , and UL power control M. For example, for a vector x=[1 2 3], 2 is the second smallest/lowest value in the vector x. For a vector x=[5 8 1], 5 is the second smallest/lowest value in the vector x. For a vector x=[9 8 7 4], 7 is the second smallest/lowest value in the vector x.

The first uplink power control set index may be the highest/greatest (e.g., may have the highest/greatest value) among the plurality of uplink power control set indexes of the plurality of uplink power control sets. The uplink power control set may be the first uplink power control set with the first uplink power control set index, for example, based on the first uplink power control set index of the first uplink power control set being the highest/greatest among the plurality of uplink power control set indexes of the plurality of uplink power control sets. For example, in FIG. 21A, the uplink power control set may be UL power control M based on uplink power control set index of UL power control M being highest/greatest among uplink power control set indexes of UL power control 0, UL power control 1, . . . , and UL power control M.

The second uplink power control set index may be second highest/greatest (e.g., may have the second highest/greatest value) among the plurality of uplink power control set indexes of the plurality of uplink power control sets. The uplink power control set may be the second uplink power control set with the second uplink power control set index, for example, based on the second uplink power control set index of the second uplink power control set being second highest/greatest among the plurality of uplink power control set indexes of the plurality of uplink power control sets. For example, in FIG. 21A, the uplink power control set may be UL power control M−1 based on uplink power control set index of UL power control M−1 being second highest/greatest among uplink power control set indexes of UL power control 0, UL power control 1, UL power control M−1, and UL power control M. For example, for a vector x=[1 2 3 4], 3 is the second highest value in the vector x. For a vector x=[5 8 1 7], 7 is the second highest value in the vector x. When a vector x=[9 8 7 4], 8 is the second highest value in the vector x.

One or more first uplink power control sets of the plurality of uplink power control sets may be associated with the first BFD set. The one or more configuration parameters may indicate, for the one or more first uplink power control sets of the plurality of uplink power control sets, an index (e.g., SRS resource set indicator field, TRP field, CORESET pool index field, additional PCI index, BFD set index, unified TCI state indicator field, joint TCI state indicator field, uplink TCI state indicator field, panel index, capability set index, and/or the like) with a first value. The one or more configuration parameters may indicate, for each uplink power control set of the one or more first uplink power control sets, the index with the first value. The first value may indicate the first BFD set.

The one or more first uplink power control sets may be identified/indicated by one or more first uplink power control set indexes of the plurality of uplink power control set indexes/identifiers/identities. Each uplink power control set of the one or more first uplink power control sets may be identified/indicated by a respective uplink power control set index of the one or more first uplink power control set indexes.

The first uplink power control set index may be lowest/smallest among the one or more first uplink power control set indexes of the one or more first uplink power control sets associated with the first value of the index. The uplink power control set may be the first uplink power control set among the one or more first uplink power control sets associated with the first value of the index, for example, based on the first uplink power control set index of the first uplink power control set being lowest/smallest among the one or more first uplink power control set indexes of the one or more first uplink power control sets. For example, in FIG. 21A, UL power control 1 and UL power control M may be associated with the first value of the index. The uplink power control set may be UL power control 1, for example, based on uplink power control set index of UL power control 1 being lowest/smallest among uplink power control set indexes of UL power control 1 and UL power control M.

The first uplink power control set index may be lowest/smallest among the one or more first uplink power control set indexes of the one or more first uplink power control sets associated with the first BFD set. The uplink power control set may be the first uplink power control set among the one or more first uplink power control sets associated with the first BFD set, for example, based on the first uplink power control set index of the first uplink power control set being lowest/smallest among the one or more first uplink power control set indexes of the one or more first uplink power control sets.

The one or more first uplink power control sets may comprise the first uplink power control set. One or more second uplink power control sets (e.g., associated with the second BFD set) may or may not comprise the first uplink power control set.

One or more second uplink power control sets of the plurality of uplink power control sets may be associated with the second BFD set. The one or more configuration parameters may indicate, for the one or more second uplink power control sets of the plurality of uplink power control sets, an index (e.g., SRS resource set indicator field, TRP field, CORESET pool index field, additional PCI index, BFD set index, unified TCI state indicator field, joint TCI state indicator field, uplink TCI state indicator field, panel index, capability set index, and/or the like) with a second value. The one or more configuration parameters may indicate, for each uplink power control set of the one or more second uplink power control sets, the index with the second value. The second value may indicate the second BFD set.

The one or more second uplink power control sets may be identified/indicated by one or more second uplink power control set indexes of the plurality of uplink power control set indexes/identifiers/identities. Each uplink power control set of the one or more second uplink power control sets may be identified/indicated by a respective uplink power control set index of the one or more second uplink power control set indexes.

The second uplink power control set index may be lowest/smallest among the one or more second uplink power control set indexes of the one or more second uplink power control sets associated with the second value of the index. The uplink power control set may be the second uplink power control set among the one or more second uplink power control sets associated with the second value of the index, for example, based on the second uplink power control set index of the second uplink power control set being lowest/smallest among the one or more second uplink power control set indexes of the one or more second uplink power control sets. For example, in FIG. 21A, UL power control 1 and UL power control M may be associated with the second value of the index. The uplink power control set may be UL power control 1, for example, based on uplink power control set index of UL power control 1 being lowest/smallest among UL power control set indexes of UL power control 1 and UL power control M.

The second uplink power control set index may be lowest/smallest among the one or more second uplink power control set indexes of the one or more second uplink power control sets associated with the second BFD set. The uplink power control set may be the second uplink power control set among the one or more second uplink power control sets associated with the second BFD set, for example, based on the second uplink power control set index of the second uplink power control set being lowest/smallest among the one or more second uplink power control set indexes of the one or more second uplink power control sets.

The one or more second uplink power control sets may comprise the second uplink power control set. The one or more first uplink power control sets may or may not comprise the second uplink power control set.

The plurality of uplink power control sets may be associated with the one or more PCIs (e.g., as shown in FIG. 21C). Each uplink power control set of the plurality of uplink power control sets may be associated with a respective PCI of the one or more PCIs. The one or more configuration parameters may indicate, for the plurality of uplink power control sets, the at least one additional PCI index (e.g., the higher layer parameter additionalPCIIndex as shown in FIG. 17). The one or more configuration parameters may indicate, for each uplink power control set of the plurality of uplink power control sets, a respective additional PCI index of the at least one additional PCI index.

The one or more configuration parameters may indicate, for first uplink power control set(s) of the plurality of uplink power control sets, a first additional PCI index (e.g., 1, or any other first value) of the at least one additional PCI index. The first additional PCI index may indicate/identify a first PCI set of the list of PCI sets. The first PCI set may comprise/indicate a first PCI (e.g., PCI 1). The first uplink power control set(s) may be associated with the first PCI, for example, based the one or more configuration parameters indicating, for the first uplink power control set(s), the first additional PCI index that indicates the first PCI. The one or more configuration parameters may indicate, for second uplink power control set(s) of the plurality of uplink power control sets, a second additional PCI index (e.g., 2, or any other second value) of the at least one additional PCI index. The second additional PCI index may indicate/identify a second PCI set of the list of PCI sets. The second PCI set may comprise/indicate a second PCI (e.g., PCI 2). The second uplink power control set(s) may be associated with the second PCI, for example, based the one or more configuration parameters indicating, for the second uplink power control set(s), the second additional PCI index that indicates the second PCI. The one or more PCIs may comprise the first PCI and the second PCI.

The one or more configuration parameters may not indicate, for uplink power control set(s) of the plurality of uplink power control sets, an additional PCI index. The uplink power control set(s) may be associated with the PCI of the cell, for example, based the one or more configuration parameters not indicating, for the uplink power control set(s), an additional PCI index.

For example, as shown in FIG. 21C, UL power control 0, UL power control 2, and UL power control 3 may be associated with PCI 1. UL power control 1, UL power control M−1, and UL power control M may be associated with PCI 2.

One or more first uplink power control sets of the plurality of uplink power control sets may be associated with the first TCI state. Each uplink power control set of the one or more first uplink power control sets may be associated with the first TCI state. The one or more first uplink power control sets may be associated with the first TCI state that is associated with the first BFD set. The one or more first uplink power control sets may be associated with the first TCI state, for example, based on the one or more first uplink power control sets and the first TCI state being associated with the same PCI. The first TCI state and each uplink power control set of the one or more first uplink power control sets may be associated with the PCI of the cell. The first TCI state and each uplink power control set of the one or more first uplink power control sets may be associated with the second PCI different from the PCI of the cell.

The one or more first uplink power control sets may be identified/indicated by one or more first uplink power control set indexes of the plurality of uplink power control set indexes/identifiers/identities. Each uplink power control set of the one or more first uplink power control sets may be identified/indicated by a respective uplink power control set index of the one or more first uplink power control set indexes.

The first uplink power control set index may be lowest/smallest among the one or more first uplink power control set indexes of the one or more first uplink power control sets associated with the same PCI as the first TCI state. The uplink power control set may be the first uplink power control set among the one or more first uplink power control sets associated with the same PCI as the first TCI state, for example, based on the first uplink power control set index of the first uplink power control set being lowest/smallest among the one or more first uplink power control set indexes of the one or more first uplink power control sets. For example, in FIG. 21C, the first TCI state (e.g., TCI state 26, or any other first TCI state) may be associated with PCI 1. The uplink power control set may be UL power control 0, for example, based on uplink power control set index of UL power control 0 being lowest/smallest among uplink power control set indexes of UL power Control 0, UL power control 2, and UL power control 3, which are associated with the same PCI (e.g., PCI 1) as the first TCI state.

The one or more first uplink power control sets may comprise the first uplink power control set. One or more second uplink power control sets (e.g., associated with the second TCI state) may not comprise the first uplink power control set.

One or more second uplink power control sets of the plurality of uplink power control sets may be associated with the second TCI state. Each uplink power control set of the one or more second uplink power control sets may be associated with the second TCI state. The one or more second uplink power control sets may be associated with the second TCI state that is associated with the second BFD set. The one or more second uplink power control sets may be associated with the second TCI state, for example, based on the one or more second uplink power control sets and the second TCI state being associated with the same PCI. The second TCI state and each uplink power control set of the one or more second uplink power control sets may be associated with the PCI of the cell. The second TCI state and each uplink power control set of the one or more second uplink power control sets may be associated with the second PCI different from the PCI of the cell.

The one or more second uplink power control sets may be identified/indicated by one or more second uplink power control set indexes of the plurality of uplink power control set indexes/identifiers/identities. Each uplink power control set of the one or more second uplink power control sets may be identified/indicated by a respective uplink power control set index of the one or more second uplink power control set indexes.

The second uplink power control set index may be lowest/smallest among the one or more second uplink power control set indexes of the one or more second uplink power control sets associated with the same PCI as the second TCI state. The uplink power control set may be the second uplink power control set among the one or more second uplink power control sets associated with the same PCI as the second TCI state, for example, based on the second uplink power control set index of the second uplink power control set being lowest/smallest among the one or more second uplink power control set indexes of the one or more second uplink power control sets. For example, in FIG. 21C, the second TCI state (e.g., TCI state 61, or any other second TCI state) may be associated with PCI 2. The uplink power control set may be UL power control 1, for example, based on uplink power control set index of UL power control 1 being lowest/smallest among uplink power control set indexes of UL power control 1, UL cower control M−1, and UL power control M, which are associated with the same PCI (e.g., PCI 2) as the second TCI state.

The one or more second uplink power control sets may comprise the second uplink power control set. The one or more first uplink power control sets may not comprise the second uplink power control set.

The one or more configuration parameters comprise at least two uplink power control parameters (e.g., higher layer parameters uplink-PowerControlToAddModList and uplink-PowerControlToAddModList2). The at least two uplink power control parameters may indicate at least two lists of uplink power control sets (e.g., as shown in FIG. 21B and FIG. 21D). Each uplink power control parameter of the at least two uplink power control parameters may indicate a respective list of uplink power control sets of the at least two lists of uplink power control sets. For example, a first uplink power control parameter of the at least two uplink power control parameters may indicate a first list of uplink power control sets. The first list of uplink power control sets may comprise one or more first uplink power control sets of the plurality of uplink power control sets. A second uplink power control parameter of the at least two uplink power control parameters may indicate a second list of uplink power control sets. The second list of uplink power control sets may comprise one or more second uplink power control sets of the plurality of uplink power control sets. The at least two lists of uplink power control sets may comprise the first list of uplink power control sets and the second list of uplink power control sets. For example, in FIG. 21B and FIG. 21D, the one or more first uplink power control sets may comprise UL power control 0, UL power control 1, . . . , and UL power control N. The one or more second uplink power control sets may comprise UL power control N+1, UL power control N+2, . . . , and UL power control M.

The first list of uplink power control sets may be associated with the first BFD set. The one or more configuration parameters may indicate, for the first list of uplink power control sets, an index (e.g., SRS resource set indicator field, TRP field, additional PCI index, CORESET pool index field, additional PCI index, BFD set index, unified TCI state indicator field, joint TCI state indicator field, uplink TCI state indicator field, panel index, capability set index, and/or the like) with a first value. The first value may indicate the first BFD set. The first list of uplink power control sets may be associated with the first TCI state.

The second list of uplink power control sets may be associated with the second BFD set. The one or more configuration parameters may indicate, for the second list of uplink power control sets, an index (e.g., SRS resource set indicator field, TRP field, additional PCI index, CORESET pool index field, additional PCI index, BFD set index, unified TCI state indicator field, joint TCI state indicator field, uplink TCI state indicator field, panel index, capability set index, and/or the like) with a second value. The second value may indicate the second BFD set. The second list of uplink power control sets may be associated with the second TCI state.

The at least two lists of uplink power control sets may be associated with the one or more PCIs (e.g., as shown in FIG. 21D). Each list of uplink power control sets of the at least two lists of uplink power control sets may be associated with a respective PCI of the one or more PCIs. The one or more configuration parameters may indicate, for the at least two lists of uplink power control sets, the at least one additional PCI index (e.g., higher layer parameter additionalPCIIndex as shown in FIG. 17). The one or more configuration parameters may indicate, for each list of uplink power control sets of the at least two lists of uplink power control sets, a respective additional PCI index of the at least one additional PCI index.

The first list of uplink power control sets and the first TCI state may be associated. The first list of uplink power control sets and the first TCI state may be associated, for example, based on the first list of uplink power control sets and the first TCI state being associated with the same PCI.

The one or more configuration parameters may indicate, for the first list of uplink power control sets, a first additional PCI index of the at least one additional PCI index. The first additional PCI index may indicate/identify a first PCI set of the list of PCI sets. The first PCI set may comprise/indicate a first PCI (e.g., PCI 1). The first list of uplink power control sets may be associated with the first PCI, for example, based the one or more configuration parameters indicating, for the first list of uplink power control sets, the first additional PCI index that indicates the first PCI.

The first list of uplink power control sets may be associated with the first PCI (e.g., PCI 1). The first TCI state may be associated with the second PCI. The first PCI (e.g., PCI 1) of the first list of uplink power control sets and the second PCI of the first TCI state may be the same (or equal). The second PCI of the first TCI state may be the first PCI (e.g., PCI 1). The first list of uplink power control sets and the first TCI state may be associated with the same PCI, for example, based on the first PCI (e.g., PCI 1) and the second PCI being the same (or equal). The first list of uplink power control sets and the first TCI state may be associated, for example, based on the first list of uplink power control sets and the first TCI state being associated with the first PCI (e.g., PCI 1). The first list of uplink power control sets and the first TCI state may be associated, for example, based on the first list of uplink power control sets and the first TCI state being associated with the second PCI. The first list of uplink power control sets and the first TCI state may be associated, for example, based on the first list of uplink power control sets and the first TCI state being associated with the first PCI (e.g., PCI 1) that is equal to the second PCI. The first PCI and the second PCI may indicate the same cell. The first PCI and the second PCI may indicate the same cell, for example, based on the first PCI and the second PCI being the same (or equal). The first PCI and the second PCI may indicate a cell among the at least one cell.

The one or more configuration parameters may not indicate, for the first list of uplink power control sets, an additional PCI index. The first list of uplink power control sets may be associated with the PCI of the cell, for example, based the one or more configuration parameters not indicating, for the first list of uplink power control sets, an additional PCI index.

The first list of uplink power control sets may be associated with the PCI of the cell. The first TCI state may be associated with the PCI of the cell. The first list of uplink power control sets and the first TCI state may be associated, for example, based on the first list of uplink power control sets and the first TCI state being associated with the PCI of the cell. The first list of uplink power control sets and the first TCI state may be associated with the same PCI, for example, based on the first list of uplink power control sets and the first TCI state both being associated with the PCI of the cell.

The one or more first uplink power control sets may be identified/indicated by one or more first uplink power control set indexes of the plurality of uplink power control set indexes/identifiers/identities. Each uplink power control set of the one or more first uplink power control sets may be identified/indicated by a respective uplink power control set index of the one or more first uplink power control set indexes.

The first list of uplink power control sets (e.g., the one or more first uplink power control sets) may comprise the first uplink power control set. The second list of uplink power control sets (e.g., the one or more second uplink power control sets) may or may not comprise the first uplink power control set.

The second list of uplink power control sets and the second TCI state may be associated. The second list of uplink power control sets and the second TCI state may be associated, for example, based on the second list of uplink power control sets and the second TCI state being associated with the same PCI.

The one or more configuration parameters may indicate, for the second list of uplink power control sets, a second additional PCI index of the at least one additional PCI index.

The second additional PCI index may indicate/identify a second PCI set of the list of PCI sets. The second PCI set may comprise/indicate a first PCI (e.g., PCI 2). The second list of uplink power control sets may be associated with the first PCI, for example, based the one or more configuration parameters indicating, for the second list of uplink power control sets, the second additional PCI index that indicates the first PCI.

The second list of uplink power control sets may be associated with the first PCI (e.g., PCI 2). The second TCI state may be associated with the second PCI. The first PCI (e.g., PCI 2) of the second list of uplink power control sets and the second PCI of the second TCI state may be the same (or equal). The second PCI of the second TCI state may be the first PCI (e.g., PCI 2). The second list of uplink power control sets and the second TCI state may be associated with the same PCI, for example, based on the first PCI (e.g., PCI 2) and the second PCI being the same (or equal). The second list of uplink power control sets and the second TCI state may be associated, for example, based on the second list of uplink power control sets and the second TCI state being associated with the first PCI (e.g., PCI 2). The second list of uplink power control sets and the second TCI state may be associated, for example, based on the second list of uplink power control sets and the second TCI state being associated with the second PCI. The second list of uplink power control sets and the second TCI state may be associated, for example, based on the second list of uplink power control sets and the second TCI state being associated with the first PCI (e.g., PCI 2) that is equal to the second PCI. The first PCI and the second PCI may indicate the same cell. The first PCI and the second PCI may indicate the same cell, for example, based on the first PCI and the second PCI being the same (or equal). The first PCI and the second PCI may indicate a cell among the at least one cell.

The one or more configuration parameters may not indicate, for the second list of uplink power control sets, an additional PCI index. The second list of uplink power control sets may be associated with the PCI of the cell, for example, based the one or more configuration parameters not indicating, for the second list of uplink power control sets, an additional PCI index.

The second list of uplink power control sets may be associated with the PCI of the cell. The second TCI state may be associated with the PCI of the cell. The second list of uplink power control sets and the second TCI state may be associated, for example, based on the second list of uplink power control sets and the second TCI state being associated with the PCI of the cell. The second list of uplink power control sets and the second TCI state may be associated with the same PCI, for example, based on the second list of uplink power control sets and the second TCI state both being associated with the PCI of the cell.

The one or more second uplink power control sets may be identified/indicated by one or more second uplink power control set indexes of the plurality of uplink power control set indexes/identifiers/identities. Each uplink power control set of the one or more second uplink power control sets may be identified/indicated by a respective uplink power control set index of the one or more second uplink power control set indexes.

The second list of uplink power control sets (e.g., the one or more second uplink power control sets) may comprise the second uplink power control set. The first list of uplink power control sets (e.g., the one or more first uplink power control sets) may or may not comprise the second uplink power control set.

The first uplink power control set index may be equal to zero. The uplink power control set may be the first uplink power control set among the one or more first uplink power control sets in the first list of uplink power control sets, for example, based on the first uplink power control set index of the first uplink power control set in the first list of uplink power control sets being equal to zero.

The uplink power control set may be the first uplink power control set (e.g., among the one or more first uplink power control sets in the first list of uplink power control sets) with the first uplink power control set index that is equal to zero. The uplink power control set may be the first uplink power control set with the first uplink power control set index that is equal to zero, for example, based on the BFD set being the first BFD set associated with the first list of uplink power control sets. For example, in FIG. 21B, the uplink power control set may be UL power control 0 in the first list of uplink power control sets based on uplink power control set index of UL power control 0 being equal to zero (e.g., among uplink power control set indexes of UL power control 0, UL power control 1, . . . , and UL power control N).

The uplink power control set may be the first uplink power control set (e.g., among the one or more first uplink power control sets in the first list of uplink power control sets) with the first uplink power control set index that is equal to zero, for example, based on the first TCI state and the first list of uplink power control sets being associated with the same PCI. The first TCI state and the BFD set may be associated (e.g., if the BFD set is the first BFD set). The uplink power control set may be the first uplink power control set, among the one or more first uplink power control sets in the first list of uplink power control sets, with the first uplink power control set index that is equal to zero, for example, based on the first TCI state and the first list of uplink power control sets being associated with the same PCI and the first TCI state being associated with the BFD set. The uplink power control set may be the first uplink power control set (e.g., among the one or more first uplink power control sets in the first list of uplink power control sets) with the first uplink power control set index that is equal to zero, for example, based on the first TCI state, associated with the first BFD set, and the first list of uplink power control sets being associated with the same PCI. For example, in FIG. 21D, the uplink power control set may be UL power control 0 in the first list of uplink power control sets based on uplink power control set index of UL power control 0 being equal to zero (e.g., among uplink power control set indexes of UL power control 0, UL power control 1, . . . , and UL power control N).

The second uplink power control set index may be equal to zero. The uplink power control set may be the second uplink power control set among the one or more second uplink power control sets in the second list of uplink power control sets, for example, based on the second uplink power control set index of the second uplink power control set in the second list of uplink power control sets being equal to zero.

The uplink power control set may be the second uplink power control set (e.g., among the one or more second uplink power control sets in the second list of uplink power control sets) with the second uplink power control set index that is equal to zero. The uplink power control set may be the second uplink power control set with the second uplink power control set index that is equal to zero, for example, based on the BFD set being the second BFD set associated with the second list of uplink power control sets. For example, in FIG. 21B, the uplink power control set may be UL power control N+1 in the second list of uplink power control sets based on uplink power control set index of UL power control N+1 being equal to zero (e.g., among uplink power control set indexes of UL Power Control N+1, UL Power Control N+2, . . . , and UL Power Control M.

The uplink power control set may be the second uplink power control set (e.g., among the one or more second uplink power control sets in the second list of uplink power control sets) with the second uplink power control set index that is equal to zero, for example, based on the second TCI state and the second list of uplink power control sets being associated with the same PCI. The second TCI state and the BFD set may be associated (e.g., if the BFD set is the second BFD set). The uplink power control set may be the second uplink power control set (e.g., among the one or more second uplink power control sets in the second list of uplink power control sets) with the second uplink power control set index that is equal to zero, for example, based on the second TCI state and the second list of uplink power control sets being associated with the same PCI and the second TCI state being associated with the BFD set. The uplink power control set may be the second uplink power control set (e.g., among the one or more second uplink power control sets in the second list of uplink power control sets) with the second uplink power control set index that is equal to zero, for example, based on the second TCI state, associated with the second BFD set, and the second list of uplink power control sets being associated with the same PCI. For example, in FIG. 21D, the uplink power control set may be UL power control N+1 in the second list of uplink power control sets based on uplink power control set index of UL power control N+1 being equal to zero (e.g., among uplink power control set indexes of UL power control N+1, UL power control N+2, . . . , and UL power control M).

The first uplink power control set index may be lowest/smallest among the one or more first uplink power control set indexes of the one or more first uplink power control sets in the first list of uplink power control sets. The uplink power control set may be the first uplink power control set among the one or more first uplink power control sets in the first list of uplink power control sets, for example, based on the first uplink power control set index of the first uplink power control set being lowest/smallest among the one or more first uplink power control set indexes of the one or more first uplink power control sets.

The uplink power control set may be the first uplink power control set (e.g., among the one or more first uplink power control sets in the first list of uplink power control sets) with the first uplink power control set index that is lowest/smallest among the one or more first uplink power control set indexes of the one or more first uplink power control sets. The uplink power control set may be the first uplink power control set with the first uplink power control set index that is lowest/smallest among the one or more first uplink power control set indexes of the one or more first uplink power control sets, for example, based on the BFD set being the first BFD set associated with the first list of uplink power control sets. For example, in FIG. 21B, the uplink power control set may be UL power control 0 based on uplink power control set index of UL power control 0 being lowest/smallest among uplink power control set indexes of UL power control 0, UL power control 1, . . . , and UL power control N.

The uplink power control set may be the first uplink power control set (e.g., among the one or more first uplink power control sets in the first list of uplink power control sets) with the first uplink power control set index that is lowest/smallest among the one or more first uplink power control set indexes of the one or more first uplink power control sets, for example, based on the first TCI state and the first list of uplink power control sets being associated with the same PCI. The first TCI state and the BFD set may be associated (e.g., if the BFD set is the first BFD set). The uplink power control set may be the first uplink power control set (e.g., among the one or more first uplink power control sets in the first list of uplink power control sets) with the first uplink power control set index that is lowest/smallest among the one or more first uplink power control set indexes of the one or more first uplink power control sets, for example, based on the first TCI state and the first list of uplink power control sets being associated with the same PCI and the first TCI state being associated with the BFD set. The uplink power control set may be the first uplink power control set (e.g., among the one or more first uplink power control sets in the first list of uplink power control sets) with the first uplink power control set index that is lowest/smallest among the one or more first uplink power control set indexes of the one or more first uplink power control sets, for example, based on the first TCI state, associated with the first BFD set, and the first list of uplink power control sets being associated with the same PCI. For example, in FIG. 21D, the uplink power control set may be UL power control 0 in the first list of uplink power control sets based on uplink power control set index of UL power control 0 being lowest/smallest among uplink power control set indexes of UL power control 0, UL power control 1, . . . , and UL power control N.

The second uplink power control set index may be lowest/smallest among the one or more second uplink power control set indexes of the one or more second uplink power control sets in the second list of uplink power control sets. The uplink power control set may be the second uplink power control set among the one or more second uplink power control sets in the second list of uplink power control sets, for example, based on the second uplink power control set index of the second uplink power control set being lowest/smallest among the one or more second uplink power control set indexes of the one or more second uplink power control sets.

The uplink power control set may be the second uplink power control set (e.g., among the one or more second uplink power control sets in the second list of uplink power control sets) with the second uplink power control set index that is lowest/smallest among the one or more second uplink power control set indexes of the one or more second uplink power control sets. The uplink power control set may be the second uplink power control set with the second uplink power control set index that is lowest/smallest among the one or more second uplink power control set indexes of the one or more second uplink power control sets, for example, based on the BFD set being the second BFD set associated with the second list of uplink power control sets. For example, in FIG. 21B, the uplink power control set may be UL power control N+1 based on uplink power control set index of UL power control N+1 being lowest/smallest among uplink power control set indexes of UL power control N+1, UL power control N+2, . . . , and UL power control M.

The uplink power control set may be the second uplink power control set (e.g., among the one or more second uplink power control sets in the second list of uplink power control sets) with the second uplink power control set index that is lowest/smallest among the one or more second uplink power control set indexes of the one or more second uplink power control sets, for example, based on the second TCI state and the second list of uplink power control sets being associated with the same PCI. The second TCI state and the BFD set may be associated (e.g., if the BFD set is the second BFD set). The uplink power control set may be the second uplink power control set (e.g., among the one or more second uplink power control sets in the second list of uplink power control sets) with the second uplink power control set index that is lowest/smallest among the one or more second uplink power control set indexes of the one or more second uplink power control sets, for example, based on the second TCI state and the second list of uplink power control sets being associated with the same PCI and the second TCI state being associated with the BFD set. The uplink power control set may be the second uplink power control set (e.g., among the one or more second uplink power control sets in the second list of uplink power control sets) with the second uplink power control set index that is lowest/smallest among the one or more second uplink power control set indexes of the one or more second uplink power control sets, for example, based on the second TCI state associated with the second BFD set and the second list of uplink power control sets being associated with the same PCI. For example, in FIG. 21D, the uplink power control set may be UL power control N+1, in the second list of uplink power control sets, based on uplink power control set index of UL power control N+1 being lowest/smallest among uplink power control set indexes of UL power control N+1, UL power control N+1, . . . , and UL power control M.

The uplink power control set may be the first uplink power control set (or the BFD set may be the first BFD set). The wireless device may send/transmit, via the one or more first uplink channels/resources for which the first TCI state is applied, the uplink signals with the transmission powers determined based on the one or more power control parameters indicated by the first uplink power control set. The wireless device may transmit, via the one or more first uplink channels/resources for which the first TCI state is applied, the uplink signals with the transmission powers determined based on the one or more power control parameters indicated by the first uplink power control set, for example, after the quantity of symbols from the last symbol of the DCI that completes the beam failure recovery procedure. The wireless device may transmit, via the one or more first uplink channels/resources that the first TCI state is applied, the uplink signals with the transmission powers determined based on the one or more power control parameters indicated by the first uplink power control set, for example, after the quantity of symbols from the last symbol of the DCI that completes the beam failure recovery procedure of the first BFD set. The wireless device may transmit, via the one or more first uplink channels/resources, the uplink signals with the transmission powers determined based on the one or more power control parameters indicated by the first uplink power control set, for example, based on/in response to applying the first TCI state to the one or more first uplink channels/resources. The wireless device may transmit each uplink signal of the uplink signals with a respective transmission power, of the transmission powers, determined based on the one or more power control parameters indicated by the first uplink power control set. For example, the wireless device may transmit a first uplink signal (e.g., a PUSCH transmission, or any other first uplink transmission) of the uplink signals with a first transmission power, of the transmission powers, determined based on the one or more power control parameters (e.g., first higher layer parameters, such as p0AlphaSetforPUSCH) indicated by the first uplink power control set. The wireless device may transmit a second uplink signal (e.g., a PUCCH transmission, or any other second uplink transmission) of the uplink signals with a second transmission power, of the transmission powers, determined based on the one or more power control parameters (e.g., second higher layer parameters, such as p0AlphaSetforPUCCH) indicated by the first uplink power control set. The wireless device may transmit a third uplink signal (e.g., PUSCH transmission, or any other third uplink transmission) of the uplink signals with a third transmission power, of the transmission powers, determined based on the one or more power control parameters (e.g., third higher layer parameters, such as p0AlphaSetforSRS) indicated by the first uplink power control set.

The uplink power control set may be the first uplink power control set (or the BFD set may be the first BFD set). The wireless device may send/transmit, via the one or more first uplink channels/resources in which the first TCI state is applied, first uplink signals. The wireless device may send/transmit the first uplink signals with first transmission powers determined based on one or more first power control parameters indicated by the first uplink power control set. The wireless device may transmit each uplink signal of the first uplink signals with a respective transmission power, of the first transmission powers, determined based on the one or more first power control parameters indicated by the first uplink power control set.

The wireless device may send/transmit the first uplink signals to/towards/via a first TRP. The wireless device may send/transmit the first uplink signals to/towards/via a first non-serving cell. The at least one cell may comprise the first non-serving cell. The wireless device may send/transmit the first uplink signals to/towards/via the cell.

The first uplink signals may comprise a first PUSCH transmission. The wireless device may send the first PUSCH transmission with a first transmission power determined based on the one or more first power control parameters indicated by the first uplink power control set (e.g., p0AlphaSetforPUSCH). The one or more first power control parameters may be/comprise power control parameter(s) indicated by a higher layer parameter (e.g., RRC parameter) p0AlphaSetforPUSCH of/in the first uplink power control set. The first transmission powers may comprise the first transmission power of the first PUSCH transmission. The wireless device may send the first PUSCH transmission based on the first TCI state.

The first uplink signals may comprise a first PUCCH transmission. The wireless device may send the first PUCCH transmission with a second transmission power determined based on the one or more first power control parameters indicated by the first uplink power control set (e.g., p0AlphaSetforPUCCH). The one or more first power control parameters may be/comprise power control parameter(s) indicated by a higher layer parameter (e.g., RRC parameter) p0AlphaSetforPUCCH of/in the first uplink power control set. The first transmission powers may comprise the second transmission power of the first PUCCH transmission. The wireless device may send the first PUCCH transmission, for example, via a first PUCCH resource of the one or more first uplink channels/resources. The wireless device may send the first PUCCH transmission, for example, via a first PUCCH resource in a first PUCCH resource set of the one or more first uplink channels/resources.

The first uplink signals may comprise a first SRS transmission. The wireless device may send the first SRS transmission with a third transmission power determined based on the one or more first power control parameters indicated by the first uplink power control set (e.g., p0AlphaSetforSRS). The one or more first power control parameters may be/comprise power control parameter(s) indicated by a higher layer parameter (e.g., RRC parameter) p0AlphaSetforSRS of/in the first uplink power control set. The first transmission powers may comprise the third transmission power of the first SRS transmission. The wireless device may send the first SRS transmission, for example, via a first SRS resource of the one or more first uplink channels/resources. The wireless device may send the first SRS transmission, for example, via a first SRS resource in a first SRS resource set of the one or more first uplink channels/resources.

The wireless device may send/transmit the first uplink signals with the first transmission powers determined based on the first uplink power control set, for example, after a quantity of symbols from a last symbol of the DCI that completes the beam failure recovery procedure. The wireless device may send/transmit the first uplink signals with the first transmission powers determined based on the first uplink power control set, for example, after a quantity of symbols from a last symbol of the DCI that completes the beam failure recovery procedure of the first BFD set. The wireless device may send/transmit the first uplink signals with the first transmission powers determined based on the first uplink power control set, for example, starting from the quantity of symbols from the last symbol of the DCI that completes the beam failure recovery procedure. The wireless device may send/transmit the first uplink signals with the first transmission powers determined based on the first uplink power control set, for example, starting from the quantity of symbols from the last symbol of the DCI that completes the beam failure recovery procedure of the first BFD set. The wireless device may start transmitting the first uplink signals with the first transmission powers determined based on the first uplink power control set, for example, after the quantity of symbols from the last symbol of the DCI that completes the beam failure recovery procedure. The wireless device may start transmitting the first uplink signals with the first transmission powers determined based on the first uplink power control set, for example, after the quantity of symbols from the last symbol of the DCI that completes the beam failure recovery procedure of the first BFD set. Transmitting the first uplink signals with the first transmission powers determined based on the first uplink power control set may start following/after the quantity of symbols from the last symbol of the DCI that completes the beam failure recovery procedure. Transmitting the first uplink signals with the first transmission powers determined based on the first uplink power control set may start following/after the quantity of symbols from the last symbol of the DCI that completes the beam failure recovery procedure of the first BFD set.

The uplink power control set may be the second uplink power control set (or the BFD set may be the second BFD set). The wireless device may send/transmit, via the one or more second uplink channels/resources for which the second TCI state is applied, the uplink signals with the transmission powers determined based on the one or more power control parameters indicated by the second uplink power control set. The wireless device may send/transmit, via the one or more second uplink channels/resources for which the second TCI state is applied, the uplink signals with the transmission powers determined based on the one or more power control parameters indicated by the second uplink power control set, for example, after the quantity of symbols from the last symbol of the DCI that completes the beam failure recovery procedure. The wireless device may send/transmit, via the one or more second uplink channels/resources for which the second TCI state is applied, the uplink signals with the transmission powers determined based on the one or more power control parameters indicated by the second uplink power control set, for example, after the quantity of symbols from the last symbol of the DCI that completes the beam failure recovery procedure of the second BFD set. The wireless device may send/transmit, via the one or more second uplink channels/resources, the uplink signals with the transmission powers determined based on the one or more power control parameters indicated by the second uplink power control set, for example, based on/in response to applying the second TCI state to the one or more second uplink channels/resources. The wireless device may send/transmit each uplink signal of the uplink signals with a respective transmission power, of the transmission powers, determined based on the one or more power control parameters indicated by the second uplink power control set. For example, the wireless device may transmit a first uplink signal (e.g., a PUSCH transmission, or any other first uplink transmission) of the uplink signals with a first transmission power, of the transmission powers, determined based on the one or more power control parameters (e.g., first higher layer parameters, such as p0AlphaSetforPUSCH) indicated by the second uplink power control set. The wireless device may transmit a second uplink signal (e.g., a PUCCH transmission, or any other second uplink transmission) of the uplink signals with a second transmission power, of the transmission powers, determined based on the one or more power control parameters (e.g., second higher layer parameters, such as p0AlphaSetforPUCCH) indicated by the second uplink power control set. The wireless device may transmit a third uplink signal (e.g., a PUSCH transmission, or any other third uplink transmission) of the uplink signals with a third transmission power, of the transmission powers, determined based on the one or more power control parameters (e.g., third higher layer parameters, such as p0AlphaSetforSRS) indicated by the second uplink power control set.

The uplink power control set may be the second uplink power control set (e.g., if the BFD set is the second BFD set). The wireless device may send/transmit, via the one or more second uplink channels/resources in which the second TCI state is applied, second uplink signals. The wireless device may send/transmit the second uplink signals with second transmission powers determined based on one or more second power control parameters indicated by the second uplink power control set. The wireless device may transmit each uplink signal of the second uplink signals with a respective transmission power, of the second transmission powers, determined based on the one or more second power control parameters indicated by the second uplink power control set.

The wireless device may transmit the second uplink signals to/towards/via a second TRP. The wireless device may transmit the second uplink signals to/towards/via a second non-serving cell. The at least one cell may comprise the second non-serving cell. The wireless device may transmit the second uplink signals to/towards/via the cell.

The second uplink signals may comprise a second PUSCH transmission. The wireless device may send the second PUSCH transmission with a first transmission power determined based on the one or more second power control parameters indicated by the second uplink power control set (e.g., p0AlphaSetforPUSCH). The one or more second power control parameters may be/comprise power control parameter(s) indicated by a higher layer parameter (e.g., RRC parameter) p0AlphaSetforPUSCH of/in the second uplink power control set. The second transmission powers may comprise the first transmission power of the second PUSCH transmission. The wireless device may send the second PUSCH transmission based on the second TCI state.

The second uplink signals may comprise a second PUCCH transmission. The wireless device may send the second PUCCH transmission with a second transmission power determined based on the one or more second power control parameters indicated by the second uplink power control set (e.g., p0AlphaSetforPUCCH). The one or more second power control parameters may be/comprise power control parameter(s) indicated by a higher layer parameter (e.g., RRC parameter) p0AlphaSetforPUCCH of/in the second uplink power control set. The second transmission powers may comprise the second transmission power of the second PUCCH transmission. The wireless device may send the second PUCCH transmission via a second PUCCH resource of the one or more second uplink channels/resources. The wireless device may send the second PUCCH transmission via a second PUCCH resource in a second PUCCH resource set of the one or more second uplink channels/resources.

The second uplink signals may comprise a second SRS transmission. The wireless device may send the second SRS transmission with a third transmission power determined based on the one or more second power control parameters indicated by the second uplink power control set (e.g., p0AlphaSetforSRS). The one or more second power control parameters may be/comprise power control parameter(s) indicated by a higher layer parameter (e.g., RRC parameter) p0AlphaSetforSRS of/in the second uplink power control set. The second transmission powers may comprise the third transmission power of the second SRS transmission. The wireless device may send the second SRS transmission via a second SRS resource of the one or more second uplink channels/resources. The wireless device may send the second SRS transmission via a second SRS resource in a second SRS resource set of the one or more second uplink channels/resources.

The wireless device may send/transmit the second uplink signals with the second transmission powers determined based on the second uplink power control set, for example, after a quantity of symbols from a last symbol of the DCI that completes the beam failure recovery procedure. The wireless device may send/transmit the second uplink signals with the second transmission powers determined based on the second uplink power control set, for example, after a quantity of symbols from a last symbol of the DCI that completes the beam failure recovery procedure of the second BFD set. The wireless device may send/transmit the second uplink signals with the second transmission powers determined based on the second uplink power control set, for example, starting from the procedure of symbols from the last symbol of the DCI that completes the beam failure recovery procedure. The wireless device may send/transmit the second uplink signals with the second transmission powers determined based on the second uplink power control set, for example, starting from the quantity of symbols from the last symbol of the DCI that completes the beam failure recovery procedure of the second BFD set. The wireless device may start transmitting the second uplink signals with the second transmission powers determined based on the second uplink power control set, for example, after the quantity of symbols from the last symbol of the DCI that completes the beam failure recovery procedure. The wireless device may start transmitting the second uplink signals with the second transmission powers determined based on the second uplink power control set, for example, after the quantity of symbols from the last symbol of the DCI that completes the beam failure recovery procedure of the second BFD set. Transmitting the second uplink signals with the second transmission powers determined based on the second uplink power control set may start after/following the quantity of symbols from the last symbol of the DCI that completes the beam failure recovery procedure. Transmitting the second uplink signals with the second transmission powers determined based on the second uplink power control set may start after/following the quantity of symbols from the last symbol of the DCI that completes the beam failure recovery procedure of the second BFD set.

Figure 22A:
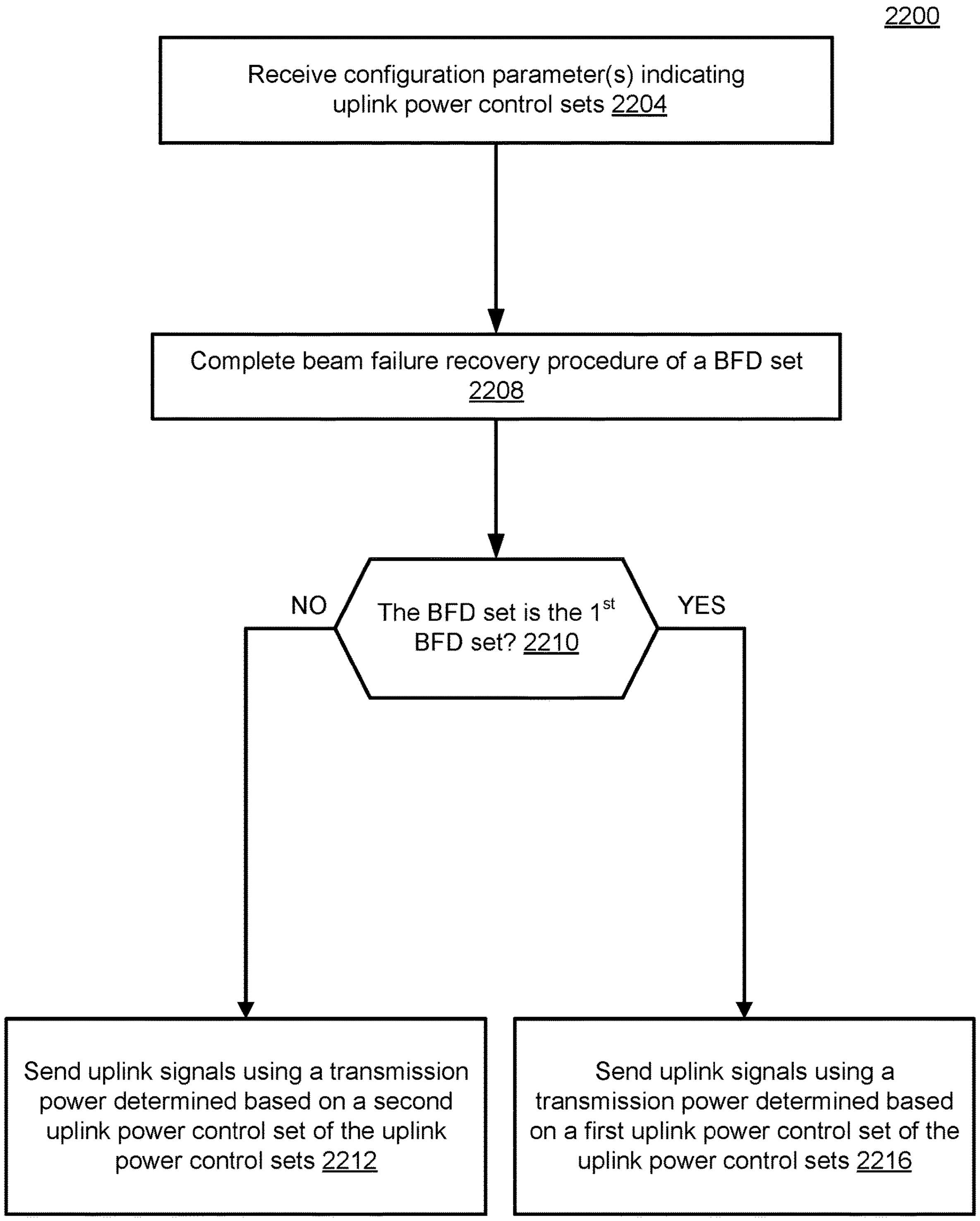
FIG. 22A and FIG. 22B show example methods corresponding to a beam failure recovery procedure.
Figure 22B:
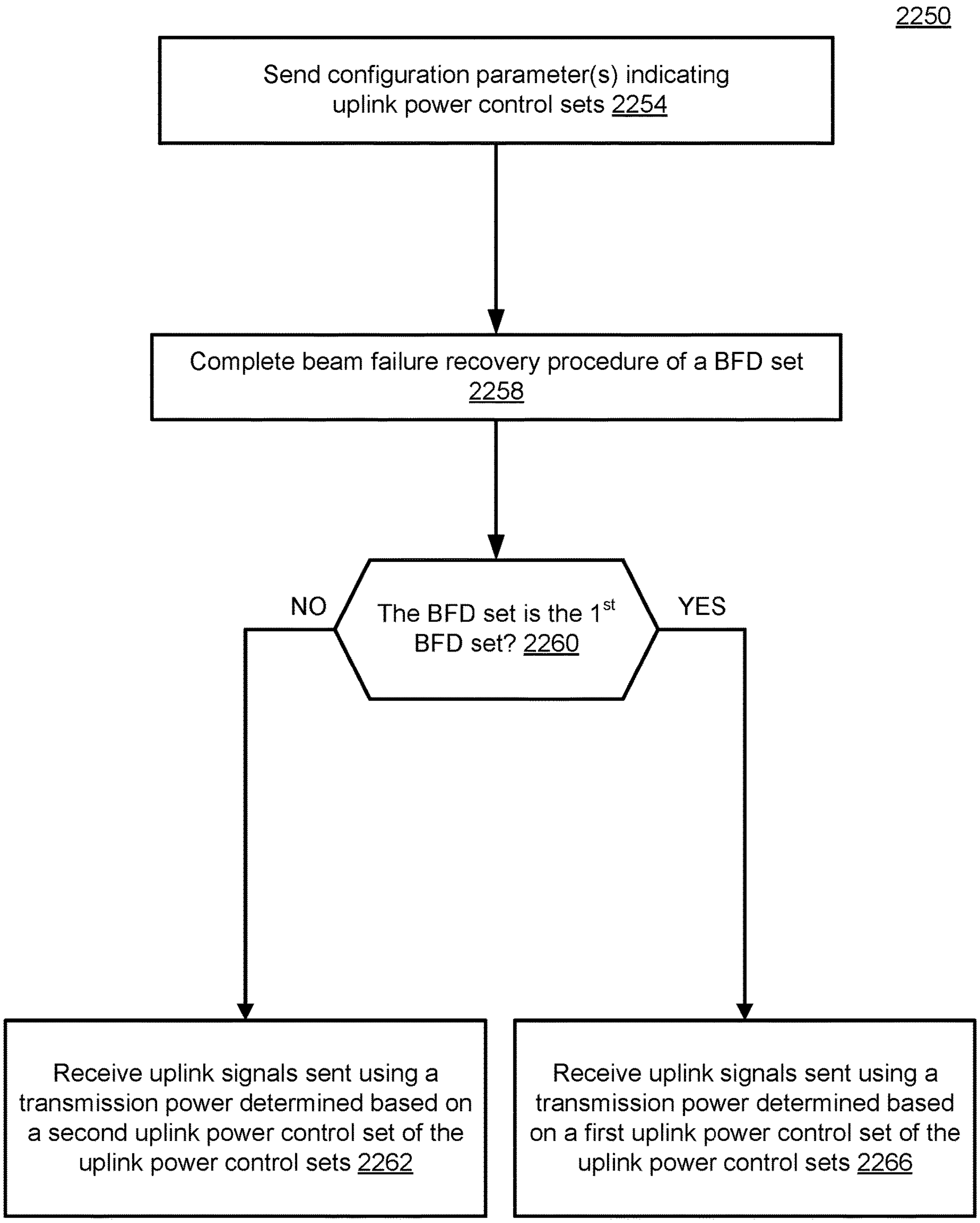

FIG. 22A and FIG. 22B show example methods corresponding to a beam failure recovery procedure. The method 2200 of FIG. 22A may be used (e.g., at wireless device) to determine a transmission power may be for an uplink transmission following completion of the beam failure recovery procedure. The method 2250 of FIG. 22B may be used (e.g., at a base station) to receive an uplink transmission following completion of the beam failure recovery procedure.

A wireless device may receive one or more messages (e.g., step 2204). The one or more messages may comprise one or more configuration parameters of a cell. A base station may send/transmit the one or more messages (e.g., step 2254).

The one or more configuration parameters indicate/comprise a plurality of uplink power control sets (e.g., a higher layer parameter Uplink-powerControl). The one or more configuration parameters may indicate a plurality of uplink power control set indexes/identifiers/identities (e.g., a higher layer parameter ul-powercontrolId) for the plurality of uplink power control sets. Each uplink power control set of the plurality of uplink power control sets may be identified/indicated by a respective uplink power control set index of the plurality of uplink power control set indexes.

The wireless device may detect a first beam failure of a first BFD set. The wireless device may send/transmit, for a first beam failure recovery procedure of the first BFD set, a first uplink signal indicating the first beam failure of the first BFD set. For example, at least two BFD sets may comprise the first BFD set.

The wireless device and/or the base station may complete the first beam failure recovery procedure of the first BFD set (e.g., step 2208, 2258). The wireless device may receive (e.g., from the base station) a first downlink control message/command (e.g., DCI) that completes the first beam failure recovery procedure. The wireless device may send/transmit first uplink signals with (e.g., using) first transmission powers, for example, based on receiving the first downlink control message/command that completes the first beam failure recovery procedure (e.g., step 2216). The wireless device may send/transmit first uplink signals with (e.g., using) the first transmission powers, for example, based on determining (e.g., at step 2210) that the first beam failure recovery procedure is completed for the first BFD set. The first transmission powers may be determined based on first power control parameters indicated by a first uplink power control set of the plurality of uplink power control sets.

The base station may receive the first uplink signals that are transmitted using the first transmission powers (e.g., step 2266). The base station may receive first uplink signals sent using the first transmission powers, for example, based on a determination (e.g., at step 2260) that the first beam failure recovery procedure is completed for the first BFD set.

The base station may transmit the first downlink control message/command, for example, based on receiving the first uplink signal indicating the first beam failure of the first BFD set. The base station may receive the first uplink signals based on (e.g., sent using/with) the first transmission powers, for example, based on transmitting the first downlink control message/command that completes the first beam failure recovery procedure. The first transmission powers may be determined, by the wireless device, based on the first uplink power control set.

Transmitting the first uplink signals based on the first uplink power control set may start/occur after a certain quantity of symbols (e.g., 28 symbols, or any other quantity of symbols) from a last symbol of reception of the first downlink control message/command. The reception of the first downlink control message/command may correspond to a first PDCCH reception comprising/carrying the first downlink control message/command.

The wireless device may detect a second beam failure of a second BFD set. The wireless device may send/transmit, for a second beam failure recovery procedure of the second BFD set, a second uplink signal indicating the second beam failure of the second BFD set. The at least two BFD sets may comprise the second BFD set.

The wireless device and/or the base station may complete the second beam failure recovery procedure of the second BFD set (e.g., step 2208, 2258). The wireless device may receive (e.g., from the base station) a second downlink control message/command (e.g., DCI) that completes the second beam failure recovery procedure. The wireless device may send/transmit second uplink signals with (e.g., using) second transmission powers (e.g., step 2212), for example, based on receiving the second downlink control message/command that completes the second beam failure recovery procedure. The wireless device may send/transmit the second uplink signals with (e.g., using) the second transmission powers, for example, based on determining (e.g., at step 2210) that the second beam failure recovery procedure is completed for the second BFD set. The second transmission powers may be determined based on second power control parameters indicated by a second uplink power control set of the plurality of uplink power control sets. The first uplink power control set and the second uplink power control set may be different.

The base station may receive the second uplink signals that are transmitted using the second transmission powers (e.g., step 2262). The base station may receive the second uplink signals sent using the second transmission powers, for example, based on a determination (e.g., at step 2260) that the second beam failure recovery procedure is completed for the second BFD set.

The base station may send/transmit the second downlink control message/command, for example, based on receiving the second uplink signal indicating the second beam failure of the second BFD set. The base station may receive the second uplink signals based on (e.g., sent using/with) the second transmission powers, for example, based on transmitting the second downlink control message/command that completes the second beam failure recovery procedure (e.g., step 2262). The second transmission powers may be determined, by the wireless device, based on the second uplink power control set.

Transmitting the second uplink signals based on the second uplink power control set may start/occur, for example, after a certain quantity of symbols (e.g., 28 symbols, or any other quantity of symbols) from a last symbol of reception of the second downlink control message/command. The reception of the second downlink control message/command may correspond to a second PDCCH reception comprising/carrying the second downlink control message/command.

The first BFD set may be associated with the first TCI state. The second BFD set may be associated with the second TCI state. The one or more configuration parameters may indicate a plurality of TCI states (e.g., joint TCI states, uplink TCI states). The wireless device may receive one or more downlink control messages/commands (e.g., MAC CEs and/or DCIs) indicating activation of at least two TCI states comprising a first TCI state and a second TCI state. The plurality of TCI states may comprise the at least two TCI states. The base station may send/transmit the one or more downlink control messages/commands.

The wireless device may send/transmit uplink signals via first uplink channels/resources (e.g., PUSCH, PUCCH, SRS) with (e.g., using) first transmission parameter(s) (e.g., a first spatial domain transmission filter, a first transmission power, and/or the like). The first transmission parameter may be determined based on the first TCI state. The wireless device may transmit the uplink signals via the first uplink channels/resources with the first transmission parameter(s) determined based on the first TCI state, for example, before (or prior to) completing the first beam failure recovery procedure. The wireless device may transmit the uplink signals via the first uplink channels/resources with the first transmission parameter(s) determined based on the first TCI state, for example, before (or prior to) the certain quantity of symbols (e.g., 28 symbols, or any other quantity of symbols) from the last symbol of reception of the first downlink control message/command. The reception of the first downlink control message/command may correspond to the first PDCCH reception comprising/carrying the first downlink control message/command. The base station may receive the uplink signals, via the first uplink channels/resources, transmitted using the first transmission parameter(s) (e.g., the first spatial domain transmission filter) determined based on the first TCI state.

Transmitting the first uplink signals based on the first uplink power control set may be via the first uplink channels/resources. The wireless device may transmit, via the first uplink channels/resources, the first uplink signals based on the first uplink power control set. The wireless device may transmit, via the first uplink channels/resources, the first uplink signals based on the first uplink power control set, for example, based on/in response to the first uplink channels/resources being associated with the first TCI state. The wireless device may transmit, via the first uplink channels/resources, the first uplink signals based on the first uplink power control set, for example, based on/in response to applying the first TCI state to the first uplink channels/resources. The wireless device may transmit, via the first uplink channels/resources, the first uplink signals based on the first uplink power control set, for example, based on/in response to the first BFD set being associated with the first TCI state. The base station may receive, via the first uplink channels/resources, the first uplink signals based on the first uplink power control set. The base station may receive, via the first uplink channels/resources, the first uplink signals based on the first uplink power control set, for example, based on/in response to the first uplink channels/resources being associated with the first TCI state.

The wireless device may send/transmit uplink signals via second uplink channels/resources (e.g., PUSCH, PUCCH, SRS) with second transmission parameter(s) (e.g., a second spatial domain transmission filter, a second transmission power, and/or the like). The second transmission parameter may be determined based on the second TCI state. The wireless device may transmit the uplink signals via the second uplink channels/resources with the second transmission parameter(s) determined based on the second TCI state, for example, before (or prior to) completing the second beam failure recovery procedure. The wireless device may transmit the uplink signals via the second uplink channels/resources with the second transmission parameter(s) determined based on the second TCI state, for example, before (or prior to) the certain quantity of symbols (e.g., 28 symbols, or any other quantity of symbols) from the last symbol of reception of the second downlink control message/command. The reception of the second downlink control message/command may correspond to the second PDCCH reception comprising/carrying the second downlink control message/command. The base station may receive the uplink signals, via the second uplink channels/resources, sent/transmitted using the second transmission parameter(s) (e.g., the second spatial domain transmission filter) determined based on the second TCI state.

Transmitting the second uplink signals based on the second uplink power control set may be via the second uplink channels/resources. The wireless device may transmit, via the second uplink channels/resources, the second uplink signals based on the second uplink power control set. The wireless device may transmit, via the second uplink channels/resources, the second uplink signals based on the second uplink power control set, for example, based on/in response to the second uplink channels/resources being associated with the second TCI state. The wireless device may transmit, via the second uplink channels/resources, the second uplink signals based on the second uplink power control set, for example, based on/in response to applying the second TCI state to the second uplink channels/resources. The wireless device may transmit, via the second uplink channels/resources, the second uplink signals based on the second uplink power control set, for example, based on/in response to the second BFD set being associated with the second TCI state. The base station may receive, via the second uplink channels/resources, the second uplink signals based on the second uplink power control set. The base station may receive, via the second uplink channels/resources, the second uplink signals based on the second uplink power control set, for example, based on/in response to the second uplink channels/resources being associated with the second TCI state.

The wireless device may determine the first uplink power control set based on one or more criteria as described herein (e.g., with reference to FIG. 21A, FIG. 21B, FIG. 21C, and FIG. 21D). The wireless device may determine the second uplink power control set based on one or more criteria as described herein (e.g., with reference to FIG. 21A, FIG. 21B, FIG. 21C, and FIG. 21D).

The base station may determine/select the first uplink power control set based on one or more criteria as described herein (e.g., with reference to FIG. 21A, FIG. 21B, FIG. 21C, and FIG. 21D). The base station may determine/select the second uplink power control set based on one or more criteria as described herein (e.g., with reference to FIG. 21A, FIG. 21B, FIG. 21C, and FIG. 21D).

The one or more configuration parameters may comprise an uplink power control parameter (e.g., uplink-PowerControlToAddModList). The uplink power control parameter may indicate a list of uplink power control sets comprising the plurality of uplink power control sets (e.g., IE Uplink-PowerControl).

The first uplink power control set may be identified with a first uplink power control set index of the plurality of uplink power control set indexes. The first uplink power control set index may be equal to zero (or any other first value). The second uplink power control set may be identified with a second uplink power control set index of the plurality of uplink power control set indexes. The second uplink power control set index may be equal to one (or any other second value).

The first uplink power control set may be identified with a first uplink power control set index that is lowest/smallest among the plurality of uplink power control set indexes. The second uplink power control set may be identified with a second uplink power control set index that is second lowest/smallest among the plurality of uplink power control set indexes.

The first uplink power control set may be identified with a first uplink power control set index that is lowest/smallest among one or more first power control set indexes of one or more first uplink power control sets. The plurality of uplink power control sets may comprise the one or more first uplink power control sets. The one or more first uplink power control sets may be associated with the first BFD set. The plurality of uplink power control set indexes may comprise the one or more first power control set indexes. Each uplink power control set index of the one or more first uplink power control set indexes may indicate/identify a respective uplink power control set of the one or more first uplink power control sets. The second uplink power control set may be identified with a second uplink power control set index that is lowest/smallest among one or more second power control set indexes of one or more second uplink power control sets. The plurality of uplink power control sets may comprise the one or more second uplink power control sets. The one or more second uplink power control sets may be associated with the second BFD set. The plurality of uplink power control set indexes may comprise the one or more second power control set indexes. Each uplink power control set index of the one or more second uplink power control set indexes may indicate/identify a respective uplink power control set of the one or more second uplink power control sets.

The one or more configuration parameters may indicate an index (e.g., TRP index, BFD set index, panel index, capability set index, CORESET pool index, flag, unified TCI state index/indicator, additionalPCIIndex) with a first value for the one or more first uplink power control sets. The one or more configuration parameters may indicate the index with the first value for each of the one or more first uplink power control sets. The first value of the index may be associated with (e.g., may indicate, may be mapped to) the first BFD set. The one or more configuration parameters may indicate an index (e.g., TRP index, BFD set index, panel index, capability set index, CORESET pool index, flag, unified TCI state index/indicator, additionalPCIIndex) with a second value for the one or more second uplink power control sets. The one or more configuration parameters may indicate the index with the second value for each of the one or more second uplink power control sets. The second value of the index may be associated with (e.g., may indicate, may be mapped to) the second BFD set.

The one or more configuration parameters may comprise at least two uplink power control parameters (e.g., uplink- PowerControlToAddModList and uplink-PowerControl-ToAddModList) indicating at least two lists of uplink power control sets. A first list of uplink power control sets of the at least two lists of uplink power control sets may comprise one or more first uplink power control sets of the plurality of uplink power control sets. A second list of uplink power control sets of the at least two lists of uplink power control sets may comprise one or more second uplink power control sets of the plurality of uplink power control sets.

The first list of uplink power control sets may be associated with the first BFD set. The second list of uplink power control sets may be associated with the second BFD set.

The first uplink power control set may be identified with a first uplink power control set index (e.g., 0, or any other value). The first uplink power control set index may be lowest/smallest among one or more first uplink power control set indexes of the one or more first uplink power control sets in the first list of uplink power control sets. The first uplink power control set may be identified with the first uplink power control set index (e.g., 0, or any other value) that is lowest/smallest among one or more first uplink power control set indexes of the one or more first uplink power control sets in the first list of uplink power control sets, for example, based on the first list of uplink power control sets being associated with the first BFD set. The plurality of uplink power control set indexes may comprise the one or more first uplink power control set indexes.

The second uplink power control set may be identified with a second uplink power control set index (e.g., 0, or any other value). The second uplink power control set index may be lowest/smallest among one or more second uplink power control set indexes of the one or more second uplink power control sets in the second list of uplink power control sets. The plurality of uplink power control set indexes may comprise the one or more second uplink power control set indexes. The second uplink power control set may be identified with the second uplink power control set index (e.g., 0, or any other value) that is lowest/smallest among one or more second uplink power control set indexes of the one or more second uplink power control sets in the second list of uplink power control sets, for example, based on the second list of uplink power control sets being associated with the second BFD set.

The first TCI state may be associated with a PCI. The second TCI state may be associated with a second PCI. The first PCI and the second PCI may be the same (e.g., same PCI). The first PCI and the second PCI may be different (e.g., different PCIs).

The one or more configuration parameters may indicate, for the first TCI state, a first additional PCI index (e.g., higher layer parameter AdditionalPCIIndex) indicating the first PCI. The first PCI may be (equal to) a PCI of the cell based on the one or more configuration parameters not indicating, for the first TCI state, an additional PCI index (e.g., higher layer parameter AdditionalPCIIndex).

The one or more configuration parameters may indicate, for the second TCI state, a second additional PCI index (e.g., higher layer parameter AdditionalPCIIndex) indicating the second PCI. The second PCI may be (equal to) a PCI of the cell based on the one or more configuration parameters not indicating, for the second TCI state, an additional PCI index (e.g., higher layer parameter AdditionalPCIIndex).

The first BFD set may be associated with the first PCI. The second BFD set may be associated with the second PCI. The one or more configuration parameters may indicate, for the first BFD set, a first additional PCI index (e.g., AdditionalPCIIndex) indicating the first PCI. The one or more configuration parameters may indicate, for the second BFD set, a second additional PCI index (e.g., AdditionalPCIIndex) indicating the second PCI.

The first uplink power control set may be identified with a first uplink power control set index that is lowest/smallest among one or more first uplink power control set indexes of one or more first uplink power control sets associated with the first PCI. The one or more first uplink power control sets may not be associated with the second PCI. The plurality of uplink power control sets may comprise the one or more first uplink power control sets. The plurality of uplink power control set indexes may comprise the one or more first uplink power control set indexes. The one or more configuration parameters may indicate, for the one or more first uplink power control sets, a first additional PCI index (e.g., higher layer parameter AdditionalPCIIndex) indicating the first PCI.

The second uplink power control set may be identified with a second uplink power control set index that is lowest/smallest among one or more second uplink power control set indexes of one or more second uplink power control sets associated with the second PCI. The one or more second uplink power control sets may not be associated with the first PCI. The plurality of uplink power control sets may comprise the one or more second uplink power control sets. The plurality of uplink power control set indexes may comprise the one or more second uplink power control set indexes. The one or more configuration parameters may indicate, for the one or more second uplink power control sets, a second additional PCI index (e.g., higher layer parameter AdditionalPCIIndex) indicating the second PCI.

The first list of uplink power control sets may be associated with the first PCI. The second list of uplink power control sets may be associated with the second PCI. The one or more configuration parameters may indicate, for the first list of uplink power control sets, a first additional PCI index (e.g., higher layer parameter AdditionalPCIIndex) indicating the first PCI. The one or more configuration parameters may indicate, for the second list of uplink power control sets, a second additional PCI index (e.g., higher layer parameter AdditionalPCIIndex) indicating the second PCI.

The first uplink power control set may be identified with a first uplink power control set index (e.g., 0, or any other value) that is lowest/smallest among one or more first uplink power control set indexes of the one or more first uplink power control sets in the first list of uplink power control sets. The first uplink power control set may be identified with the first uplink power control set index (e.g., 0, or any other value) that is lowest/smallest among one or more first uplink power control set indexes of the one or more first uplink power control sets in the first list of uplink power control sets, for example, based on the first list of uplink power control sets being associated with the first PCI. The plurality of uplink power control set indexes may comprise the one or more first uplink power control set indexes.

The second uplink power control set may be identified with a second uplink power control set index (e.g., 0, or any other value) that is lowest/smallest among one or more second uplink power control set indexes of the one or more second uplink power control sets in the second list of uplink power control sets. The plurality of uplink power control set indexes may comprise the one or more second uplink power control set indexes. The second uplink power control set may be identified with the second uplink power control set index (e.g., 0, or any other value) that is lowest/smallest among one or more second uplink power control set indexes of the one or more second uplink power control sets in the second list of uplink power control sets, for example, based on the second list of uplink power control sets being associated with the second PCI.

Figure 23A:
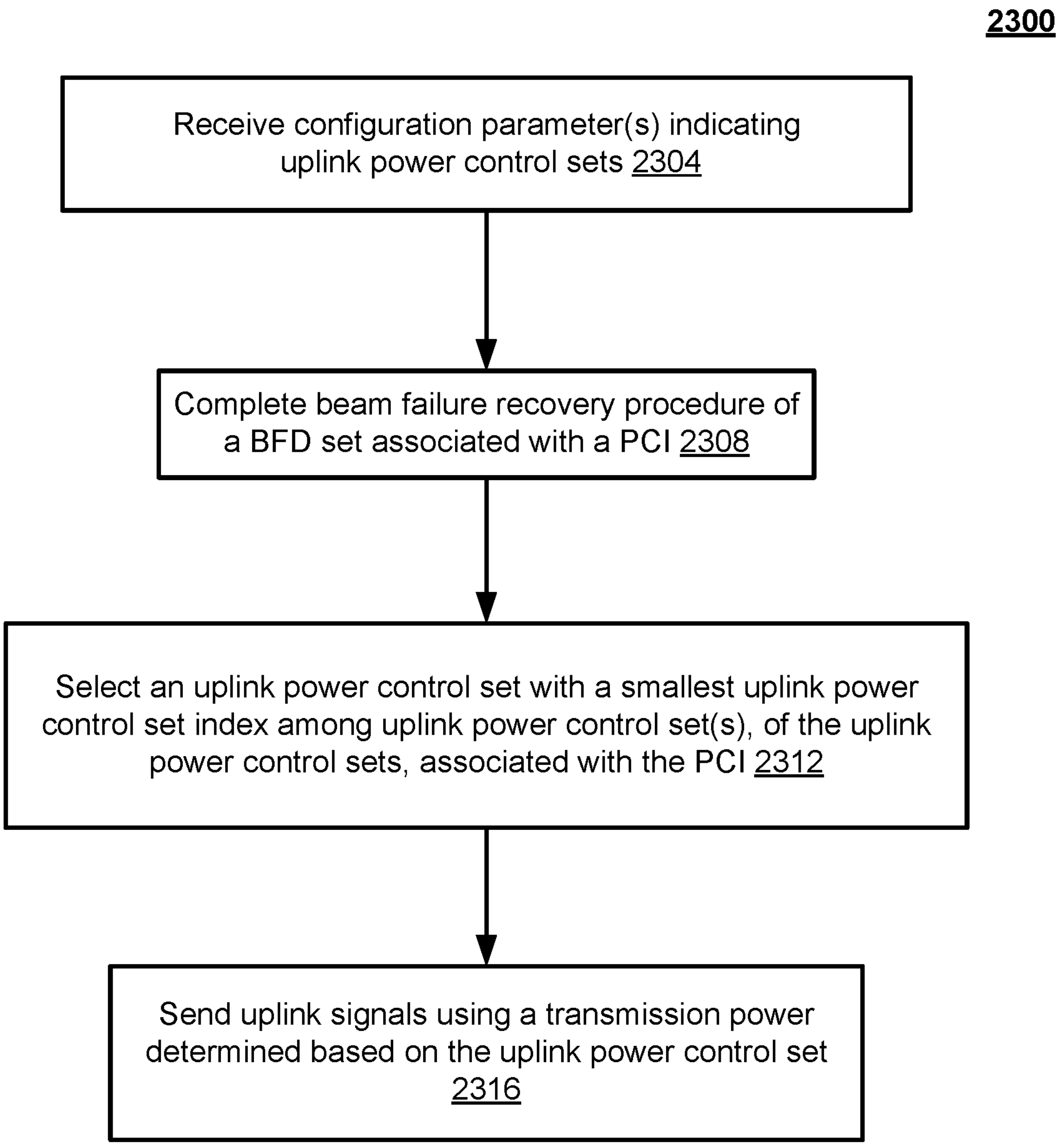
FIG. 23A and FIG. 23B show example methods corresponding to a beam failure recovery procedure.
Figure 23B:
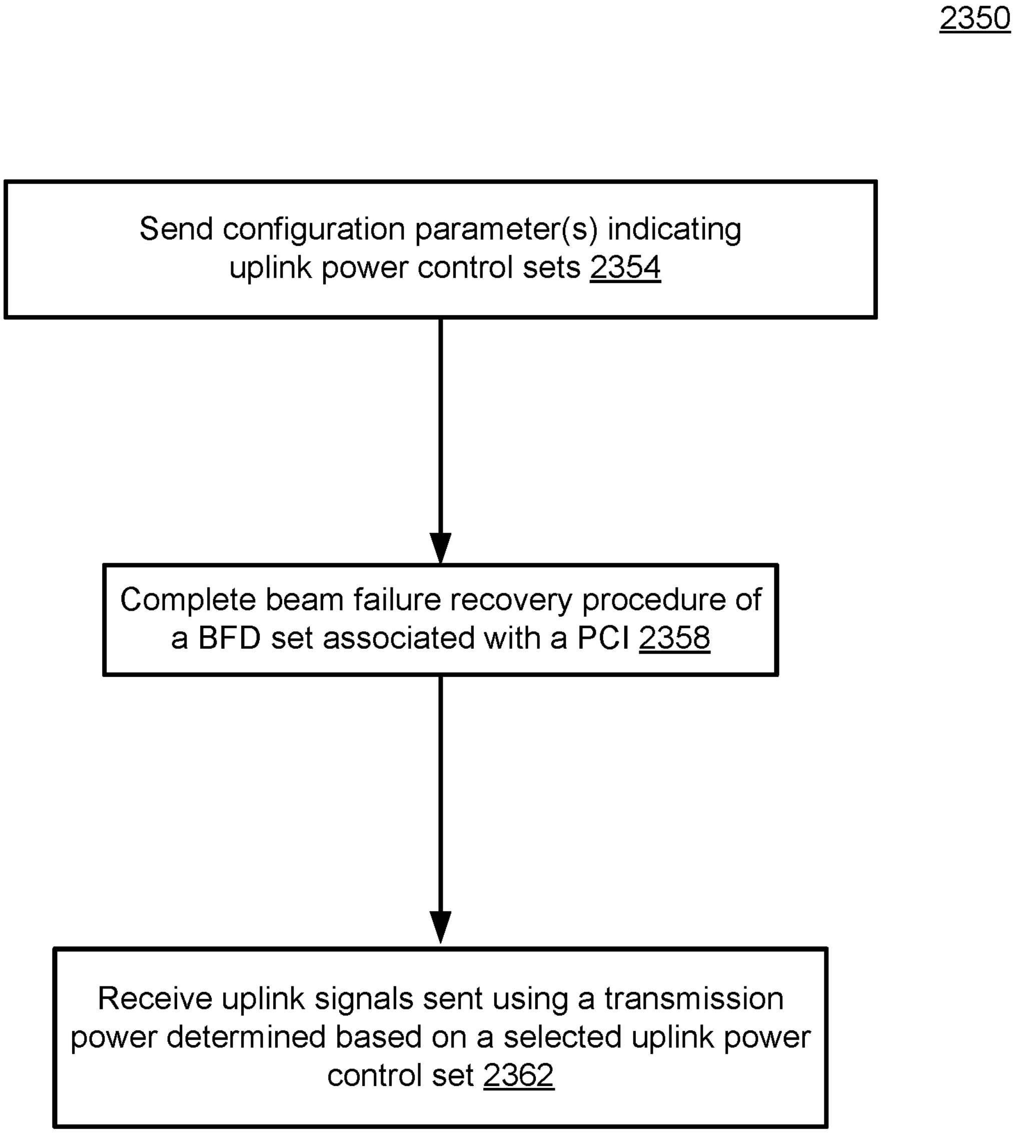

FIG. 23A and FIG. 23B show example methods corresponding to a beam failure recovery procedure. The method 2300 of FIG. 23A may be used (e.g., at wireless device) to determine a transmission power may be for an uplink transmission following completion of the beam failure recovery procedure. The method 2350 of FIG. 23B may be used (e.g., at a base station) to receive an uplink transmission following completion of the beam failure recovery procedure.

The wireless device may receive one or more messages comprising one or more configuration parameters of a cell (e.g., step 2304). The one or more configuration parameters may indicate a plurality of uplink power control sets associated with a plurality of PCIs. Each uplink power control set of the plurality of uplink power control sets may be associated with a respective PCI of the plurality of PCIs. The base station may send the one or more messages comprising the one or more configuration parameters of the cell (e.g., step 2354)

The wireless device may send/transmit, for a beam failure recovery procedure of a BFD set associated with a PCI of the plurality of PCIs, an uplink signal. The uplink signal may indicate a beam failure of the BFD set.

The wireless device and/or the base station may complete a beam failure recovery procedure of the BFD set (e.g., step 2308, 2358). The wireless device may receive a downlink control message/command that completes the beam failure recovery procedure. The wireless device may select an uplink power control set, among/of one or more uplink power control sets of the plurality of uplink power control sets, for example, based on receiving the downlink control message/command that completes the beam failure recovery procedure (e.g., step 2312). The uplink power control set may have a lowest uplink power control set index associated with the same PCI as the BFD set. The plurality of uplink power control sets may comprise the one or more uplink power control sets.

The wireless device may send/transmit uplink signals with (e.g., using) a transmission power determined based on power control parameters indicated by the uplink power control set (e.g., step 2316). The wireless device may send/transmit the uplink signals with the determined transmission power, for example, after a certain quantity of symbols following completing the beam failure recovery procedure (e.g., after the certain quantity of symbols following the reception of the downlink control message/command). The base station may receive the uplink signals (e.g., step 2362)

The wireless device may receive one or more control commands (e.g., MAC CE, DCI, downlink control command/message, and/or the like) activating at least two TCI states (e.g., two unified TCI states, two joint TCI states, two uplink TCI states, and/or the like). The PCI may be associated with one of the at least two (activated) TCI states. The BFD set may be associated with the one of the at least two (activated) TCI states. The uplink signals (or the uplink channels, or uplink resources via which the uplink signals are transmitted) may be associated with the one of the at least two (activated) TCI states.

A wireless device may receive one or more configuration parameters indicating a plurality of uplink power control sets. The wireless device may send/transmit, for a beam failure recovery procedure, an uplink signal indicating a beam failure. The wireless device may receive a downlink control message/command that completes the beam failure recovery procedure.

The wireless device may select an uplink power control set of the plurality of uplink power control sets. The wireless device may select an uplink power control set of the plurality of uplink power control sets, for example, based on which one of at least two BFD sets for which the beam failure recovery procedure is completed. The wireless device may determine/select the uplink power control set of the plurality of uplink power control sets, for example, based on which one of at least two BFD sets for which the downlink control message/command completes the beam failure recovery procedure.

The wireless device may determine a first uplink power control set of the plurality of uplink power control sets, for example, if the beam failure recovery procedure is completed for a first BFD set of the at least two BFD sets. The uplink power control set may be the first uplink power control set.

The wireless device may determine a second uplink power control set of the plurality of uplink power control sets, for example, if the beam failure recovery is completed for a second BFD set of the at least two BFD sets. The uplink power control set may be the second uplink power control set.

The wireless device may determine the first uplink power control set based on one or more criteria described herein (e.g., with reference to FIG. 21A, FIG. 21B, FIG. 21C, and FIG. 21D). The wireless device may determine the second uplink power control set based on one or more criteria described herein (e.g., with reference to FIG. 21A, FIG. 21B, FIG. 21C, and FIG. 21D).

The wireless device may send/transmit uplink signals with a transmission power determined based on power control parameters indicated by the uplink power control set. The wireless device may transmit first uplink signals with a first transmission power determined based on first power control parameters indicated by the first uplink power control set. The wireless device may transmit second uplink signals with a second transmission power determined based on second power control parameters indicated by the second uplink power control set.

Figure 24:
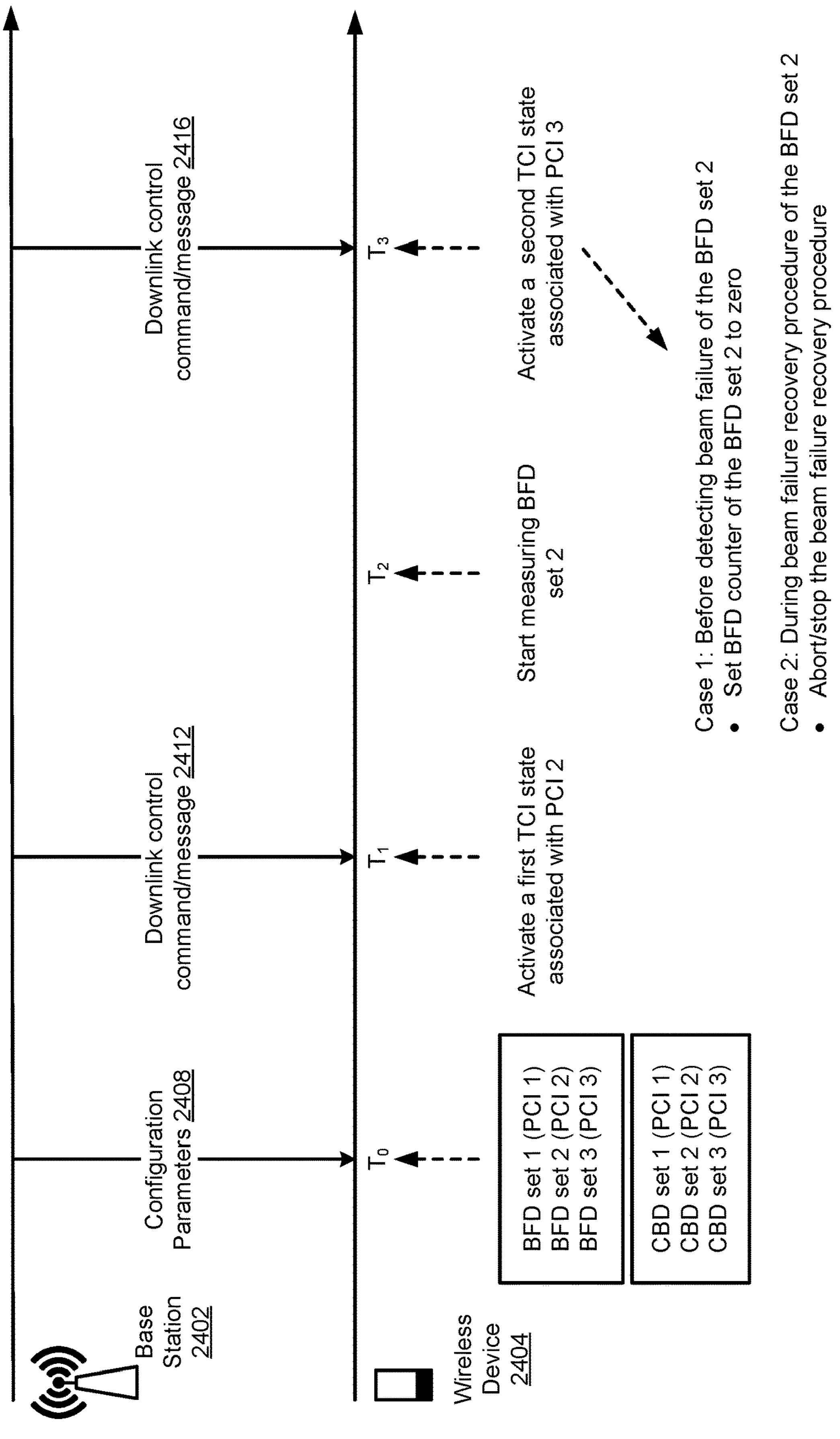
FIG. 24 shows an example beam failure detection.
Figure 25:
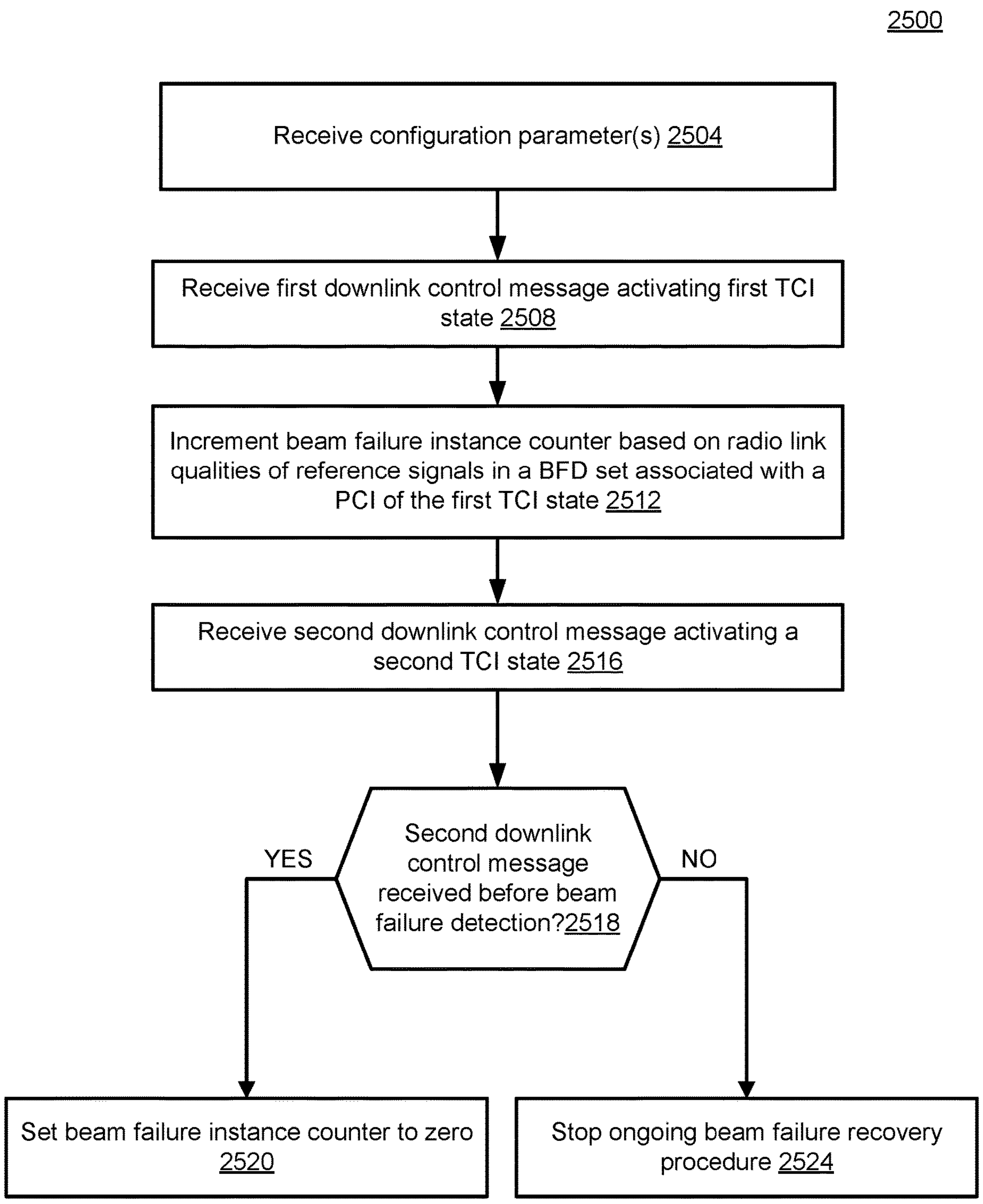
FIG. 25 shows an example method of beam failure detection.

FIG. 24 shows an example beam failure detection. A wireless device may use a beam failure detection counter to detect beam failure and to initiate a beam failure recovery procedure. A control command may be used to indicate activation of a TCI state that is different from a currently activated TCI state. The wireless device may reset the beam failure detection counter, for example, based on receiving the control command prior to detecting a beam failure. The wireless device may abort an ongoing beam failure recovery procedure, for example, based on receiving the control command during the ongoing beam failure recovery procedure. FIG. 25 shows an example method of beam failure detection.

A wireless device (e.g., wireless device 2404) may receive (e.g., from a base station 2402) one or more messages comprising one or more configuration parameters of a cell (e.g., configuration parameters 2408 at time TO, step 2504). The one or more configuration parameters may indicate a plurality of BFD sets. The plurality of BFD sets may comprise at least BFD set 1, BFD set 2, and BFD set 3.

The one or more configuration parameters may comprise a first BFD set parameter (e.g., higher layer parameter failureDetectionSet1) indicating a first BFD set (e.g., BFD set 1) of the plurality of BFD sets. The one or more configuration parameters may comprise a second BFD set parameter (e.g., higher layer parameter failureDetection-Set2) indicating a second BFD set (e.g., BFD set 2) of the plurality of BFD sets. The one or more configuration parameters may comprise a third BFD set parameter (e.g., higher layer parameter failureDetectionSet3) indicating a third BFD set (e.g., BFD set 3) of the plurality of BFD sets. The one or more configuration parameters may comprise other BFD set parameter(s) indicating other BFD set(s).

The one or more configuration parameters may indicate a plurality of candidate beam detection (CBD) sets. The plurality of candidate beam detection sets may comprise at least CBD set 1, CBD set 2, and CBD set 3.

The one or more configuration parameters may comprise a first candidate beam detection set parameter (e.g., higher layer parameter candidateBeamRSList1) indicating a first candidate beam detection set (e.g., CBD set 1) of the plurality of candidate beam detection sets. The one or more configuration parameters may comprise a second candidate beam detection set parameter (e.g., higher layer parameter candidateBeamRSList2) indicating a second candidate beam detection set (e.g., CBD set 2) of the plurality of candidate beam detection sets. The one or more configuration parameters may comprise a third candidate beam detection set parameter (e.g., higher layer parameter candidate-BeamRSList2) indicating a third candidate beam detection set (e.g., CBD set 3) of the plurality of candidate beam detection sets. The one or more configuration parameters may comprise other candidate beam detection set parameter (s) indicating other candidate beam detection set(s).

The plurality of BFD sets may be associated with the plurality of candidate beam detection sets. Each BFD set of the plurality of BFD sets may be associated with a respective candidate beam detection set of the plurality of candidate beam detection sets. For example, the first BFD set (e.g., indicated by failureDetectionSet1) may be associated with the first candidate beam detection set (e.g., indicated by candidateBeamRSList1). The second BFD set (e.g., indicated by failureDetectionSet2) may be associated with the second candidate beam detection set (e.g., indicated by candidateBeamRSList2). The third BFD set (e.g., indicated by failureDetectionSet3) may be associated with the third candidate beam detection set (e.g., indicated by candidate-BeamRSList3). An n-th BFD set (e.g., indicated by failure-DetectionSet-n) may be associated with n-th candidate beam detection set (e.g., indicated by candidateBeamRSList-n). For example, with reference to FIG. 24, BFD set 1 may be associated with CBD set 1, BFD set 2 may be associated with CBD set 2, and BFD set 3 may be associated with CBD set 3.

The plurality of BFD sets may be associated with a plurality of PCIs. Each BFD set of the plurality of BFD sets may be associated with a respective PCI of the plurality of PCIs. The plurality of PCIs may comprise a PCI of the cell (e.g., serving cell). The plurality of PCIs may comprise a second PCI different from the PCI of the cell (e.g., non-serving cell, neighboring cell, assisting/candidate cell, etc.).

A first BFD set of the plurality of BFD sets may be associated with a first PCI of the plurality of PCIs. The one or more configuration parameters may indicate, for the first BFD set, a first additional PCI index (e.g., higher layer parameter additionalPCIIndex as shown in FIG. 17) indicating the first PCI. The first PCI may be different from a PCI of the cell. The first PCI may be same as the PCI of the cell based on the one or more configuration parameters not indicating, for the first BFD set, an additional PCI index (e.g., higher layer parameter additionalPCIIndex as shown in FIG. 17).

A second BFD set of the plurality of BFD sets may be associated with a second PCI of the plurality of PCIs. The one or more configuration parameters may indicate, for the second BFD set, a second additional PCI index (e.g., higher layer parameter additionalPCIIndex as shown in FIG. 17) indicating the second PCI. The second PCI may be different from a PCI of the cell. In an example, the second PCI may be same as the PCI of the cell based on the one or more configuration parameters not indicating, for the second BFD set, an additional PCI index (e.g., higher layer parameter additionalPCIIndex as shown in FIG. 17).

A third BFD set of the plurality of BFD sets may be associated with a third PCI of the plurality of PCIs. The one or more configuration parameters may indicate, for the third BFD set, a third additional PCI index (e.g., higher layer parameter additionalPCIIndex in FIG. 17) indicating the third PCI. The third PCI may be different from a PCI of the cell. The third PCI may be same as the PCI of the cell based on the one or more configuration parameters not indicating, for the third BFD set, an additional PCI index (e.g., higher layer parameter additionalPCIIndex as shown in FIG. 17). For example, as shown in FIG. 24, BFD set 1 may be associated with PCI 1, BFD set 2 may be associated with PCI 2, and BFD set 3 may be associated with PCI 3.

The first candidate beam detection set may be associated with the first PCI based on the first BFD set that is associated with the first candidate beam detection set being associated with the first PCI. The second candidate beam detection set may be associated with the second PCI based on the second BFD set that is associated with the second candidate beam detection set being associated with the second PCI. The third candidate beam detection set may be associated with the third PCI based on the third BFD set that is associated with the third candidate beam detection set being associated with the third PCI.

As shown in FIG. 24, CBD set 1 may be associated with PCI 1 based on BFD set 1 being associated with PCI 1. CBD set 2 may be associated with PCI 2 based on BFD set 2 being associated with PCI 2. CBD set 3 may be associated with PCI 3 based on BFD set 3 being associated with PCI 3.

The wireless device may receive a first downlink control command/message (e.g., downlink control command/message 2412 at time T1, step 2508). The first downlink control command/message may indicate activation of a first TCI state (e.g., unified TCI state, joint TCI state, common TCI state or uplink TCI state).

The first TCI state may be associated with a first PCI of the plurality of PCIs. The first PCI of the first TCI state may be same as the PCI of the cell. For example, the one or more configuration parameters may not indicate, for the first TCI state, an additional PCI index (e.g., higher layer parameter additionalPCIIndex as shown in FIG. 17).

The first PCI of the first TCI state may be different from the PCI of the cell. The one or more configuration parameters may indicate, for the first TCI state, an additional PCI index (e.g., higher layer parameter additionalPCIIndex as shown in FIG. 17) indicating the first PCI.

The wireless device may measure/assess one or more first reference signals in a first BFD set, of the plurality of BFD sets, associated with the first PCI of the first TCI state. The wireless device may measure/assess the one or more first reference signals in the first BFD set associated with the first PCI of the first TCI state, for example, based on receiving the first downlink control command/message indicating activation of the first TCI state associated with the first PCI.

The wireless device may start measuring/assessing the one or more first reference signals in the first BFD set associated with the first PCI of the first TCI state (e.g., at time T2 in FIG. 24). The wireless device may start measuring/assessing the one or more first reference signals in the first BFD set associated with the first PCI of the first TCI state, for example, based on receiving the first downlink control command/message indicating activation of the first TCI state associated with the first PCI. The wireless device may measure/assess the one or more first reference signals in the first BFD set, for example, for beam failure detection of the first BFD set.

The wireless device may start measuring/assessing radio link qualities (e.g., BLER, SINR, SNR, RSRP, and/or any other parameters) of/for the one or more first reference signals in the first BFD set associated with the first PCI of the first TCI state. The wireless device may start measuring/assessing the radio link qualities (e.g., BLER, SINR, SNR, RSRP, and/or any other parameters) of/for the one or more first reference signals in the first BFD set associated with the first PCI of the first TCI state, for example, based on receiving the first downlink control command/message indicating activation of the first TCI state associated with the first PCI. The wireless device may measure/assess a respective radio link quality of the radio link qualities of/for each reference signal of the one or more first reference signals The radio link qualities may be worse (e.g., higher BLER, lower RSRP, lower SNR, lower SINR, and/or the like) than a first threshold (e.g., rlmInSyncOutOfSyncThreshold). Each radio link quality of a respective reference signal of the one or more first reference signals may be worse than the first threshold. A respective radio link quality of each reference signal of the one or more first reference signals may be worse than the first threshold.

The downlink control command/message 2412 may activate a first TCI state associated with PCI 2. The wireless device may start measuring/assessing radio link qualities of one or more reference signals in BFD set 2, for example, based on BFD set 2 being associated with PCI 2 of the first TCI state. The wireless device may start measuring/assessing radio link qualities of one or more reference signals in BFD set 2, for example, based on BFD set 2 and the first TCI state both being associated with PCI 2.

The wireless device may increment/increase a beam failure instance counter (e.g., indicated by higher layer parameter BFI_COUNTER) of the first BFD set (e.g., step 2512). The wireless device may increment/increase the beam failure instance counter of the first BFD set, for example, based on the radio link qualities of the one or more first reference signals being worse than the first threshold. The wireless device may increment/increase the beam failure instance counter of the first BFD set, for example, by one (or any other quantity). A MAC layer of the wireless device may increment/increase the BFD timer of the first BFD set, for example, based on receiving a beam failure instance indication from a PHY layer of the wireless device. The beam failure instance indication may indicate that the radio link qualities of the one or more first reference signals are worse than the first threshold.

The wireless device may start/restart a BFD timer (e.g., indicated by higher layer parameter beamFailureDetectionTimer) of the first BFD set, for example, based on the radio link qualities of the one or more first reference signals being worse than the first threshold. The one or more configuration parameters may indicate, for the first BFD set, the BFD timer. The MAC layer of the wireless device may start/restart the BFD timer of the first BFD set based on receiving the beam failure instance indication from the PHY layer.

The wireless device may receive a second downlink control command/message (e.g., downlink control command/message 2416 at time T3, step 2516. The second downlink control command/message may indicate activation of a second TCI state (e.g., unified TCI state, joint TCI state, common TCI state, or uplink TCI state).

The second TCI state may be associated with a second PCI of the plurality of PCIs. The second PCI of the second TCI state may be same as the PCI of the cell. The one or more configuration parameters may not indicate, for the second TCI state, an additional PCI index (e.g., higher layer parameter additionalPCIIndex as shown in FIG. 17).

The second PCI of the second TCI state may be different from the PCI of the cell. The one or more configuration parameters may indicate, for the second TCI state, an additional PCI index (e.g., higher layer parameter additionalPCIIndex as shown in FIG. 17) indicating the second PCI.

The wireless device may measure/assess one or more second reference signals in a second BFD set, of the plurality of BFD sets, associated with the second PCI of the second TCI state. The wireless device may measure/assess one or more second reference signals in the second BFD set associated with the second PCI of the second TCI state, for example, based on receiving the second downlink control command/message indicating activation of the second TCI state associated with the second PCI.

The wireless device may determine whether the second downlink control command/message is received before beam failure detection of the first BFD set (e.g., step 2518). For example, the wireless device may determine whether the second downlink control command/message is received before the beam failure instance counter (e.g., BFI_COUNTER) of the first BFD set reaching a maximum quantity of beam failure instances (e.g., indicated by higher layer parameter beamFailureInstanceMaxCount).

The wireless device may receive the second downlink control command/message before beam failure detection of the first BFD set. The wireless device may receive the second downlink control command/message, for example, before (or prior to) the beam failure instance counter (e.g., BFI_COUNTER) of the first BFD set reaching a maximum quantity of beam failure instances (e.g., indicated by higher layer parameter beamFailureInstanceMaxCount). The wireless device may receive the second downlink control command/message when/during the beam failure instance counter of the first BFD set is less than the maximum quantity of beam failure instances (e.g., case 1 as shown in FIG. 24). The one or more configuration parameters may indicate the maximum quantity of beam failure instances.

The second TCI state indicated by the second downlink control command/message may be applied (e.g., may become applicable/effective) for uplink transmissions, for example, before (or prior to) the beam failure instance counter of the first BFD set reaching a maximum quantity of beam failure instances (e.g., indicated by higher layer parameter beamFailureInstanceMaxCount). The second TCI state indicated by the second downlink control command/message may be applied (e.g., may become applicable/effective) for uplink transmissions, for example, when (e.g., during) the beam failure instance counter of the first BFD set is less than the maximum quantity of beam failure instances (e.g., case 1 as shown in FIG. 24). The one or more configuration parameters may indicate the maximum quantity of beam failure instances.

The wireless device may send/transmit (or start transmitting) uplink signals based on the second TCI state. The wireless device may send/transmit (or start transmitting) uplink signals based on the second TCI state, for example, after (or starting from) an application time. The wireless device may determine the application time (e.g., based on a beam application time parameter, such as higher layer parameter BeamAppTime) starting from transmission of HARQ-ACK information bit/feedback of the second downlink control command/message. The second TCI state may be applied, by the wireless device, starting from a starting (e.g., initial, earliest, first) slot that is at least a quantity of symbols (e.g., indicated by the beam application time) after the last symbol of transmission of HARQ-ACK information bit/feedback of the second downlink control command/message The application time may occur before (or prior to) the beam failure instance counter of the first BFD set reaching the maximum quantity of beam failure instances. The one or more configuration parameters may indicate the beam application time/offset.

The second PCI of the second TCI state may be different from the first PCI of the first TCI state. The downlink control command/message 2416 may activate a second TCI state associated with PCI 3 (e.g., different from PCI 2).

The wireless device may set the beam failure instance counter of the first BFD set to zero (e.g., step 2520), for example, based on receiving the second downlink control command/message prior to detection of a beam failure of the first BFD set. The wireless device may set the beam failure instance counter of the first BFD set to zero, for example, based on the second PCI of the second TCI state being different from the first PCI of the first TCI state. The wireless device may set the beam failure instance counter of the first BFD set to zero, for example, based on receiving the second downlink control command/message indicating activation of the second TCI state associated with the second PCI that is different from the first PCI of the first TCI state. The wireless device may set the beam failure instance counter of the first BFD set to zero, for example, based on receiving the second downlink control command/message before (or prior to) the beam failure instance counter of the first BFD set reaching the maximum quantity of beam failure instances. The wireless device may set the beam failure instance counter the first BFD set to zero, for example, based on the application time of the second TCI state occurring before (or prior to) the beam failure instance counter of the first BFD set reaching the maximum quantity of beam failure instances.

The wireless device may stop the BFD timer of the first BFD set, for example, based on the second PCI of the second TCI state being different from the first PCI of the first TCI state. The wireless device may stop the BFD timer of the first BFD set, for example, based on receiving the second downlink control command/message indicating activation of the second TCI state associated with the second PCI that is different from the first PCI of the first TCI state. The wireless device may stop the BFD timer of the first BFD set, for example, based on receiving the second downlink control command/message before (or prior to) the beam failure instance counter of the first BFD set reaching the maximum quantity of beam failure instances. The wireless device may stop the BFD timer of the first BFD set, for example, based on the application time of the second TCI state occurring before (or prior to) the beam failure instance counter of the first BFD set reaching the maximum quantity of beam failure instances.

The wireless device may stop measuring/assessing radio link qualities (e.g., BLER, SINR, SNR, RSRP) of/for the one or more first reference signals in the first BFD set. The wireless device may stop measuring/assessing the radio link qualities of/for the one or more first reference signals in the first BFD set, for example, based on the second PCI of the second TCI state being different from the first PCI of the first TCI state. The wireless device may stop measuring/assessing the radio link qualities of/for the one or more first reference signals in the first BFD set, for example, based on receiving the second downlink control command/message indicating activation of the second TCI state associated with the second PCI that is different from the first PCI of the first TCI state.

The second PCI of the second TCI state may be same as the first PCI of the first TCI state. The wireless device may keep measuring/assessing radio link qualities (e.g., BLER, SINR, SNR, RSRP) of/for the one or more first reference signals in the first BFD set, for example, based on the second PCI of the second TCI state being same as the first PCI of the first TCI state. The wireless device may not reset the beam failure instance counter to zero, for example, based on the second PCI of the second TCI state being same as the first PCI of the first TCI state. The wireless device may increment the beam failure instance counter of the first BFD set, for example, based on the radio link qualities being worse than the first threshold. The wireless device may start/restart the BFD timer of the first BFD set, for example, based on the radio link qualities being worse than the first threshold.

The beam failure instance counter of the first BFD set may be equal to or greater than the maximum quantity of beam failure instances (e.g., indicated by the higher layer parameter beamFailureInstanceMaxCount). The wireless device may detect a beam failure of the first BFD set, for example, based on the beam failure instance counter of the first BFD set being equal to or greater than the maximum quantity of beam failure instances.

The wireless device trigger/initiate a beam failure recovery procedure for the beam failure of the first BFD set. The wireless device may send/transmit, for the beam failure recovery procedure, an uplink signal (e.g., SR, PUCCH transmission, PUSCH transmission, BFR MAC CE, RACH transmission, preamble, and/or the like). The uplink signal may indicate the beam failure of the first BFD set. The uplink signal may indicate a candidate reference signal for the first BFD set. The wireless device may determine (e.g., detect, select, or identify) the candidate reference signal among one or more candidate reference signals in a first candidate beam detection set of the plurality of candidate beam detection sets. The first candidate beam detection set and the first BFD set may be associated. The first candidate beam detection set may be associated with the first PCI. The first candidate beam detection set may be associated with the first PCI, for example, based on the first BFD set being associated with the first PCI.

The wireless device may receive the second downlink control command/message after beam failure detection of the first BFD set. The wireless device may receive the second downlink control command/message during the beam failure recovery procedure of the first BFD set (e.g., case 2 as shown in FIG. 24). The wireless device may receive the second downlink control command/message before completing the beam failure recovery procedure of the first BFD set. The wireless device may receive the second downlink control command/message after the beam failure instance counter of the first BFD set is equal to or greater than the maximum quantity of beam failure instances. The wireless device may receive the second downlink control command/message after the beam failure instance counter of the first BFD set reaches the maximum quantity of beam failure instances.

The application time of the second TCI state may occur during the beam failure recovery procedure of the first BFD set (e.g., case 2 as shown in FIG. 24). The application time of the second TCI state may occur before completing the beam failure recovery procedure of the first BFD set. The application time of the second TCI state may occur after the beam failure instance counter of the first BFD set is equal to or greater than the maximum quantity of beam failure instances. The application time of the second TCI state may occur after the beam failure instance counter of the first BFD set reaches the maximum quantity of beam failure instances.

The second PCI of the second TCI state may be different from the first PCI of the first TCI state. For example, in FIG. 24, the downlink control command/message 2416 received at time T3 may activate a second TCI state associated with PCI 3 that is different from PCI 2 of the first TCI state (e.g., activated at time T1).

The wireless device may stop (e.g., abort, cancel) the beam failure recovery procedure of the first BFD set, for example, based on receiving the second downlink control command/message after detection of a beam failure of the first BFD set (e.g., step 2545). The wireless device may stop the beam failure recovery procedure of the first BFD set. The wireless device may stop the beam failure recovery procedure of the first BFD set, for example, based on the second PCI of the second TCI state being different from the first PCI of the first TCI state. The wireless device may stop the beam failure recovery procedure of the first BFD set, for example, based on receiving the second downlink control command/message indicating activation of the second TCI state associated with the second PCI that is different from the first PCI of the first TCI state. The wireless device may stop/the beam failure recovery procedure of the first BFD set, for example, based on receiving the second downlink control command/message during the beam failure recovery procedure of the first BFD set. The wireless device may stop the beam failure recovery procedure of the first BFD set, for example, based on the application time of the second TCI state occurring during the beam failure recovery procedure of the first BFD set.

The wireless device may not send/transmit an uplink signal for the beam failure recovery procedure of the first BFD set, for example, based on stopping (e.g., aborting, canceling) the beam failure recovery procedure of the first BFD set. The wireless device may not monitor downlink control channels for a beam failure response (e.g., DCI), for example, based on stopping the beam failure recovery procedure of the first BFD set.

The second PCI of the second TCI state may be same as the first PCI of the first TCI state. The wireless device may continue (or keep performing) the beam failure recovery procedure of the first BFD set, for example, based on the second PCI of the second TCI state being same as the first PCI of the first TCI state. The wireless device may send/transmit an uplink signal for the beam failure recovery procedure of the first BFD set. The wireless device may monitor downlink control channels for a beam failure response (e.g., DCI). The base station may send/transmit the beam failure response based on receiving the uplink signal. The wireless device may complete the beam failure recovery procedure of the first BFD set, for example, based on receiving the beam failure response.

A wireless device may perform a method comprising multiple operations. The wireless device may receive one or more configuration parameters of a cell, wherein the one or more configuration parameters indicate a plurality of uplink power control sets. The wireless device may, based on completing a beam failure recovery procedure associated with a beam failure detection (BFD) set of at least two BFD sets of the cell, sending uplink signals using a transmission power determined based on an uplink power control set, of the plurality of uplink power control sets, corresponding to the BFD set. The wireless device may also perform one or more additional operations. The completing the beam failure recovery procedure associated with the BFD set of the at least two BFD sets of the cell may comprise completing a beam failure recovery procedure of a transmission and reception point (TRP) of at least two TRPs. The selected uplink power control set is selected based on the TRP, of the at least two TRPs of the cell, for which the beam failure recovery procedure was completed. The uplink power control set may be a first uplink power control set, if the completed beam failure recovery procedure associated with the BFD set is a beam failure recovery procedure associated with a first BFD set of the at least two BFD sets of the cell. The uplink power control set may be a second uplink power control set, if the completed beam failure recovery procedure associated with the BFD set is a beam failure recovery procedure associated with a second BFD set of the at least two BFD sets of the cell. The wireless device may select, as the uplink power control set, a first uplink power control set with a lowest uplink power control set index of a plurality of uplink power control set indexes of the plurality of uplink power control sets, if the completed beam failure recovery procedure associated with the BFD set is a beam failure recovery procedure associated with a first BFD set of the at least two BFD sets of the cell. The wireless device may select, as the uplink power control set, a second uplink power control set with a second lowest uplink power control set index of a plurality of uplink power control set indexes of the plurality of uplink power control sets, if the completed beam failure recovery procedure associated with the BFD set is a beam failure recovery procedure associated with a second BFD set of the at least two BFD sets of the cell. The wireless device may select, as the uplink power control set, a first uplink power control set with a lowest uplink power control set index of one or more first uplink power control set indexes of one or more first uplink power control sets, of the plurality of uplink power control sets, associated with a first BFD set of the at least two BFD sets of the cell, if the completed beam failure recovery procedure associated with the BFD set is a beam failure recovery procedure associated with the first BFD set. The wireless device may select, as the selected uplink power control set, a second uplink power control set with a lowest uplink power control set index of one or more second uplink power control set indexes of one or more second uplink power control sets, of the plurality of uplink power control sets, associated with a second BFD set of the at least two BFD sets of the cell, if the completed beam failure recovery procedure associated with the BFD set is a beam failure recovery procedure associated with the second BFD set. The one or more configuration parameters may comprise: an index with a first value for the one or more first uplink power control sets, wherein the first value is associated with the first BFD set, and an index with a second value for the one or more second uplink power control sets, wherein the second value is associated with the second BFD set. The index may be at least one of: a CORESET pool index; a TRP index; a unified transmission configuration indication (TCI) state indicator, or an additional physical cell identifier (PCI). The wireless device may select, as the uplink power control set, a first uplink power control set with a lowest uplink power control set index of one or more first uplink power control set indexes of one or more first uplink power control sets, of the plurality of uplink power control sets, associated with a first physical cell identifier (PCI), if the completed beam failure recovery procedure associated with the BFD set is a beam failure recovery procedure associated with a first BFD set of the at least two BFD sets of the cell. The wireless device may select, as the uplink power control set, a second uplink power control set with a lowest uplink power control set index of one or more second uplink power control set indexes of one or more second uplink power control sets, of the plurality of uplink power control sets, associated with a second PCI, if the completed beam failure recovery procedure associated with the BFD set is a beam failure recovery procedure associated with a second BFD set of the at least two BFD sets of the cell. The one or more configuration parameters may indicate: a first additional PCI index indicating the first PCI for the one or more first uplink power control sets; and a second additional PCI index indicating the second PCI for the one or more second uplink power control sets. An uplink power control set of the plurality of uplink power control sets may be associated with a PCI of the cell based on the one or more configuration parameters not indicating, for the uplink power control set, an additional PCI index. The one or more configuration parameters may further indicate: a first list of uplink power control sets comprising one or more first uplink power control sets of the plurality of uplink power control sets; and a second list of uplink power control sets comprising one or more second uplink power control sets of the plurality of uplink power control sets. The wireless device may select, as the uplink power control set, a first uplink power control set with a lowest uplink power control set index of one or more first uplink power control set indexes of the one or more first uplink power control sets, if the completed beam failure recovery procedure associated with the BFD set is a beam failure recovery procedure associated with a first BFD set of the at least two BFD sets of the cell. The wireless device may select, as the uplink power control set, a second uplink power control set with a lowest uplink power control set index of one or more second uplink power control set indexes of the one or more second uplink power control sets, if the completed beam failure recovery procedure associated with the BFD set is a beam failure recovery procedure associated with a second BFD set of the at least two BFD sets of the cell. The first list of uplink power control sets may be associated with the first BFD set. The second list of uplink power control sets may be associated with the second BFD. An uplink power control set index of the first uplink power control set may be equal to zero. An uplink power control set index of the second uplink power control set may be equal to zero. The first list of uplink power control sets may be associated with a first physical cell identifier (PCI). The second list of uplink power control sets may be associated with a second PCI. The one or more configuration parameters may indicate: a first additional PCI index indicating the first PCI for the first list of uplink power control sets; and a second additional PCI index indicating the second PCI for the second list of uplink power control sets. The at least two BFD sets may comprise a first BFD set and a second BFD set. The first BFD set may be associated with a first physical cell identifier (PCI). The second BFD set may be associated with a second PCI. The one or more configuration parameters may indicate, for the first BFD set, a first additional PCI index indicating the first PCI; and may indicate, for the second BFD set, a second additional PCI index indicating the second PCI. The wireless device may send, for the beam failure recovery procedure of the BFD set, an uplink signal indicating a beam failure of the BFD set. The uplink signal may indicate a candidate reference signal of one or more candidate reference signals in a candidate set, wherein the candidate set is associated with the BFD set. The one or more configuration parameters may indicate the candidate set. A radio link quality of the candidate reference signal may be greater than or equal to a threshold. The uplink signal may be a first physical uplink shared channel (PUSCH) transmission comprising a first beam failure recovery medium access control (MAC) control element (CE) indicating a first candidate reference signal and a first BFD set of the at least two BFD sets of the cell, if the completed beam failure recovery procedure of the BFD set is a beam failure recovery procedure of the first BFD set. The uplink signal may be a second PUSCH transmission comprising a second beam failure recovery MAC CE indicating a second candidate reference signal and a second BFD set of the at least two BFD sets of the cell, if the completed beam failure recovery procedure of the BFD set is a beam failure recovery procedure of the second BFD set. The first PUSCH transmission and the second PUSCH transmission may be the same PUSCH transmission. The first beam failure recovery MAC CE and the second beam failure recovery MAC CE may be the same beam failure recovery MAC CE. A transmission of a contention-based random access procedure may comprise the same beam failure recovery MAC CE. The completing the beam failure recovery procedure of the BFD set may be based on receiving downlink control information (DCI). The wireless device may determine the transmission power based on power control parameters indicated by the uplink power control set. The wireless device may detect a beam failure of the BFD set. The detecting the beam failure may comprise detecting the beam failure based on measuring one or more reference signals in the BFD set, wherein a quality of the one or more reference signals may be worse than a threshold. A quantity of the one or more reference signals may be equal to or less than a maximum quantity of BFD reference signals. The wireless device may transmit a capability message comprising a parameter indicating the maximum quantity of BFD reference signals. The one or more configuration parameters may indicate the at least two BFD sets. The wireless device may receive a first medium access control (MAC) control element (CE) activating one or more first reference signals of at least two reference signals in a first BFD set of the at least two BFD sets. The wireless device may receive a second MAC CE activating one or more second reference signals of at least two reference signals in a second BFD set of the at least two BFD sets. The one or more configuration parameters may not indicate the at least two BFD sets. The wireles s device may determine one or more transmission configuration indication (TCI) states of one or more control resource sets (CORESETs), wherein the one or more TCI states may indicate the one or more reference signals in the BFD set. The cell may be a PCell or a PSCell. The one or more configuration parameters may indicate, for a control resource set (CORESET), a recovery search space set index. The completing the beam failure recovery of the BFD set may be based on receiving downlink control information (DCI) via the CORESET. The uplink signals may start a quantity of symbols from a last symbol of a first physical downlink control channel (PDCCH) reception comprising the DCI. A cyclic redundancy check (CRC) field of the DCI may be scrambled by cell radio network temporary identifier (C-RNTI) or modulation and coding scheme C-RNTI (MCS-C-RNTI). The completing the beam failure recovery procedure of the BFD set may be based on the DCI scheduling a physical uplink shared channel (PUSCH) transmission with a hybrid automatic repeat request (HARQ) process number that is the same as a HARQ process number used for transmission of the uplink signal, and wherein the DCI comprises a toggled new data indicator (NDI) field. The one or more configuration parameters may indicate a plurality of transmission configuration indication (TCI) states. The wireless device may receive one or more downlink control messages indicating activation of at least two TCI states comprising a first TCI state and a second TCI state, wherein the plurality of TCI states comprises the at least two TCI states. The first TCI state may be associated with a first CORESET pool index. The second TCI state may be associated with a second CORESET pool index. The one or more downlink control messages may be two downlink control messages comprising: a first downlink control message with a first TCI field indicating activation of the first TCI state; and a second downlink control message with a second TCI field indicating activation of the second TCI state. The wireless device may receive: a first MAC CE indicating activation of a first subset of the plurality of TCI states for the first CORESET pool index, wherein the first subset of the plurality of TCI states comprise the first TCI state; and a second MAC CE indicating activation of a second subset of the plurality of TCI states for the second CORESET pool index, wherein the second subset of the plurality of TCI states comprise the second TCI state. The one or more downlink control messages may be a single downlink control message with a TCI field indicating activation of the first TCI state and the second TCI state. The wireless device may receive a MAC CE indicating activation of a subset of the plurality of TCI states, wherein the subset of the plurality of TCI states may comprise the first TCI state and the second TCI state. The wireless device may map the subset of the plurality of TCI states to one or more TCI codepoints, wherein a TCI codepoint of the one or more TCI codepoints may comprise the first TCI state and the second TCI state. The wireless device may send: first uplink signals via first uplink channels or first uplink resources with a first transmission parameter determined based on the first TCI state, wherein the first transmission parameter is a first spatial domain transmission filter or the first transmission power; and second uplink signals via second uplink channels or second uplink resources with a second transmission parameter determined based on the second TCI state, wherein the second transmission parameter is a second spatial domain transmission filter or the second transmission power. The first uplink channels or first uplink resources may comprise at least one of: first physical uplink shared channel (PUSCH) resources; first physical uplink control channel (PUCCH) resources; or first sounding reference signal (SRS) resources. The second uplink channels or second uplink resources may comprise at least one of: second PUSCH resources; second PUCCH resources; or second SRS resources. The one or more configuration parameters may comprise, for the first uplink channels or the first uplink resources, an index with a first value indicating application of the first TCI state for the first uplink channels or the first uplink resources. The one or more configuration parameters may comprise, for the second uplink channels or the second uplink resources, the index with a second value indicating to apply the second TCI state for the second uplink channels or the second uplink resources. The index may be at least one of: a CORESET pool index; a transmission reception point (TRP) index; or a flag. The wireless device may receive, via a first CORESET with a first index indicating application of the first TCI state for the first CORESET, first DCI scheduling transmission of a signal in the first uplink signals. The wireless device may receive, via a second CORESET with a second index indicating application of the second TCI state for the second CORESET, second DCI scheduling transmission of a signal in the second uplink signals. The first index or the second index may be at least one of: a CORESET pool index; a transmission reception point (TRP) index; or a flag. The sending the uplink signals may comprise sending third uplink signals via the first uplink channels or the first uplink resources based on completing a beam failure recovery procedure of a first BFD set of the at least two BFD sets. The sending the uplink signals may comprise sending fourth uplink signals via the second uplink channels or the second uplink resources based on completing a beam failure recovery procedure of a second BFD set of the at least two BFD sets. The sending the uplink signals may comprise: sending the third uplink signals based on a first uplink power control set in response to applying the first TCI state to the first uplink channels or the first uplink resources; and sending the fourth uplink signals based on a second uplink power control set in response to applying the second TCI state to the second uplink channels or the second uplink resources. The first TCI state may be associated with a first PCI. The second TCI state may be associated with a second PCI. The first PCI and the second PCI may be different. The one or more configuration parameters may indicate, for the first TCI state, a first additional PCI index indicating the first PCI. The one or more configuration parameters may indicate, for the second TCI state, a second additional PCI index indicating the second PCI. The first PCI may be equal to a PCI of the cell based on the one or more configuration parameters not indicating, for the first TCI state, an additional PCI index. The second PCI may be equal to a PCI of the cell based on the one or more configuration parameters not indicating, for the second TCI state, an additional PCI index. The one or more configuration parameters may indicate a plurality of TCI states indicating a unified TCI state for the cell. The one or more configuration parameters may indicate a plurality of uplink power control set indexes for the plurality of uplink power control sets. Each uplink power control set of the plurality of uplink power control sets may be identified by a respective uplink power control set index of the plurality of uplink power control set indexes. Each uplink power control set of the plurality of uplink power control sets may indicate respective power control parameters for: physical uplink shared channel (PUSCH) transmissions; physical uplink control channel (PUCCH) transmissions; and sounding reference signal (SRS) transmissions. Each uplink power control set, of the plurality of uplink power control sets, may indicate a respective: target received power value for uplink transmissions; pathloss compensation factor value for uplink transmissions; and closed loop index value for uplink transmissions. The one or more configuration parameters may comprise an uplink power control parameter indicating a list of uplink power control sets comprising the plurality of uplink power control sets. The uplink power control parameter may configure uplink power control parameters for uplink transmissions when the one or more configuration parameters comprise a unified-TCI-state-type field for the cell. The plurality of uplink power control sets may be used to configure power control parameters for uplink transmissions. The wireless device may select, as the uplink power control set, a first uplink power control set, with an uplink power control set index equal to zero, if the completed beam failure recovery procedure associated with the BFD set is a beam failure recovery procedure of a first BFD set of the at least two BFD sets of the cell. The wireless device may select, as the uplink power control set, a second uplink power control set with an uplink power control set index equal to zero, if the completed beam failure recovery procedure associated with the BFD set is a beam failure recovery procedure associated with a second BFD set of the at least two BFD sets of the cell. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to send the one or more configuration parameters. A computer-readable medium may store instructions that, when executed, cause performance of the described method, additional operations and/or include the additional elements.

A wireless device may perform a method comprising multiple operations. The wireless device may receive one or more configuration parameters of a cell, wherein the one or more configuration parameters may indicate a plurality of uplink power control sets. The wireless device may, based on completing a beam failure recovery procedure of a transmission and reception point (TRP) of at least two TRPs of the cell, send uplink signals using a transmission power determined based on an uplink power control set, of the plurality of uplink power control sets, corresponding to the TRP. The wireless device may also perform one or more additional operations. The completing the beam failure recovery procedure of the TRP of the at least two TRPs of the cell may comprise completing a beam failure recovery procedure associated with a beam failure detection (BFD) set of at least two BFD sets. The uplink power control set may be selected based on the BFD set. The uplink power control set may be: a first uplink power control set if the completed beam failure recovery procedure of the TRP is a beam failure recovery procedure of a first TRP of the at least two TRPs of the cell; or a second uplink power control set, if the completed beam failure recovery procedure of the TRP is a beam failure recovery procedure of a second TRP of the at least two TRP of the cell. The wireless device may select, as the uplink power control set, a first uplink power control set with a lowest uplink power control set index of a plurality of uplink power control set indexes of the plurality of uplink power control sets, if the completed beam failure recovery procedure of the TRP is a beam failure recovery procedure of a first TRP of the at least two TRPs of the cell. The wireless device may select, as the uplink power control set, a second uplink power control set with a second lowest uplink power control set index of a plurality of uplink power control set indexes of the plurality of uplink power control sets, if the completed beam failure recovery procedure of the TRP is a beam failure recovery procedure of a second TRP of the at least two TRPs of the cell. The wireless device may select, as the uplink power control set, a first uplink power control set with a lowest uplink power control set index of one or more first uplink power control set indexes of one or more first uplink power control sets, of the plurality of uplink power control sets, associated with a first TRP of the at least two TRPs of the cell, if the completed beam failure recovery procedure of the TRP is a beam failure recovery procedure of the first TRP. The wireless device may select, as the uplink power control set, a second uplink power control set with a lowest uplink power control set index of one or more second uplink power control set indexes of one or more second uplink power control sets, of the plurality of uplink power control sets, associated with a second TRP of the at least two TRPs of the cell, if the completed beam failure recovery procedure of the TRP is a beam failure recovery procedure of the second TRP. The wireless device may select, as the uplink power control set, a first uplink power control set with a lowest uplink power control set index of one or more first uplink power control set indexes of one or more first uplink power control sets, of the plurality of uplink power control sets, associated with a first physical cell identifier (PCI), if the completed beam failure recovery procedure of the TRP is a beam failure recovery procedure of a first TRP of the at least two TRPs of the cell. The wireless device may select, as the uplink power control set, a second uplink power control set with a lowest uplink power control set index of one or more second uplink power control set indexes of one or more second uplink power control sets, of the plurality of uplink power control sets, associated with a second PCI, if the completed beam failure recovery procedure of the TRP is a beam failure recovery procedure of a second TRP of the at least two TRPs of the cell. The one or more configuration parameters may further indicate: a first list of uplink power control sets comprising one or more first uplink power control sets of the plurality of uplink power control sets; and a second list of uplink power control sets comprising one or more second uplink power control sets of the plurality of uplink power control sets. The wireless device may select, as the uplink power control set, a first uplink power control set with a lowest uplink power control set index of one or more first uplink power control set indexes of the one or more first uplink power control sets, if the completed beam failure recovery procedure of the TRP is a beam failure recovery procedure of a first TRP of the at least two TRPs of the cell. The wireless device may select, as the uplink power control set, a second uplink power control set with a lowest uplink power control set index of one or more second uplink power control set indexes of the one or more second uplink power control sets, if the completed beam failure recovery procedure of the TRP is a beam failure recovery procedure of a second TRP of the at least two TRPs of the cell. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to send the one or more configuration parameters. A computer-readable medium may store instructions that, when executed, cause performance of the described method, additional operations and/or include the additional elements.

A base station may perform a method comprising multiple operations. The base station may send one or more configuration parameters of a cell, wherein the one or more configuration parameters may indicate a plurality of uplink power control sets. The base station may, based on completing a beam failure recovery procedure associated with a beam failure detection (BFD) set of at least two BFD sets of the cell, receive uplink signals sent, by a wireless device, using a transmission power based on an uplink power control set of the plurality of uplink power control sets. The uplink power control set may correspond to the BFD set. The base station may also perform one or more additional operations. The uplink power control set may be: a first uplink power control set, if the completed beam failure recovery procedure associated with the BFD set is a beam failure recovery procedure associated with a first BFD set of the at least two BFD sets of the cell; or a second uplink power control set, if the completed beam failure recovery procedure associated with the BFD set is a beam failure recovery procedure associated with a second BFD set of the at least two BFD sets of the cell. The uplink power control set may be: a first uplink power control set with a lowest uplink power control set index of a plurality of uplink power control set indexes of the plurality of uplink power control sets, if the completed beam failure recovery procedure associated with the BFD set is a beam failure recovery procedure associated with a first BFD set of the at least two BFD sets of the cell; or a second uplink power control set with a second lowest uplink power control set index of a plurality of uplink power control set indexes of the plurality of uplink power control sets, if the completed beam failure recovery procedure associated with the BFD set is a beam failure recovery procedure associated with a first BFD set of the at least two BFD sets of the cell. The configuration parameters may further indicate corresponding reference signals for each BFD set of the at least two BFD sets. The completing the beam failure recovery procedure associated with the BFD set may comprise sending downlink control information (DCI) scheduling transmission of the uplink signals. The base station may comprise one or more processors; and memory storing instructions that, when executed by the one or more processors, cause the base station to perform the described method, additional operations and/or include the additional elements. A system may comprise a base station configured to perform the described method, additional operations and/or include the additional elements; and a wireless device configured to send the uplink signals. A computer-readable medium may store instructions that, when executed, cause performance of the described method, additional operations and/or include the additional elements.

A wireless device may perform a method comprising multiple operations. The wireless device may receive one or more messages comprising one or more configuration parameters of a cell. The one or more configuration parameters may indicate: at least two beam failure detection sets; and a plurality of uplink power control sets. The wireless device may, based on completing a beam failure recovery of a first beam failure detection set of the at least two beam failure detection sets, transmit first uplink signals with a first transmission power determined based on a first uplink power control set, among the plurality of uplink power control sets, with a lowest uplink power control set index. The wireless device may, based on completing a beam failure recovery of a second beam failure detection set of the at least two beam failure detection sets, transmit second uplink signals with a second transmission power determined based on a second uplink power control set, among the plurality of uplink power control sets, with a second lowest uplink power control set index. The wireless device may also perform one or more additional operations. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to send the one or more messages. A computer-readable medium may store instructions that, when executed, cause performance of the described method, additional operations and/or include the additional elements.

A wireless device may perform a method comprising multiple operations. The wireless device may receive one or more messages comprising one or more configuration parameters of a cell. The one or more configuration parameters may indicate: at least two beam failure detection reference signal sets; and a plurality of uplink power control set indexes for a plurality of uplink power control sets. The wireless device may, based on completing a beam failure recovery of a first beam failure detection reference signal set of the at least two beam failure detection reference signal sets, transmit first uplink signals with a first transmission power determined based on a first uplink power control parameter set, among the plurality of uplink power control parameter sets, with a lowest uplink power control set index of the plurality of uplink power control set indexes. The wireless device may, based on completing a beam failure recovery of a second beam failure detection reference signal set of the at least two beam failure detection reference signal sets, transmit second uplink signals with a second transmission power determined based on a second uplink power control parameter set, among the plurality of uplink power control parameter sets, with a second lowest uplink power control set index of the plurality of uplink power control set indexes. The wireless device may also perform one or more additional operations. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to send the one or more messages. A computer-readable medium may store instructions that, when executed, cause performance of the described method, additional operations and/or include the additional elements.

A wireless device may perform a method comprising multiple operations. The wireless device may receive one or more messages comprising one or more configuration parameters of a cell. The one or more configuration parameters may indicate a plurality of uplink power control sets associated with a plurality of physical cell indexes (PCIs). The wireless device may transmit, for beam failure recovery of a beam failure detection set associated with a PCI of the plurality of PCIs, an uplink signal indicating a beam failure of the beam failure detection set. The wireless device may, based on receiving a downlink control message/command that completes the beam failure recovery, select an uplink power control set, of the plurality of uplink power control sets, with a lowest uplink power control set index among one or more uplink power control sets, of the plurality of uplink power control sets, associated with the same PCI. The wireless device may transmit uplink signals with a transmission power determined based on power control parameters indicated by the uplink power control set. The wireless device may also perform one or more additional operations. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to send the one or more messages. A computer-readable medium may store instructions that, when executed, cause performance of the described method, additional operations and/or include the additional elements.

A wireless device may perform a method comprising multiple operations. The wireless device may receive one or more messages comprising one or more configuration parameters of a cell. The one or more configuration parameters may indicate a plurality of beam failure detection sets associated with a plurality of physical cell indexes (PCIs). The wireless device may receive a first downlink control message indicating activation of a first transmission configuration indicator (TCI) state associated with a first PCI of the plurality of PCIs. The wireless device may, based on the receiving the first downlink control message indicating activation of the first TCI state associated with the first PCI, start measuring one or more first reference signals in a first beam failure detection set, of the plurality of beam failure detection sets, associated with the first PCI. The wireless device may, based on a radio link quality of the one or more first reference signals being worse than a threshold: increment a beam failure instance counter of the first beam failure detection set; and start a beam failure detection timer of the first beam failure detection set. The wireless device may receive a second downlink control message indicating activation of one or more TCI states associated with one or more PCIs of the plurality of PCIs. Each PCI of the one or more PCIs may be different from the first PCI. The wireless device may, based on the one or more PCIs being different from the first PCI: set the beam failure instance counter to zero; and stop the beam failure detection timer. The wireless device may also perform one or more additional operations. The receiving the second downlink control message may be prior to the beam failure instance counter reaching a maximum beam failure instance count of the first beam failure detection set. The one or more TCI states may comprise a second TCI state associated with a second PCI of the plurality of PCIs. The wireless device may, based on the receiving the second downlink control message indicating activation of the second TCI state associated with the second PCI, start measuring one or more second reference signals in a second beam failure detection set, of the plurality of beam failure detection sets, associated with the second PCI. The starting measuring the one or more second reference signals may be further based on the one or more configuration parameters indicating the second beam failure detection set associated with the second PCI. The wireless device may, based on a radio link quality of the one or more second reference signals being worse than the threshold: increment a second beam failure instance counter of the second beam failure detection set; and start a second beam failure detection timer of the second beam failure detection set. The wireless device may transmit an uplink signal for a beam failure recovery of the second beam failure detection set based on the second beam failure instance counter being equal to or greater than a maximum beam failure instance count of the second beam failure detection set. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to send the messages. A computer-readable medium may store instructions that, when executed, cause performance of the described method, additional operations and/or include the additional elements.

A wireless device may perform a method comprising multiple operations. The wireless device may receive one or more messages comprising one or more configuration parameters of a cell. The one or more configuration parameters may indicate a plurality of beam failure detection sets associated with a plurality of physical cell indexes (PCIs). The wireless device may receive a first downlink control message indicating activation of a first transmission configuration indicator (TCI) state associated with a first PCI of the plurality of PCIs. The wireless device may, based on the receiving the first downlink control message indicating activation of the first TCI state associated with the first PCI, start measuring one or more first reference signals in a first beam failure detection set, of the plurality of beam failure detection sets, associated with the first PCI. The wireless device may trigger a beam failure recovery procedure based on detecting a beam failure of the first beam failure detection set. The wireless device may receive, during the beam failure recovery procedure of the first beam failure detection set, a second downlink control message indicating activation of one or more TCI states associated with one or more PCIs of the plurality of PCIs, wherein each PCI of the one or more PCIs is different from the first PCI. The wireless device may, based on the one or more PCIs being different from the first PCI, stop the beam failure recovery procedure. The wireless device may also perform one or more additional operations. The receiving the second downlink control message may be after the beam failure instance counter being equal to or greater than a maximum beam failure instance count of the first beam failure detection set. The detecting the beam failure may be based on a first beam failure instance counter of the first beam failure detection set being equal to or greater than a maximum beam failure instance count of the first beam failure detection set. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to send the one or more configuration parameters. A computer-readable medium may store instructions that, when executed, cause performance of the described method, additional operations and/or include the additional elements.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or capability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that may not comply with the disclosed methods, for example, because those wireless devices and/or base stations may perform based on older releases of LTE, 5G, or other 3GPP or non-3GPP technology.

One or more parameters, fields, and/or Information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:

receiving, by a wireless device, one or more configuration parameters of a cell, wherein the one or more configuration parameters indicate a plurality of uplink power control sets;

sending, based on a beam failure for a first beam failure detection (BFD) set of at least two BFD sets and for a beam failure recovery procedure for the first BFD set, an uplink signal, wherein:

the first BFD set is associated with a first control resource set (CORESET) pool index, and a second BFD set of the at least two BFD sets is associated with a second CORESET pool index; and after completing a beam failure recovery procedure for the first BFD set, sending uplink signals that apply a first transmission configuration indication (TCI) state associated with the first CORESET pool index using a transmission power determined based on an uplink power control set, of the plurality of uplink power control sets associated with a lowest uplink power control set identifier.

2. The method of claim 1, wherein:

the completing the beam failure recovery procedure for the first BFD set of comprises completing a beam failure recovery procedure of a first transmission and reception point (TRP) of at least two TRPs, and the uplink power control set is selected based on the first TRP.

3. The method of claim 1, further comprising:

after completing a second beam failure recovery procedure for the second BFD set, sending second uplink signals that apply a second TCI state associated with the second CORESET pool index using a second transmission power determined based on a second uplink power control set, among the plurality of uplink power control sets, with a second lowest uplink power control set identifier.

4. The method of claim 1, further comprising:

after completing a second beam failure recovery procedure for the second BFD set, sending second uplink signals that apply a second TCI state associated with the second CORESET pool index using a second transmission power determined based on, a second uplink power control set, among a second plurality of uplink power control sets, with a lowest uplink power control set identifier among uplink power control set identifiers of the second plurality of uplink power control sets.

5. The method of claim 1, wherein:

the first BFD set is associated with a first physical cell identifier (PCI); and the second BFD set is associated with a second PCI.

6. The method of claim 1, wherein:

the plurality of uplink power control sets is associated with a first physical cell identifier (PCI).

7. The method of claim 1, further comprising receiving:

first downlink control information (DCI) indicating the first TCI state associated with the first CORESET pool index; and second DCI indicating a second TCI state associated with the second CORESET pool index.

8. The method of claim 1, wherein the one or more configuration parameters further indicate:

the first CORESET pool index for one or more first CORESETs; and the second CORESET pool index for one or more second CORESETs.

9. The method of claim 1, wherein each uplink power control set of the plurality of uplink power control sets indicates at least one of:

a respective target-received power;

a respective pathloss compensation factor; or a respective closed-loop index.

10. A method comprising:

receiving, by a wireless device, one or more configuration parameters of a cell, wherein the one or more configuration parameters indicate a plurality of uplink power control sets;

sending, based on a beam failure for a first transmission and reception point (TRP) of at least two TRPs of the cell and for a beam failure recovery procedure for the first TRP, an uplink signal, wherein:

the first TRP is associated with a first control resource set (CORESET) pool index, and a second TRP of the at least two TRPs is associated with a second CORESET pool index; and after completing a beam failure recovery procedure of the first TRP, sending uplink signals that apply a first transmission configuration indication (TCI) state associated with the first CORESET pool index using a transmission power determined based on an uplink power control set, of the plurality of uplink power control sets, associated with a lowest uplink power control set identifier.

11. The method of claim 10, wherein:

the completing the beam failure recovery procedure for the first TRP comprises completing a beam failure recovery procedure associated with a first beam failure detection (BFD) set of at least two BFD sets, and the uplink power control set is selected based on the first BFD set.

12. The method of claim 10, further comprising:

after completing a second beam failure recovery procedure of the second TRP, sending second uplink signals that apply a second TCI state associated with the second CORESET pool index using a second transmission power determined based on a second uplink power control set, among the plurality of uplink power control sets, with a second lowest uplink power control set identifier.

13. The method of claim 10, further comprising:

after completing a second beam failure recovery procedure of the second TRP, sending second uplink signals that apply a second TCI state associated with the second CORESET pool index using a second transmission power determined based on a second uplink power control set, among a second plurality of uplink power control sets, with a lowest uplink power control set identifier among uplink power control set identifiers of the second plurality of uplink power control sets.

14. The method of claim 10, wherein the plurality of uplink power control sets, is associated with a first physical cell identifier (PCI).

15. A method comprising:

sending, by a base station, one or more configuration parameters of a cell, wherein the one or more configuration parameters indicate a plurality of uplink power control sets;

receiving, based on a beam failure for a first beam failure detection (BFD) set of at least two BFD sets and for a beam failure recovery procedure for the first BFD set, an uplink signal, wherein:

the first BFD set is associated with a first control resource set (CORESET) pool index, and a second BFD set of the at least two BFD sets is associated with a second CORESET pool index; and after completing a beam failure recovery procedure for the first BFD set, receiving uplink signals sent by a wireless device applying a first transmission configuration indication (TCI) state associated with the first CORESET pool index and using a transmission power based on an uplink power control set, of the plurality of uplink power control sets, associated with a lowest uplink power control set identifier.

16. The method of claim 15, further comprising:

after completing a second beam failure recovery procedure for the second BFD set, receiving second uplink signals sent by the wireless device applying a second TCI state associated with the second CORESET pool index and using a second transmission power determined based on a second uplink power control set, among the plurality of uplink power control sets, with a second lowest uplink power control set identifier.

17. The method of claim 15, wherein the configuration parameters further indicate corresponding reference signals for each BFD set of the at least two BFD sets.

18. The method of claim 15, wherein the completing the beam failure recovery procedure associated for the first BFD set comprises sending downlink control information (DCI) scheduling transmission of the uplink signals.

19. The method of claim 15, further comprising sending:

first downlink control information (DCI) indicating the first TCI state associated with the first CORESET pool index; and second DCI indicating a second TCI state associated with the second CORESET pool index.

20. The method of claim 15, wherein each uplink power control set of the plurality of uplink power control sets indicates at least one of:

a respective target-received power;

a respective pathloss compensation factor; or a respective closed-loop index.

* * * * *